(12) United States Patent
May

(10) Patent No.: US 12,541,733 B2
(45) Date of Patent: Feb. 3, 2026

(54) ASSESSMENT AND AUGMENTATION SYSTEM FOR OPEN MOTOR SKILLS

(71) Applicant: iCueMotion LLC, San Francisco, CA (US)

(72) Inventor: Bérénice Mettler May, San Francisco, CA (US)

(73) Assignee: iCueMotion LLC, San Francisco, CA (US)

( * ) Notice: Subject to any disclaimer, the term of this patent is extended or adjusted under 35 U.S.C. 154(b) by 948 days.

(21) Appl. No.: 17/558,521

(22) Filed: Dec. 21, 2021

(65) Prior Publication Data

US 2022/0198368 A1 Jun. 23, 2022

Related U.S. Application Data

(60) Provisional application No. 63/128,437, filed on Dec. 21, 2020.

(51) Int. Cl.
    *G06Q 10/0639* (2023.01)
    *A63B 24/00* (2006.01)

(52) U.S. Cl.
    CPC .......... *G06Q 10/06398* (2013.01); *A63B 24/0003* (2013.01)

(58) Field of Classification Search
    CPC .......... G06Q 10/06398; A63B 24/0003
    See application file for complete search history.

(56) References Cited

U.S. PATENT DOCUMENTS

| | | | |
|---|---|---|---|
| 4,257,594 | A | 3/1981 | Conrey et al. |
| 4,303,241 | A | 12/1981 | Burroughs |

(Continued)

FOREIGN PATENT DOCUMENTS

| | | |
|---|---|---|
| CN | 104107134 A | 10/2014 |
| CN | 104225890 A | 12/2014 |

(Continued)

OTHER PUBLICATIONS

Extended European Search Report dated Jun. 4, 2024 in connection with European patent application No. 21912106.8, 10 pages.

(Continued)

*Primary Examiner* — Malina D. Blaise
(74) *Attorney, Agent, or Firm* — Dorsey & Whitney LLP

(57) ABSTRACT

A system adapted to augment movement behavior of participants in an open motor task or activity includes one or more movement sensors configured to generate output characterizing movements of participants, including relevant interactions with elements and features of the environment and task or activity objects within the environment. A processor is configured to extract and segment a sequence of movement behavior elements from the output, register the movement elements with respect to operating environment, including the task or activity objects, recognize activity state, and determine cues to enhance performance and/or learning. Augmentations include verbal, visual, or haptic or audible signal-based cues that are designed to target critical aspects of movement skills in open motor tasks, including planning sequence of movements toward task goals; coordinating and executing movement elements in the sequence in relationship to relevant task activity events and elements.

11 Claims, 40 Drawing Sheets

(56) References Cited

U.S. PATENT DOCUMENTS

| | | |
|---|---|---|
| 4,508,510 A | 4/1985 | Clifford |
| 5,031,909 A | 7/1991 | Pecker |
| 5,154,427 A | 10/1992 | Harlan et al. |
| 5,226,650 A | 7/1993 | Suttner |
| 5,368,042 A | 11/1994 | Oneal et al. |
| 5,419,562 A | 5/1995 | Cromarty |
| 5,610,590 A | 3/1997 | Johnson et al. |
| 5,646,911 A | 7/1997 | Davis |
| 5,694,340 A | 12/1997 | Kim |
| 6,032,530 A | 3/2000 | Hock |
| 6,219,032 B1 | 4/2001 | Rosenberg et al. |
| 6,224,493 B1 | 5/2001 | Lee et al. |
| 6,314,339 B1 | 11/2001 | Rastegar et al. |
| 6,565,449 B2 | 5/2003 | Buhler |
| 6,649,905 B2 | 11/2003 | Grenlund |
| 6,659,905 B2 | 12/2003 | Usoro et al. |
| 7,021,140 B2 | 4/2006 | Perkins |
| 7,160,200 B2 | 1/2007 | Grober |
| 7,264,554 B2 | 9/2007 | Bentley |
| 7,337,335 B2 | 2/2008 | Jorgenson et al. |
| 7,536,033 B2 | 5/2009 | Kirby |
| 7,602,301 B1 | 10/2009 | Stirling et al. |
| 7,891,666 B2 | 2/2011 | Kuenzler et al. |
| 8,282,487 B2 | 10/2012 | Wilson et al. |
| 8,323,107 B2 | 12/2012 | Amit |
| 8,337,335 B2 | 12/2012 | Dugan |
| 8,360,904 B2 | 1/2013 | Oleson et al. |
| 8,556,267 B2 | 10/2013 | Gobush |
| 8,589,114 B2 | 11/2013 | Papadourakis |
| 8,602,922 B2 | 12/2013 | Schwenger et al. |
| 8,622,795 B2 | 1/2014 | Edis et al. |
| 8,831,905 B2 | 9/2014 | Papadourakis |
| 8,903,521 B2 | 12/2014 | Goree et al. |
| 8,905,855 B2 | 12/2014 | Fitzpatrick et al. |
| 8,941,723 B2 | 1/2015 | Bentley et al. |
| 8,944,928 B2 | 2/2015 | Kaps et al. |
| 8,944,940 B2 | 2/2015 | Mettler |
| 8,956,238 B2 | 2/2015 | Boyd et al. |
| 8,989,441 B2 | 3/2015 | Han et al. |
| 8,994,826 B2 | 3/2015 | Bentley |
| 9,039,527 B2 | 5/2015 | Bentley et al. |
| 9,565,122 B2 | 2/2017 | Harrand et al. |
| 9,694,267 B1 | 7/2017 | Thornbrue et al. |
| 9,901,776 B2 | 2/2018 | Mettler |
| 10,668,353 B2 | 6/2020 | Mettler May |
| 10,854,104 B2 | 12/2020 | Mettler May |
| 2001/0049890 A1 | 12/2001 | Hirsch et al. |
| 2002/0077189 A1 | 6/2002 | Tuer et al. |
| 2002/0107077 A1 | 8/2002 | Buhler |
| 2002/0134153 A1 | 9/2002 | Grenlund |
| 2003/0024311 A1 | 2/2003 | Perkins |
| 2004/0243261 A1 | 12/2004 | King |
| 2004/0259651 A1 | 12/2004 | Storek |
| 2005/0017454 A1 | 1/2005 | Endo et al. |
| 2005/0054457 A1 | 3/2005 | Eyestone et al. |
| 2005/0196737 A1 | 9/2005 | Mann |
| 2005/0227775 A1 | 10/2005 | Cassady et al. |
| 2005/0261073 A1 | 11/2005 | Farrington et al. |
| 2006/0025229 A1 | 2/2006 | Mahajan et al. |
| 2006/0052173 A1 | 3/2006 | Telford |
| 2006/0166737 A1 | 7/2006 | Bentley |
| 2006/0166738 A1 | 7/2006 | Eyestone et al. |
| 2006/0184336 A1 | 8/2006 | Kolen |
| 2006/0277466 A1 | 12/2006 | Anderson |
| 2007/0015611 A1 | 1/2007 | Noble et al. |
| 2007/0026975 A1 | 2/2007 | Marty et al. |
| 2007/0105664 A1 | 5/2007 | Scheinert et al. |
| 2007/0111811 A1 | 5/2007 | Grober |
| 2007/0135225 A1 | 6/2007 | Nieminen et al. |
| 2007/0207873 A1 | 9/2007 | Rose |
| 2007/0265105 A1 | 11/2007 | Barton et al. |
| 2008/0085778 A1 | 4/2008 | Dugan |
| 2008/0200287 A1 | 8/2008 | Marty et al. |
| 2008/0312010 A1 | 12/2008 | Marty et al. |
| 2009/0143926 A1 | 6/2009 | Almalki et al. |
| 2009/0209358 A1 | 8/2009 | Niegowski |
| 2009/0210078 A1 | 8/2009 | Crowley |
| 2010/0093463 A1 | 4/2010 | Davenport et al. |
| 2010/0121228 A1 | 5/2010 | Stirling et al. |
| 2010/0144414 A1 | 6/2010 | Edis et al. |
| 2010/0173276 A1 | 7/2010 | Vasin |
| 2010/0184564 A1 | 7/2010 | Molyneux et al. |
| 2010/0323794 A1 | 12/2010 | Su |
| 2011/0021280 A1 | 1/2011 | Boroda et al. |
| 2011/0054290 A1 | 3/2011 | Derchak |
| 2011/0143319 A1 | 6/2011 | Bennett et al. |
| 2011/0183787 A1 | 7/2011 | Schwenger et al. |
| 2011/0184225 A1 | 7/2011 | Whitall et al. |
| 2011/0202152 A1 | 8/2011 | Barton et al. |
| 2011/0230265 A1 | 9/2011 | Amit |
| 2011/0230274 A1 | 9/2011 | Lafortune et al. |
| 2012/0029666 A1 | 2/2012 | Crowley et al. |
| 2012/0046119 A1 | 2/2012 | Davenport |
| 2012/0050529 A1 | 3/2012 | Bentley |
| 2012/0052973 A1 | 3/2012 | Bentley |
| 2012/0136464 A1 | 5/2012 | Saito et al. |
| 2012/0157241 A1 | 6/2012 | Nomura et al. |
| 2012/0189996 A1 | 7/2012 | Hager et al. |
| 2012/0236030 A1 | 9/2012 | Border et al. |
| 2013/0018493 A1 | 1/2013 | Amini |
| 2013/0018494 A1 | 1/2013 | Amini |
| 2013/0053190 A1* | 2/2013 | Mettler .............. A63B 24/0062 |
| | | 473/422 |
| 2013/0095939 A1 | 4/2013 | Meadows et al. |
| 2013/0095962 A1 | 4/2013 | Yamamoto et al. |
| 2013/0128022 A1 | 5/2013 | Bose et al. |
| 2013/0266918 A1 | 10/2013 | Tinjust |
| 2013/0267339 A1 | 10/2013 | Boyd et al. |
| 2013/0302768 A1 | 11/2013 | Webb |
| 2014/0031703 A1 | 1/2014 | Rayner et al. |
| 2014/0047457 A1 | 2/2014 | Nojima |
| 2014/0180451 A1 | 6/2014 | Marty |
| 2014/0278219 A1 | 9/2014 | Canavan et al. |
| 2015/0019135 A1 | 1/2015 | Kacyvenski et al. |
| 2015/0057111 A1 | 2/2015 | Tremblay-munger et al. |
| 2015/0104768 A1 | 4/2015 | Clark |
| 2015/0112464 A1 | 4/2015 | Crowley et al. |
| 2015/0120021 A1 | 4/2015 | Kerhuel et al. |
| 2015/0141178 A1 | 5/2015 | Mettler |
| 2015/0196803 A1 | 7/2015 | Shavit et al. |
| 2015/0317910 A1 | 11/2015 | Daniels |
| 2016/0027325 A1 | 1/2016 | Malhotra |
| 2016/0086500 A1 | 3/2016 | Kaleal |
| 2016/0303426 A1 | 10/2016 | Martikka et al. |
| 2016/0361593 A1 | 12/2016 | Elliott |
| 2017/0004358 A1 | 1/2017 | Bose et al. |
| 2017/0011527 A1 | 1/2017 | Matsunaga et al. |
| 2017/0021259 A1 | 1/2017 | Dismuke |
| 2017/0061817 A1* | 3/2017 | Mettler May ........ A61B 5/1124 |
| 2017/0225033 A1 | 8/2017 | Czaja |
| 2017/0232324 A1* | 8/2017 | Mettler May .......... A63B 69/38 |
| | | 473/459 |
| 2018/0001173 A1 | 1/2018 | Cupa |
| 2018/0165864 A1 | 6/2018 | Jin et al. |
| 2018/0229078 A1 | 8/2018 | Mettler |
| 2019/0009133 A1* | 1/2019 | Mettler May ...... G09B 19/0038 |
| 2019/0111327 A1 | 4/2019 | Mochizuki |
| 2019/0126126 A1 | 5/2019 | Knab |
| 2020/0289907 A1 | 9/2020 | Mettler May |
| 2020/0289909 A1 | 9/2020 | Kline et al. |
| 2021/0110734 A1 | 4/2021 | May |
| 2022/0198368 A1* | 6/2022 | May ................... A63B 24/0003 |

FOREIGN PATENT DOCUMENTS

| | | |
|---|---|---|
| CN | 110998696 A | 4/2020 |
| EP | 2750773 A1 | 7/2014 |
| EP | 2752224 A1 | 7/2014 |
| EP | 3385937 A1 | 10/2018 |
| FR | 2829700 A1 | 3/2003 |
| RU | 2364436 C2 | 8/2009 |
| WO | 2006004908 A2 | 1/2006 |
| WO | 2009043558 A1 | 4/2009 |
| WO | 2011036567 A2 | 3/2011 |

(56) References Cited

FOREIGN PATENT DOCUMENTS

| WO | 2015123474 A1 | 8/2015 |
|---|---|---|
| WO | 2016025460 A1 | 2/2016 |
| WO | 2017040242 A1 | 3/2017 |
| WO | 20170420242 A1 | 3/2017 |
| WO | 2019010435 A1 | 1/2019 |

OTHER PUBLICATIONS

Communication pursuant to Article 94(3) dated Jan. 2, 2016 issued in European Patent Application No. 12827395.0.
Extended European Search Report issued in European Application No. 12827395.0, mailed on Apr. 21, 2015, 6 pages.
Extended European Search Report issued in European Application No. 18173631.5, mailed on Jun. 21, 2018, 4 pages.
International Preliminary Report on Patentability issued in International Application No. PCT/US2016/048871, mailed on Mar. 15, 2018, 15 pages.
International Search Report and Written Opinion issued in International Application No. PCT/US2016/048871, issued on Dec. 1, 2016, 16 pages.
Second Office Action dated Jan. 6, 2022 in connection with Chinese patent application No. 2018800486618, 9 pages including English translation.
Official Action dated Mar. 1, 2022 in connection with European patent application No. 18829049.8, 13 pages.
International Search Report and Written Opinion dated Mar. 17, 2022 in connection with International Patent Application No. PCT/US2021/064752, 11 pages.
First Office Action dated Jun. 3, 2021 in connection with Chinese patent application No. 2018800486618, 20 pages including English translation.
Office Action dated Jul. 25, 2019 in connection with Chinese Patent Application No. 2016800641099, 17 pages including English translation.
Decision Denying Institution of Inter Partes Review; IPR2016-00675, U.S. Pat. No. 8,941,723. 16 pages, Aug. 14, 2017.
Final Written Decision of Inter Partes Review; IPR2016-00676, U.S. Pat. No. 8,905,855. 38 pages, Aug. 14, 2017.
Final Written Decision of Inter Partes Review; IPR2016-00677, U.S. Pat. No. 8,944,928. 30 pages, Aug. 14, 2017.
Decision Denying Institution of Inter Partes Review; IPR2016-00672, U.S. Pat. No. 8,903,521. 20 pages, Aug. 29, 2016.
Decision Denying Institution of Inter Partes Review; IPR2016-00674, U.S. Pat. No. 9,039,527. 11 pages, Aug. 29, 2016.
Otto, et al. "System Architecture of a Wireless Body Area Sensor Network for Ubiquitous Health Monitoring," Journal of Mobile Multimedia, vol. 1, No. 4, 2006, pp. 307-326.
Decision Denying Request for Rehearing; IPR20198-00537, U.S. Pat. No. 8,831,905. 8 pages, Oct. 7, 2019.
Decision Denying Petitioner's Request for Rehearing of Decision Denying Institution of Inter Partes Review; IPR2019-00538, U.S. Pat. No. 8,589,114. 12 pages, Oct. 10, 2019.
Decision Denying Petitioner's Request for Rehearing of Decision Denying Institution of Inter Partes Review; IPR2019-00536, U.S. Pat. No. 9,656,122. 14 pages, Oct. 24, 2019.
Dec. 7, 2020 summons to attend oral proceedings for European patent application No. 15831843.6, 7 pages.
Office Action dated Dec. 7, 2021 in connection with European patent application No. 16842664.1, 11 pages.
Office Action dated Dec. 7, 2020 in connection with Chinese Patent Application No. 2016800641099, 5 pages including English translation.
Extended European Search Report dated Feb. 10, 2021 in connection with European patent application No. 18829049.8, 7 pages.
Second Office Action dated May 19, 2020 in connection with Chinese Patent Application No. 2016800641099, 23 pages including English translation.
Examination Report dated May 22, 2019 in connection with European Patent Application 15831843.6, 6 pages.
Extended European Search Report dated Apr. 8, 2019 in connection with European Patent Application No. 16842664.1, 13 pages.
Extended European Search Report dated Nov. 29, 2017 in connection with European Patent Application No. 15831843.6, 10 pages.
International Search Report and Written Opinion dated Nov. 11, 2015 in connection with International Patent Application No. PCT/US2015/044620, 12 pages.
International Search and Written Opinion dated Nov. 20, 2018 in connection with International Patent Application No. PCT/US2018/041118, 12 pages.
Abernathy, et al., "Expertise and the perception of kinematic and situational probability information", Abstract, Perception, 2001; 30(2): 233-252.
Bernardi, et al., "Mental practice promotes motor anticipation: evidence for skilled music performance", Abstract, Frontiers in Human Neuroscience, 2013; 7:451.
Bernstein, "The Co-ordination and Regulation of Movements", Science, Jan. 26, 1968: vol. 159, Issue 3813, p. 415.
Gibson, "The Ecological Approach lo Visual Perception: Classic Edition", Introduction, Psychology Press, 1986.
Kugler, et al., "Information, natural law, and the self-assembly of rhythmic movement", Abstract, Hillsdale, N.J., NJ Erlbaum Associates, (1987).
Landlinger, et al., "Key factors and timing patterns in the tennis forehand of different skill levels", J. Sports Sc. & Med., 9(4): 643 (2010).
Lee, et al., "Sensory and intrinsic coordination of movement", Royal Soc. of London, pp. 2029-2035 (1999).
Posner, et al., "Orienting of Attention", The Quarterly Journal of Experimental Psychology, 1980, 32:3-35.
Warren, "The Dynamics of Perception and Action", Psychological Review, (2006), vol. 113, No. 2, pp. 358-389.
Williams, et al., "Anticipation skill in a real-world task: Measurement, raining, and transfer in tennis", Abstract, Journal of Experimental Psychology: Applied, vol. 8(4), Dec. 2002, pp. 259-270.
First office action dated Aug. 18, 2025 in connection with Chinese patent application No. 202180094224.1, 38 pages including English translation.

* cited by examiner

ASSESSMENT AND AUGMENTATION SYSTEM FOR OPEN MOTOR SKILLS

CROSS-REFERENCE TO RELATED APPLICATION

This application claims priority to U.S. Provisional Application No. 63/128,437, filed Dec. 21, 2020, HIERARCHICAL AND OPEN MOTOR SKILL ASSESSMENT AND AUGMENTATION, which is incorporated by reference herein, in the entirety and for all purposes.

FIELD

This application describes a sensor-based system and method for assessing and augmenting movement behavior in open motor tasks, focusing on computer-based measurement, assessment, and augmentation techniques for improved task-level planning, movement element coordination, and movement element control.

BACKGROUND

In open motor tasks, actions take place in a dynamic environment. Therefore, the operating conditions under which the movements are executed are in constant evolution. The performer must learn to manage these conditions, as well as the movement execution. Open motor tasks also require the subjects to plan a sequence of movement behaviors to accomplish task goals, and coordinate the elements in the sequence to ensure appropriate dynamics of their interactions with the environment. Therefore, proficiency in open motor tasks requires both cognitive and motor skills, which makes learning open motor skills challenging.

The assessment and augmentation build on a hierarchical interactive model. The model has three primary levels: task planning, movement sequence coordination, and the movement elements execution. The task planning follows principles of naturalistic decision making and can be described by global task-level patterns. These patterns abstract the details of the task environment dynamics to focus on the configuration in key task and movement skill elements. The execution of the underlying behaviors deals with the coordination of a sequence of skill elements. Each skill element is described by operating conditions and outcomes.

Open motor skills play a fundamental role in many human activities, in both professional domains and recreation such as sports. Open motor tasks are challenging to perform and learn, because the movement behaviors take place in dynamic environments. Therefore, subjects, in addition to learning the movement patterns needed to achieve specific outcomes in the environment, must learn to plan and coordinate entire sequence of movement elements, and finally control the environment in which different movement behavior elements take place.

These skills also depend on a hierarchical sensing, control, and decision-making architecture. The subjects must learn a repertoire of lower-level motor skills needed to support the range of interactions with the task environment and elements, including adapting the movement technique to achieve a range of outcomes under different conditions. They must learn to coordinate the movement elements in a sequence, for example to synchronize with the environment dynamics, including sensing and perception of the local environment to control the movement elements environment conditions. Finally, at the higher-level, the subjects must learn the global perception and planning for sequencing behavior elements toward the task goals. As a result of this deep hierarchy, lengthy training is required to attain superior levels of proficiency.

SUMMARY

The present disclosure describes systems and methods for modeling, assessing, and augmenting the performance and learning of open motor tasks. The general approach includes identifying and modeling the units of behavior, such as movement elements, supporting the larger task and environment interactions (e.g., including interactions of the subject, agent or participant with the environment, and interactions of a tool, equipment or other objects manipulated by the subject, agent, or participant with the environment).

These units are then integrated within a hierarchical interactive model that captures the larger task-level planning, decision making, and coordination. The hierarchical model is formalized using internal models describing different brain motor control processes: 1) a type of forward model that describes the larger scale task environment dynamics and higher-level planning and decisions; 2) a type of coordination policy that describes the executive functions responsible for the coordination of the sequence of movement elements; and 3) a type of inverse models that describe the decision making at the level of each movement element.

The hierarchical interactive model is used to augment learning and performance at the level of movement behavior, e.g., movement technique adapted to the conditions and outcomes; at the level of the sequence of movement elements, e.g., controlling each unit's operating environment; and at the task level, e.g., generating the sequence of actions needed to achieve the task goals. Furthermore, the hierarchical interactive model enables design augmentations that target key processes in open motor skills, including perceptual and planning, as well as the movement control and execution across the system hierarchy.

At the cognitive level, augmentation targets the planning process including the generation of goal configurations at the task level; at the executive level, augmentations can provide cues to drive spatial control and coordination for the sequence of movement elements; and at the motor level, augmentations can provide cues for movement execution. The disclosure considers different forms of augmentation, including verbal cueing, visual cueing, such as through augmented reality glasses, and simple signal based cueing that can be implemented using audio or haptic device.

BRIEF DESCRIPTION OF THE DRAWINGS

FIG. 16 is an illustration of an execution phase, including conditions at the preparation time, execution time, and during the follow-through.

FIGS. 19A-19E illustrate example frames and pose estimation from computer vision for key frames from ready positioning, preparation, stroke forward swing initiation, strike, and the end of the follow through.

DETAILED DESCRIPTION

Figure 1:
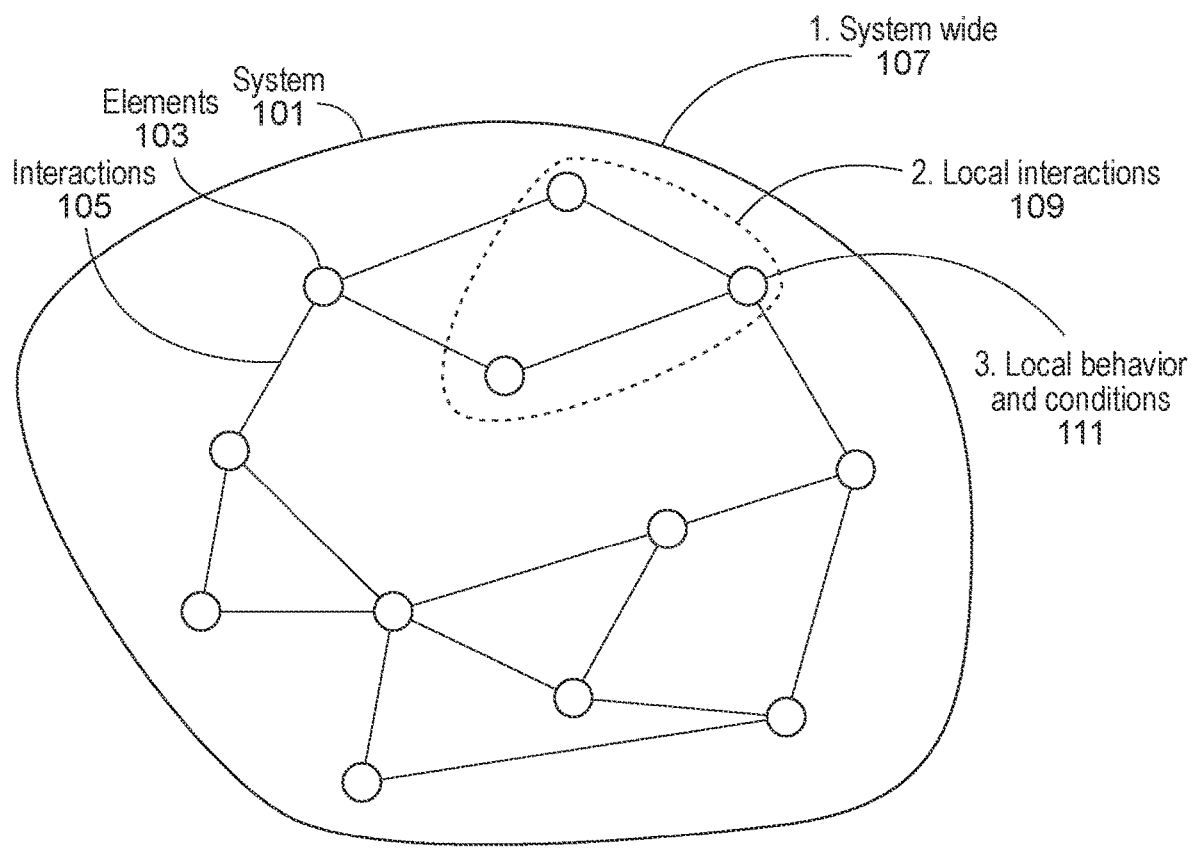
FIG. 1 is an illustration of open-motor tasks as a graph showing a collection of interactions (edges) between elements (nodes) where each element is either an agent, a segment of an agent, a task or environment element or object.

The present disclosure describes sensor systems and computer-based techniques for improved assessment and augmentation in open motor tasks such as tennis and other racket and paddle sports, golf, skiing, and other professional and recreational activities, covering open motor skill assessment, diagnostics and augmentation. These techniques can be applied to a variety of other open motor task domains, both for natural subjects and artificial agents, as well as encompassing human-machine systems, and computer processor based simulations.

I. Introduction and Overview

This disclosure first provides goals and motivations for modeling and assessing skills for so-called open motor tasks. It then describes general challenges and outlines the general approach to improved, computer-based motion sensor systems and augmentation techniques. An outline of the disclosure is also provided.

Movement Elements Deployment and Execution

A key characteristic of open motor tasks is the player's control of the environment under which the movement elements are executed. Instructions and cueing at this level focus on the features that drive the correct deployment of the primary movement units to create optimal conditions for their outcomes. The global conditions are determined by the planning and executive level, which specifies the movement elements deployment relative to the task elements and configuration for the next exchange cycle.

For example, for the positioning movement elements (FIGS. 29A and 29B), this includes the foot work patterns and the aspects related to the stroke, such as the racket take back (unit turn) in relationship with the incoming shot. For the stroke preparation (FIG. 29C), this includes the interaction with the incoming ball, in particular its bounce, and how the body segments and racket are initiated to create the setup state for the stroke execution. For the stroke execution (FIG. 29D), this includes the interaction with the ball in its last phase before the strike.

I.I Goals and Motivation

A fundamental difference between open and closed motor tasks is that in the former the movements take place in dynamic conditions and, therefore, the performer must control the conditions in which the primary movements/actions are taken. In addition, open motor tasks rely on complex movement interactions with the environment and task elements, and in many such tasks, the task goals are achieved through a sequence of movements. Therefore, the performer has to plan the movement sequence, and coordinate these movements over the sequence, including their respective operating conditions and system configuration.

Good examples of open motor tasks are tennis and skiing. As shown in FIG. 2, a tennis stroke is deployed in a dynamic environment with a moving ball and different player and opponent configurations. More generally, to achieve desired outcomes, movement execution should follow a sequence of movement behaviors; e.g., including positioning and preparation stages. The sequence creates the conditions under which the stroke or other movement is executed. However, since the environment may be evolving, the sequence of planned movements must be coordinated based on the current and predicted conditions.

Figure 34:
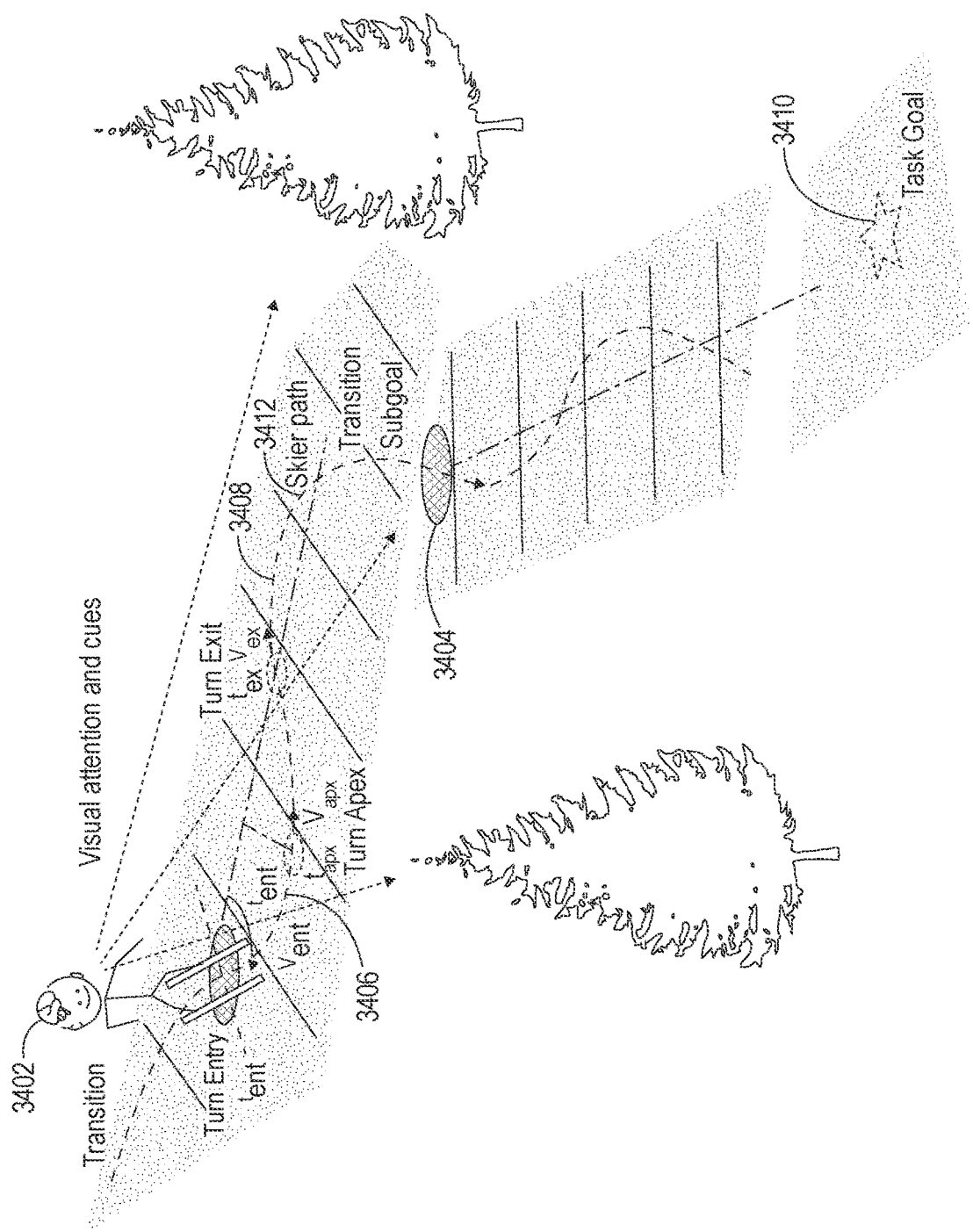
FIG. 34 illustrates a skier's movement and perceptual behavior in a terrain environment.
Figure 35:
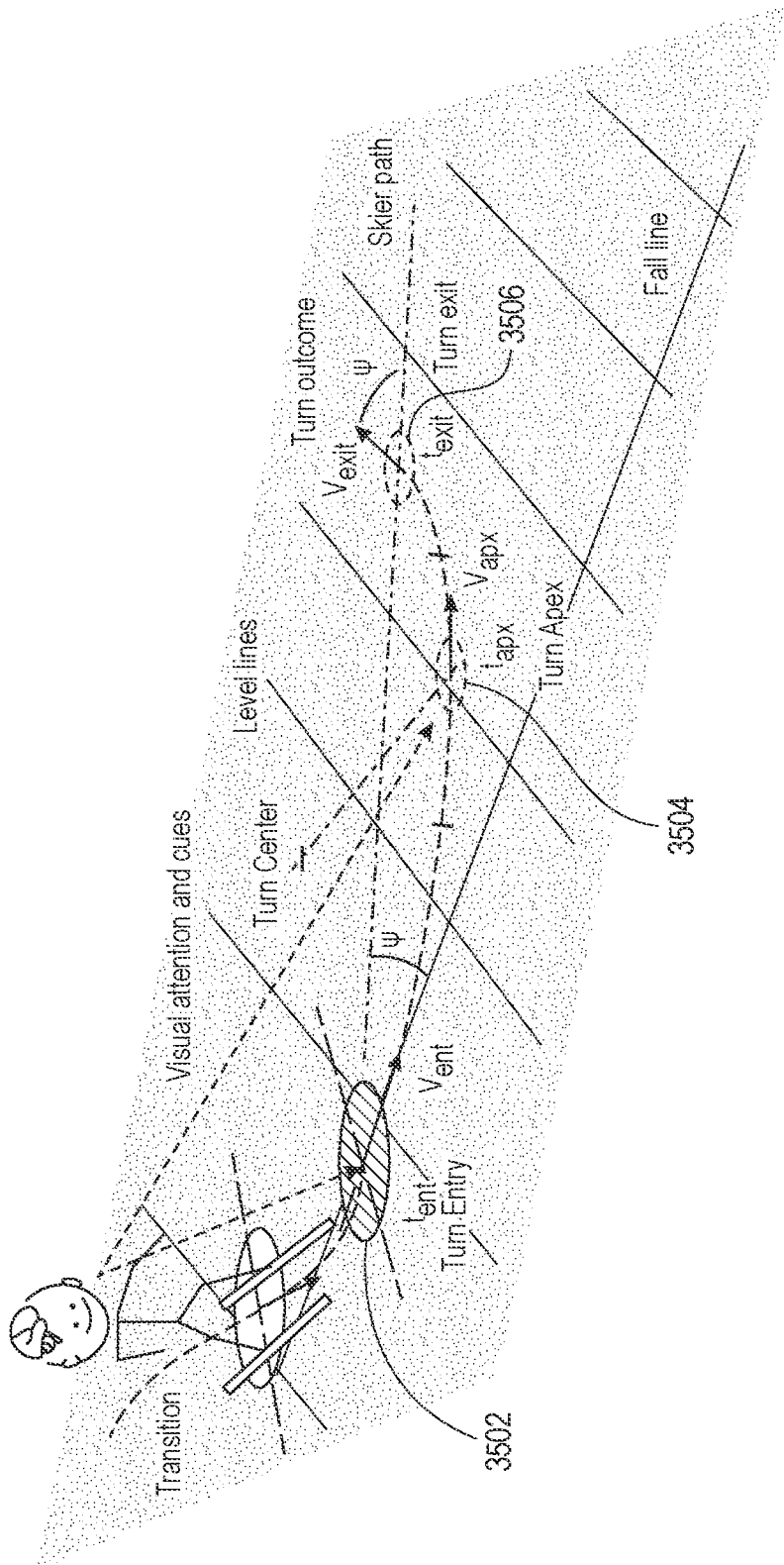
FIG. 35 shows the skier transition into a different turn maneuver following a new path.

Similarly, as shown in FIGS. 34 and 35, a sequence of ski turn maneuvers are executed in terrain conditions. The sequence depends on the skier's current location and velocity, as well as the terrain and local and larger goal such as desired destination. In addition, creating the desired turn performance and outcomes requires setting up the maneuver based on the local conditions.

Therefore, these movements must be analyzed and trained considering the larger task goal, and the sequence of movements and their respective operating environment. Open motor tasks are among the most challenging to learn and achieve superior levels of proficiency. This challenge is faced not only by athletes, as well as amateurs in various sports, but also by many professionals such as surgeons or pilots.

A basic question is: how can technology help the performance and learning of open motor tasks? This disclosure builds on the prior art to elaborate skill modeling and augmentation across the comprehensive dimensions of skills in open motor tasks including, but not limited to, tennis, handball, volleyball, badminton, and other racket and paddle sports. Suitable applications also include alpine (downhill) and Nordic (cross-country) skiing, running, swimming, hiking, walking, bicycling, golf, and other sports activities, as well as physical therapy and rehabilitation, video games, and other simulated or remote professional activities such as surgery, remote or robotic surgery, remote architecture, and remote interior and exterior design. References include commonly-assigned U.S. Pat. Nos. 8,944,940 B2, 9,901,776 B2, and 10,610,732 B2; U.S. Pat. No. 10,668,353 B2 and U.S. Publication No. 2020/0289907 A1; U.S. Pat. No. 10,854,104 B2 and U.S. Publication No. 2021/0110734 A1; and U.S. Publication No. 2019/0009133 A1; all by the same inventor as the present application, and each of which is incorporated by reference herein, in the entirety and for all purposes.

A starting point for understanding the nature of the problems to be solved for building comprehensive assessment, is the National Tennis Rating Program (NTRP). This rating system assigns a numerical rating based on assessments of different aspects and dimensions of the tennis performance. From the NTRP, the criteria for the rating cover a broad range of dimensions in performance.

i) The first goal is to formulate a comprehensive skill modeling framework for open motor skills that can support comprehensive assessments such as provided by the NTRP; therefore, the system operates in a quantitative fashion from performance measurements.

ii) Furthermore, the system provides assessment and diagnostics that enable identifying and specifying training goals needed to drive training.

iii) Third, understanding these techniques supports the design of feedback or cueing augmentations that supplement human natural sensory and perceptual mechanisms. Compared with feedback reinforcements at the level of movement execution, these augmentations can also operate on higher-level processes such as task-level planning, visual attention, and cueing supporting the coordination with task and environment elements (compare, e.g., U.S. Pat. No. 10,854,104 B2 and U.S. Publication No. 2121/0110734 A1, and U.S. Publication No. 2019/0009133 A1).

iv) Finally, this system is integrated within a data-driven training process augmentation and management architecture, including, but not limited to, an iterative training system (compare, e.g., U.S. Publication No. 2019/0009133 A1).

The central problems are the definition and extraction of meaningful behavior elements, together with the element of their operating environment, from various measurement data; and their integration under an interaction model for the task or activity. These elements and the integrated model should provide the knowledge needed for the assessment and training augmentation.

Figure 28:
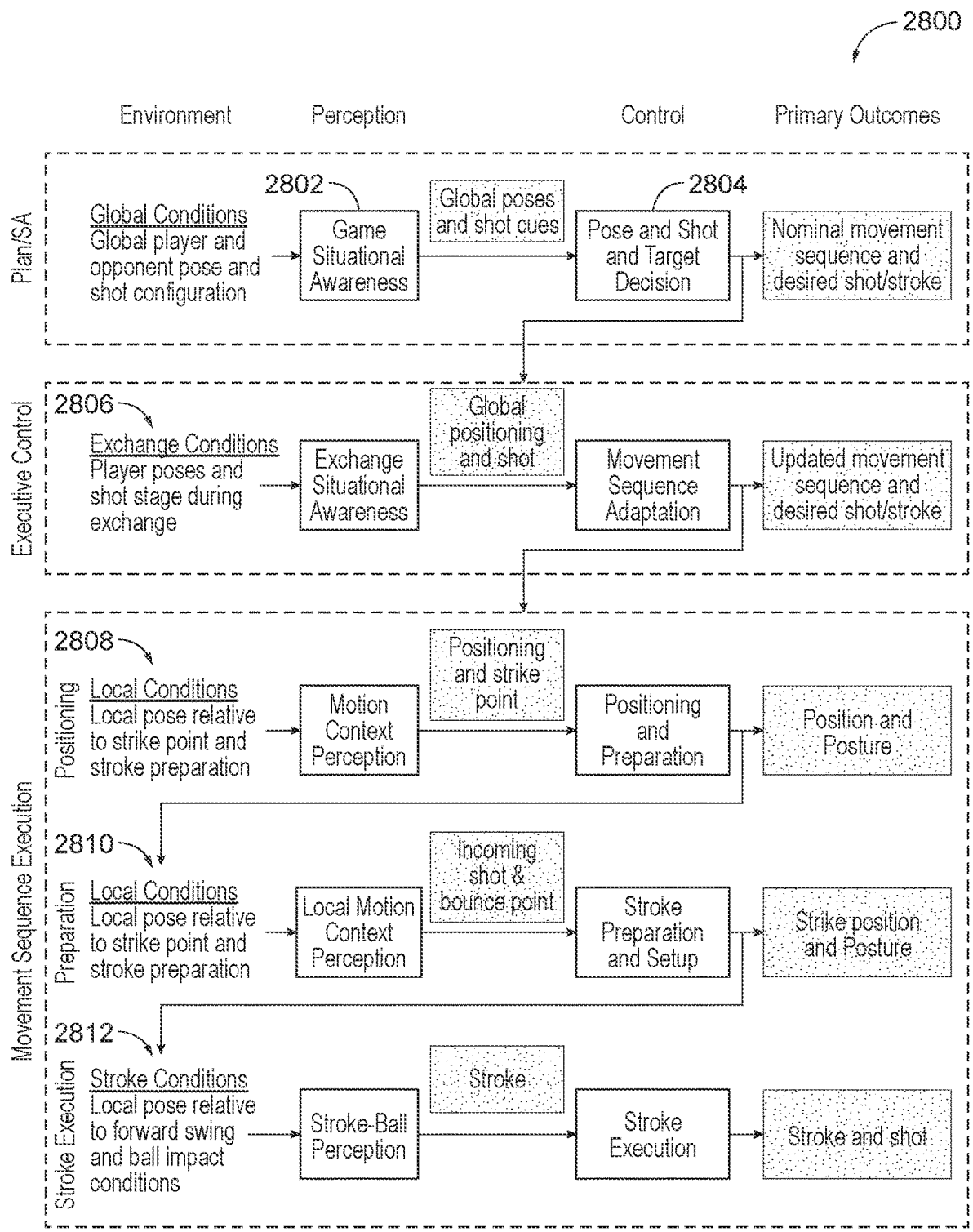
FIG. 28 illustrates a hierarchical model derived from FIG. 3, highlighting functions that lend themselves to augmentation across levels of organization.

An overall goal of the present disclosure is to describe methods and systems for augmentation of open motor tasks/activities to enhance learning and performance. This disclosure extends beyond training of individual movement elements, to encompass execution of a broader category of movement behavior elements within a larger task environment, and across the system hierarchy, including planning, attention, timing and coordination of behavior; for example, as shown in FIG. 28 (compare, e.g., U.S. Pat. No. 10,854, 104 B2 U.S. Publication No. 2121/0110734 A, and U.S. Publication No. 2019/0009133 A1). Therefore, key extensions presented here include extending the model to the interactions with the larger task and operating environment, as well as accounting for the task-level planning, perception, and coordination.

Finally, the general goal for this system and approach is to be generalizable to any open motor task. The system and methods also apply to human-machine systems such as humans with prosthetics, or robotic surgical system driven by an operator, and virtual system such as in video games and other simulation-based systems.

Problem Description

Figure 4:
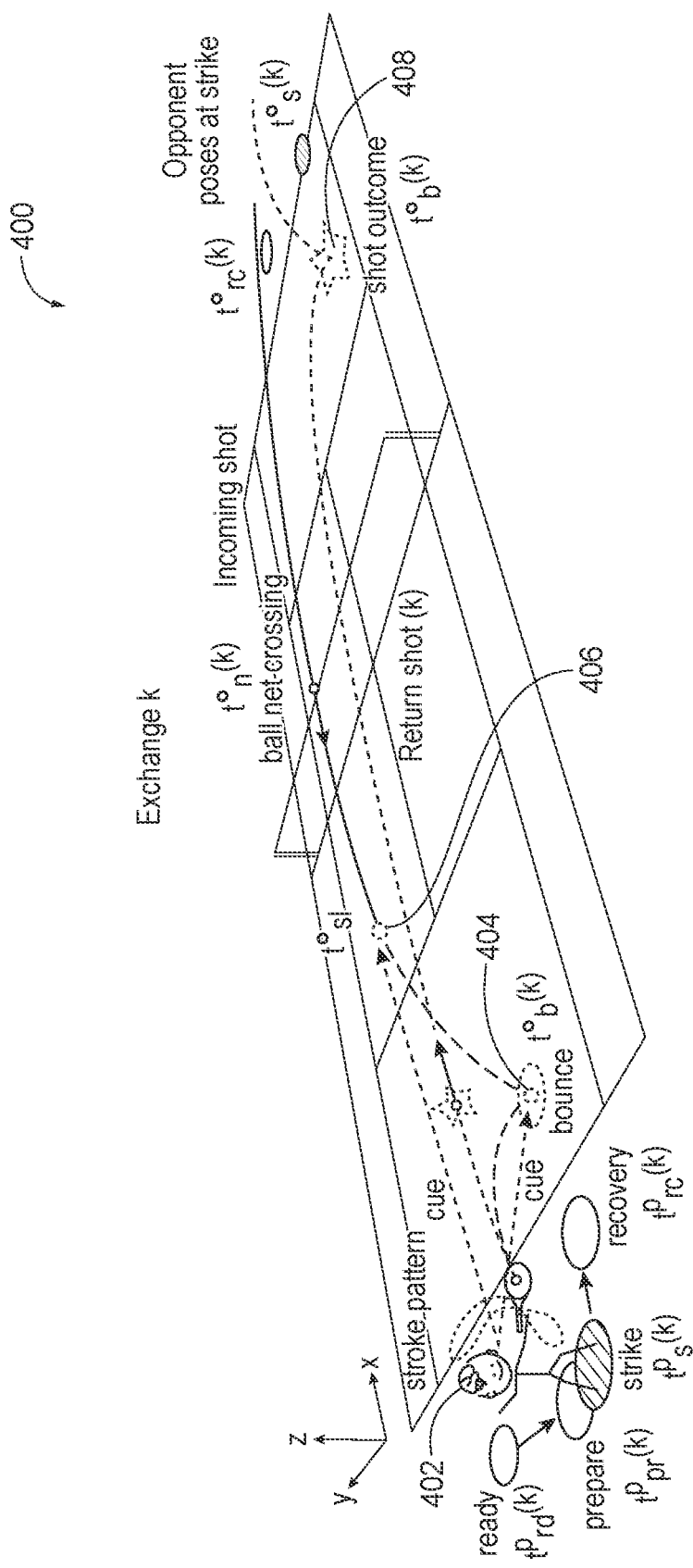
FIG. 4 is an illustration of a tennis stroke and interactions with environment task or activity elements, including state dimensions that can be tracked during an exchange to capture the entire activity environment interactions.

Human movement performances in skilled tasks, particularly in so-called open motor tasks, are complex because they involve dynamic interactions between the human agent 402 and the task environment 400 and its elements (see FIG. 4 for tennis example). Examples of such tasks include sports, such as tennis or skiing, as well as professional skills such as surgery. These types of tasks usually require performers to produce a broad range of different actions needed to support a variety of interactions and task outcomes under a range of conditions (see FIGS. 5A and 5B, FIG. 6). In addition, the movement behaviors emerge from the dynamics with the environment, and therefore the movement elements have specific environment elements that are associated with the behavior. In closed tasks the environment in which the movement are executed is fixed.

TABLE 1

Description of types of strokes accounting for posture and stroke execution

| Phase | Attribute | Value |
| --- | --- | --- |
| Ground stroke Preparation/Setup | Side | Forehand, backhand |
| | Stance | Open, semi-open, closed |
| | Bounce Phase | Rise, apex, drop |
| | Point of contact | Offensive, neutral, defensive |
| | Strike zone | High, medium, low |
| Stroke Execution | Stroke intensity | Low, medium, high, very high |
| | Spin | Backspin (BS) low, BS medium, BS high |
| | | Flat |
| | | Top spin (TS) low, TS medium, TS high |

For example, the main interactions in tennis are the movements produced to intercept the incoming shots, and the stroke produce the outgoing shots with specific outcomes needed to control the game state. There are many combinations of incoming shot/bounce and stroke types. A large part of a player's skills is the versatility to accommodate different strike conditions and producing a range of outcomes. Table 1 describes the types of groundstrokes, accounting for the posture and stroke execution. This description is based on key attributes, encompassing the basic postural and stroke execution forms, and, assuming discrete set of values following nomenclature from tennis literature. The combination of attributes results in many (e.g., in this example a total of 702) different ways to intercept a shot using a ground stroke. This estimate is based on the combinatorial combination of attribute values. Note that this example is provided as an illustration, and not all combinations are necessarily valid. If, in addition, the analysis also accounts for positioning on the court, shot outcomes, and other strokes including volleys and half volleys, the number easily goes in the thousands. The number of combinations may be fewer in more controlled open motor tasks, such as professional and vocational activities, as compared to recreational activities, or it may be more.

Subjects therefore acquire skills by learning a repertoire of movement behavior patterns that support the range of task environment interactions needed to negotiate the environment and achieve task goals. Subjects then learn to coordinate these to produce the desired task outcomes. In addition to producing reliable movement outcomes and distinct forms of techniques adapted to the conditions, performers should learn to recognize the situations and control the operating environment in which these actions are executed.

Furthermore, the primary movement interactions result from a sequence of supportive movements, including, in tennis, the positioning, preparation/setup, and stroke execution. The strike conditions therefore are determined by a sequence of movements with at each stage their own operating conditions created from the preceding movement. Finally, the entire sequence should be planned ahead of time to make it possible to execute the first steps in the sequence leading to the desired activity goal; and the elements in the sequence typically need to be coordinated to the concurrently unfolding task environment.

Due to the multitude of configurations and dynamics of the activity, open motor tasks are difficult to learn, coach or train. Proficiency in these types of tasks often requires thousands of hours of training. The situation is similar in other open motor tasks or activities such as skiing (FIG. 34). In skiing, the turn maneuver is the primary interaction. The skier 3402 has a broad range of techniques that can be used to achieve different turn outcomes in different terrains. The turns themselves depend on sub movements that help setup the primary turn stage. The sequence of turns should be planned ahead of time to follow the desired path through the terrain, and the elements in the sequence typically need to be coordinated to the concurrently unfolding task environment.

Further reasons for lengthy training are that open motor skills depend on an entire system of processes that go well beyond the sensory-motor control in open tasks. Skill acquisition involves learning an extensive control hierarchy 300 (see FIG. 3). It includes sensory-motor skills needed for the precise execution of a variety of movement skill elements 302; perceptual skills necessary to extracting task-relevant information and attention needed to discriminate between various sources of information at various levels of organization, executive skills needed to coordinate and adjust the sequence of movements, as well as planning and strategy to bring the activity to its desired state.

Figure 8:
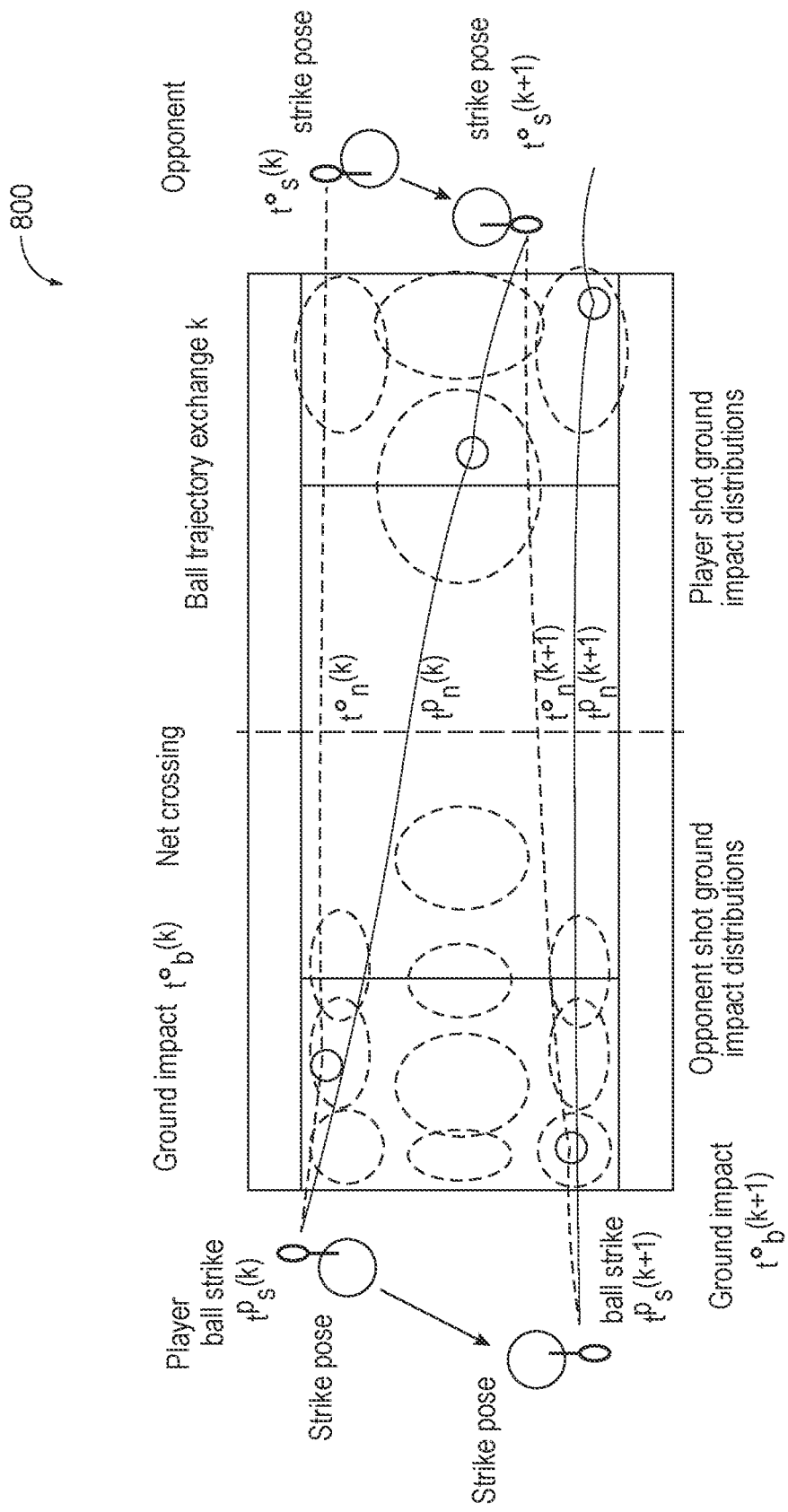
FIG. 8 illustrates a tennis environment and elements with interactions between the shots and court, as well as the player and opponent court movements.

Research on human movement skills in complex tasks has demonstrated that proficient subjects exploit structural properties of the so-called agent-environment interactions to help organize the various processes (see the discrete values used for the attributes in Table 1, and for example, the distinct shot patterns in FIG. 8). These structural properties constrain the movement behavior and help with the integration and coordination of movement performance, perception, and planning. Viewed conceptually, these properties and their associated behavior elements act as a form of language of spatial behavior.

Therefore, to become proficient in a task domain, human subjects should learn the spatial behavior language for that domain. However, this language is largely unconscious, and therefore challenging to self-assess and modify. More generally, the complexities of this system, including the high-dimensional and dynamic movement environment, which manifests in complex movement and environment interactions (see FIG. 4, FIGS. 5A-5B and FIG. 34), make open motor skills challenging to explain and communicate through ordinary language.

The following technology breaks down the activity or task performance in its detailed temporal development and configuration across key activity stages, and in relationship with the environment and task or activity elements. The movement can then be analyzed for patterns that correspond to the elements used by an individual's language. This language can then be assessed for performance as well as identifying deficiencies or faults at various process system levels. The results of the assessment and diagnostics are then used to design augmentations, encompassing instructions and feedback cueing, which can enhance performance and learning. Augmentations at the cognitive level, such as instructions or visualizations, can help form mental models for the acquisition of necessary interaction schemas building the repertoire of movement elements. Real-time augmentation in the form of verbal, visual cueing supports the coordination, timing, and execution of the critical environment interactions in different stages of the task.

Technology

Most existing high-level activity performance modeling and analyses focus on the overall task performance. They also tend to be descriptive as opposed to explanatory. These technologies are primarily video based. For example, in tennis performance modeling and analyses include tracking the player court poses, shot placements and the statistics of outcomes and points. The insight is that performance modeling and analyses do not account for the input-output dynamics of the underlying activity interactions, in particular the combination of the subject's response to the various events and actions of the environment, e.g., opponent movement and shot, and the top-level cognitive control, including coordination and planning processes, necessary to pursue the larger task goals.

Building new assessment and augmentation tools can help accelerate training of complex movement skills. The general approach is to define the units of movement skills that serve as the building blocks of movement behavior and use them to formulate learning as an iterative process, where these units are further refined and integrated within the larger hierarchical control architecture described herein (compare, e.g., U.S. Pat. No. 10,854,104 B2 and U.S. Publication No. 2121/0110734 A1, and U.S. Publication No. 2019/0009133 A1). This modeling framework is then used to define data-driven tools to operationalize training and augment the performance through feedback operating across the levels of task performance and organization, and across the various planning, perceptual, executive, and sensory-motor processes.

As described above, complex tasks rely on coordination of behavior elements that are organized based on the task interactions, and in particular, the control of the operating environment for the various movement interactions, including the primary movement elements. For example, in tennis, the positioning and setup on the court determine the conditions for the stroke execution (FIG. 4). The positioning and setup are part of what can be described as the environment control level. The domain of applications for the technology encompasses any activity driven by sensory-motor interactions between one or more human or artificial agents and its/their task or activity environment, where the goal is to take the current task environment state to a particular goal state.

Technological Features

This disclosure extends and improves upon prior art feedback cueing platforms and training agents to encompass the larger task interactions, coordination, and planning (compare, e.g., U.S. Pat. No. 10,854,104 B2 and U.S. Publication No. 2121/0110734 A1, and U.S. Publication No. 2019/0009133 A1, respectively). Therefore, the general goal for this application is to specify methods and systems to capture and model the comprehensive interactions supporting the larger task goals and performance. In particular, to extend the analysis beyond the basic movement units such as the tennis stroke, encompassing the movement units that participate in the control and coordination of task-level interactions. In tennis these task-level interactions include the court positioning 202 and stroke preparation in relationship to the player 204 and opponent poses and the incoming shot 206 (FIG. 2). As already mentioned, the methods and systems described in this application may also be applied to other activities including open motor tasks, such as other racket and paddle sports, skiing, other sports, surgery, and other skilled motor tasks in some examples.

This disclosure focuses on modeling key areas of movement behavior, including, but not limited to, the following:
  The performance and learning process for movement behavior elements that compose the repertoire needed to support the range of task interactions, and how the elements of the repertoire define a task-level behavior representation.
  The performance and learning process for sensory and perceptual mechanisms needed to deploy movement behavior elements within the task environment.
  Model of movement behavior elements, including the comprehensive functional details and their associated operating environment.
  The performance and learning process for the coordination and sequencing of the movement elements within the larger task process, particularly the planning, sequencing and coordination of elements, in pursuit of the task goals.

To fully appreciate the significance of the technical approach, the following briefly elaborates on some relevant movement skills in open motor tasks.

I.II Hierarchical Interactive Skill Model

Figure 2A:
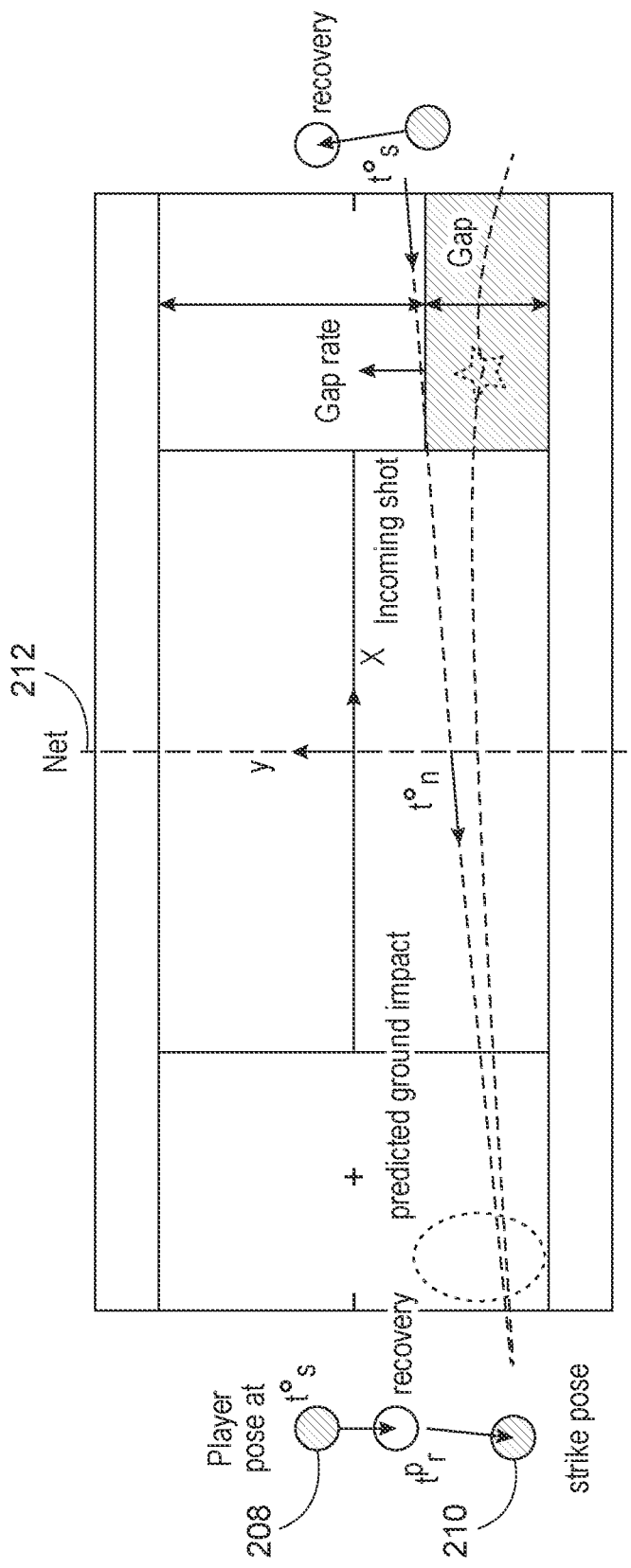
FIGS. 2A-2C are illustrations of interactions at different levels of organization in tennis, showing behavior at the level of shot exchange (FIG. 2A), global positioning (FIG. 2B), and stroke preparation and execution (FIG. 2C).
Figure 2B:
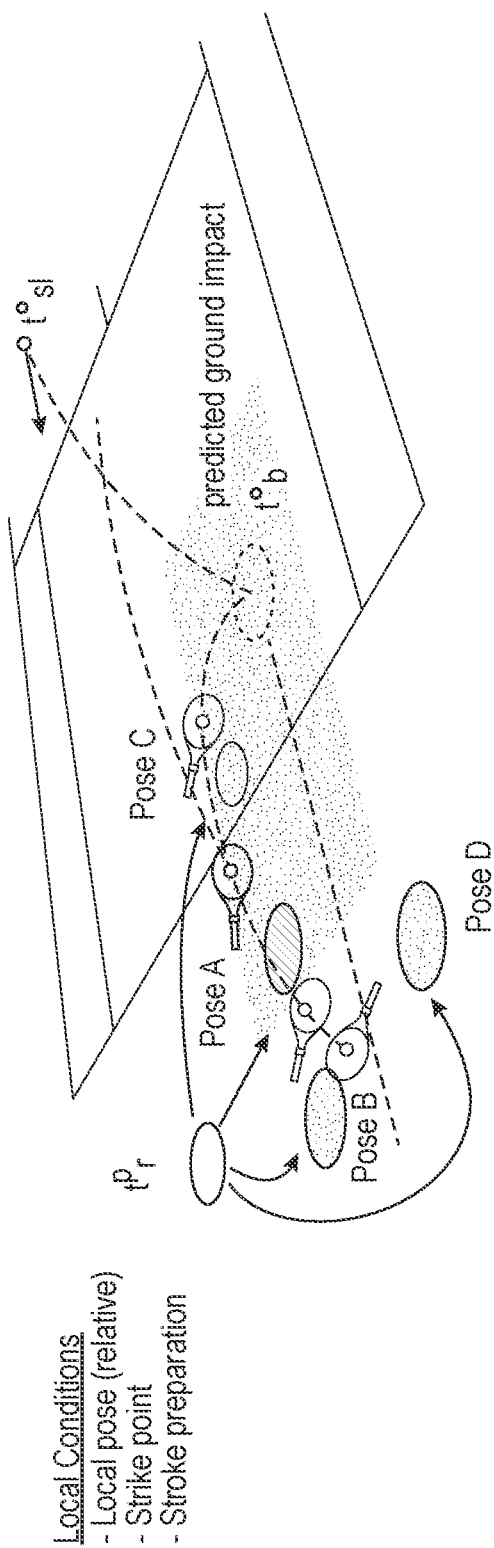
Figure 2C:
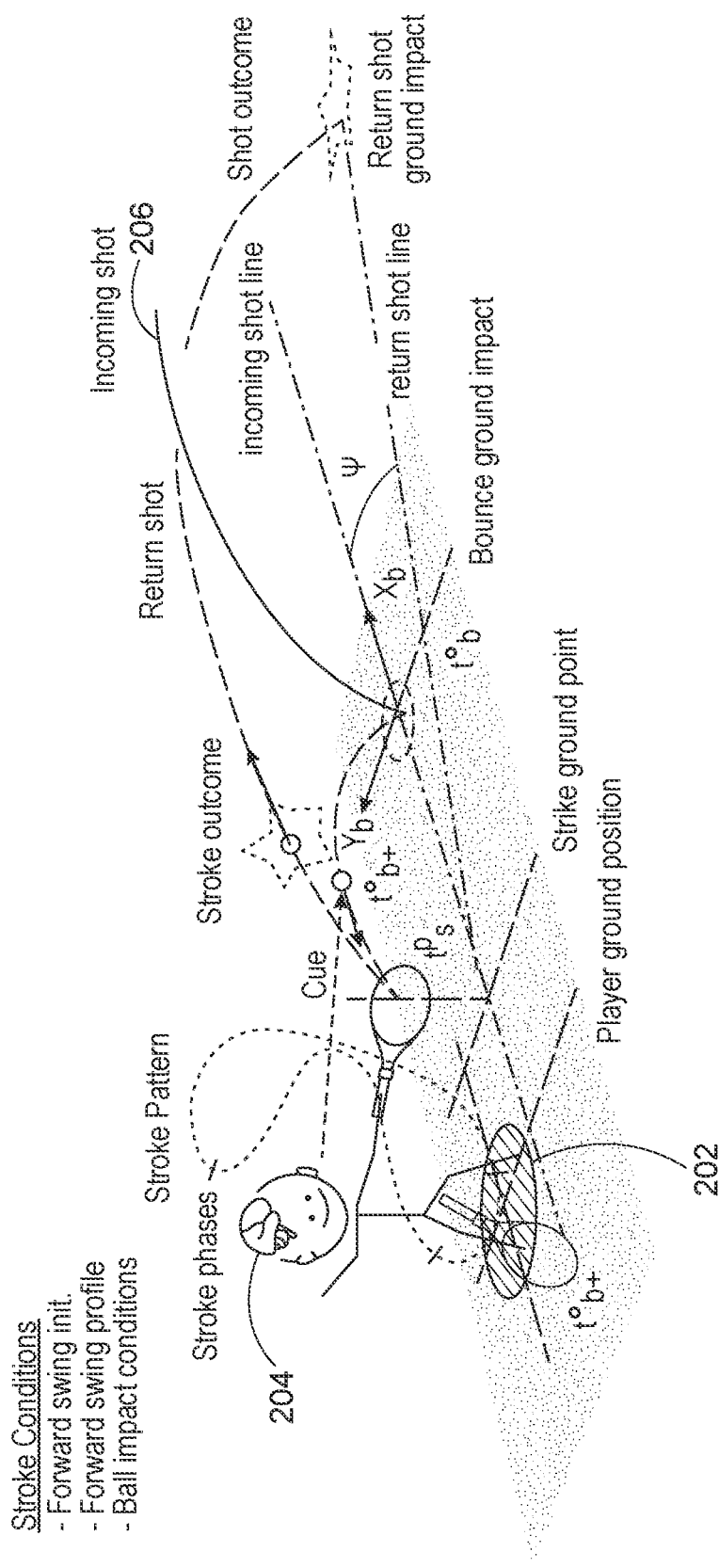

The central component of the training and feedback system is a hierarchical interactive skill model (see, e.g., the behavior hierarchy for tennis shown in FIGS. 2A-2C. The skill model describes how the movement elements are used as units of organization for planning and how they are deployed in the task environment. The model enables:
  Comprehensive and detailed assessments and diagnostics of the performer's skills.
  Building effective training tools, including the operationalization of training process.
  Design feedback augmentations to enhance performance and learning across the behavior hierarchy.

General Approach—Overview

In one general approach, behavior elements are extracted from performance data and aggregated based on some measures of similarity, and subsequently analyzed to perform assessments and diagnostics (compare, e.g., U.S. Pat. No. 10,854,104 B2 and U.S. Publication No. 2121/0110734 A1, and U.S. Publication No. 2019/0009133 A1). The present disclosure also extends the scope of the units of behavior to encompass larger interactions and dimensions supporting the deployment and execution of behavior elements. At the same time, these units are used for modeling higher-level processes including planning.

Units of Behavior

The central problem for building technology for open motor task is to determine a modeling language based on some units of behavior that allow to decompose behavior according to the natural behavior elements; provide a system-level understanding; is also suitable to capture the learning process; and, finally, can lead to synthesis of augmentation for both skill learning and performance.

Figure 5A:
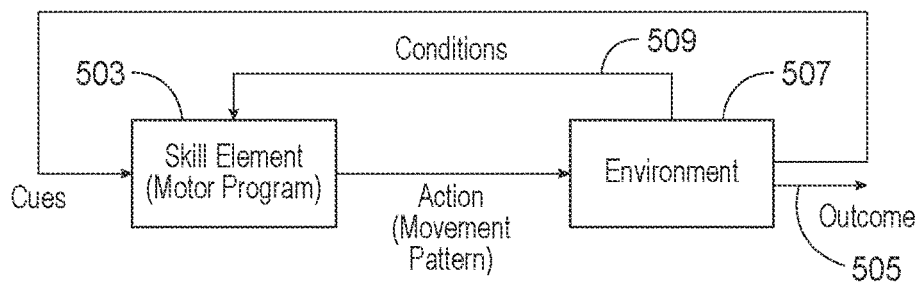
FIG. 5A is a block diagram illustrating a skill element and associated movement and perceptual processes.
Figure 5B:
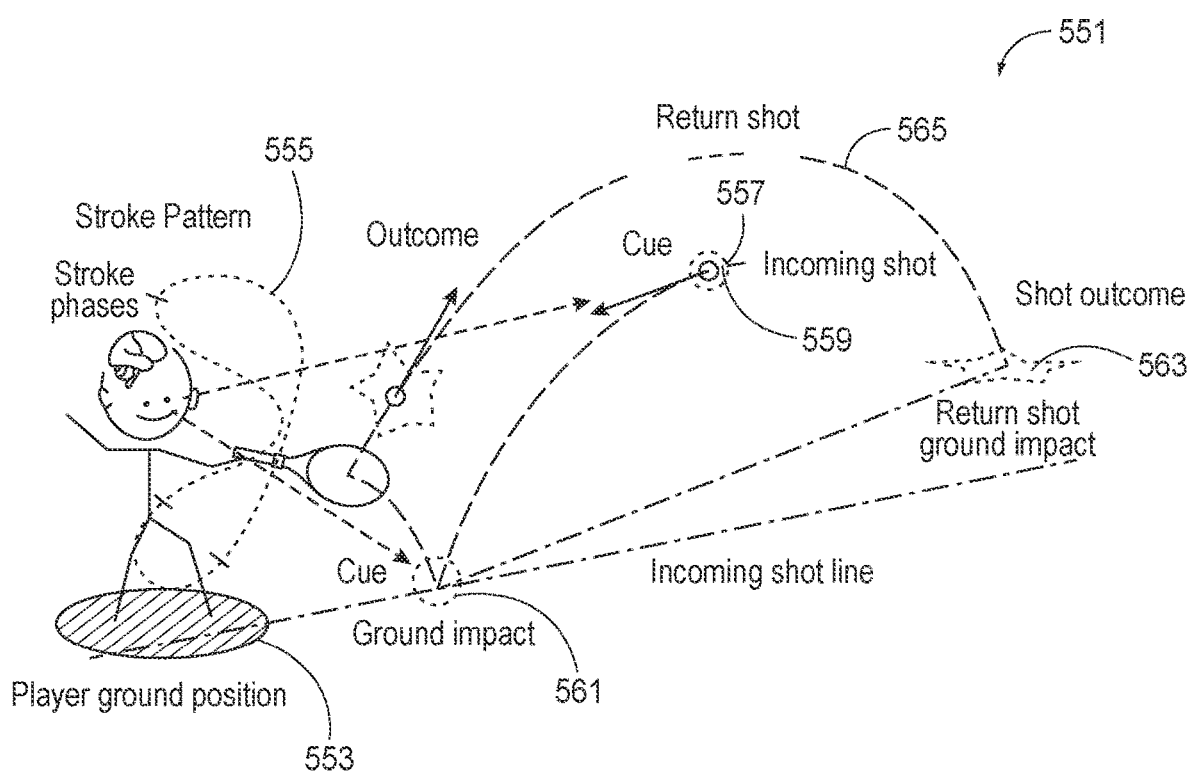
FIG. 5B is a schematic diagram illustrating the skill element and associated processes, supporting interaction with the task environment and objects, under different conditions.

The first step for such modeling and assessment is breaking up the behavior into elements 103. Movement units are related to the motion primitive in robotics and motor control. A key challenge is to do so in a way that the resulting elements correspond to natural behavioral movement units; e.g., compatible with the underlying biological processes. This is particularly critical if these units are used to define the augmentations. In particular, the sensory-motor processes (FIGS. 5A and 5B). The augmentation needs to operate according to functional properties. The movement unit emphasizes the idea that movement emerges from the agent's interactions with the environment and task elements and operate as entire units of behavior, combining sensory, perceptual, and motor processes.

Returning to learning, one of the first steps is to have some basic definition of a unit of skill. The basic unit of analysis associated with an individual's skills is related to the basic units of behavior supporting interaction in task or activity as shown in FIG. 1. From this system's perspective, the skill acquisition process can be described as the formation and incremental perfecting of some elemental units of skills, and in parallel learning to coordinate these units and ultimately understanding the large-scale task dynamics and environment.

Given the hierarchical organization of open motor tasks, such as shown for tennis in FIG. 2, skilled performance requires coordination and planning of actions and movements across different levels of organization (compare, e.g., U.S. Publication No. 2019/0009133 A1). The units provide the link between the different levels of organization, from those needed for execution, to higher-level processes such as task level perception and planning.

Task Dynamics

Each level of organization has a set of units of behavior, inputs, and outputs. Skills can be defined at each level. For example, an individual can be skilled in the stroke execution, or producing shots. Yet, when engaged in a live game, that same individual may have difficulties anticipating the incoming shots, controlling the conditions, and or directing the shot. As a result, he or she will not be able to execute the stroke and produce shots with the same quality as when the conditions were controlled.

Flow captures a fundamental requirement for skilled performance. Flow can be used to describe the performance of proficient athletes or other types of performers. Flow is also relevant to understanding what phenomenon drives learning. Skills can be viewed as the ability to sustain flow in behavior even in the face of contingencies, or disturbances and uncertainties affecting the various aspects of behavior dynamics. Therefore, one hypothesis is that learning is driven by reduction of surprise. Surprise can be formalized as the prediction error and has been proposed as the quantity that is being optimized in a new brain theory based on the free energy principle.

Flow requires anticipation at different levels of the behavior's organization, which is achieved by learning to exploit the behavior structure and organization emerging from the task and environment interactions. In natural systems, to a large degree, the structure and organization are rooted in the ecological principles of perception and action. However, these principles of organization have been primarily studied at the level of behavior execution. Therefore, they should be extended to the level of the larger task and environment structure.

At the task level, a significant part of skill acquisition in open motor tasks is the acquisition of behavior patterns that lend themselves to coordination and organization of behavior across the levels of interaction. Learning such a behavioral structure enables prediction across larger problems and time scales, and therefore, enables augmentation to reduce surprise and maximize flow.

Structural Characteristics

The main idea is that units of behavior extend across the hierarchical task structure and enable to connect behavior dimensions across scales and thus are critical to achieve flow (see FIGS. 2A-2C). The structural features in behavior can be exploited by the subject to organize behavior; e.g., the natural processes constrain the behavior which in theory is intractable because of the infinite possibilities to a subset of behavior patterns. These features provide a form of scaffold and task space discretization that connect the different levels of organization. The behavior patterns serve as states and play a key role for abstraction in planning and decision making. At the same time, for decomposition and assessment of behavior.

For example, in tennis, the stroke, which serves as basic unit of action, is extended to the shot that serve as unit of interactions across the task domain. The shot patterns in turn participate in discretization of the task environment (see FIG. 8) and connects the lower-level behavior to the task elements and higher level behavior including situational awareness, planning and executive functions. The following focuses on the tennis as a representative use case but the key ideas, techniques and overall approach extend to other open motor tasks or activities. The following sections also discuss the example of skiing, which provides broader illustrations for the various techniques introduced.

Performance Data Capture

Modeling uses performance data from the task or activity. The goal for the performance data capture is to obtain information across the skill and task hierarchy. Open motor tasks, with the range of interactions with the task environment and their key elements, require special data acquisition to extract sufficient information about the behavior and their supporting processes. Key data acquisition requirements for skill modeling in open motor tasks include but are not limited to:

1) Extracting information about the general context and conditions in which a movement is performed, including the environment and task elements that the subjects are interacting with throughout the phases of performance or play (before, during, and after the movement performance).
2) Capturing subject's movement elements (e.g., movement element 1002) and environment interactions (e.g., environment interaction 1004) across the multiple levels of organization in the skill hierarchy (e.g., levels 1006a, 1006b, and 1006c), including the different activity stages such as preparation, setup, and execution.
3) Capturing the movement execution for each element detailing technique and outcomes across levels of organization, including the primary movement outcomes and the task outcomes.

Figure 17:
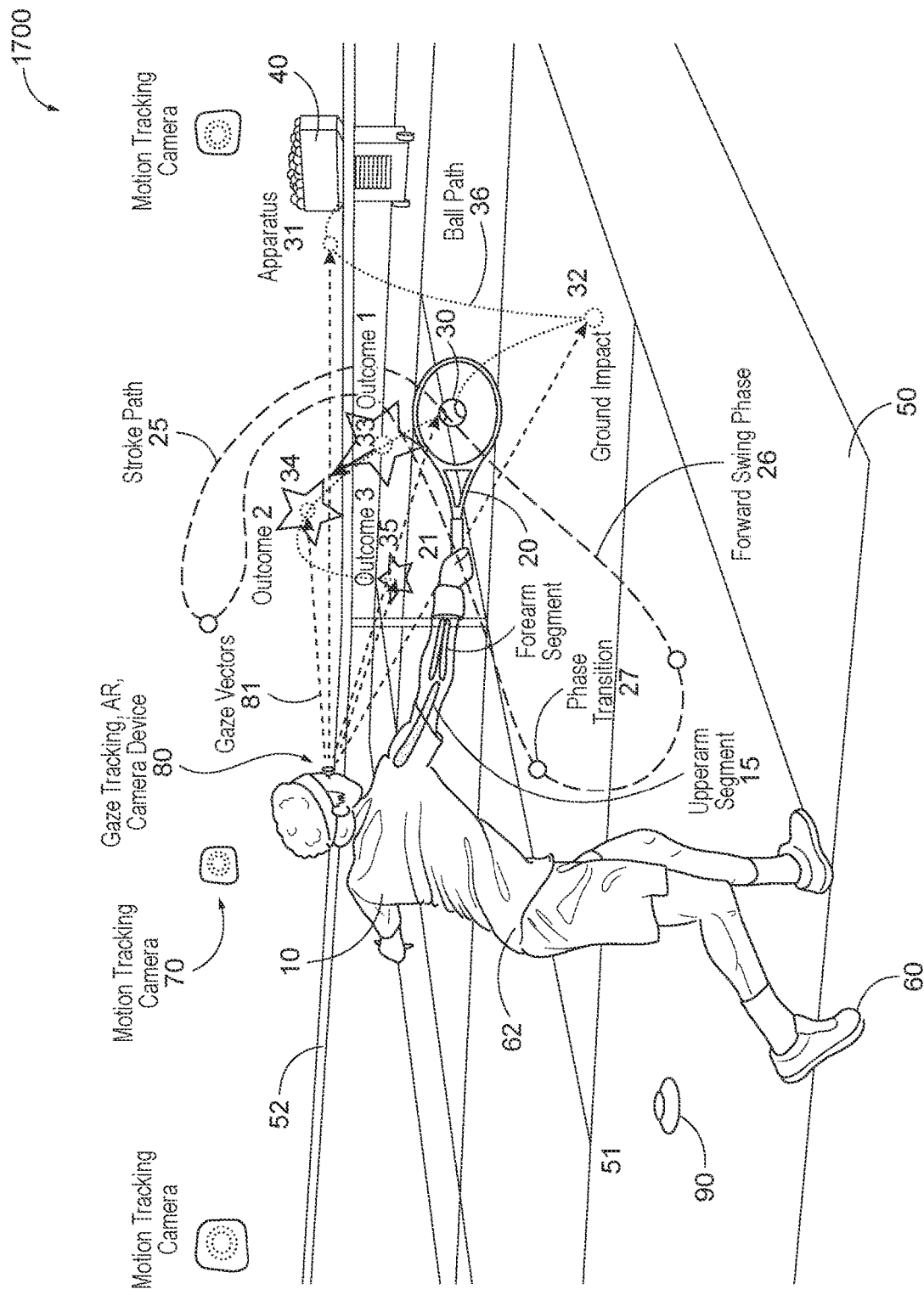
FIG. 17 is an illustration of an interaction between a stroke motion and task and environment elements, including ball trajectory relative to a court, impact of the ball, and bouncing of the ball before interception with the racket trajectory.

The general data acquisition approach includes combining information from one or more video streams with information from one or more wearable sensors (e.g., camera 80 of FIG. 17) mounted on or embedded in players and their equipment (e.g., racket 30) (FIG. 17). The combination of embedded motion and computer vision system enables the acquisition of detailed movement execution, together with the task environment interactions, encompassing task and activity objects. For example, the computer vision system is used to capture the larger activity and the environment, and wearable sensors can be used to capture specific motion information about objects or agents.

Video typically captures comprehensive information about the scene covered by the cameras but have less spatial and temporal resolution. However, this performance has been steadily increasing. Video processing can be used to extract multiple aspects of the activity, including the player movement relative to the court and the ball trajectory relative to the court (the shot). The wearable motion sensors such as IMUs provide high spatial and temporal resolution but are limited to the specific elements on which the sensors are mounted (equipment such as tennis racket, ski boots, body segments etc.). Ultimately, a key is to integrate these sources of measurements.

The specific capture method in the tennis example may use the video stream collected from field cameras (e.g., motion tracking camera 70 in FIG. 17) deployed in the environment and body-mounted cameras. Field video cameras enable a 3D reconstruction of the agent interactions with the task and environment elements, thus providing global information about the task or activity processes used to plan and coordinate behavior. In addition, one or more body or so-called first-person cameras can be included to provide information from the agent's perspective and are therefore useful for capturing the agent's perception-action process. To register the details of these interactions in 4D (3D space+time), the images from the video stream are first processed using spatiotemporal feature trackers, extracting for example, the ball trajectory and player motion from the overall scene.

These types of measurements generate large quantities of data. A key challenge is to process the data to extract relevant pieces of information. The approach follows an ecological representation that describes the behavioral elements within their specific sensory-motor interactions. By integrating these elements, it is possible to form the overall task-level interactions and performance.

Movement Skill Elements as Behavioral Units

The fact that the movements operate as entire units combining inputs and outputs for their interaction within their specific operating environment (FIGS. 5A and 5B), with behavior organized and executed around these units, means that:

1) For every subject operating in a task domain, it is possible to aggregate the movement behavior for each type of interaction and build a repertoire. Instead of analyzing individual instances, representative elements of that repertoire can be extracted and analyzed.
2) The units of behavior can be analyzed in their different functional dimensions, including the motor, sensory and perceptual features. This functional model explains not only how these units are executed but also how they are deployed in the task or activity, including the perceptual cues used for anticipation and synchronization of movement behavior.
3) The movement units provide the building blocks for the organization of behavior towards the task goals. These units define how the movement behavior is sequenced over the period of the game or activity cycle to achieve the task goals (e.g., task goal 1008 in FIG. 10).
4) Finally, these elements can be integrated under a hierarchical interactive skill model, which, in turn, can be used to design augmentation that enhances performance and learning by operating at the comprehensive, system-wide scale.

To make this possible, movement performance data can be processed to capture the movement behavioral unit, along with details of their interaction with the local elements, as well as the larger task environment that determines the overall task or activity performance.

In addition to the primary movement units, each skill element type can be manifested as one or more patterns, and collectively span a repertoire to cover task requirements (compare, e.g., U.S. Pat. No. 10,854,104 B2 and U.S. Publication No. 2121/0110734 A1, and U.S. Publication No. 2019/0009133 A1). The repertoire encompasses different classes of primary movement (stroke execution). Similar repertoires can be defined for the supporting behaviors, such as court movement, stroke preparation leading to the execution, and recovery (see FIG. 4).

Movement and Skill Elements Organization

The behavior units described herein are basic skill elements that are learned and further developed and differentiated as an individual gains experience in the domain of performance (compare, e.g., U.S. Pat. No. 10,854,104 B2 and U.S. Publication No. 2121/0110734 A1, and U.S. Publication No. 2019/0009133 A1). These are then integrated under coordination and task planning processes, which are derived from the behavior organization shown for tennis in Table 2. The goal of the model is to capture the comprehensive task or activity's performance, including the control, sensing, and planning responsible for the deployment of behavior elements in the activity relative to the critical task and environment elements. The model builds on the behavioral elements supporting key interactions used to perform a task or activity.

TABLE 2

Hierarchy of behavioral elements used in the construction of a tennis point

| Task Level (e.g., point making) | | | |
|---|---|---|---|
| Behavior Sequence (e.g., shot exchange) | | | |
| Behavior Elements (e.g., shot making) | | | |
| Court Movement | Stroke Preparation | Stroke Execution | Stroke Recovery |

Figure 25:
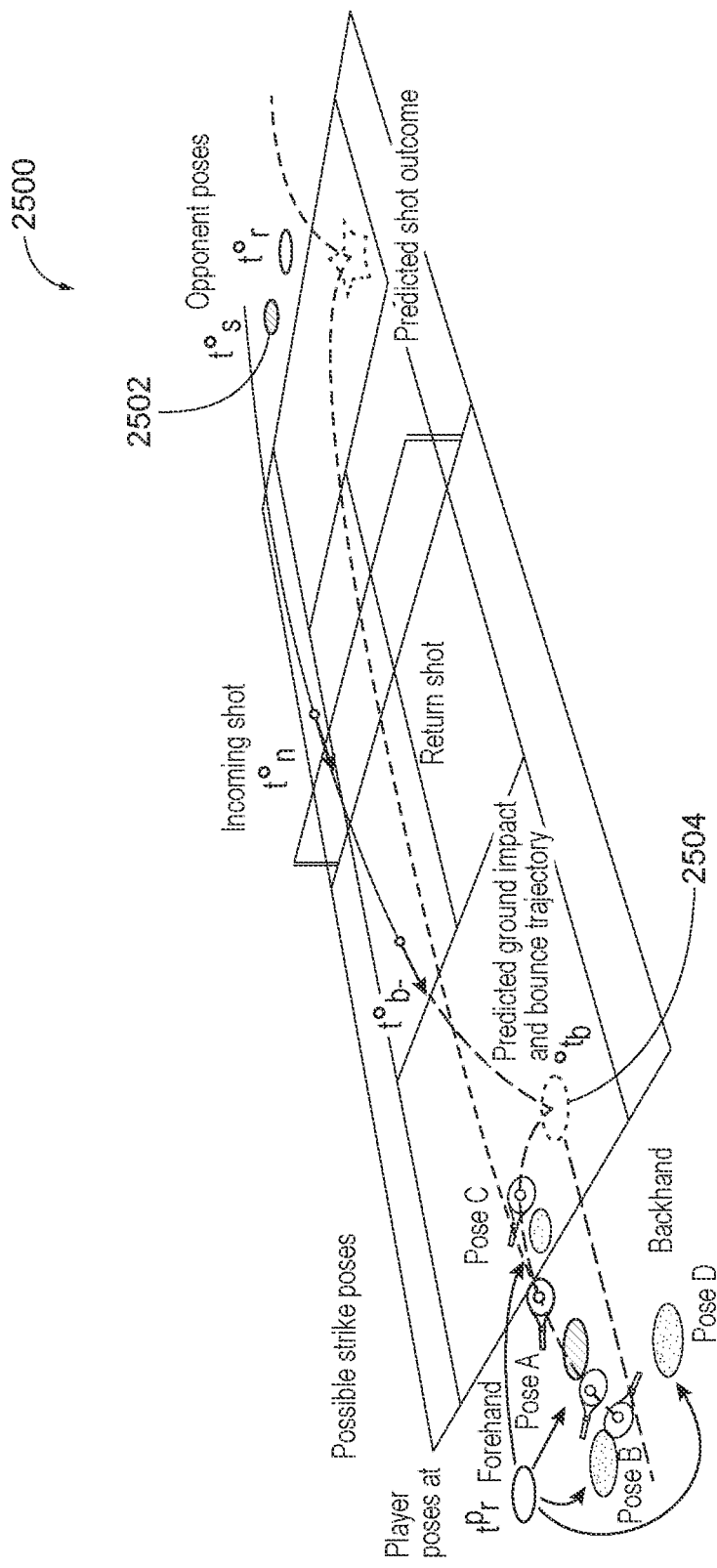
FIG. 25 is an illustration of preparation and setup of a stroke, highlighting a reference frame based on the shot bounce location and key events relevant for this stage and level of movement behavior.
Figure 26:
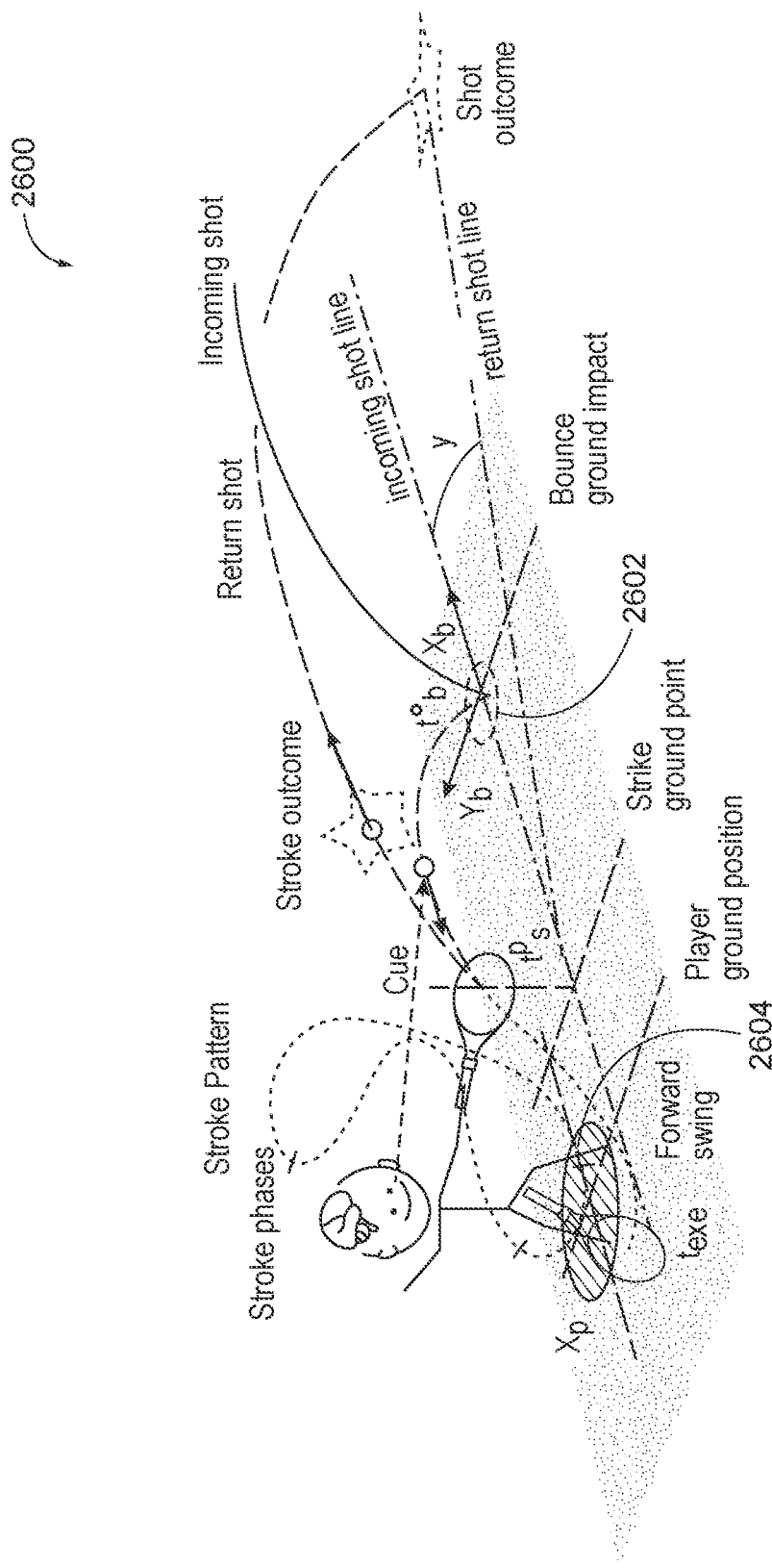
FIG. 26 is a depiction of a bounce reference frame used to model stroke execution.

In open motor tasks, participants must learn entire skill sets. Behavior elements are typically arranged sequentially; the preparation and setup skills are responsible for the final conditions under which the primary skill element is executed (see, e.g., FIG. 7; FIG. 25 and FIG. 26).

Figure 10:
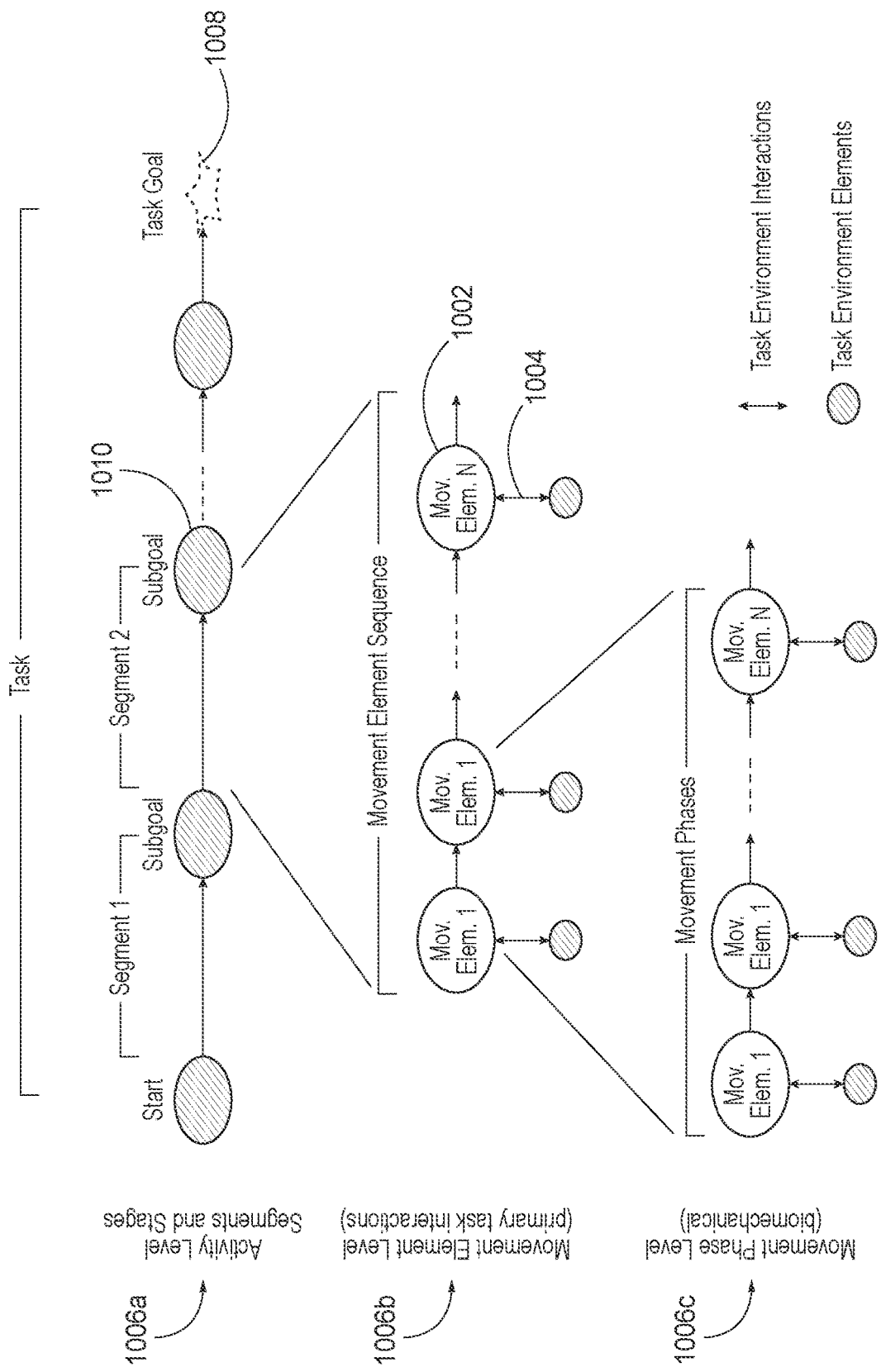
FIG. 10 illustrates a hierarchical model with breakdown of behavior elements from point and exchange levels down to positioning, stroke preparation and execution, and ultimately the stroke phases.
Figure 11:
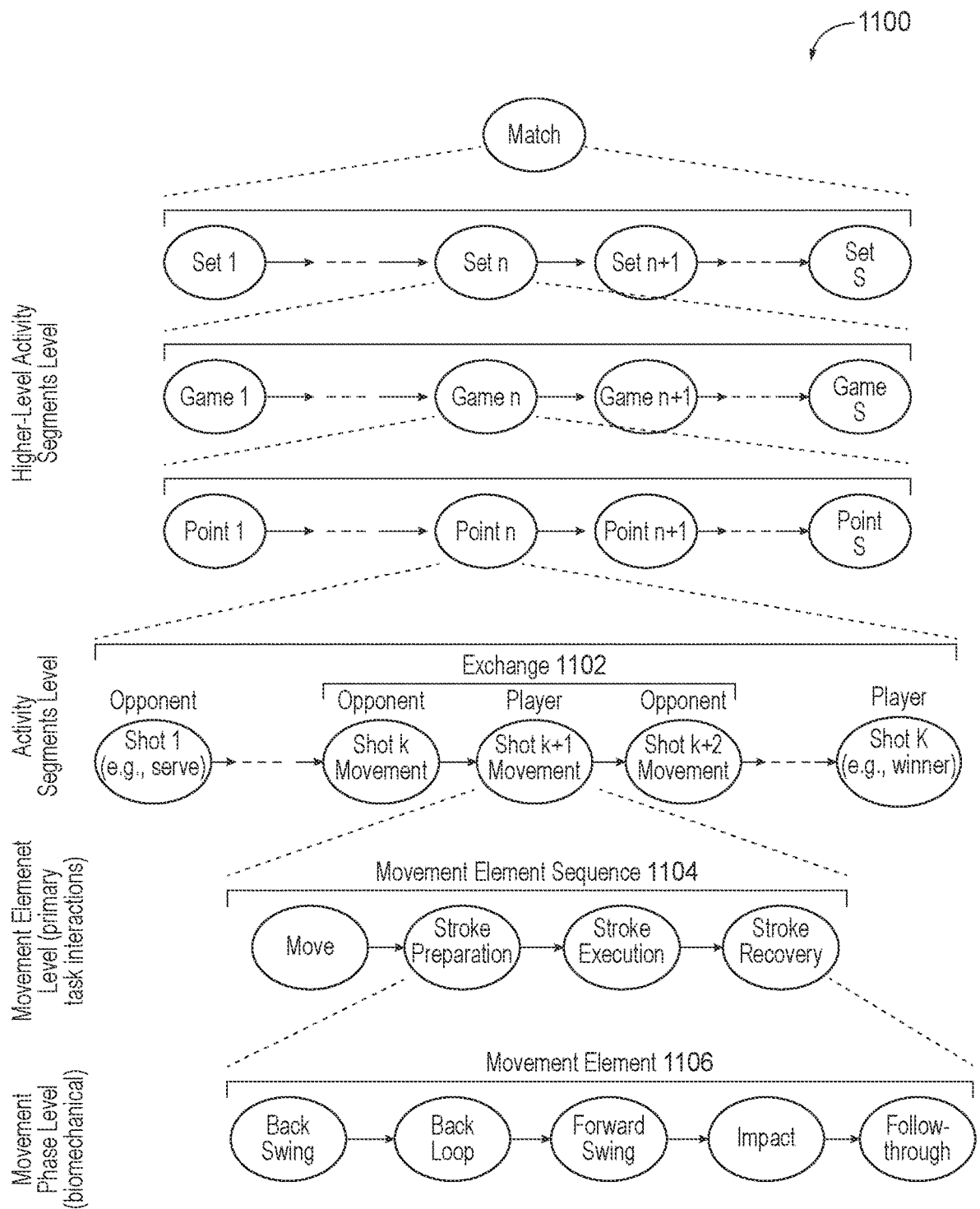
FIG. 11 illustrates shows the main hierarchical levels of organization and structure for tennis.

It is useful to distinguish between primary skill elements, responsible for the primary outcome (stroke execution in tennis), and supportive skill elements that are supporting the primary skill (e.g., ground movement, stroke preparation and stroke setup in tennis). The behavior elements are decomposed hierarchically into skill elements and skill sub-elements (see, e.g., Table 2; FIG. 10, FIG. 11).

Therefore, the general assumption for this system is that it forms a modular system architecture that can learn (i) learn sensory-motor patterns necessary to support specific interactions with the environment, and (ii) learn to combine elements in sequence to accomplish larger task goals. Other activities have a similar general structure. For example, in skiing, the primary unit is the turn maneuver; the supporting movement behaviors are preparation and setup for the turn maneuver.

Hierarchical Interactive Skill Model

Some key improvements of this disclosure over the prior art include the extension to the full range of movement behaviors and interactions supporting an open motor task; and the integration under a hierarchical interactive skill model needed for comprehensive assessment, diagnostics, and augmentation. The major insights and steps for this modeling framework are described as follows.

Movement Elements Model

The performance data are used to characterize and model these movement skill elements. These elements are described by their outcomes, movement technique, physical performance, and operating environment.

Figure 6:
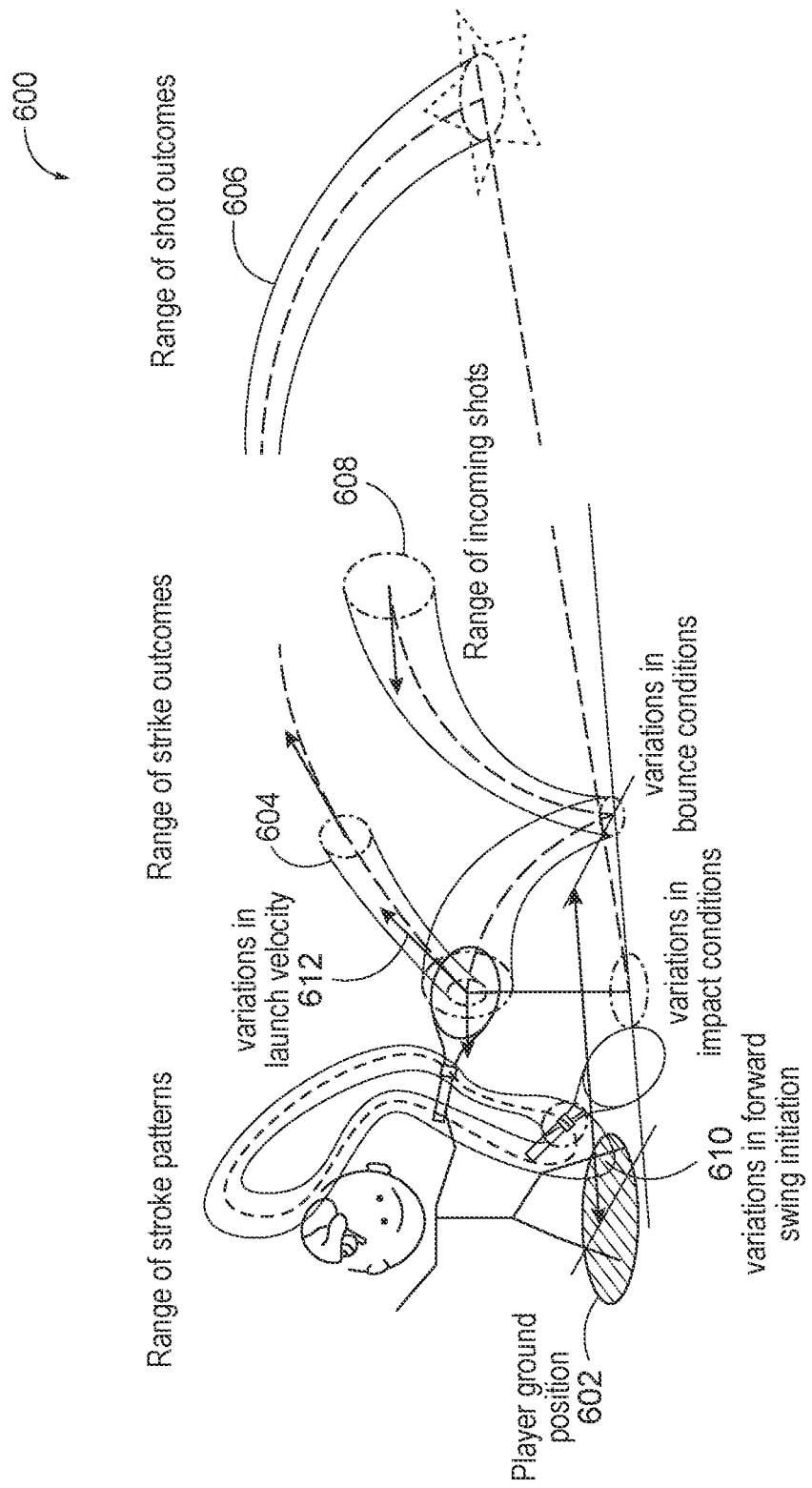
FIG. 6 is an illustration of an operating envelope for a skill element, for a given stance and stroke class, showing examples of sources of variations in conditions, and variations of outcomes.

Each unit supports interaction under a range of conditions in its specific operating environment (see, e.g., FIG. 6). Therefore, an important characteristic is the operating range of the units and their performance limits, as well as the relationship between operating conditions and performance. A critical aspect of modeling the skill element is the functional model, which describes how movement performance characteristics and outcomes change under the range of conditions.

The skill elements model also encompasses the interaction schemas that describe the deployment of the behavioral elements relative to the task and environment elements (FIGS. 2A-2C). Every skill element operates as a unit of behavior with an interaction schema characterized by a set of inputs and outcomes. The functional model also describes the schema for the task and environment elements interactions, including which cues are used for the execution and synchronization of the skill elements with the environment elements, and how these are employed to modulate movement performance.

The decision-making at the level of skill element can be modelled using a so-called inverse model. This model determines the movement profile ostensibly through the selection of a motor program and its parameters given the desired outcome for the movement unit and the current operating conditions.

For a sequence of skill elements in a game like in tennis, the supportive skill elements create the conditions for the subsequent skill element (see, e.g., FIGS. 13A-13F and FIG. 15). The inverse model enables the subject to make adjustments to the movement performance by accounting for actual conditions at each stage of the behavior. In many applications, the plan for the sequence of behaviors and their respective subgoals is provided ahead of time through the planning process.

Task Environment and Planning Process Model

Planning is responsible for determining the sequence of movement behavior in the future. This is typical of so-called dynamic programming problems where the decisions at any given time are determined by the task goals. In the tennis example, this corresponds to determining the court movement, posture, and racket stroke, in relationship to the court elements, ball trajectory, and actions from the opponent to control the point, i.e., these behaviors can be determined from the future strategy about the point.

Figure 3:
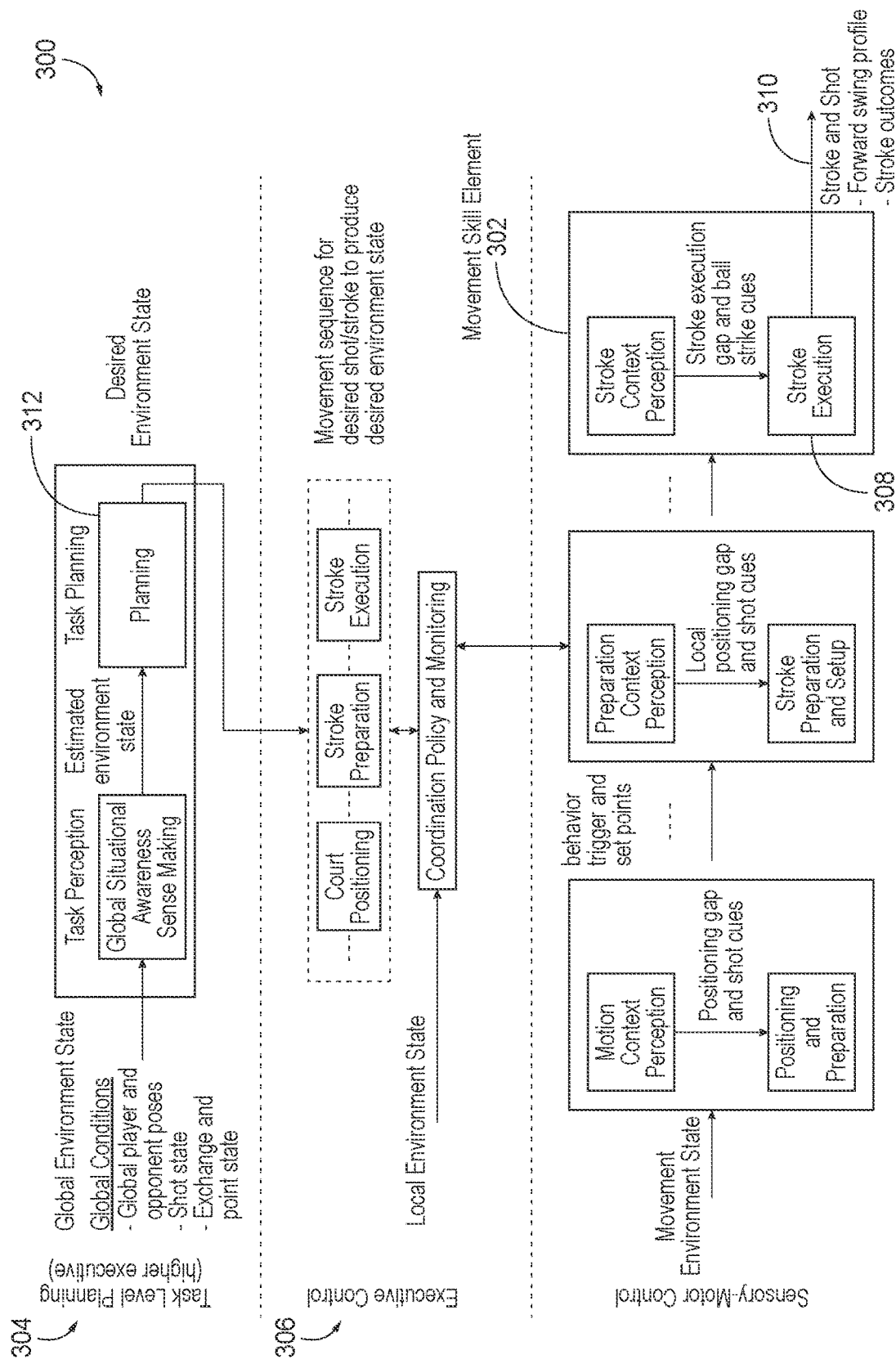
FIG. 3 is a hierarchical system diagram illustrating the organization of key processes including planning, executive, perceptual and sensory-motor control.

Regarding the planning and decision making, it is generally helpful to consider different scales and levels (e.g., shown in FIG. 3). The task level 304 is the largest time scales that consider the task goals and task phases arising from task structure and environment. The executive level 306 deals with the integration between the task level and the control level.

Task-level planning 312 is performed based on the current and future state of the task-environment system; e.g., determining a sequence of actions that will take the current state to the desired future state. For example, in tennis, taking the current exchange to a configuration of shot and player-opponent positioning that will be favorable for the player to execute a winning shot.

This is another characteristic of open motor tasks. For example, in skiing, task-level planning is concerned with the sequence of turns that lead from the current state closer to the destination.

The tennis player does not have the capacity to plan an entire game let alone a point. It is not only the "computational" complexity but also the limited visual range and attention. The are also uncertainties associated with the behavior, and the task and environment dynamics. Therefore, a tennis player, understand the larger strategies and can use this to plan one or more exchanges ahead within a point. This information is necessary for the executive level that is responsible to coordinate and control the sequence of immediate movements to create the environment conditions for their execution.

With reference to FIG. 34, the skier similarly does not necessarily see the entire environment and does not have the working memory and planning capacity to plan the entire sequence of turns to a remote location. Therefore, they typically plan an intermediate goal 3404 in the vicinity that provides the information to plan the immediate sequence of turns 3406, 3408 which take the skier in a favorable state to reach the destination.

Task Environment Patterns and Planning

Figure 15:
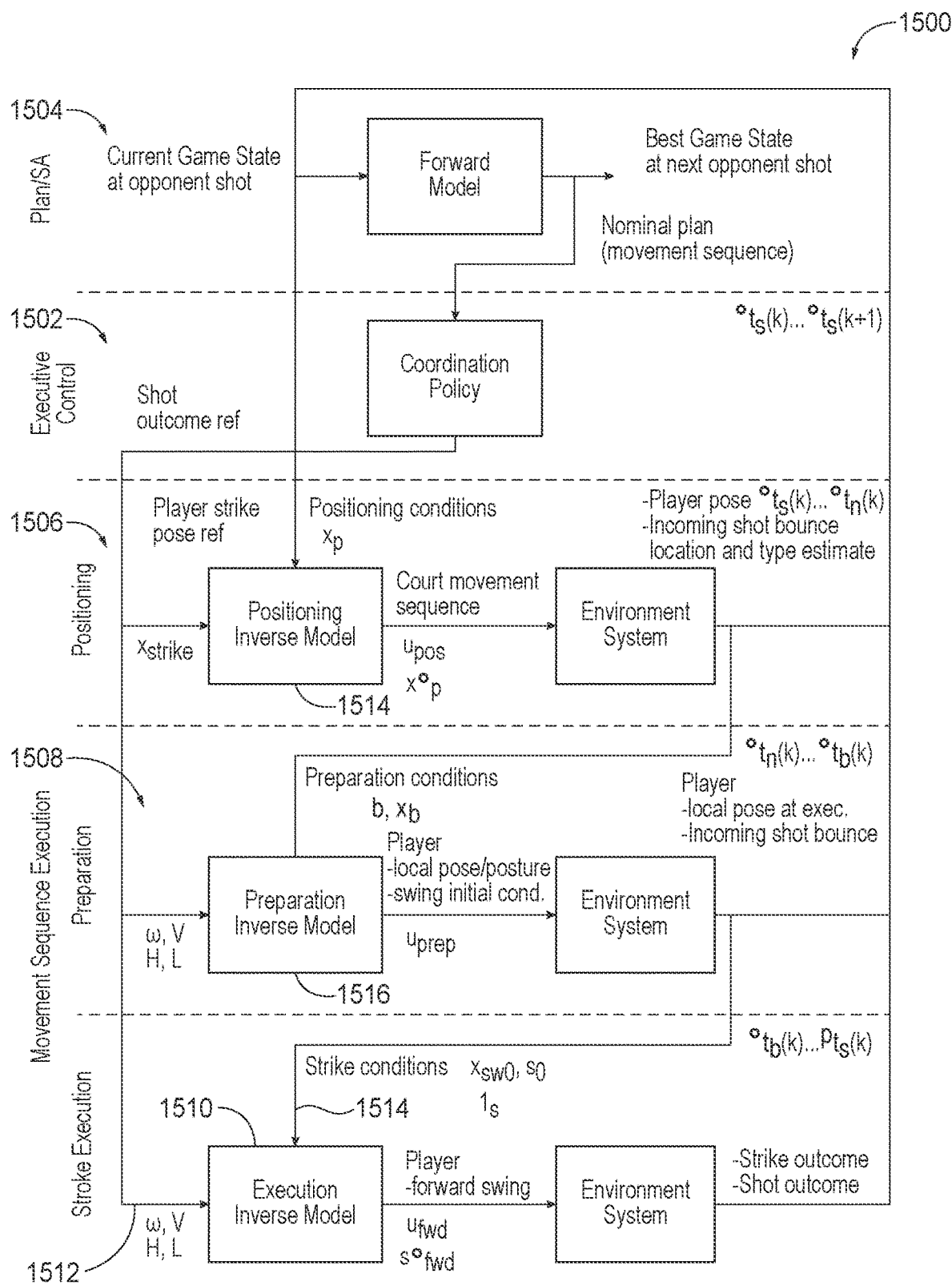
FIG. 15 is an illustration of a hierarchical process flow for formal analysis of the tennis example.

The environment model is not constructed like a traditional state-space model but exploits structural properties of the human and shot decision in tennis. The sequence of behavior for the underlying hierarchical levels is then determined by a sequence of inverse models (FIG. 15).

Executive Control Model

Figure 12:
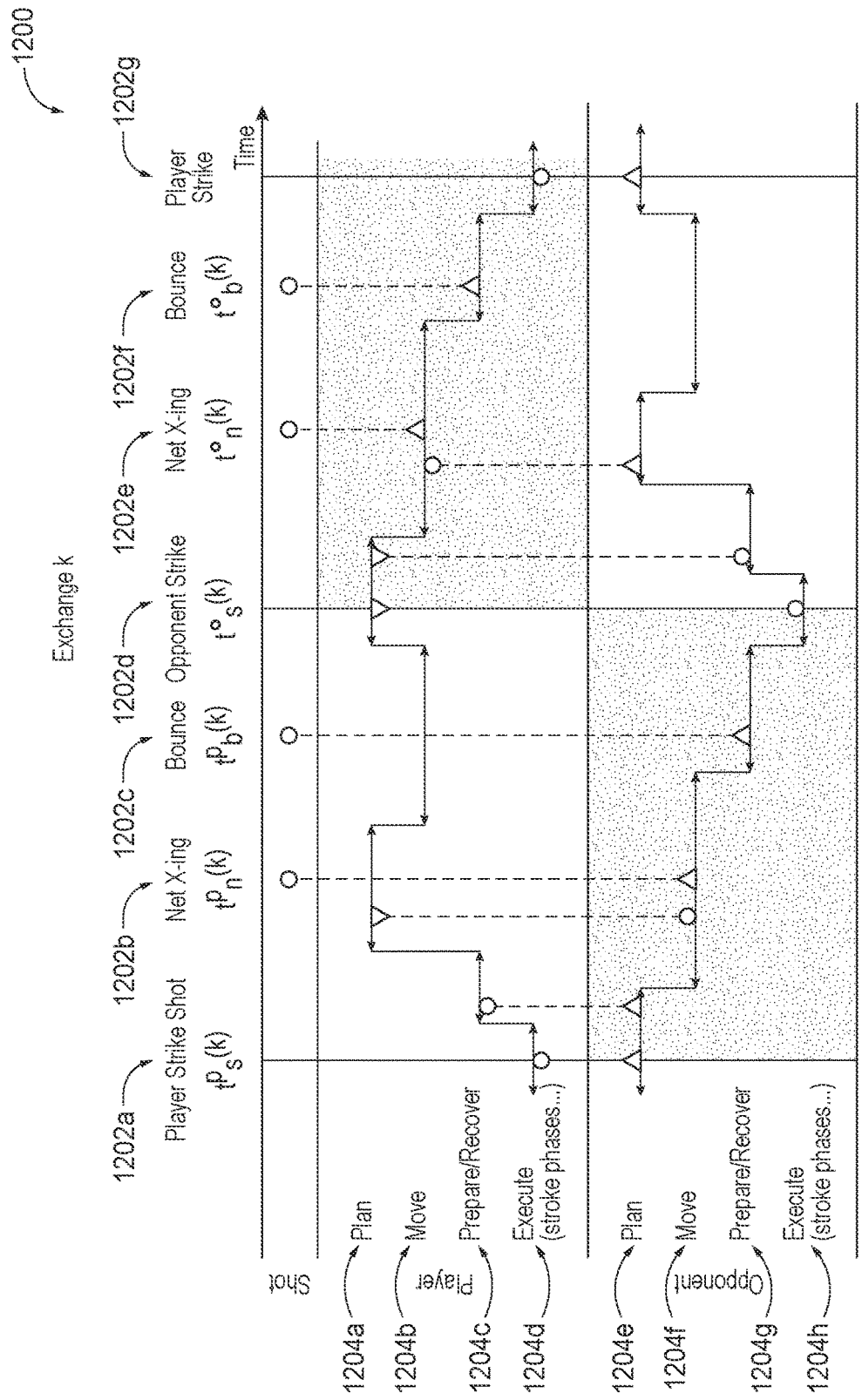
FIG. 12 is a temporal event chart of player and opponent key actions and key activity events during a shot exchange.

Open motor tasks often involve processing multiple skill elements in parallel with the higher-level planning and perceptual processes. With reference to FIG. 15, the executive control model 1502 is responsible for the coordination of these elements during performance. FIG. 12 illustrates the relationship between the sequence of key events 1202*a-g* in the game environment and the movement behavior 1204*a-h* and cues 402 and 404 shown in FIG. 4. A key aspect of executive control is creating the environment conditions for the successful execution of the movement elements. A key aspect of the executive control model is the deployment of attention throughout the levels of the skill hierarchy, including cues for ground movement coordination with respect to the incoming shot, or the stroke execution with respect to the ball closing in.

I.III Assessment and Augmentation System

The hierarchical interactive model with its internal models (forward model at the planning level and the inverse models for each behavior unit as shown in FIG. 15) describes the functional architecture and elements of behavior in open motor skills. Therefore, it provides the foundations for comprehensive skill assessment and augmentation.

Assessment and Diagnostics

The diagnostics follows the hierarchical model and thus enables augmentation to isolate specific deficiencies as well as entire fault patterns across the hierarchical levels based on dependencies in the sequence of behavior elements.

Planning Assessment

With reference to FIG. 15, the highest level in the hierarchical model is planning 1504. Assessment at this level focuses on the ability of a subject to select the next system state and associated action (shot target/selection and strike pose in tennis) that advances the system state towards the task or activity goal (e.g. winning the point in tennis).

Executive Control Assessment

A critical aspect of open motor skill is that the primary action results from the sequence of decisions and behaviors for the underlying stages. The performance observed at the level of the primary behavior is a function of the operating conditions that are created through the sequence of behavior used to manage the larger task performance (FIGS. 13A-13F). Assessment focuses on the conditions across these stages (FIGS. 29A-29D). This information is used to determine patterns in performance.

Environment Control

Another critical aspect for open motor skills is the environment control, e.g. in tennis, the positioning 1506 and preparation 1508 before the stroke. The assessment of the subject's positioning is made relative to the incoming shot and then subsequently accounts for the preparation relative to the incoming shot.

istics and the additional quantities captured across the model hierarchy (compare, e.g., U.S. Pat. No. 10,854,104 B2 and U.S. Publication No. 2121/0110734 A1, and U.S. Publication No. 2019/0009133 A1). In addition, it is possible to incorporate best practices from training domain such as the so-called key features in movement technique that are used in qualitative movement diagnosis and training.

Augmentation

Given the comprehensive scope of the model, the augmentation can target a variety of critical functions at different levels, including the visual attention and planning at the cognitive level, and perceptual, sensory, and motor performance at the movement stages (Table 3).

TABLE 3

Overview of the process dimensions and components for the levels of behavior

| Knowledge Level (Cognitive and Memory) | Movement Level (Sensorimotor) | Perceptual Level (Visual Attention and Visuomotor) |
|---|---|---|
| Components |||
| Task Planning Level |||
| Strategy for point Positioning and shot patterns | General movement patterns for court motion and configurations. | Global Situational awareness |
| Movement Deployment Level |||
| Positioning |||
| Positioning relative to incoming shot Preparation | Ground movement Specific movement patterns | Perceive and anticipate incoming shot impact location Perceive cues associated with the range of conditions and outcomes Selection of appropriate movement class. |
| Stoke Preparation |||
| Understanding the relationship between conditions and outcomes Understanding of setup | Stroke preparation pattern Balance | Interaction schema for positioning and stroke setup. |
| Stroke Execution |||
| Understanding stroke architecture and adjustments | Stroke movement patterns | Strike schema for ball perception and coordination |

Skill Element

Finally, the detailed skill element model can be used for diagnostics (explaining which features are responsible for the observed performance) and augmentation (how/which features can be manipulated to enhance skills and task performance).

Reference Data

In addition to the model generated from the subject's data, which describes the range of movement behaviors for each class of movement skill element, population analysis can be used to provide reference data for skill element character- Cueing can also encompass the subject's interactions with the task or activity environment. The hierarchical interactive model described here provides additional elements, control, and sensing architectures to set up augmentations across multiple levels of the system hierarchy (FIG. 15). In particular, the internal models describe the inputs and outputs at each level of behavior and, therefore, detail the specific dimensions that can be targeted by cueing. Augmentation can target the inputs and outputs to the models, as well as the models themselves (Table 4).

TABLE 4

Outline of the inputs and outputs of the internal models at each level of the model's hierarchy (for the tennis example)

| Description | Inputs | Outputs |
|---|---|---|
| *Task Planning* | | |
| Plan for shot and positioning for point construction | General situational awareness (game state) Activity goal (winning point over next exchanges) | Strike pose and target for next shot Sequence of game configuration (game state) |
| *Executive* | | |
| Coordination of movement elements during exchange | Plan for current exchange cycle (strike pose and shot target) Anticipated incoming shot | Movement element sequence Movement elements start-stop conditions Updated plan |
| *Movement Elements* | | |
| Positioning | Anticipated strike point Current pose relative to strike point | Ground movement into strike position Ground movement pattern |
| Preparation | Local environment (conditions resulting from positioning) Expected strike point and outgoing shot target | Stroke preparation and setup movement patterns |
| Execution | Execution conditions for racket strike Outgoing shot target | Forward swing stroke pattern |

Table 4 outlines the augmentations based on the inputs and outputs at each level. FIGS. 29A-29D (below) illustrate the behaviors and augmentations across the stages of a shot exchange. The following summarize some augmentations at the task and movement levels.

Task Level

The two primary aspects at the task level are situational awareness (recognizing the activity state) and task planning.

Regarding situational awareness, cueing can highlight critical cues, such as task elements or objects. For example, in tennis, perception of the game state over the exchange cycle in particular, the anticipation of the incoming shot and the opponent movements follows the model in FIGS. 29A-29D.

Planning is based on the forward model; as described, this model predicts the next task states and associated actions. This prediction is based on an abstracted representation of the task and environment. This information can then be processed by an executive control augmentation to assist the execution at each stage (subgoals) described here for the movement stages in tennis.

Movement Stages

The augmentation at the movement stage is based on the inverse model. With reference to FIG. 15, the inverse model (e.g., execution inverse model 1510) specifies the movement profile, via selection of motor program and parameter. This model has two inputs: the desired outcome 1512 and the conditions 1514. Cueing can target these inputs, which correspond to a perceptual augmentation. It can also target the output; e.g., cueing can play the role of the inverse model implementation, communicating the specifications for the motor actions.

At the positioning stage (FIG. 29B), on the input side, cueing can specify the target strike pose (from planning) and the motion gap (positioning conditions). On the movement side, cueing can communicate the target pose 2902 and specifications of the movement pattern; e.g., the necessary footwork to reach this pose. The footwork pattern can be encoded by the sequence of left/right footsteps (direction, length, speed).

At the preparation stage (FIG. 29C), on the input side, cueing can specify the current pose relative to the strike pose 2904 (preparation conditions) and the target strike pose with stroke outcomes 2906. On the output side, cueing can communicate specifications of the preparatory movement.

At the execution stage (FIG. 29D), on the input side, cueing can specify the current strike pose (execution conditions) and the desired stroke outcome 2908 (shot target). On the output side, cueing can communicate specifications of the stroke pattern.

Augmentation Profile

Not all aspects of augmentation need to be implemented. Rather, the idea is to target the areas of weakness based on the specific subject's assessment and diagnostics. Given the variety of factors that play into the subject's performance, it is critical to identify specific causes holding back the performance and skill development.

The combination of the subject's performance data and the population data provides different sources of reference for cueing. Cueing can be based on the subject's own performance, for example, reinforcing the best performance over the past performance history. With population data, reference data can be generated from representative subgroups (used to generate reference internal models). An advantage of population data is the availability of information in areas where the subject is lacking sufficient performance. Population data can also help drive skill development in specific areas of performance, and along the larger skill development path (compare, e.g., U.S. Publication No. 2019/0009133 A1).

Augmentation Modalities

The cueing can encompass a combination of visual cues and other modalities, such as audio, to highlight a broad range of task or activity events and movement features during performance.

Figure 33:
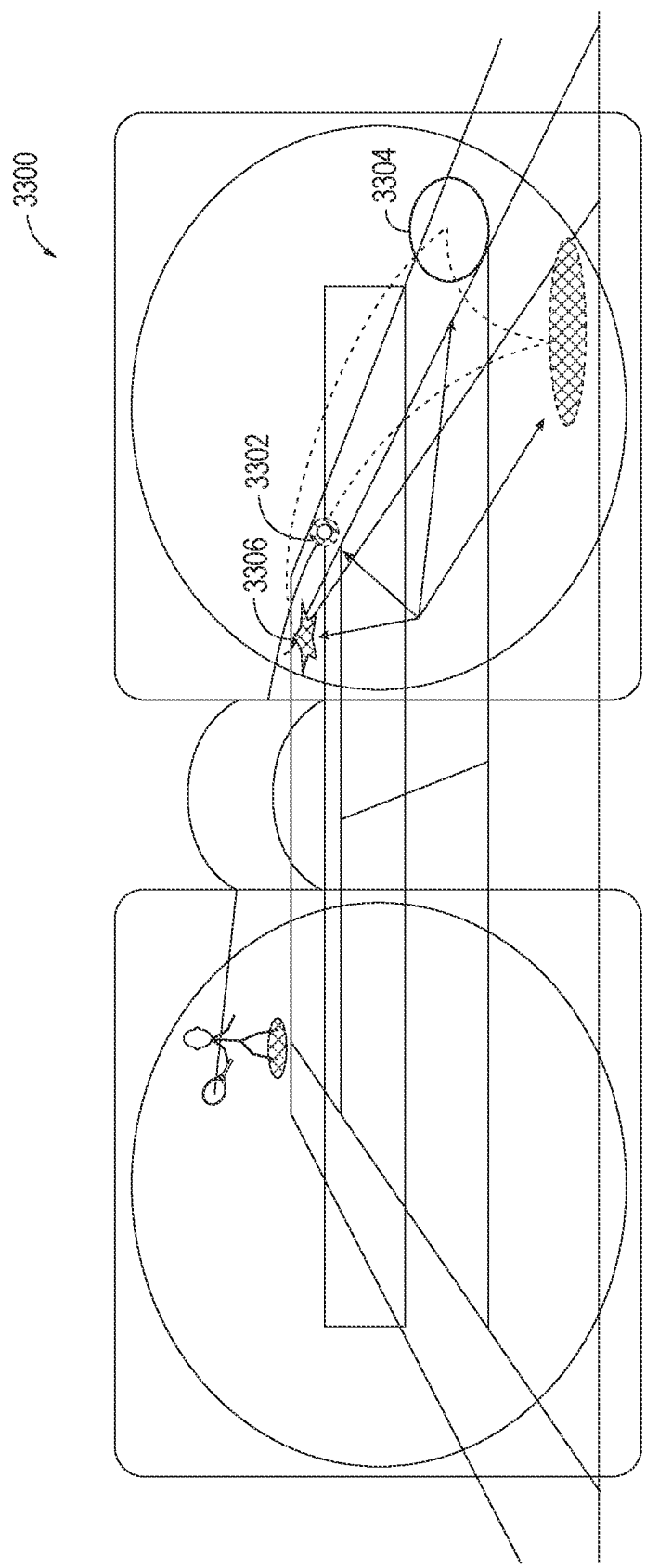
FIG. 33 is an illustration of the fusion of the natural visual environment and the visual cue elements in a tennis example, using augmented reality glasses.

With reference to FIG. 33, the most direct way to communicate spatial information is through so-called immersive technologies such as augmented reality (e.g., HoloLens system). In such an implementation, cues are superimposed onto the natural visual scenery. Examples of the use of augmented environment include movement cues 3302, 3304 in the environment, such as direction of motion and subgoal, and cues 3306 to enhance visual attention about relevant task elements, for example, those used to anticipate future events.

Cues can also be encoded into audio signals, for example, timing cues, of simple magnitude information and alerts (compare, e.g., U.S. Pat. No. 10,668,353 B2 and U.S. Publication No. 2020/0289907 A1). Stereo audio signals for example using headsets, can also produce spatial signals such as directional cues to communicate the direction of motion for court positioning.

Finally, cues can be communicated verbally, for example, the augmentation system can directly generate the posture and stroke attributes to be implemented by the player during the performance (see Table 1).

Augmentation System

Figure 30:
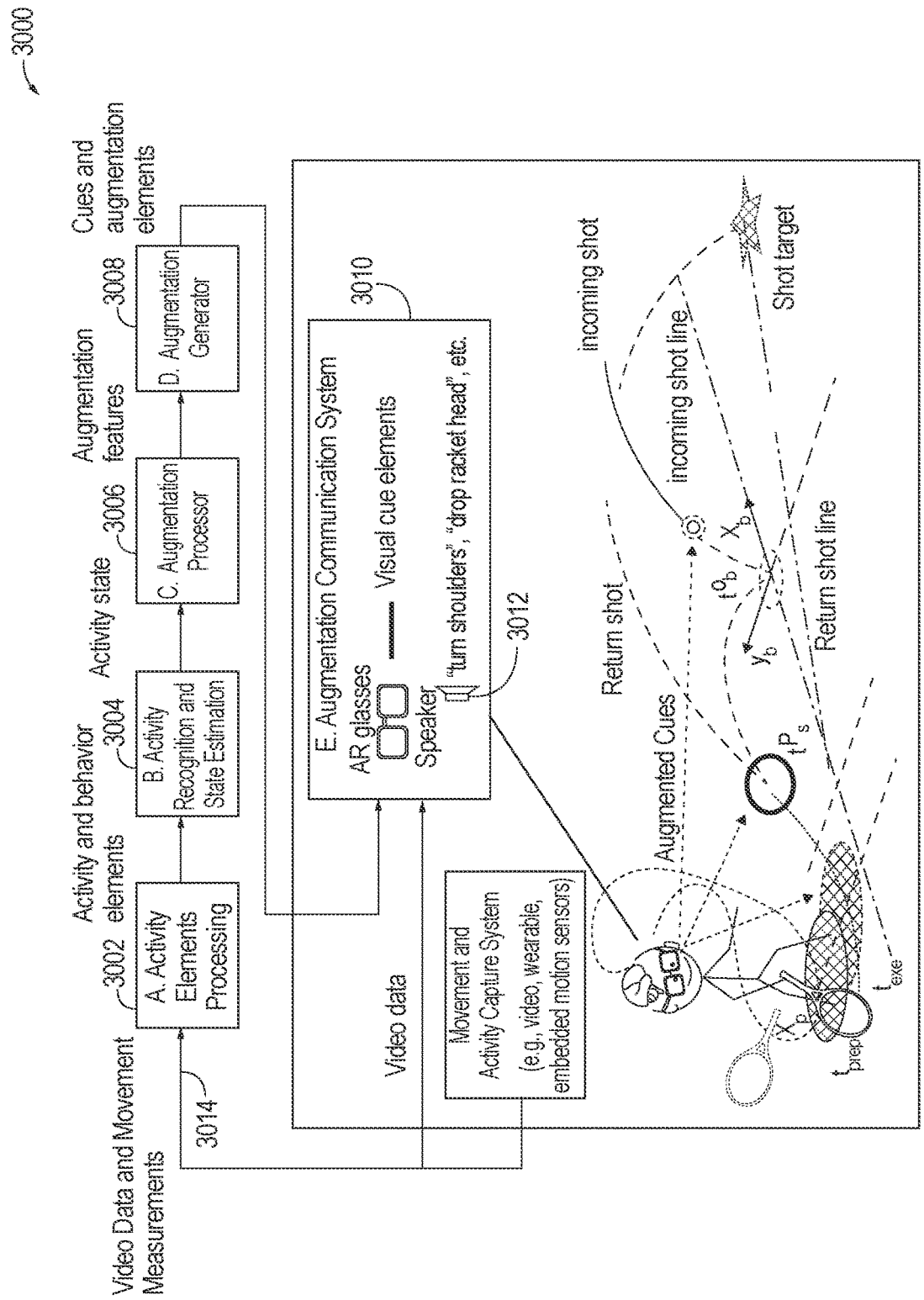
FIG. 30 is a block diagram illustrating an augmentation system with key processes.

This disclosure enables a person of skill to delineate the necessary components of the augmentation system for open motor tasks. FIG. 30 gives an overview of the augmentation system with its primary processes and process flow. The key processes of this system include the extraction of the behavior elements, the activity processing and recognition, the generation of reference quantities, the definition of augmentation features, and their integration with the activity process, and finally their communication to the subject for the realization of the augmented performance. This patent considers a range of augmentation modalities, including augmented reality, verbal commands, and/or simpler signal-based communication modalities.

FIG. 30 shows an overall system diagram for the augmentation system implementation, illustrated here for tennis. The system is divided into the following primary components: Activity Element Processor 3002; Activity Recognition and State Estimation 3004; Augmentation Processor 3006; Augmentation Generator 3008; and the Augmentation Communication System 3010.

The Activity Element Processing 3002 is responsible for detecting and extracting information about relevant activity elements to support the activity state estimation. It is based on the same general process as already described for modeling (shown in FIG. 20); however, its implementation as part of the augmentation system runs in real time. This process uses data from several possible sensors including video cameras, embedded and wearable motion sensors, as well as gaze tracker to capture the relevant elements and behavior of an activity. The selection of sensors and how these are combined depends on the activity and the scope of the analysis and augmentation. For example, the gaze tracking sensor makes it possible to support estimation of attention behavior.

The Activity Recognition and State Estimator 3004 is responsible for the recognition and estimation of the global activity state, as well as the stage of behavior for the current activity sequence or cycle, and the state of the behavior elements. It is based on the hierarchical interactive model illustrated for the tennis example in FIG. 23. The estimate of the higher-level game state provides information for the estimates of the behavior stage in the sequence shown in FIG. 10 and FIG. 11.

Figure 32:
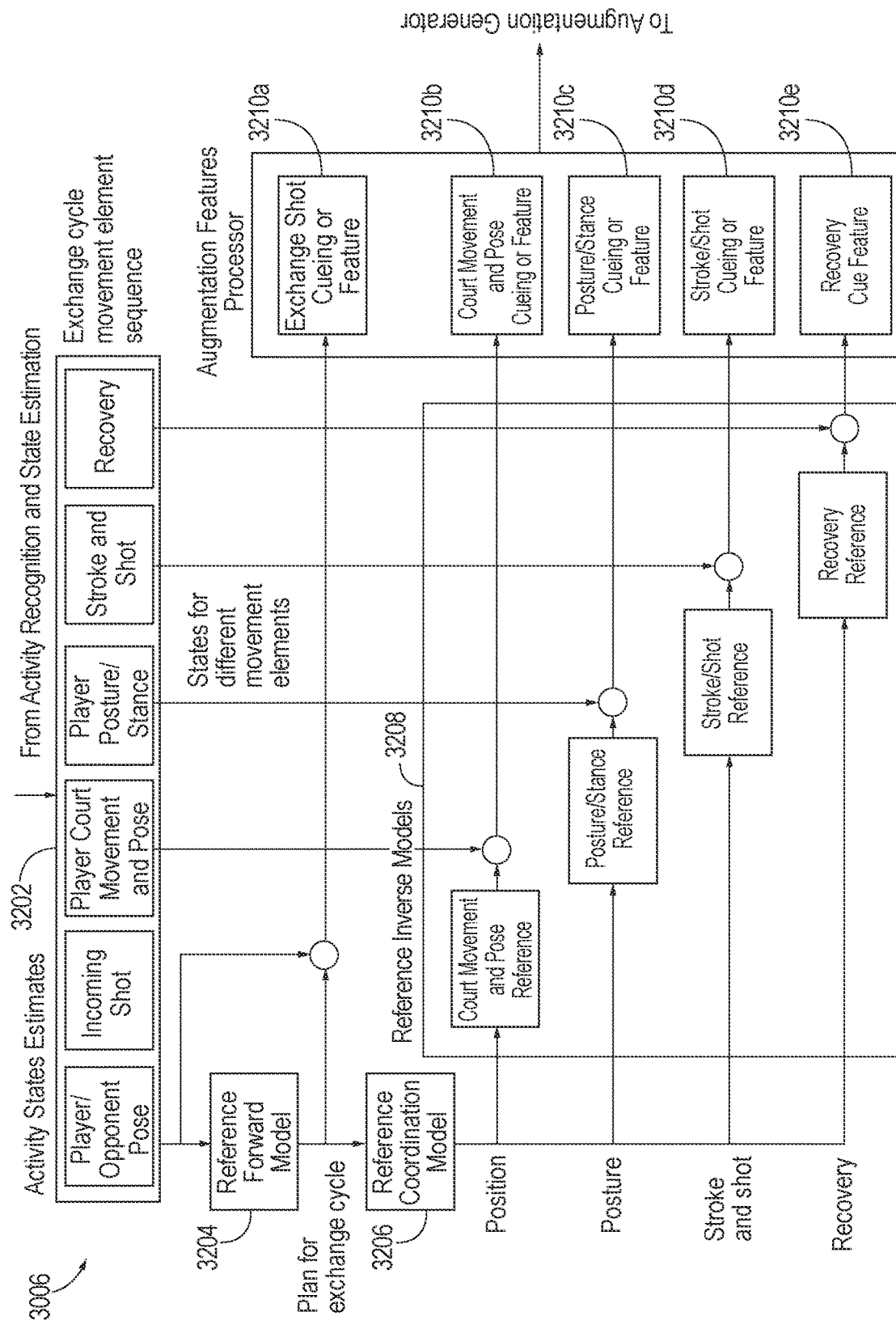
FIG. 32 is a block diagram of the augmentation processor system shown in FIG. 30, illustrated for tennis.

The Augmentation Processor 3006 detailed in FIG. 32 combines the activity state estimate 3202 and the reference models 3204, 3206, and 3208 to determine cue features 3210a-e. The cue features are a representation of the cues that are general and not modality specific. The complete augmentation hierarchy uses three primary types of reference models: the reference forward model 3204 for planning over the next activity cycle, the reference coordination policy 3206 for the coordination of the movement elements in the sequence for the activity cycle, and the reference inverse models 3208 specifying the movement for the movement skill elements in the sequence. The reference models are derived from user data assessment and diagnostics and can also account for population data and/or expert knowledge.

The combination of subject's performance data and population data provides different sources of reference data for cueing. Cueing can be based on the subject's own performance, for example reinforcing the best performance over the past performance history. The reference data for behavior can also incorporate best practices from coaching. Furthermore, with population data reference data can be obtained from representative subgroups (used to generate reference internal models). The advantage of population data is the availability of information in areas where the subject is lacking sufficient performance. Population data can also help drive the skill development in specific areas of performance and along the larger skill development path (compare, e.g., U.S. Publication No. 2019/0009133 A1).

FIG. 32 illustrates a general form of cueing law that uses the current activity state estimate (game state and the various element's states), and comparison with the internal reference models, to synthesize cue features across the levels of hierarchy during an exchange. The reference inverse models use the updated state estimates to determine reference behaviors. Therefore, reference models are applied based on the evolution of the activity state. Other forms of cueing laws in FIG. 32 can be defined based on whether the cues are corrective, such as for commentary about performance, or instructive, such as for commands. In some applications, the state estimate can include state predictions for the future behavior stages. This information enables computing anticipatory cue features for these behaviors.

Figure 31:
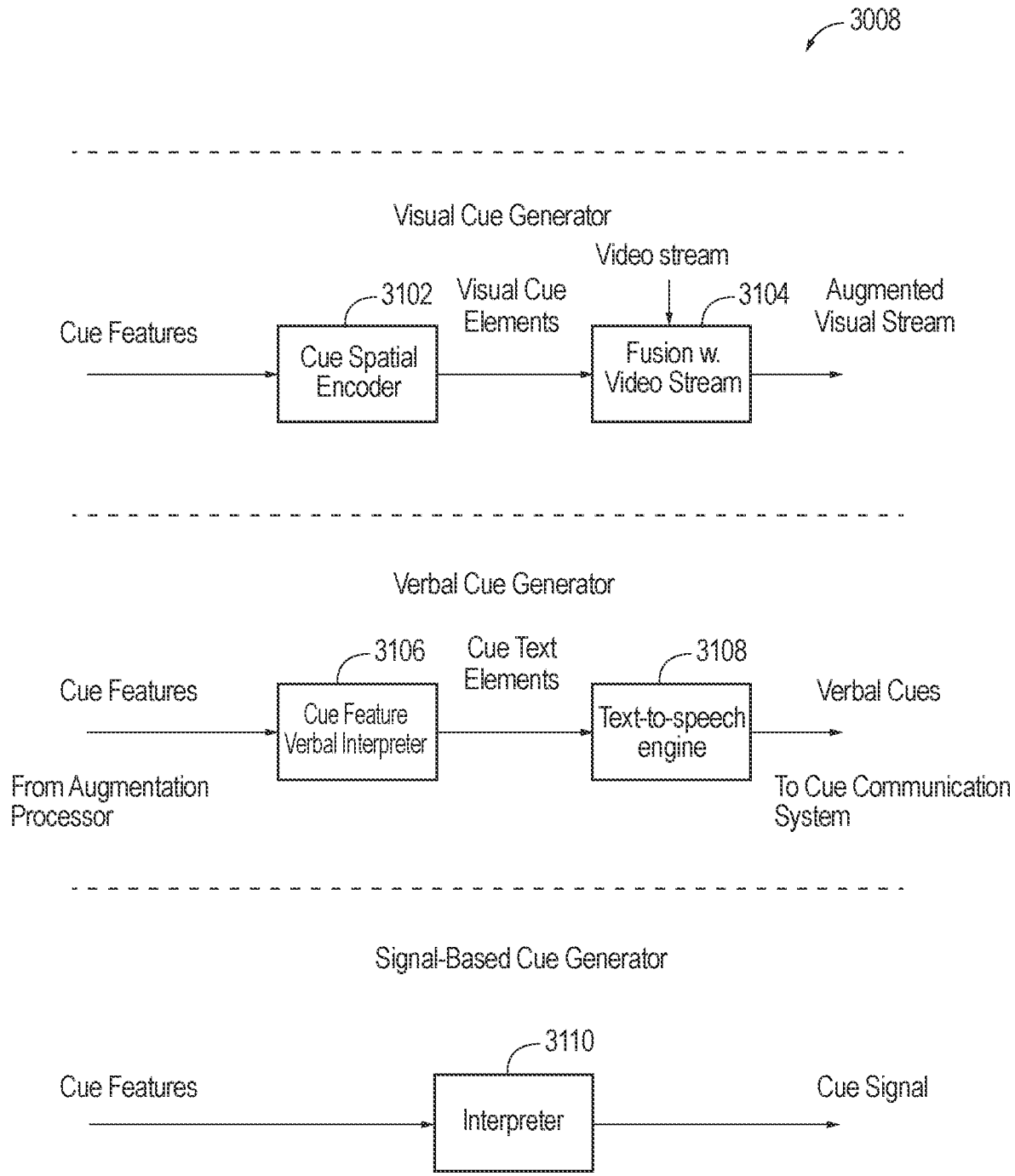
FIG. 31 is an illustration of augmented reality, verbal, and signal-based cues.

The Augmentation Generator 3008, and detailed in FIG. 31, is responsible for the production of the cue stimuli from the cue features. Basically, it is responsible for translating the cue information encoded in the cue features into a form that can be understood by the subject and creates an effect on the performance or learning. The idea is to make the approach compatible with cues that operate in different modalities (visual, verbal, signal based cues) and at different levels of the human information processing.

A cueing logic can be used to select the cueing modality based on the goals of augmentation such as training or performance augmentation. The modalities can be used individually or can also be combined. FIG. 31 describes the augmentation generator for the three modalities in more details. Augmented reality can be realized using AR glasses (such as shown in FIG. 33); verbal cues using some audio device such as headphones, portable speaker; and the simpler realizations include using similar audio devices or wearable or embedded haptic devices.

The AR cueing first requires transforming 3102 the cue features into visual cue elements that can be easily decoded by the human visual system. A second stage requires the fusion 3104 of the natural cue from the environment, embedded in the video stream, with the artificial cue elements. FIG. 33 shows the fusion of the cue with the video stream in AR glasses. The cue elements superposed to the environment for the different stages of behavior are illustrated in FIGS. 29A-29D.

The verbal cueing first requires interpretation 3106 of the cue features into text, followed by a text-to-speech engine 3108 that generate speech from the text. Samples of texts for the tennis embodiment are provided in Tables 21A-21E (below).

The simple audio and haptic cue signals first require transforming 3110 the cue features into audio or haptic signals that make the information easy to decode for the human subject, such as sounds pulses with different tones or haptic signals of different frequencies, magnitude and pulse length and patters. For example, validation of behavior can be based on a simple two-tone scheme.

The final step is for the cue to be communicated to the subject, shown in FIG. 30 as the Cue or Augmentation Communication System 3010. FIG. 33 shows an AR glasses system 3300, and FIG. 30 shows the system worn by a subject together with a speaker 3012 for verbal or simple audio cueing. Stereo speakers or headphones can be used for spatial audio cueing. FIGS. 29A-29D illustrate examples of cues at the different stages of behavior in a tennis exchange.

The specifications cover the entire hierarchy of processes because they represent the system that enables the performance of open motor tasks. However, embodiments that focus on a subset of the levels or aspects covered in the specifications can be simpler to implement and can already provide useful benefits for training or performance augmentation.

Notes on Computational Vs. Learning-Based Implementation

Note that the subdivision into these five systems labeled in FIG. 30 is to provide a functional description that can be translated into practice using different forms of algorithms and hardware. For example, the activity recognition and state estimation 3004 can be performed using various statistical modeling techniques including recurrent neural networks (RNN), auto-encoder, Bayesian graph and hidden Markov models (HMM). The actual implementation can follow other architectures than outlined in FIG. 30. For example, in some implementations the augmentation processor 3006, including the cueing law and reference model, can be combined with the cue generator.

Implementations based on neural networks (NN) have been transforming traditional computational approaches. A major drawback of NN-based solutions is that they typically rely on learning such as supervised learnings. This requires a very large amount of labelled data. For example, in the present tennis example, data could be collected from expert coaches while they are training subjects. Video and microphone recordings could be collected from large populations of players during coaching lessons. Other forms of measurements discussed in these specifications could be used.

Multi-layer neural net-based systems, including deep neural networks (DNN) having more than two layers, provide flexibility in the functional allocation for the encoding and decoding processes to support the cue generation from some input signals. In fact, it is conceivable to integrate the entire process flow from the measurement processing to the cue generation using a form of multi-layer neural-network architecture where for example: recurrent neural networks can be used to represent the task or activity and the various movement behavior elements from performance measurement data 3014 (video, IMU, etc.). The representation can incorporate reference behavior at different skill levels and style. These networks can then be used to implement the augmentation processor to determine cue features based on an input behavior provided as performance measurements. NN enable to implement very general representations can be used for encoding cue features, which in turn can then be decoded into cue elements for the different cueing modalities.

Such NN learning-based implementations can be used for the entire end-to-end system, or it can be used to implement specific aspects or processes of the system in FIG. 30. For example, it could be used for the activity elements processing 3002 and activity recognition and state estimation 3004. Or it could be used to implement the augmentation generator 3008. In particular, for verbal cueing since it is a natural communication modality for coaches.

Generalization

This disclosure includes a detailed use case for a tennis application, representing an example of open motor tasks. The approach generalizes to applications in other activity domains such as skiing, which is discussed further, as well as professional skills such as surgery. Moreover, the approach can also apply to human-machine systems such as robotic surgery.

I.IV Outline

This disclosure extends the basic skill elements (the stroke in tennis or turn maneuver in skiing) to include the larger task environment interactions. These important techniques are further developed with a focus on definitions of key activity elements and processes including, but not limited to, the following:

The behavior elements supporting the performance and various internal representations across different levels of the system and behavior hierarchy.

How these elements are grounded in the agent-environment interactions and human factors (e.g., affordances).

How this structure is leveraged for perception, decision-making, planning, and learning.

A tennis example provides an overview of human system dimensions, and in particular the problem of description and representation of behavior in open motor tasks, focusing on the patterns in behavior and considering the hierarchical organization of the agent-environment system. The central idea is that human behavior leads to structural characteristics that can be exploited for task-level organization and representation. These techniques are then used to formalize the hierarchical interactive model with an application to the tennis example. Finally, generalization of the approach to other open motor tasks is discussed.

II. Activity Tracking and Modelling

This section starts with an overview of related work, focusing primarily on activity tracking and modeling. Then, an overview of the challenges arising with modeling human performance is provided, outlining general requirements for modeling. Subsequently a systems view of complex task performance is taken, discussing some of the human factors that influence movement behavior structure and organization across the larger hierarchy. Biological constraints affecting motor control, perception, planning, and learning are discussed, and how these constraints participate in the hierarchical structure and organization of behavior. Finally, an overview of key learning concepts relevant to open motor skills is given, followed by an overview of the different roles of feedback in learning, and concluding with an outline of a representative augmentation system.

II.I Technical Standpoint

From a technical standpoint, a relevant area to comprehensive skill modeling and analysis is activity modeling and analysis. In particular, the segmentation of activity phases to automatically extract information for assessment or even augmentation. The literature in activity tracking and analysis includes a wide range of approaches that have evolved dramatically over the past 20 years with progress in computer vision and machine learning.

The following first provides a brief general review, followed by review focusing on tennis, which is representative of the state of the art in sports, and then some applications to surgical assessment.

Activity Modeling, Analysis and Recognition Techniques

Activity modeling, analysis, and recognition can be primarily considered in two forms: top-down and bottom-up (compare, e.g., Yamamoto 1992). The former is based on geometric models, determining a representation from the images. The latter are based on low-level features. The relationship between action categories for representations is typically more explicit than in low level features. Therefore, these approaches rely on learning procedures.

Early activity modeling and analysis depended on the ability to extract objects from the videos and reconstructing the 3D environment. Therefore, low-level features have been popular. Alternatively, the features and states of the models can be hand crafted, which determines the level of detail of the activity models. With the progress in video quality and computer vision, higher-level features, such as based on scene understanding providing contextual information, are becoming possible. Finally, more recent, machine and deep-learning methods can also be trained to determine features automatically.

Video processing can be used to extract player blobs and related movement elements; e.g., using Fourier descriptors to model the participant posture (compare, e.g., Petkovic 2001).

A computer vision approach can be applied to tracking tennis players. The problem can also be approached by solving specific subproblems, including detecting the player on the court, tracking the player, and subsequently, recognizing the stroke based on the identification of key video strike frames (compare, e.g., Bloom 2003).

A model for automatic interpretation and tracking of a tennis match using broadcast video can be implemented. A graphical model can be formulated to track the events associated with the evolution of a point and determine the point outcomes. The events can include the ball strikes, the ball court impacts, and player positions; however, the work does not necessarily include the video processing, and can also be based on manual annotations.

Analysis with fully automatic video processing can include player pose and motion data relative to the court environment, based on a 3D camera model. One approach can employ scene-level events such as baseline rally, net-approach or serve. The events can be used to produce a summary of the game.

Once the video processing and event detection is accomplished, the next level of analysis can include game tactics. This may require a form of spatiotemporal modeling. A simple ontology of tennis events and tactics can also be defined, based on categories of events. Two levels of actions and events can thus be considered. First level events, for example, can include basic movements and shots. Second level analysis can be based on the configuration, and spatial behavior can be modeled based on coarse discretization of the court. These results can then be converted into a symbolic representation that captures evolution of a point (or other interactive task goal), based on these simple features. Pattern analysis can also be used to determine tactics.

An example of game event tracking using HMM is also provided (compare, e.g., Almajai 2010). In some applications, events can be defined based on heuristics. For example, hidden Markov Models (HMMs) can be used to classify tennis strokes in a game. HMMs can also be applied to different human behavior recognition techniques, including speech, gesture, and action; however, not necessarily to a time-sequenced, motion recognition (compare, e.g., Yamamoto 1992).

Analysis can also focus on player behavior and game styles. For example, a model can be set up to predict a next shot (or return), using features from incoming shots (deliveries), and the player and opponent (participant) poses. For example, a dynamic Bayesian Network (DBN) can be used to capture game state dynamics during a point or other competitive or cooperative, goal-oriented activity (compare, e.g., Wei 2013).

Statistical models with finer spatial and temporal resolution of larger system behavior (combining the player movement behavior and shot characteristics) makes it possible to analyze and compare player strategies. For example, the model can include features describing the shot and player positioning, as well as dominance metrics (compare, e.g., Wei 2016). These details can also make it possible to analyze characteristics of incoming shots, in conjunction with player court movements for different outcomes (winner, unforced error, rally).

Other examples use patterns in shots and shot combinations to learn a player shot dictionary, and define a player style (e.g., based on the frequency count of dictionary elements). This work also incorporates contextual factors such as score and number of shots in the rally that can influence the point outcome (compare, e.g., Wei 2016).

Motion sensors can also be used, for example, GSP and inertial motion sensors; however, it can also be difficult to achieve meaningful results at the activity level without sufficient information, in particular (for example) the ball trajectory and player positioning, for tennis and other racket sport applications.

Deep learning can also be applied to activity tracking and analysis (compare, e.g., Polk 2019). Deep learning can enable augmentation to reduce reliance on hand-crafted features (compare, e.g., Hassan, 2014; Mo 2016). A deep generative model can be applied for forecasting the next shot location in tennis (compare, e.g., Fernando 2019). A deep network can also enable automatic hierarchical feature learning, in contrast to hand-crafted features (compare, e.g., Wei 2016).

Finally, data visualization is an important component of some approaches. The large dimensionality of the problem environment (including participants and objects evolving in spatial and temporal dimensions across multiple scales), can make it challenging to summarize insights.

Other similar results have been achieved in other sports such as soccer, basketball, American football. In tennis, the applications are mostly based on computer vision and focus on the annotation of activities or scenes. Inputs to the algorithms are the images, and/or, ball trajectory tracking data (such as Hawk-Eye, which is widely used in professional matches). Some examples also include movement sensor data, such as GPS, and audio data of the play and broadcaster commentary.

Activity Tracking and Skill Assessment and Augmentation

Despite the rich literature on activity recognition and tracking, there are few examples of its application to skill assessment and augmentation, in particular in open motor tasks. The movement skill behavior in open motor tasks often involves a rich set of different movements and situations. For skill assessment and augmentation these need to be processed and modeled in ways that account for the ecological principles of human control, including how movement skills are learned and organized. The problem domain combines the task specifications, the environment, and the set of movement interactions, together with the range of human factors that determine human movement skills.

One area that has been getting more attention is surgical assessment. Most of these applications are based on intra-operative video recordings. The use of video is attractive because it does not require specialized instrumentation. Robotic surgery is a special case since the robotic system already includes data about its movement.

The literature so far focuses primarily on specific technical challenges such as tool detection, surgical stage or phase identification. Surgical phase recognition is a central capability for automated skill assessment and feedback. For example, in (Yu, 2019), the authors use manually segmented phases in videos to train a deep learning algorithm. Since different aspects of the procedure rely on different tools, tool identification has been used to provide information for surgical phase.

Classical approaches to segmenting video are based on transforming the videos into a feature representation followed by using a distance metric within the feature space to identify the phase. More recent approaches combine computer vision and machine learning to directly label the segments of the video. Learning-based approaches are based on labelled video by human experts. The experts label the phases and instrument use and other relevant events.

The general approach is changing with deep learning and other machine learning methods. However, the skill modeling and assessment remains primitive. For example, in (Jin 2018), the authors assess surgical quality through analysis of tool usage patterns, and simple metrics such as movement range and economy of motion. The movements patterns are not contextualized in their specific environment, i.e., they are not regarded as interactions. The following example in tennis illustrates and can be readily translated to surgery.

Discussion

Most of the above applications rely on statistical models that are designed or adapted for specific aspects of the performance. In sports, like in tennis, the emphasis has been on the macroscopic patterns at the task level; e.g., point strategy. Therefore, in these examples the models are useful for training at the game strategy level but cannot provide actionable information for training the underlying coordination and movement skills. In surgery, as described above, the emphasis has been on technical aspects.

For the analysis and augmentation of skills it is necessary to model the actual sensory-motor interactions and their ramifications to the higher-level processes including perception, executive functions, and planning. The more fundamental issue is that the events and decisions that are typically used in activity models do not correspond to the building blocks of behavior. The prior art models may ignore the sensory-motor interactions, and, as a result, they do not explain the various processes underpinning the modeled task performance.

Furthermore, these applications focus on limited aspects of the game or activity; their goal is not to propose a comprehensive system model. Deep learning techniques can be used to replicate the brain's memory networks (episodic and semantic) necessary to predict the task level performance; however, these are not necessarily learning the procedural memory of the underlying elements of movement skills (compare, e.g., Fernando 2019). Finally, the outputs of these models are typically in the form or reports and, therefore, are not suited for real-time feedback augmentation.

More generally, while related techniques may have been contemplated by prior art authors, they have not been implemented in the same way, nor in the same combinations, that are presented here. The result is an improved, hierarchical approach to open skill assessment and augmentation, which addresses these and other deficiencies with the prior art as a whole.

II.II Challenges—Overview and Requirements

Comprehensive and quantitative approaches that are typical of process models in dynamics and control engineering are challenging to use for comprehensive human performance modeling. This is especially true in open motor tasks because of the dynamic, emergent, and hierarchical structure of behavior. The following briefly reviews some of the origins of the challenges.

It is relatively easy to measure, model, and assess skills for specific aspects of isolated movements (such as would be the case in closed motor tasks). For example, in golf, where the swing takes place in stationary conditions (both the ball and the player) skill metrics can be obtained relatively easily from measurements of the swing path and body segments displacement. However, it is much more difficult to assess skills comprehensively in open motor tasks where the movement behavior emerges from dynamic interactions with the task environment and depends on a wide array of processes.

Human Factors—Ecosystem

In open motor tasks, the performer is embedded in the task or activity ecosystem, and his or her actions influence the environment in which they are performing, and, at the same time, the environment determines the performance of actions. Basically, in open motor activities such as tennis or skiing, every movement is executed in conditions that result from dynamic interactions with the environment and task elements, therefore the modeling and augmentation should extend to the environment interactions.

Open motor tasks involve the dynamic coupling of the individual movement elements with the environment and task elements. The movement technique cannot be meaningfully isolated from the larger performance without accounting for the dynamic interactions between an agent's behavior and its environment. Open motor tasks require modeling and analysis of behavior across the task and environment interactions. These characteristics are fundamental to how the models are formulated. An agent-environment model is formulated to capture the movement skill elements respective operating environment and the perception-action and planning mechanisms driving movement behavior.

Moreover, open motor tasks typically require a broad repertoire of movement patterns to deal with the range of outcomes and conditions arising from the task and environment interactions. Therefore, it is also necessary to understand how the agent subdivides the space of outcomes and conditions and the relationship to the task performance.

Furthermore, to operate under dynamic environment conditions, behavior elements in open motor tasks should be capable of range of adaptation and modulation, therefore, the assessment. For complex open motor tasks, it is necessary to measure how the performer controls the conditions and model the planning, perceptual, coordination, and sensory and motor processes across the levels of behavior organization (see FIGS. 3A and 3B).

Learning

Natural systems are fundamentally different from most artificial or engineered systems. A key difference with engineered systems is that advanced skills (as opposed to innate skills) are learned; e.g., they are acquired through interactions with the activity or task environment. Therefore, the brain's encoding of behavior has to support the incremental learning.

Therefore, another way to enable data-driven training is to capture the mechanisms of human learning (compare, e.g., U.S. Publication No. 2019/0009133 A1). This also allows the unit of behavior to represent appropriate units of skill in the learning process. For example, the basic units of skill can:

Accommodate longitudinal skill development in response to performance or training; e.g., capture the evolution through learning in the form of well-defined transformations of the underlying elements.

Be valid across broad range of skill levels (from novice to experts), and enable formally relating different skill levels (e.g., through the definition of a skill gap).

Generalize across activities; e.g., capture fundamental characteristics of the human movement behavior.

Progress has been made in machine learning (ML). ML has been changing the engineering approaches in particular by offering learning solutions instead of traditional design-build approach. Therefore, ML frameworks can be used to provide additional insights. For example, reinforcement learning can provide useful insights about the augmentation.

Other Biological Constraints and Factors

In open skills tasks and applications, the subject's proficiency can be anywhere from novice to expert. The proficiency affects every process, from movement execution (motor skills) to perception and decision making. The approach to modeling and analysis therefore should accommodate different skill levels, and more fundamentally the larger learning process.

Finally, modeling skilled behavior in humans is further challenging because it involves biological constraints. Such systems combine mechanical properties, such as motion kinematics, which offer tangible dimensions, but also unobservable ones, such as, memory structures, and higher-level mental representations. Therefore, to produce a modeling language that is compatible with the biological constraints and principles, it is necessary to account for the human factors.

These various challenges are described in greater detail in following sections of the disclosure.

Summary and Requirements

In summary, some key challenges in comprehensive assessment, modeling, and augmentation of skills in open motor tasks include:

Movement behavior takes place in dynamic conditions that involve task and environment interactions.

The conditions in which the movement behaviors and actions are produced have to be actively controlled by the performer or agent. Therefore, it is important to distinguish between the environment control and the actions that are directed directly at the movement outcomes.

Behavior is harder to measure and assess because of the multiple dimensions of movement behavior and their environment interactions. It is also difficult to determine what information is extracted by the subjects.

Larger task goals are typically the result of a sequence of movements. The movement behaviors are the result of perceptual, planning, and decision processes that take place at different levels and stages of the agent-environment interactions.

Movement skills are acquired through physical interactions with the task and environment. You cannot use mental exercises alone. Learning higher-level functions such as task-level planning depends on sufficient skills in the movement execution.

Behavior characteristics are determined by biological factors and constraints that also have characteristics that are unique to each individual.

As a result, there are many confounding factors, and performance measurements do not map directly to simple skill metrics. For such comprehensive assessment and diagnostics, it is necessary, in addition, to capture the dynamic interactions that lead to the conditions in which movement is executed, as well as the mechanisms across the range of processes that drive these interactions.

The following describes the general approach to achieving more comprehensive model of the movement behavior based on an ecosystem view that emphasizes the system-wide interactions, and key processes accounting for the natural principles governing human behavior.

The approach first elucidates how the brain deals with these same challenges in the performance of open motor tasks. The general approach is tailored to the particular way human performers sense, perceive, and represent information. Tennis is used here as an example, but the approach generalizes to other open motor tasks and activities.

II.III Systems View and Structural Characteristics in Open Motor Tasks

The central task for the definition of a language to represent the complex human behavior in open motor tasks is to define appropriate units of analysis and representation. These have to be compatible with human behavior and encompass the multiple levels of organization in the task and human control hierarchy. The central question is, what principles can be used to define units of behavior that serves as building blocks for open motor tasks?

This section discusses the units of skill and structural characteristics in open motor tasks and their significance to learning, decision making, and larger system organization. The understanding of structural characteristics is central to the identification of model elements, and to the understanding of the levels of organization and analysis. The approach builds on ecological principles. Once these structural elements have been characterized, it is possible to consider their roles in learning and decision-making.

This section first briefly considers key human factor dimensions influencing the modeling approach. General structural characteristics of human behavior are introduced, which can be used to help understand the solutions used by a human brain in the representations and control architecture. General systems techniques are then introduced, which will help formalize the structural elements; e.g., by introduction of some units of behavior in open motor tasks. Finally, the interactions are presented for units of behavior, and an overview of the approach in tennis is provided.

Human Decision Making in Dynamic Environments

Compared to closed motor tasks, open motor tasks require perception and decision making at the task and environment level, such as for the planning of a tennis shot. Effective performance in open motor tasks not only requires fast and precise movements but also a seamless integration and coordination of behavior across different levels of the task and control hierarchy, with challenges at each level.

Tennis provides a representative example displaying a variety of interactions with the extended task environment, including the movement on the court, and the game plan. These larger dimensions of decision making have to be made and updated in real-time, and, therefore, the human brain must have ways to mitigate issues associated with the so-called curse of dimensionality.

This scenario requires a sensing and control system with multiple levels of processing, from large scale including decisions that affect the overall organization, to faster, smaller scale, behaviors that are nested in those larger scale behaviors. A key requirement for the definition of higher-level representation and decision making is to resolve their connection to the underlying sensory-motor processes responsible for the implementation of behavior.

Engineering Vs. Human Solution Principles

Taking human factors—and the natural structure and organization resulting from these constraints—into considerations make it possible to derive models that accurately describe human performance and therefore can also be used for the comprehensive assessments, diagnostics, and augmentation of skills.

In engineering, the environment state description can be simplified by discretizing the control and state variables. Discretization and quantization are common approaches in computational techniques to motion planning in robotics and aerospace. It provides a formal approach to formulate decision making and planning as mathematical programs. These models commonly show a tradeoff between computational complexity and optimality.

Humans also employ some form of abstraction or discretization to convert complex problems into some form of "computational" model. However, humans approach differs from input quantization, and the grid worlds, or tessellations that are used to describe the task environment in robotics motion planning. Elucidating these questions is essential for building comprehensive skill assessments, diagnostics, and augmentation.

Decision making and perception requires some form of representation that captures key behavior elements and interactions, supporting efficient decision making. If the states of all the interacting elements involved in agent and task environment are described by the full state space—as is often the case in engineering—finding a solution to this system would be intractable. In addition, there are multiple aspects of solution process, including perception, control, and memory.

Serial Order in Behavior

Two additional higher-level capabilities required for many open motor tasks are the coordination and sequencing of the actions to accomplish larger goals and dealing with the hierarchical structure of tasks. These require understanding the relation between behavior and task structure. More specifically, the coupling between task and behavior requires a unit of behavior to incorporate elements of the task structure. Movements are not isolated behaviors but are fundamentally interactions within the task environment ecosystem.

Naturalistic Decision Making

The natural decision-making process is believed to be based on some pattern matching and prediction process. For example, master chess players may be able to recognize board configurations based on patterns and not individual positions of the pieces.

In tennis and other open-motor tasks, the behaviors are not simply discrete and static as in chess but involve may also dynamics of interaction at multiple levels of the task hierarchy. To employ pattern-matching process in such dynamic conditions, the brain must use some forms of abstraction. These are expected to be derived from structural characteristics or features in the behavior.

Structural Characteristics

Some elements of the activity have discrete structure, such as specific events (ground impact, racket strike, net crossing). These are basically spatiotemporal characteristics of the interactions which delineate task phases. These phases are key for behavior organization and decision making.

However, there are also deeper structural characteristics at the level of the dynamic characteristics that can provide features for organizing the various processes across the multiple levels of hierarchy, including perceptual and decision making (predicting ball trajectory, situational awareness for shot selection, and the motion and stroke coordination with the activity elements).

Hierarchical Modeling: A Systems View

Open motor skills distinguish themselves by the complex interactions with the environment. A subject, or performer, is embedded in the task environment, responds to the perceived changes that result from effects of interactions due to his or her own actions, and external elements, or actions by other actors. An agent such as a human performer relies on a repertoire of sensory-motor patterns.

Fundamental types of patterns have been extensively studied such as in gait analysis, reaching motions, or specific skilled movements. However, a key aspect that is missing in these investigations is the coupling of these patterns with the task and environment elements, and how these patterns influence the large-scale behavior, and can in turn operate as abstractions for the larger processes and cognitive functions.

To better delineate between levels of organization and understand how to capture the relevant characteristics of this system, it is important to put behavior details in perspective of the larger task and system. In ecological systems, the behavior is distributed over the agents and their environment.

Activity Ecosystem

FIG. 1 is an illustration of open-motor tasks as a graph, showing a collection of interactions (e.g., interaction 105) (edges) between elements (e.g., element 103) (nodes) where each element is either an agent, a segment of an agent, a task or environment element or object. The figure highlights three scales: the global system scale, the local interactions, and the local behavior, encompassing system wide 107 and local interactions 109, and local behavior and conditions 111, respectively.

FIG. 1 illustrates open-motor task ecosystem as a graph showing a collection of interactions (edges) between elements (nodes), where each element is either an agent, a segment of an agent, a task or environment element. Agents typically take deliberate control over their interactions. They can control the task environment through actions, which have direct and indirect effects on the task and environment elements and thereby produce outcomes at multiple levels of interactions. In parallel, agents also need to sense their environment. The sensing typically has a limited scope (shown as a region surrounding the agent), and human visual attention cannot be divided and attention in general is limited to a few simultaneous items.

From a mathematical modeling standpoint, the overall task description in open-motor tasks results in large nonlinear control problems. One aspect as illustrated in FIG. 1, movements that are directed at task outcomes (3. Local Behavior 110) take place in operating conditions that result from the larger interactions (2. Local interactions 108).

For agents to be proficient in a task or activity, they have to understand how this system is organized, so that they can participate in these various interactions in a way that satisfies the system constraints, as well as achieves the task or activity goals. From a formal standpoint this understanding corresponds to learning the topology of the behavior interactions and the information flow in this system. Complex movement skills therefore rely on a comprehensive system of processes deployed through a sensing and control architecture.

From the general description in FIG. 1, it is possible to delineate between the following three levels of analysis:
1. At the highest level, the hierarchical model emphasizes the global configuration or state of the system.
2. The next level considers the interactions between the elements of the system.
3. The final level encompasses local conditions and behaviors for each element.

The system can have additional hierarchic levels. For example, an element can itself be a system composed of elements and internal interactions.

In the present disclosure, the system represents the open motor task or activity, and the elements are key objects and agents that play a role in the overall system behavior. An agent engaged in a task therefore has to adjust its behavior to take the system to a desired configuration. To accomplish this, the agent has to consider the general, global state of the system, while controlling or reacting to local elements.

Human Factors Considerations

The human limitations translate in limitations on the scope of behavior across the global system, and the spatial and temporal accuracy with which the agent can sense and control the elements. In natural systems, the brain is part of the agent, and therefore is embedded in one of the nodes (e.g., a node 3 as shown in FIG. 1) and must gain situational awareness over the extended system but its actions are limited to the immediate, local interactions.

Another aspect that stands out in human behavior are the limitations in parallel processing. As shown in the figure, many activities involve concurrent interactions; the human agent must deal with these despite limited attention and working memory. The solution is to determine the organizational structure, including the sequencing of the sensory, decision, and movement processes.

Hierarchical Information Processing

The delineation between levels outlined above can be explained by fundamental system properties, but also based on neuro-cognitive theories. The brain developed the fundamental spatial sensory, perceptual, and planning capabilities through evolution to support the range of skills needed to interact with the world. Different brain regions have been identified that reflect the general organization from task-level processing to the lower-level motor execution.

Human hierarchical information processing models distinguish different forms of information. For example, three levels/categories of information have been proposed in the literature: symbol, cues, and signals. These levels will be illustrated in the following tennis example, as representative of applications to other professional, recreational, and vocational open motor tasks and activities.

Tennis Example

The activity ecosystem in FIG. 1 provides the starting point for understanding how the behavior elements are organized and how they combine to achieve the task goal. This holistic system description can be applied to tennis. The tennis example is used to illustrate the modeling approach, including the specifications of the quantities that are measured or estimated. FIG. 4 shows some of the state dimensions that are measured or estimated to capture the activity environment interactions for the tennis example.

In tennis the main elements are the player 402 and opponent, and the ball (see FIG. 4). The main movement elements include the ground movements, postural movements, stroke, and the shot.

The resulting delineation is as follows:
At the ecosystem level, the player, opponent and shot define the state of the system or game.
For key interactions in tennis, in particular the motion of the player and opponent relative to the shot. The court motion and shot targets determine the game state and conditions for the shot execution.
The local behaviors of individual elements include the player and opponent stroke preparation and execution.

Instead of describing the shot exchanges taking place during a point as the collection of states of the various elements, such as the full state time histories of the ball, racket, and player and opponent, the activity is described in a more structured way by accounting for the behavioral elements that determine the structure of the activity performance.

Because of the combination of human factors, behavior dynamics, and task interactions, behaviors cluster around specific patterns. Patterns emerge from the mechanisms and processes that implement and organize behavior including constraints. Therefore, it is possible to reverse-engineer these patterns to model the underlying processes. For tennis, a primary pattern can be considered to include the stroke pattern (compare, e.g., U.S. Pat. No. 10,854,104 B2 and U.S. Publication No. 2121/0110734 A1, and U.S. Publication No. 2019/0009133 A1). Different stroke patterns, however, are needed to encompass the full range of conditions and outcomes. The modeling is extended to include larger task and activity interactions.

Hierarchical Structure and Organization of Human Behavior

The structuring and organization of the behavior is central to the integration of the resulting processes and system. The structure and organization help overcome complexity associated with the execution, as well as task-level perception and decision making. The general idea is that structure emerges from the natural system interactions.

Humans use various schemes to organize information, and structure behavior. For example, chunking of information; e.g., the combination of various pieces of information into some units of information, is one of the most fundamental approach. Chunking implies that behaviors, and their associated cues, are organized according to their participation in interactions.

Some of the structure arises from the process used to encode and execute movement behavior. At the movement execution level, for example movement behavior can be learned and organized building on the definition of a motor program. The domain of operation of each program, however, is limited. These limitations arise in part from the functional mechanisms (relationship between control variables, sensory signals, and cues), and the constraints that restrict the range of configurations between body segments (biomechanical system and muscle synergies).

Such deeper, dynamic properties can for example be described using the language of nonlinear dynamic systems. Representations such as from phase portraits can be used to capture the patterns in the dynamic interactions and their relationship. Bayesian graph analysis can also be used to help identify patterns between heterogeneous quantities, such as gaze and dynamic behavior.

The specific operating range of movement leads to a partitioning of the task workspace. Therefore, the properties of the movement patterns acquired by a performer determines the larger task organization and performance. The properties in turn are exploited for task-level perception and decision making. Collectively, the repertoire of these programs has to cover the range of movements and outcomes needed for task performance.

To gain understanding about the participation of movement behaviors in the larger behavior organization, it is necessary to consider the larger agent-environment system (FIG. 1).

The analysis and modeling of skills presented here, therefore, focuses on explicitly accounting for the coupling between the movement patterns and the environment and task elements. The coupling is determined by the interactions that take place between different aspects of movement behavior and different objects or elements of the environment and task.

Quantifying the basic units, and their functional characteristics, as well as, the fundamental characteristics these units engender, represent the primary challenge for skill modeling and modeling the larger acquisition process.

Interactions and the Units of Behavior

Human behavior tends to be viewed as less structured and variable than engineered systems. However, the structure becomes more apparent when understanding the larger system and principles. Once such structure is determined behavior and skills can be precisely analyzed and eventually augmented.

Interactions and the Organization of Behavior

Interactions typically manifest as patterns in the system's dynamics. These patterns describe how the behavior clusters around different conditions and dynamics of the agent-environment system. In open motor tasks, the behaviors form a repertoire of movement behaviors associated with the different patterns. Different agents or subjects will exhibit different pattern characteristics, and as a result, also different repertoires. The repertoire, therefore, reflect their proficiency, style, and other factors such as age, health, and even personality.

These interactions are fundamental because they shape the larger structure and organization of behavior needed to support efficient decision making. Therefore, subjects are not just learning behaviors, they learn to refine and expand the scope of dynamics of the agent-environment system. These insights demonstrate why the interactions that support the range of agent-environment dynamics represent the units of behavior in open motor tasks.

Complex tasks are acquired through experience; therefore, structure and organization of behavior is also central to understanding the learning process. Specifying what could be considered the building blocks and principles dictating the learning process can help determine the modeling language that is compatible with this process, and the underlying biological constraints. Another benefit of this approach is that it will apply to the broad range of skill levels.

As illustrated in FIG. 1, interactions are key processes through which the agent-environment state changes. An important class of interactions are those driven by sensory motor processes of the agents. Through these interactions, the agent acquires information for its behavior, while simultaneously generating outcomes; outcomes are defined as the effect of actions on the environment.

The agent's interactions are either deliberate actions directed toward the task environment elements or objects, or simply part of the dynamic task process. The interactions in FIG. 1 can be graded from weak to strong; e.g., based on the level of coupling between the elements involved. The strong interactions are typically produced by perception-action processes, or direct, physical couplings.

Example of Interactions in Tennis

For example, in tennis the primary action is the stroke directed at incoming shots to return and redirect them (see FIGS. 2A-2C). The shots, in turn, are directed at producing specific changes in the player configuration (see top). However, there are additional supporting interactions. These include the movement on the court (see middle), and the preparatory movements used to achieve an effective setup for the actual stroke execution (see bottom). As described below, a key aspect of open motor tasks is to produce task environment conditions for the primary actions such as the court movement and preparatory movement before the stroke execution (see bottom).

Other open motor tasks have similar general characteristics. In skiing, an agent, subject, or participant; e.g., the skier, uses turns, which represent the primary movement, to maneuver through the terrain. The turns are performed by coordinating the skis and body. The maneuvers encompass different turn types needed to negotiate different conditions. Before each turn, the skier sets up the turn to control the conditions under which the turn maneuvers are executed.

The interaction processes for an activity can be described by the graph in FIG. 1. Note that important information about the activity is captured by the graph characteristics, including its topology. Recall also, that the relationship between elements (nodes) is dynamic.

This example is developed fully in subsequent sections of the disclosure, to define the exact topology of interactions between agent and the task and environment elements from the tennis example depicted. See graph illustrated in FIG. 9 and the task and environment elements shown in FIG. 4. First, the stroke is considered as basic skill element, used for interaction with the ball. Then, the stroke is integrated into the larger task and environment interactions, which will enable a formal description of the task structure and organization needed for processing the measurement data and proceed to its modeling and analysis toward the assessment, diagnostics and ultimately augmentation.

II.IV Hierarchical Model—Overview

FIG. 2 provides an illustration of interactions at different levels of organization in tennis, showing the behavior at the level of shot exchange, global positioning, and stroke preparation and execution. Alternatively, the illustration can be generalized for a subject or participant engaged in another open-motor skill activity.

At the shot exchange level, the player or other participant takes a pose 208 at the opponent shot time ($t^O_s$), with recovery time ($t^P_r$) for taking a strike pose 210; e.g., responsive to a projected ground impact or other delivery position of the object. In this tennis example, the participant interacts with a ball or other object delivered by a second player or participant (e.g., an opponent), at time ($t^O_s$). The object crosses a net 212 or other barrier or environmental feature at crossing time ($t^O_n$).

Figure 24:
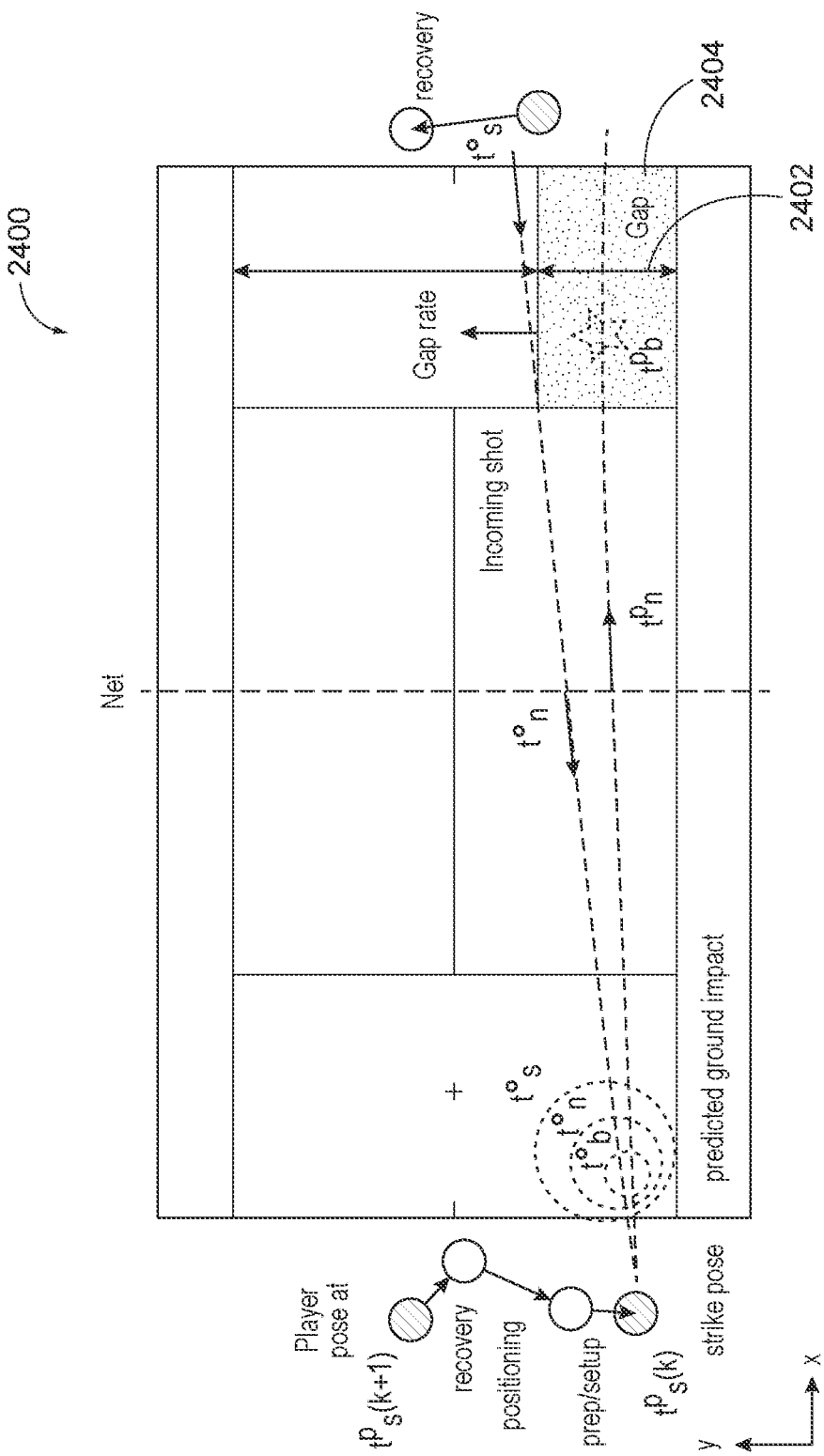
FIG. 24 is a graphical description of a player's sequence of court movement and shot targeting according to the top panel of FIG. 2A, based on anticipated ball ground impact and sensory gap formed by opponent ground motion.

In tennis examples, the object is an incoming ball or shot, with return shot targeted in a gap G (e.g., a target area for delivery of the ball, or other object), which varies according to a defined gap rate according to the tau model of FIG. 24. At the positioning level (e.g., to position for a desired shot, stroke, or other interaction with the other participant), local conditions include local (or relative) pose, strike point (or delivery point) and preparation. At recovery time $t^P_r$, a number of poses A, B, C and D are options for the player strike ($t^P_s$), depending on cues provided at the predicted ground impact ($t^O_b$), or at another delivery position of the object.

At the preparation and execution level (e.g., for position and posture), stroke or interaction conditions include forward swing initiation, forward swing profile, and ball impact (or other delivery) conditions. An additional cue can be provided at time $t^O_b+$, following the bounce ($t^O_b$). The participant forms a stroke pattern (or other movement pattern) responsive to the cues obtained along the delivery path (incoming shot line); e.g., depending on the subject's position (player ground position), and comprised of stroke or movement phases selected to strike the ball ($t^P_s$). Augmentation can be provided to alter or improve the outcome of the return; e.g., as defined by delivery parameters such directional vectors $X_b$ and $Y_b$, as defined at the impact position (bounce ground impact), and the angle $\Psi$ between the incoming and outgoing shot lines (or other delivery and return paths).

In the prior art, there was an emphasis on assessing movement outcomes at the level of the skill elements movement technique and primary outcomes. Therefore, this disclosure focuses on extending the sensing and control from the skill element level to the higher levels of control and organization, including, but not limited to:

Local situation, including the positioning and preparation of the movement elements; and Global situation, including the planning and management of behavior to achieve the task goals.

The following first describes the overall system architecture starting with the decision-making components. The goal of this system description is to integrate the skill elements in the larger task process.

Human Factors and Learning

An important factor in the structure and organization of behavior is that the human planning, perception, attention and more specifically working memory have specific limitations. For example, visual attention is limited to tracking a single object at a time, perception of the environment is conditioned by what information is critical for the activity, and the working memory can only hold a few objects simultaneously.

Therefore, complex tasks require mechanisms of sequencing behaviors across levels of hierarchy and coordinating how resources are used. An agent such as a tennis player solves this challenge by learning the task structure, and a sensing and control structure that determines how the human brain deploys the resources to support the various interactions as the task unfolds. The brain primarily addresses these complexity challenges by learning a hierarchical control architecture.

Although the brain is organized to process information hierarchically, the specific task architecture must be learned by the player; e.g., they have to learn the task elements and structure, the vocabulary of movement skill elements, and learn the interactions mediated by the skill elements. In parallel, subjects must learn to identify cues that provide the necessary information for coordination across the levels of organization.

Therefore, a key to a comprehensive model for open motor skills is to be able to formalize the relationship between the different levels of behavior and integrate those under a hierarchical control architecture 300 as shown in FIG. 3. The model's elements reflect the subject's skills across the levels of organization and provide the basis for a comprehensive skill assessment. Key tasks that need to be addressed to make such a model useful for the applications of skill assessment and augmentation, is to model the movement skill elements and cues at each level of the hierarchy and integrate them across different levels under a task model.

Hierarchical Structure of Task and Behavior

As disclosed herein, complex tasks, such as in open motor tasks, have typically been described based on sequence of movement elements or movement primitives (serial order). The behavior should not be decomposed based on simple motion primitives, such as given by geometrical properties, but based on functional properties, accounting for the interaction between movement skill elements and the task. Basically, the movement skill elements supporting the various task or activity interactions represent units of organization for the task level processes.

FIG. 10 shows the general hierarchical structure of behavior and FIG. 11 shows the main levels of organization and structure 1100 for tennis. Different units of behavior can be defined based on the level of organization. The activity level can be described as a sequence of stages. The stages often delineated by states that can be considered subgoals. As described herein, the subgoals can be interpreted based on the activity and environment dynamics. The subgoals in tennis can be described as the player shot target during each exchange cycle 1102. In skiing, the subgoals.

Each stage is typically described by a sequence 1104 of movement elements 1106. These elements are defined by the various interactions with the task and activity environment. For example, in tennis, the interactions during an exchange are the positioning movement, the preparation, execution, and recovery. Each movement element is defined by specific interactions with, and, possibly also, events of the activity (detailed in FIG. 12).

Each element is typically described by movement phases. This level is used to the biomechanical constraints associated with the movement execution and details of the sensory-motor interactions. For tennis, as shown in FIG. 11, it may be possible to consider the following key phases: backswing, back loop, forward swing, impact, follow through. Note that there may exist some overlap between the movement elements and movement phases (co-articulation). For example, the stroke movement spans several movement elements. Stroke phases are distributed over the sequence of elements. The back swing typically already starts with a so-called unit turn, which can be considered as part of the positioning, and the back loop is typically part of the stroke preparation, and the forward swing is part of the execution. As can be appreciated here, considering the larger environment interactions, results in a more complex behavior structure than if only the stroke were considered (e.g., as a result of simplification or in quasi-stationary conditions where the player does not have to take a new position and can execute the stroke as a primary behavior element).

As disclosed in the previous section, the units of behavior also operate at different levels of information processing and organization. For example, as illustrated in FIG. 11, the shots and gross court movements in tennis span the larger task scope, while the stroke preparation, and ultimately execution, may span more local behaviors, within specific operating environments. Furthermore, these multiple units of behavior can operate concurrently, which implies overlap of phases and that they may need to share the resources such as visual attention (FIG. 12). This requires some coordination mechanism, which is typically performed by executive functions. The present description describes this structure for tennis, but most open motor tasks have similar general units and exhibit a stratification of behavior.

The specific behavior hierarchy derives from the task structure (FIG. 10 and FIG. 11) and associated control hierarchy (FIG. 12), proceeding top-down, at each level, generates more specific context for the perception and control processes. As a result, at the higher level in the hierarchy the behaviors operate in a more general and global operating environment, and at the lower a more specific operating environment. The following first provides an overview of the behavior hierarchical organization for the tennis example.

FIG. 28 is an illustration of the perception-action and decision processes 2800 across the levels of organization for the representative tennis example. The primary action execution, preparation and setup, global positioning and task levels are shown on the left (vertical direction), in hierarchical order. The process flows through global environment perception, decision/action and primary outcome functions, appearing across the top (horizontal direction).

At the task level, environmental processing includes global conditions, e.g., global player and opponent (or subject/participant) poses, shot or task state, exchange and point (or other status) state, or other task level conditions. Perception includes situational awareness and sense making 2802. Global poses and cues (e.g., shot cues) can be defined for decisions/actions including pose and shot decision 2804, with primary outcomes including positioning for a desired shot or stroke, or other task-level decisions, actions and outcome.

For purpose of illustration in application to other recreational, professional and vocational tasks and activities, four primary movement elements in tennis are considered. The positioning movements used to move on the court; the preparation movements used to setup for stroke execution, where the preparation typically require synchronization with environment elements and objects, and the primary action execution, which is directed at producing the primary outcomes for the task or activity. In tennis this corresponds to the shot; and, finally, the recovery following the stroke execution.

For global positioning, the environment encompasses global conditions; e.g., global pose, strike point, and stroke preparation, or other global conditions. Perception includes motion content. Global positioning and cues can be defined for decisions/actions including positioning and preparation, with primary outcomes including position and posture, or other global positioning outcomes.

For preparation and setup, the environment encompasses local conditions; e.g., local (relative) pose, strike point, and stroke preparation, or other local conditions. Perception includes local motion context. Local positioning and cues can be defined for decisions/actions including preparation and setup, with primary outcomes including position and posture, or other preparation and setup outcomes.

For primary action execution, the environment encompasses the stroke conditions; e.g., forward swing initiation, forward swing profile, and ball impact conditions, or other primary action conditions. Perception includes stroke type, or other primary action perception. Execution cues can be defined for decisions/actions including stroke execution, with primary outcomes including stroke and shot, or other primary actions, decisions and outcomes.

After the primary action it may also be important to consider the recovery movement. In tennis this corresponds to the movement that allows the player to get ready for the next incoming shot. Recovery may follow standard patterns for the activity, such as returning to the middle of the baseline in tennis.

Nesting of Behavior

Note how the perceptual processes in FIG. 28 are nested, with the top level capturing the macroscopic task configuration and planning, and the mid and lower levels focusing on the details of behavior implementation. A key characteristic of behavior in open motor tasks is that the behavior and underlying movement elements in the sequence take place as the task or activity unfolds (FIG. 12). The executive function updates the state and setpoints for the movement elements based on the outcomes achieved as the behavior unfolds. If the environment changes are too large to be compensated for, within the existing plan, task-level planning can update the plan with a new desired activity/environment state and sequence of movements (FIG. 3).

Generally, the decisions and behavior within the sequence of movement elements follow a coarse-to-fine profile; e.g., with larger, more approximate movements, followed by adjustments, and finally execution. This is a typical profile in human movement and is implemented in the move/prepare/execute sequence. Note that the hierarchy involves a delineation of operating environment both in terms of temporal and spatial characteristics.

The tennis example illustrates how the scope of behavior elements goes down in terms of their spatial range and time scale. The task level is broader, encompassing the task and environment elements, and typically has a time scale of the order of several seconds (e.g., an exchange in tennis is about 2-5 sec long, depending on the speed of the ball). The sequence of movement elements considered by the executive control level, such as the positioning and stroke preparation, takes place within a subset of the environment elements, and has a time scale of the order of 0.5 to 2 sec. The actual execution of movement elements, takes place within the immediate environment. For example, the stroke execution has to consider the incoming ball near its ground impact, and has a time scale of the order 100-200 msec.

TABLE 5

Summary of the scope and functions for the three key levels of behavior

| Level | Scope | Function |
| --- | --- | --- |
| Planning: situation awareness and orientation at the global level | General task goals (e.g., win a point) | Make decision and set goal of current planning cycle |
| Central executive: Situation awareness and | Movement sequence in current cycle of behavior | Creation of conditions and specification of |

TABLE 5-continued

Summary of the scope and functions for the three key levels of behavior

| Level | Scope | Function |
|---|---|---|
| orientation at the local level | (e.g., current shot exchange) | goals details |
| Movement execution: sensory and motor functions for movement element execution. | Current action preparation and execution (e.g., final setup and ball strike) | Create precise conditions for movement execution, and produce the primary outcomes. |

Table 5 summarizes the scope environment and behavior for the three key levels. The first level can be considered the tactical level process that drives new task state, and primarily involves the situational awareness and planning functions. The second, can be called environment control level (player-ball-court interactions), and primarily involves the executive functions. The third level represents the task action control level (player-ball interactions) responsible for the successful execution of the primary outcomes, and primarily involves the lower level sensory-motor functions.

This delineation provides additional insights about the factors that determine the behavior organization and decision-making architecture for complex open motor tasks. It makes it possible to break down the cognitive, perceptual and control processes based on the structure of the information flow and behavior hierarchy as shown in FIG. 3. At the same time, it helps delineate the skill components that are associated with these processes, which will make it possible to formulate comprehensive skill assessments and training and performance augmentation processes.

For example, notice that the positioning control level, supported in part by executive functions, allows for active control over the perception-action loop that arises from being embedded in the environment, which is a key characteristic of open motor tasks. It can be conceived as the control of the operating conditions (compensate for the nonlinearities of the complex agent-environment dynamics, see FIG. 1). An important task of this level is to control the conditions so that the best task action can be achieved. In the tennis example, it corresponds to the execution of a stroke that provides the highest confidence over the desired outcome (shot placement). For example, the research on the infield baseball catcher running behavior is a result of the environment control.

Environment Dynamics

To better describe the behavior in open motor tasks, it is helpful to describe the type of environment conditions. For example, consider the case of stationary or quasi-stationary environment conditions, then the movement elements typically reduce to the primary movements, e.g., strokes in tennis or turn maneuvers in skiing, and these can then be performed in a repeatable condition.

In tennis the conditions are stationary if the shot exchange remains, the incoming and outgoing shots are repeated, and the player and opponent can remain in their configuration. Therefore, they can use the same sequence of preparation, execution, and recovery, which results in a periodic sequence of movements. They can anticipate the incoming shot since it is also a period movement. There is little positioning to do, and the shot target remains constant. Basically, all aspects of the behavior may be repeatable. The subjects can settle in a stable periodic behavior.

This changes in a game situation. The player and opponent must outperform one another. The incoming shot is less predictable, and the player may have to change the shot direction. These dynamic conditions are hallmarks of open motor tasks.

In skiing, or other activity in terrain environments, when the terrain is uniform, the conditions are stationary. There are degrees of uniformity and stationarity. In quasi-stationary conditions, the skier can regulate the movement phases to adjust to perturbations in conditions. More dramatic changes such as shown in FIG. 34, where the skier must transition between two terrain environments to avoid the trees and reach the destination. This transition requires a sequence of movements to position and resume a sequence of quasi-stationary turns.

In skiing, the conditions are non-stationary when the terrain changes and/or when the skier changes their behavior relative to the environment, for example, skier changes the path relative to the fall line, or changes the characteristics of the maneuvers, or engages into a new terrain element or conditions. These planning can be conceptualized as the determination of subgoals are local states that drive the behavior into its new regime.

For decision making the planning process sequence of larger (segments of exchanges in tennis, where some can remain stationary conditions, such as during a rally where the player and opponent exchange shots without large changes in configuration, or segments of stationary behaviors in the terrain for skiing).

Subgoals

As shown in FIG. 10 and FIG. 11, the stages of activity can be described based on a concept of subgoals. Based on the above discussion, a subgoal (e.g., subgoal 1010) may be defined as the transition state between stages of stationary or quasi-stationary behaviors, i.e., a change of the regime of operation. For example, in tennis, in an exchange, if the rally remains stationary, every ball strike and shot will take place in the same conditions. When playing a game and to win point, the player will have to change the shot patterns. Every shot re-direction requires a new target, which can be considered as a subgoal.

In skiing, a uniform terrain element allows repeated turns in similar conditions, but if the terrain changes, or the skier wants to take a new path that travels across a different terrain element, the skier will have to select a subgoal and transition to this new state (as shown by the subgoal 3404 in FIG. 34). The environment control is particularly challenging in these transition stages.

Based on the above it is also possible to appreciate how operating in dynamic environment conditions requires learning a repertoire of movement to adapt to the different conditions and transition between conditions or states.

Many open motor tasks share the same general form of hierarchic behavior organization. The levels of organization are derived from the structure and topology associated with the task structure, dynamics, and resulting interactions (FIGS. 1 and 10). Each level is defined by its operating environment and the perception or sensory component and decision or action component.

Hierarchical System Architecture and its Processes

This deep structure of behavior organization and coordination is a key characteristic of open motor tasks. As a result, the decision and control processes should be organized following a combination of behavior and information processing stratification. Typical levels include planning and organization at the larger task level outcomes, the global coordination of various movement skill elements, and their sequential execution, including movement preparation and execution (see FIGS. 2A-2C).

The scope of processes includes:
- Planning for the deployment of the agent's skill elements at the global scale, including movement element sequence toward a subgoal.
- Coordinating the movement behavior used to control the local task operating environment, and conditions (environment control). This includes the perception processes supporting the local task and environment interactions.
- Sensory-motor processes for the execution of primary actions (biomechanical system).

These processes are organized under a hierarchical architecture, as illustrated in FIG. 3. In tennis the three primary system levels correspond to: planning court movements and shot selection, the coordination of the movement skill elements leading to the next game state (including the positioning, stroke preparation, stroke execution, and recovery), and the execution of these movement skill elements.

Proceeding top-down, the model in FIG. 3 delineates: global environment, task-level planning perception, followed by the perception of the court motion and shot goals (in the current shot exchange), and at the lowest level the stroke execution 308 including the synchronization of the stroke and ball trajectory before impact.

Planning is a fundamental capability in open motor tasks. Planning determines the system's larger state trajectory, which can typically be described as a sequence of subgoals toward the goal. In tennis, the state at the planning level is a game state (formalized below), which captures the player/opponent and shot configuration. A tennis game state trajectory describes the system configuration over a series of exchanges leading to a point, or some equilibrium state such as a rallying (shown in FIGS. 13 and 14A-C). These details are illustrated below.

Task-level planning includes perception and sense making (sometime also described as situational awareness). For tennis, this corresponds to determining the state of the game, including the player and opponent's positions, the shot, as well as determining the current phase in the point. The planning and decision making at this level is primarily tactical; e.g., selecting the next shot target. This also requires planning the positioning to intercept the incoming shot, selection of the stroke type to achieve the desired target under these specific conditions. Therefore, planning determines a sequence of movements during the next exchange cycle (FIG. 3).

In most open motor activities, especially those directly dealing with spatial control such as in skiing through an environment, planning should determine a trajectory and subgoals that define the intermediate stages toward the larger task goal 3410 (FIG. 34). Planning also deals with task constraints such as imposed by the environment or task elements and illustrated by the terrain elements and obstacles such as trees.

Once the system trajectory for the task have been planned, the next levels deal with controlling the behavior along the planned trajectory taking the current system state to the desired state. The trajectory can be specified by the sequence of movement elements. This typically involves coordinating the behavior within the local environment. In tennis this involves implementing various movement interactions, such as moving on the court, preparing the stroke, striking the ball, and recovering and getting ready for the next shot exchange. Given the dynamical nature of the environment, the sequence of movement should be monitored through the interactions to achieve the exact timing and outcomes of the movement behaviors (FIG. 12).

The executive control level is focused on creating the conditions for the successful execution of the movement sequence needed to achieve the desired game state. On the perceptual sides, this may include updating the positioning and shot selection in the context of the plan, cues are more specific, and actions are focused on implementing the positioning for the shot interception and stroke execution (FIG. 12).

The monitoring of the performance must also deal with contingencies. For example, a tennis player may have to switch plans if the situation unfolds in an unexpected manner, but this can often result in a suboptimal plan (e.g., blocking a shot, which is a defensive behavior). Different modes of control have been described in literature (see, e.g., scrambled, opportunistic, tactical, and strategic).

Finally, at sensory-motor control level, the execution of the various movement behaviors supporting the task interactions. In these specifications we focus on the aspects involving environment interactions. For example, the stroke execution requires precise synchronization with the oncoming ball, and possibly modulating the stroke parameters to adapt to the actual conditions of the shot interception and stroke execution. At this level and phase, the conditions are usually controlled to satisfy the operating conditions of the planned shot and the player is usually committed to the plans and stroke type.

II.V Skill Learning and Augmentation

The ultimate goal for the training augmentation technology is a set of algorithms, that can aggregate information and extract knowledge about a subject's skills and use this knowledge to generate various forms of feedback to help drive the skill acquisition process. Therefore, the general approach encompasses essentially reverse engineering the brain's learning mechanisms.

One of the starting points for the modeling is the fact that humans and animals rely on the acquisition of skills throughout most of their lifetime. Humans and animals learn these skills through actual real-life interactions. That is, they learn to interact with the environment and deal with the various challenges confronted during activities. Humans distinguish themselves by their ability to acquire skills and use tools in a variety of domains. Specialized skills are not innate but are acquired, and such complex skills play a central role in human experience. Specialized skills such as for surgery or athletes are typically acquired through dedicated training, however, perfecting of the skills depends on real-life experience.

Knowing that the skills are learned through interactions with the real world should provide additional insights into the structure and properties of the type of skill elements used for learning. These elements can then be exploited to formulate the model representation to assess the learning process, and eventually building augmentation systems for open skill training.

A learning process can be described (compare, e.g., U.S. Publication No. 2019/0009133 A1). In the present disclosure, these techniques are extended to the task interactions, and the environment perception from the sensorimotor to the higher-level planning functions.

Human Motor Skills Learning

From neuroscience, it is known that the brain can learn a large variety of behaviors, building on fundamental sensory-motor functions. The simplest are reaching movements such as those studied extensively in humans and primates. Example of skilled behaviors include complex manipulation, playing a variety of musical instruments, and sports. When considered holistically, these skills typically form complex system such as described in FIG. 1.

Role of Environment

Movements are interactions with specific environment features and produce outcomes that in turn change the environment; therefore, most skilled movements are not isolated actions, but take place in the particular conditions determined by the agent-environment system (see FIG. 1). This perspective is underscored by ecological psychology. Some of these ideas have been further elaborated by embodied cognition, which underscores the idea that behavior is not just stored in the brain, but the information is distributed across the body and environment.

Instructions Vs. Selective Differentiation

Some learning theories emphasize the central role of selection over instruction. A so-called hierarchical fixation of internal parameters can also be used. In this model, an animal or organism learns by building a repertoire of movements. The selective theory of learning derives from a requirement for parsimony, optimality, and adaptiveness. Patterns are not necessarily innate, because this could require unrealistic number of patterns to have been stored in motor memory to deal with the environment and tasks of all possible human activities.

Performers have to learn to use the acquired sensory-motor patterns to generate specific outcomes needed to achieve the larger task or activity goals. In open motor tasks, learning has to encompass both the actions (motor outputs) and the sensory inputs from the environment, and how these behaviors are deployed in a task to produce coherent sets of outcomes.

Key Learning Concepts

Learning the structure of movement behavior and task is key to efficient learning. Some of the structural elements considered are the stroke classes, which support the primary outcomes and interactions in the activity (FIG. 6), and therefore, represent basic skills elements.

Strokes can be delineated into classes, forming a repertoire. Changes in movement technique can also be considered, for example those taking place with learning and proficiency (compare, e.g., U.S. Pat. No. 10,854,104 B2 and U.S. Publication No. 2121/0110734 A1, and U.S. Publication No. 2019/0009133 A1). Learning a repertoire can also be considered through a process of formation of movement patterns, and their differentiation into classes (compare, e.g., U.S. Publication No. 2019/0009133 A1).

From a neurobiological standpoint, movements in each class are produced by the same so-called general motor program. This generalized program can be considered as parameterized motor functions that enables adaptation to accommodate a range of conditions and modulation of the outcomes within a class. Recall that generalized motor programs are based on schema theory, which embodies some of the basic concepts of structure learning.

Innate Vs. Acquired Skills

The sensory motor system incorporates millions of years of experience about interactions with the world. The processes supporting learning are encoded in the genes; these processes provide some basic capabilities and make it possible for specialized skills to be acquired based on specific experiences. Animals from different species differ in the degree of capability from the time of their birth. Humans stand out by their higher dependency on support yet have an extremely large potential to acquire skills.

In particular, the brain architecture, and the sensory-motor systems are predetermined from genetic information. These structures provide low-level representations (features, etc.) and functional mechanisms such as eye-hand coordination needed to support the interactions with the world from the first days for life. The brain builds on these to build more comprehensive mechanisms such as those used in open motor skills. In particular, the low-level representation incorporated in higher level attention and planning functions needed to coordinate and sequence behavior elements within the larger task or activity goals.

Machine Learning

A key aspect of machine learning is to extract structure from data. Three primary machine learning paradigms have been developed: unsupervised, supervised, and reinforcement learning. These techniques are usually applied to engineering problems but are informative about the human learning problem in different domains. In supervised learning, the inputs are data, and the output are labels describing the data. The goal is to find a network that generates the right label to data not included in the training set. In unsupervised learning, the goal is to determine statistical regularities in the data that make it possible for a network to determine the labels for the data without supervision. Finally, in reinforcement learning, the learning takes place from the outcomes of actions produced by the network applied on data; good outcomes generate reinforcements that drive the direction of learning.

The supervised learning implemented in machine learning requires very large amounts of data compared to what typical human child is exposed, for example in object learning in images (compare, e.g., Zador 2019). Apparently, much of the sensory and motor representations are innate. What is learned in highly skilled behaviors such as in sports and some professional skills, combined innate and learned behaviors. Learning open motor skills involve learning solutions to a variety of problems that do not fit into a single learning paradigm. Maybe the most appropriate paradigm is hierarchical learning which involves representations at several levels each driving actions. At the top level, the task goals and planning, at subordinate levels, more specific decision and control problems.

Within such a model, innate sensory and motor representation provide the basic elements used at these different levels, and learning involves fine tuning, and specializing behaviors to a particular domain, and integrating these behaviors into larger representation used for planning and coordination.

Structure Learning

Learning tennis strokes or other movement forms can be described as an aspect of structure learning. The player learns the motion patterns and the associated sensory and perceptual features. Instead of learning a specific pattern for every stroke type used to accommodate the different conditions and the outcomes that arise in a game, the player learns to break up the space of these variations in conditions into sub-domains, where each subdomain defines the operating conditions of a stroke class.

Therefore, from the neuro-cognitive perspective, learning the structure and the organization is essential for efficient learning. From the engineering perspective, this understanding can help design or adapt augmentations for skill learning across the hierarchical system.

Three learning stages can be distinguished: formation, consolidation, and optimization, primarily with the goal of adapting the augmentation forms to specific aspects of learning (compare, e.g., U.S. Publication No. 2019/0009133 A1).

Parametric Learning

Once a stroke type or class is formed; e.g., as a motor program capturing the movement functional structure is established, the player can further learn its parameterization to enable execution under a broader range of variations in conditions and outcomes. The latter is described as parametric learning and can be regarded as the consolidation stage. This process can also extend into the optimization stage, which typically would involve refinement of the movement structure in parallel with parametric learning and tuning.

Task Structure Learning and Hierarchical Learning

The combination of learning the movement element structure and the task structure, leads to learning the hierarchical structure of the activity or task. In many open motor tasks, movement elements have to be organized and sequenced to achieve larger task goals (see serial order in behavior). Studies have demonstrated that expert tennis players form hierarchical representations of stroke architecture in long-term memory. It is expected that similar memory structures are formed to encode the task or activity interactions and structure.

One of the central questions is the principles that can be used to formalize the larger structure in the activity: What characteristics in the state-space can be elaborated to form structural features? Structure is both spatial and temporal, therefore, these features also determine the task's temporal structure that determine how actions and events unfold. This structure is needed to coordinate the sensory and perceptual processes, such as attention as well as task planning.

Finally, learning these structural elements and properties are essential to enabling higher-level decision making needed to support task performance.

Principles Participating in the Structural Properties

Learning literature has not emphasized enough the questions related to the task or activity structure. Most motor learning takes place in natural world conditions.

Given the complexity of movement itself, and the added complexity of coupling movement with the environment and task elements, several fundamental principles are being exploited by the brain to mitigate those challenges. These principles are important because they shape the structure and organization of behavior.

- At the movement performance level, these principles include synergies in muscle activations, which result in coordinated patterns of body segments and joints motion.
- At the movement interaction level, synchronization and coordination with environment is determined by perceptual invariants such as tau guidance.
- At the movement organization level, these principles include the brain's ability to exploit invariants and symmetries in the interactions with the environment.

Most movements produce specific outcomes and are triggered by specific state conditions. Therefore, movements are input-output patterns that manifest as interaction patterns with specific cues and outcomes (e.g., based on information and empowerment).

The results of these properties and principles (synergies, invariants, and symmetries) is to produce a structured workspace. Basically, the movement and their interactions with the environment result in a subspace with specific structural features.

Roles of Feedback in Learning

Feedback can be essential for the development of motor programs (compare, e.g., U.S. Pat. No. 10,854,104 B2 and U.S. Publication No. 2121/0110734 A1, and U.S. Publication No. 2019/0009133 A1; Summers 1981). Motor programs have two components: the motor commands, as well as a forward model that predicts the effect of the motor commands (efferent copy; e.g., efferent sensory consequences). Feedback from the proprioception and exteroception is used to compare the expected effect of the motor commands. Discrepancy is used to update the internal model. An external model (e.g., modeling or demonstration of movement by coach) can be used in the initial stage of learning; e.g., to learn the movement form or architecture. More generally, feedback from the performance can be compared with the model and used to update the motor program and internal model. Over time, the external model can be replaced by the internal model (or models).

There are additional roles of feedback that are particularly relevant to the environment interactions. Movements are directed at producing outcomes in the environment. In this regard, one or more of the following feedbacks may be relevant. First, movement execution takes place in a physical environment and therefore, therefore it is critical that the correct initial conditions exist before movement execution. A successful movement and outcome start with the correct movement preparation. In most activities, the movement preparation phase represents a movement element in its own right. This has also been supported by neurological studies. Execution can proceed after verification that the correct initial conditions are met. Both proprioceptive and exteroceptive feedback (in particular vision) can be used to provide information for assessment of initial conditions and adjustments in body pose and posture.

Second, feedback is used as a program monitor. Before the movement execution begins, the expected sensory consequences are fed forward to be compared with the feedback from the proprioception and exteroception during execution. The comparison is used to determine if the movement was executed correctly. It is also used to determine the effectiveness of the movement in producing the desired outcome (so called knowledge of result).

Finally, low-level feedback, operating at the spinal level, are used to make fast correction (faster than 50 msec). This feedback is used to compensate for small disturbances or uncertainties in the environment conditions during execution of fast movement phases.

Cueing can augment some of these feedbacks to help learning and performance. The present disclosure focuses on environment interactions. To produce meaningful effects on the performer, the environment interactions can also be more fully characterized.

Understanding the structure of these interactions provides a model of how learning takes place, which in turn can be used for the assessment and augmentation of movement skills.

Augmented Skill Learning System

An augmented human training system can be introduced and elaborated upon (compare, e.g., U.S. Pat. No. 10,854, 104 B2 and U.S. Publication No. 2121/0110734 A1, and U.S. Publication No. 2019/0009133 A1). The augmentation process described here also incorporates a system of feedback augmentation, encompassing instructions, cues and signals. In the prior art, cueing was sometimes directed primarily at the movement execution of the primary movements, which are used in performing a task.

Cueing is extended to encompass larger movement interactions as illustrated in FIGS. 2A-2C. These additional dimensions of behavior can be implemented by expanding a general augmentation system; including measurements of a larger task ecosystem. In particular, movement sequence coordination with the environment elements and events and a task level performance can be introduced, which is further expanded and generalized herein (compare, e.g., U.S. Pat. No. 10,854,104 B2 and U.S. Publication No. 2121/0110734 A1, and U.S. Publication No. 2019/0009133 A1).

Several key aspects of behavior in open motor tasks are detailed, including but not limited in particular to environment control, such as the movement preparation used to create the operating conditions for the primary movement. Therefore, the feedback cueing will encompass environment interactions, such as the movement synchronization and the relationship between the environment operating conditions and the movement performance, including its multiple levels of outcomes in the task environment (see Outcomes 1-3 in FIG. 17).

Elements of a Learning System

Learning implies that skill acquisition involves an aggregation and processing of information to produce knowledge. Therefore, isolating the elements and processes involved in the knowledge acquisition provides a basis to systematically model and assess skills. Although these quantities are not necessarily explicit as is the case in a computer program, the fact that skill changes incrementally implies that there are quantities that can be tracked and evaluated for change; e.g., skill acquisition can be conceived as a series of transformations.

Elements of a skill learning system may also include (compare, e.g., U.S. Pat. No. 10,854,104 B2 and U.S. Publication No. 2121/0110734 A1, and U.S. Publication No. 2019/0009133 A1).
  A memory structure that aggregates movement patterns and can be improved through successive iterations
  Expanded range of patterns
  Improved individual patterns
  Ability to extract information about movement interactions that provides understanding of what changes in movement and environment characteristics will improve specific outcomes critical to performance of a task or activity (analysis and diagnostics)
  Ability to determine what changes in characteristics and what increment of change to implement (feedback synthesis)
  Mechanisms to induce desired changes (feedback communication) Task Interaction Augmentation This disclosure addresses specific requirements needed to support more extensive interactions with the task or activity environment.

On the input side of the cueing system, measurements of the movement performance, encompassing the relevant task and environment elements. Open motor tasks require learning attention and perceptual processes:
  Visual attention
  Environment cue determination In addition, open motor tasks depend on higher-level processes, including:
  Planning of movement sequences toward task goals
  Movement sequencing and coordination relative to environment and task elements (executive functions)

As the scope of possible augmentations in open motor tasks is wider, a broad range of different augmentation system configurations and augmentation modalities can be utilized to target different aspects of performance, and different components of the human information processing system, respectively.

Augmentation can be based on acoustic, verbal, visual, and/or haptic cues (compare, e.g., U.S. Pat. No. 10,854,104 B2 and U.S. Publication No. 2121/0110734 A1, and U.S. Publication No. 2019/0009133 A1). Verbal cueing is a good candidate for cueing complex interactions, since instructions and commands can be more easily encoded into verbal cues. Augmented reality (AR) is a good candidate of augmentation at the sensory and perceptual processes. AR systems are immersive and therefore provide augmentations of the natural experience of the environment. However, in augmentations for training open motor skills, the information overlay must be organized according to the natural hierarchical and functional structure and organization of the agent-environment system; i.e., the perceptual system's ecological principles.

III. Tennis Examples

This section of the disclosure focuses on the functional requirements in open motor tasks. It provides illustrations of key ideas and techniques discussed in the previous section through their application to the tennis game. The general description of the movement units supporting the agent-environment interactions highlights the functional dimensions and general principles governing spatial behavior in open motor tasks and provides the basis for the larger-scale task representations. This section also:
  Describes the movement behavior elements in tennis and their general functional characteristics.
  Extends the movement behavior elements to the task and environment interactions and defines the elements as units of organization.
  Describes the large-scale structural characteristics of behavior, and the task level representation, including the task level behavioral discretization, which derive from the movement behavior elements.
  Builds on these insights to outline the hierarchical organization of behavior and the system-wide architecture, integrating the lower-level sensory and control processes and the higher-level perception and decision processes.

III.I. Tennis Overview of Behavioral and Functional Dimensions

Tennis represents a typical open motor task, where movements are performed in a variety of conditions that are determined by the dynamic configuration of the player, racket, and ball which are all moving relative to court. As a result, players have to learn to successfully execute movements under broad range of conditions arising during a game, and also learn to deploy these movements in a way that is compatible with the task structure and ultimately supports the task goals.

Tennis—Activity and Behavioral Elements

FIG. 4 depicts a tennis court environment, with key elements and variables. The overall task environment state is determined by the state of the player's and task elements:

The player and opponent pose and motion in relation to the court. The player and opponent are divided into body segments (forearm, hand, shoulder, torso, etc.).

In addition to clothing, the participants also wear or carry equipment, including shoes and a racket, respectively. The racket is used to strike the ball and produce a shot.

The stroke is the primary movement element and can be represent an interaction between the players and ball.

Finally, the shot, which is defined by the ball trajectory, and connects the environment and agent, and therefore represents a task-level interaction.

The physical environment of a tennis game is the court, which has some key elements, including the net (net band and actual net), and the court is further subdivided into discrete regions (service box, alleys, etc.). The complete set of elements, physical environment, and players describes the activity environment, which designates the environment experienced by the players.

FIG. 4 is a schematic representation of a tennis stroke, and its interactions with key environment task or activity elements, including some of the state dimensions that can be tracked during an exchange to capture the entire activity environment interactions. FIGS. 5A and 5B also show the times for key events related to the ball interaction with the court and players.

In this particular example, representative times associated with the incoming shot are characterized by the opponent strike time ($t^O_s$), opponent recovery time ($t^O_{rc}$), net crossing time ($t^O_n$), incoming shot line ($t^O_{sl}$), and bounce time ($t^O_b$). Representative times associated with the player stroke pattern include the player ready time ($t^P_{rd}$), strike time ($t^P_s$), and recovery time ($t^P_{rc}$). Cues are provided by the incoming shot line ($t^O_{sl}$), and the bounce or strike ($t^O_b$). Augmentation can be designed and adapted to improve or otherwise alter the outcome of the return shot, for example by changing the targeted return position and time, based on the ball speed and direction, or by selecting the spin or other parameter to alter the return path.

A tennis game involves the dynamic interaction of the player and opponent with the objects (racket and ball) and the court. FIG. 4 illustrates these elements, as well as key features of the behavior and interaction, such as possible cues used by the player to anticipate the incoming shot and regulate the behavior. The figure also shows the outcomes at the level of the stroke (strike outcome) and shot (shot outcome 408).

A detailed and complete, first-principle model of this system would be formed by describing the physics of the agents (player and opponent) and environment interactions. It may also include the biomechanics of all relevant body segments participating in the interactions (e.g. kinetic chain). However, such a model would be highly complex and would make it difficult to capture the overall system-level dynamics and behavior. In particular, a realistic model will also have to account for the influences of neuro-motor, perceptual, and more generally cognitive processes, which typically cannot be directly measured.

Determining the holistic behaviors from the collection of all the parts and processes is extraordinarily complex. Instead, the idea is to use a behavioral modeling approach, which focuses on key behavioral dimensions driving the task dynamics. Such a model is derived based on the movement elements and decisions supporting key activity interactions.

The behavior elements integrate the relevant functional aspects of behavior and activity interactions, including movement performance, sensing and perceptual processes. The behavior elements can then be integrated under a task level model that accounts for the planning and decision-making processes. The first step, therefore, is to define the behavior elements and their corresponding functional dimensions, both in the specific tennis example, and in general, as elaborated bellow.

Tennis—Overview of Functional Dimensions

The general idea is that players and other performers can learn movements to support specific task and environment interactions.

Behavior and Movement Skill Elements

The movement element can be introduced in the form of a movement skill element (compare, e.g., U.S. Publication No. 2019/0009133 A1). Movement skill elements can also be encoded as general motor programs and achieve specific outcomes for the task or activity under a range of conditions.

The movement elements typically encompass a range of processes such as sensory and perceptual. In this disclosure, the term behavior element is also used, for example to emphasize other behavior such as gaze or planning. The broader definition of behavior follows the one in psychology: The organism's activities in response to external or internal stimuli, including objectively observable activities, introspectively observable activities (see covert behavior), and non-conscious processes (see APA).

FIG. 5A is a block diagram 501 illustrating a skill element and associated movement and perceptual processes. As shown in FIG. 5A, the skill element or motor program 503 can be utilized to effect a movement pattern, or other action selected to produce an outcome 505 in an environment 507, responsive to one or more cues. Conditions 509 of the environment feed back to the skill element.

FIG. 5B is a schematic illustration 551 of the skill element and its associated movement and perceptual processes, supporting an interaction with the task environment and objects under different conditions. As shown in FIG. 5B, the participant assumes a player ground position 553, in order to form a stroke pattern 555 made of stroke phases, responsive to one or more cues 557 from an incoming shot 559 and/or ground impact 561, as defined along the incoming shot line. The outcome is defined by the return shot ground impact 563, as defined along the return shot line 565.

FIG. 5B shows the tennis stroke as an example of movement skill element, highlighting the input-output processes. These processes correspond to the perception-action loop supporting the environment interactions. The figure shows the gaze and cues that are used for the execution and modulation of the stroke.

In open motor tasks the brain has to learn a repertoire of movement patterns to cope with the range of conditions and produce reliable outcomes required to be proficient in a task or activity. The following describes the skill element and eventually their interactions with the task environment. This will help understand how the brain learns and organizes the behavior across the range of conditions, and ultimately model, assess, and augment skills.

Skill Elements: Definition

A Skill Element is a formal definition of a unit of player or participant skills. A skill element may also be defined as follows (compare, e.g., U.S. Publication No. 2019/0009133 A1).

The skill element ($e_i$) combines the pattern class ($P_i$), its movement functional structure (MFS) (e.g., specified by the motion model $\delta_i$), and various relevant attributes ($a_i$):

$$e_i = (P_i, \delta_i, a_i) \tag{Eq. 1}$$

The collection of attributes (a_i) includes but is not limited in particular to the outcomes, various attributes relevant to technique and performance, and the range of operating conditions.

The attributes are selected to provide a comprehensive description of each skill element. This information can be used to assess the skill elements, which for example can be implemented as a composite cost function, combining the attributes to form a score.

Note that attributes are best described as statistical distribution. Each skill element corresponding to a pattern class captures a range of motions with range of attributes. In skilled players, this range is due to the response to varying conditions, perceptions. Therefore, the variations correlate closely with changes in technique/motion. In less-skilled players, the variation can be more random. One objective with attributes is therefore to identify invariant characteristics in attributes for the movement instances in a class. Another objective is to develop a method to quantify skill or learning status based on this attributes and movement distribution; for example, by developing a skill status to help identify the learning stage (compare, e.g., U.S. Publication No. 2019/0009133 A1).

Interactions and Outcomes

Outcomes are defined as the effects of actions on the environment. With the inclusion of the environment, it is possible to give a more precise definition of a movement skill element. A movement skill element is basically a movement pattern that is directed at supporting one or more aspects of task and environment interactions, and more specifically is directed at producing outcomes in the task or activity environment (see FIGS. 5A and 5B).

In tennis, a primary action of the stroke is to return an opponent shot and produce an outgoing or return shot. Its ultimate goal is to drive the opponent's movement and achieve a winning shot. Therefore, it is necessary to consider outcomes across several levels of interaction. For example, in tennis, from the state of the ball just following the racket strike, to multiple shot attributes as it travels across the court, such as for example, the height over the net, and the ground impact location on the opponent's side of the court (see FIG. 4).

Motor Programs

Each stroke class represents a sensory-motor (or perceptual-motor pattern depending on the level or outcome considered), which emphasizes that the behavior results from some input-output process, as illustrated in FIGS. 5A and 5B. Each class of skill element includes a set of inputs, outputs, and a set of cues.

The inputs are the signals and cues used to execute the stroke, and coordinate with the task and environment elements, such as the incoming ball and the shot target. The outputs are the outcomes which describes the effect of the movement on the task environment. The conditions under which the movement is executed can be considered a form of secondary inputs, or parameter since it influences the execution of the movement and its outcomes.

The movement pattern itself is typically defined by a functional movement architecture (compare, e.g., U.S. Pat. No. 10,854,104 B2 and U.S. Publication No. 2121/0110734 A1, and U.S. Publication No. 2019/0009133 A1).

Such movement skills, however, can also be assimilated in procedural memory to enable fast response and to free up attention to support higher-level processing such as planning. In open motor tasks, this would require encoding an infinite number of movement programs. The brain solves this "curse of dimensionality" by using so-called general motor programs (GMP; see also "human factors," as described herein).

Operating Envelope and Repertoire

With GMPs the brain still must learn multiple programs, but each of these programs covers entire classes of movements. Each stroke class, for example, covers an operating environment that encompasses a specific range of conditions and outcomes. The specific range supported by each class is determined by the movement functional characteristics (biomechanics, sensory-motor process, and cues, see FIG. 6). These characteristics are acquired by learning and experience and determine the performance.

With GMP, a player still must learn multiple classes of skill elements to cover the range of outcomes and conditions, but only a finite number, which is much more tractable than if each outcome-conditions had to be learned individually.

A stroke class can be defined by (see FIGS. 5A and 5B):
Inputs: Reference outcomes and cues that encode the information needed to execute the stroke under the range of conditions to produce desired outcomes (intention).
Outcomes: spin, pace, shot length and height, ground impact location (see FIG. 6).
Conditions: incoming shot pace, spin and height before impact, player relative position to ground impact (state of the environment as shown in FIGS. 5A and 5B).

Note that conditions are inputs to the system but act more as parameters.

Skill elements such as the tennis stroke are able to accommodate a range of conditions and outcomes, and collectively, a repertoire of skill elements essentially discretize the larger operating domain. Therefore, to cover the larger operating domain of a task, different stroke types with different operating envelopes are needed.

FIG. 6 is an illustration 600 of the operating envelope for the skill element, for a given stance and stroke class, showing example of sources of variations in conditions, and variations of outcomes. The variations are illustrated relative to some nominal conditions and outcome.

As shown In FIG. 6, the participant can assume a player ground position 602 to execute a range of stroke patterns; e.g., with variations in the forward swing initiation and launch velocity responsive to variations in the bounce conditions and impact conditions. Thus, there can be a range of strike outcomes 604 (or returns) and shot outcomes 606 (return positions), depending on the corresponding range of incoming shots 608 (or deliveries).

FIG. 6 depicts the range of conditions for a forehand stroke a player can accommodate for, and at the same time, the range of outcomes that can be achieved with this specific stroke class. These characteristics can be formalized by defining some nominal condition and nominal outcome and defining the operating conditions as perturbations about the nominal condition. For a stroke, variations in the interception/strike conditions arise both from variations in the player positioning relative to the shot (e.g. relative to the ground impact point), and variations in the stroke execution.

In FIG. 6, the variations in stroke execution are illustrated as the variations in the racket state at the forward swing initiation point 610 and the resulting variations in racket state at ball strike. The variations in oncoming shot are illustrated as the variations in ground location and in the height of the ball bounce at impact and the state of the ball (primarily velocity direction). These are expressed by relative position of the player from the nominal ground impact and the state of the ball at the ground impact. All the sources of variations ultimately result in a perturbation of the ball strike, which result in variations in outcomes, first in the ball velocity 612 as it leaves the racket and the shot destination on the court.

A player, therefore, has to learn to compensate for variations in conditions. Proficient players even take advantage of conditions to achieve the desired outcomes most efficiently.

FIG. 6 also shows how the movement element is "anchored" in the environment. In tennis the player position relative to the ground impact point defines the conditions of the interaction.

In summary, the movement units enable an agent to achieve necessary outcomes, or actions on the task environment, while simultaneously adapting to, and even, exploiting conditions. Each movement pattern is characterized by the range of outcomes and conditions the pattern can accommodate. These characteristics define the pattern's operating envelope.

A player can learn to expand the operating and outcome range of a skill element. However, the biomechanical and sensory-motor constraints result in limits to the achievable ranges. Therefore, to further expand the ranges of outcomes and conditions players or agents build up their repertoire of movement units, which allows them to cover broad range of conditions and outcomes.

Selection of Behavior and Outcomes

There are many different movement techniques and postures that can be used in a given situation (see Table 1). The decisions at the level of the skill element are based on the given conditions and the desired outcomes. In the following, this form of "local" decision making is based on a type of inverse model, which determines the motor program in FIGS. 5A and 5B, based on the intended outcome and prevailing conditions (see FIGS. 3A-3B and FIG. 15).

However, in open motor tasks, the performer can to some degree control the conditions in which the skill element is executed. For example, in tennis, the player can position their body and select a stance relative to the incoming shot. This higher level of decision making is covered under the task-level planning.

Supporting Behavior Elements and Processes

Complex open motor skills also require other behavior elements to support the range of capabilities needed for the task. For example, in tennis, besides the strokes, which are considered the primary movement behavior element, other movement behaviors include various ground movements and preparatory movements. The set of extended movement behavior is critical because it determines how well a player can control the conditions and ultimately the outcomes.

Moreover, the effective deployment of these behaviors depends on anticipation and planning skills. Therefore, for a complete assessment, all these functional dimensions of the behaviors can be captured and modelled.

Figure 7:
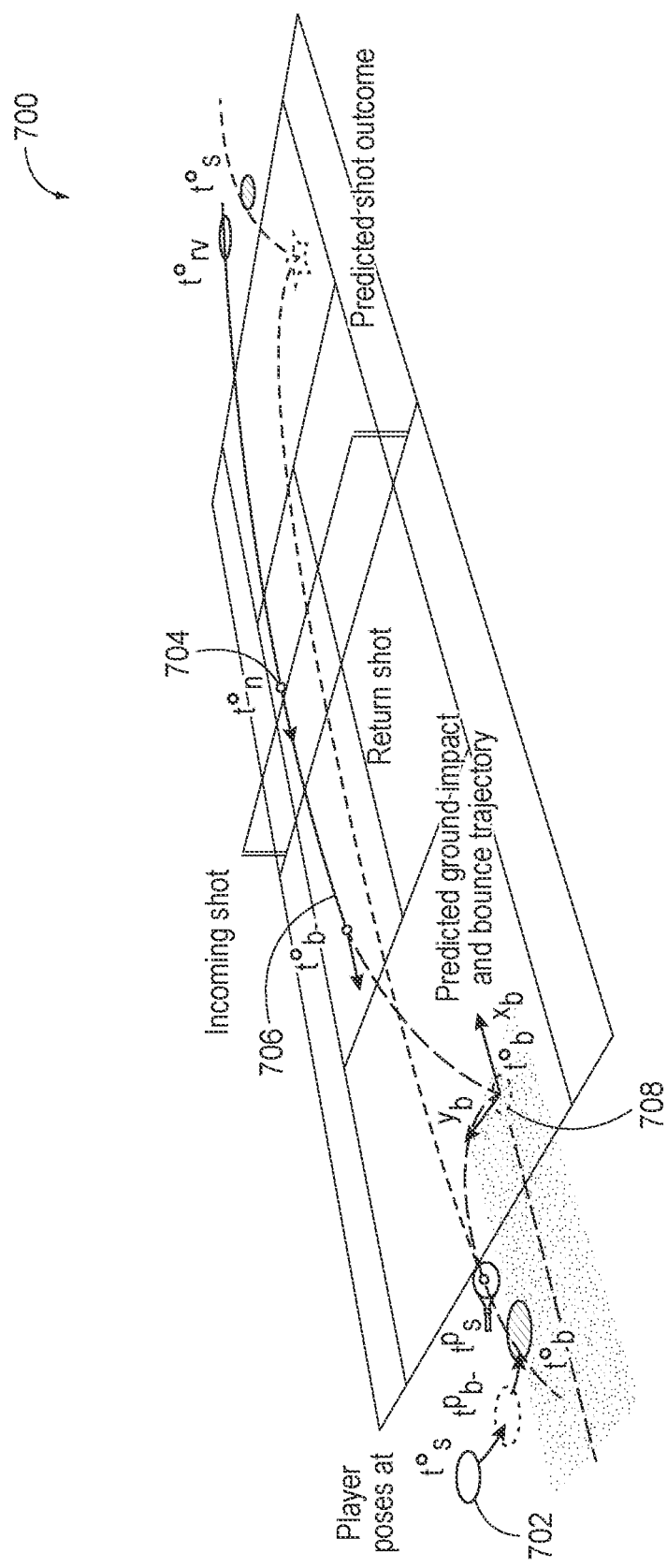
FIG. 7 is an illustration of possible player strike poses for an incoming shot, with required court motion from the starting pose.

For example, in a shot exchange, the player observes the opponent's movement and shot, selects a stroke target, and positions herself or himself on the court to strike the ball and produce the desired outcomes (see FIG. 7). Given the size of the court, and limited ground speed, the player has to anticipate the shot ground impact and conditions, then move to that expected position, while simultaneously updating the actual shot parameters and preparing the stroke to create the required conditions, and, finally, execute the stroke as close as possible to the nominal operating envelope for the selected stroke and shot outcomes (FIG. 6). If that is not possible, and the stroke is executed outside the nominal conditions, the stroke outcomes may be sub optimal. For example, the precision of the shot placement may be poor, or even result in unforced error (shot goes in the net or outside the court boundaries).

Behavior Hierarchical Structure

Furthermore, like stroke, the larger interactions, for example the shots in tennis, operating at the scale of the court, form large-scale behavioral elements. These larger patterns of behavior are produced by the combination of movement elements encompass the environment elements to produce higher-level outcomes. Their coordination over the larger environment interactions is governed by larger units of perception and action (compared to the lower-level stroke movements that encompass the local environment).

The set of behaviors can be represented through a hierarchical model as illustrated in FIG. 11 and Table 6 for the tennis example. FIG. 11 defines the hierarchical organization highlighting the temporal relationship of behavior elements. Recall that the stroke is considered the primary movement behavior; however, effectiveness of the strike depends on other behaviors such as court movements and the preparatory movements. These supporting behaviors are also skill elements, which are subordinate to a primary behavior but provide critical capabilities.

TABLE 6

Hierarchy of behavioral elements used in the construction of a tennis point

| | Point making | | |
| | Shot exchange | | |
| | Shot making | | |
| Court Movement | Stroke Preparation | Stroke Execution | Stroke Recovery |

The complete behavior is defined by an extended state-space that combines the player state, the shot and opponent. This large set of possible states, cues, conditions, and outcomes, however, is structured by the constraints that govern the interactions such as the behavior hierarchical model in FIG. 11.

Generalization

Hierarchical organization can be a general characteristic of human movements (compare, e.g., Bernstein 2014). Other open motor tasks or activities share similar motion skill elements and hierarchical organizations. In summary, the movement units enable an agent to achieve necessary outcomes, or actions on the task environment, while simultaneously adapting to conditions.

The following section describe the extension of the behavior elements for the tennis example with the larger task interactions. Environment control dimensions that are critical to open motor tasks are also described.

Environment Integration

Open motor tasks and activities rely on a variety of movement skill behaviors. Each one of these is a skill dimensions can have multiple interacting elements and operating environment. As illustrated in FIG. 4, tennis provides a good example where skills build on multiple behavior elements (court movement, stroke setup and preparation, stroke execution, and shot making) interacting across multiple levels of a hierarchy (see FIG. 11). Given the number of elements interacting across different levels of organization, operating within this system involves a complex planning and control problem.

One of the central problems for decision making is the specification of some form of representation: how can the complete set of behavior encompassing body, task and environment elements be described in a concise way that lends itself to efficient higher-level processing such as perception and decision making?

To successfully deal with a large range of conditions, the brain partitions the state space of conditions and outcomes (configuration space) into sub-spaces where each is performed with a different movement class. In tennis, each of these is a stroke class. The classes are defined by macroscopic configuration variables (geometry of the racket-ball at strike), as well as the dynamics of the underlying sensory-motor processes (which also depend on skills, strength, coordination, etc.).

Furthermore, the strike conditions, and therefore the stroke class selected for intercepting or returning a shot, depend on the relationship between the state of the player and racket, and the incoming shot trajectory. To create favorable conditions for the execution of actions such as the stroke in tennis, the player must predict the incoming shot and take position on the court; e.g., drive the body in the state that affords the best outcomes and correspond to an interaction from the repertoire.

FIG. 4 illustrates the stroke behavior with the larger interactions with environment and task element, including the court movement and the shot. The next step is to expand the behavior to these larger task interactions. Which amounts to describing how the basic skill element used for the primary interactions; e.g., the stroke, extend to the higher-level interactions supporting the task.

Task Level Interactions in Tennis and Larger Skill Units

For example, the stroke and shot making comprise a repertoire of different movement behavior classes to handle the variety of conditions and outcomes. The same is the case for the ground motion. Players typically learn a repertoire of different footwork patterns to effectively move on the court, which can be described by the sequence of steps. The movements are also coordinated with the shot and potentially with an opponent's movements. Therefore, they represent units of behavior in their own right.

Since movement skills are acquired over time, the skill elements capture how these movements are employed and emerge from experience dealing with the expanding range of environment interactions that arise with experience and proficiency.

Levels of Operation/Operating Requirements

Since the outcome of a movement element is determined by how close the behavior is executed to the nominal conditions for that class, a critical aspect of movement performance is controlling the conditions. An essential set of properties of skill elements driving the larger interactions is their respective operating conditions.

The exact conditions under which behaviors are performed result from the relative configuration between the agent and the environment. The operating conditions for a particular stroke class, are determined by the relative motion and state between player and racket, and the incoming shot. The returning shot is determined by where the player strikes the ball relative to the incoming shot's ground impact, and the height and velocity at racket strike (see FIG. 4).

The positioning is driven in part to preserve consistent operating environment. Producing constant conditions helps keeps the overall perception and control problem tractable. The requirements on the operating conditions act as constraints for the larger behavior organization. The player must anticipate the trajectory of the incoming shot. In the tennis example, the cues may include event related features, such as the opponent's stroke, the direction and location of the shot as it crosses the net; the curvature of the shot trajectory before the ground impact or features of the bouncing shot before player's interception. These cues can be formally investigated using gaze tracking and behavior responses. Existing techniques, on the other hand, have focused on opponent motion and stroke cues.

The outcomes include the state of the ball immediately after the racket strike, and most relevant for the exchange or the game the location and state of the shot as it impacts the opponent court side.

The following describes the coordination within the larger-scale elements, in particular the court movement and task environment control and perception needed to control the conditions.

Environment Perception and Control

In open motor tasks such as tennis, the conditions depend on player court positioning, posture, shot prediction, target identification, etc. Therefore, there are potentially many sources of uncertainties in the conditions under which an action is executed. Skills in open motor tasks depend heavily on the ability to stabilize the conditions in specific range needed to achieve the desired outcomes. This is referred to as the environment control level in addition to the court movement or stroke execution level.

For example, in the context of the tennis example, a player can possess the various behavior elements such as court movement, and strokes, but still has to coordinate these elements toward building points and eventually winning points.

Furthermore, each class of behavior is governed by a subset of variables that characterize the interactions, which shows how a specific stroke pattern enables the player to handle a range of strike conditions. The strike conditions are primarily determined by the player's pose relative to the ground impact location and the incoming shot conditions. Given these conditions (the incoming shot and the selected positioning), the exact strike conditions are then determined by the selected stroke pattern (initial conditions and swing profile characteristics). Note that even for the exact same conditions, because of the presence of "motor noise" and uncertainties and disturbances affecting the processes, the outcomes of a stroke pattern and the shot are subject to variations.

Based on this description, the requirements for proficient performance are the ability to orient relative to the task environment (e.g., opponent, shot, next shot target), and the local environment (incoming shot bounce, relative posture) that defines the physical interaction underlying the behavior execution. Note that perception includes exteroceptive and proprioceptive dimensions.

Coordination within the task environment largely depends on the ability to predict changes in the task state. The decision making has to account for the structure of interactions and how these interactions determine the execution of key actions in a task or activity.

Environment Coordination

The player's movement behavior involves several nested movement coordination problems. These may include, but are not limited to, the following:
  (i) First, there is the larger coordination of the positioning relative to the incoming shot and the opponent's pose and movement. The spatial configuration defines the striking conditions and the range of outcomes (see FIG. 7 and operating range of patterns).
  (ii) Next, once approximately in position relative to the incoming shot, there is the movement relative to the more local environment of that shot, including the preparation and setup needed to create precise conditions for the shot execution.

(iii) Finally, there is the coordination and modulation of the final phases of the stroke movement relative to the incoming ball. This phase takes place about 100 msec before the racket strike.

The coordination of these three levels of movement behaviors is driven by the predicted interception point, together with the anticipated stroke and shot. These multiple levels of spatial coordination across task space are characteristic of open motor tasks. The following gives more details about the behavior coordination at each level of the tennis example. A formal description is provided below.

Global Coordination

To produce a successful returning shot, the player has to take position across the court in a way that anticipates the incoming shots. Shots can arrive in variety of location and come with different characteristics (spin, pace, height and length). As shown in FIG. 7 an incoming shot also affords a variety of options for striking the ball. Therefore, the court motion also has to account for desired type and target of the return shot.

FIG. 7 is an illustration 700 of possible player strike poses (A-D) for an incoming shot. FIG. 7 also shows the required court motion from the starting pose.

The initial position 702 ($t^O_s$) describes the position of the player at the time the opponent ball strike and predicted poses at the time the shot crosses the net 704 ($t^O_n$). To decide the positioning and interception, the player has to predict the shot trajectory. Ideally, when the ball is hitting the player's half court, the player has already taken position responsive to one or more cues from the incoming shot line 706 ($t^O_{sl}$) and (predicted) ground strike and bounce trajectory 708 ($t^O_b$), allowing the player to properly prepare the return stroke, and to create the precise conditions for the return ball strike to achieve a predicted outcome. Note that the scales shown in FIG. 7 are merely representative, and not intended to necessarily be realistic for any specific tennis environment, or other interactive task environment.

The ball trajectory is entirely determined by the velocity, spin, and position of the ball immediately following the racket strike. Therefore, the earlier a player or task participant can extract information about the incoming shot or other task interaction, the earlier the participant can predict the trajectory, make decisions about the position and strike (or return) conditions, and the more time is available for taking position and preparing the return. Studies have shown that advanced players even use cues from the opponent's stroke preparation phase.

Local Task Environment Coordination

To return an incoming shot toward the desired target, the player has to intercept the ball and strike in a precise way that will produce the racket interactions generating the forces needed to produce the impulse needed to change the incoming velocity to the desired outgoing velocity. Studies have established that proficient performers can achieve time windows for coordination with external events of the order of 5 msec.

Such level of precision requires coordination and preparation of the motion. Proceeding backward from the strike time, the racket has to follow a very precise trajectory toward the ball. The last phase of the stroke (about 100 msec before strike), is essentially an open-loop, ballistic trajectory; e.g., its trajectory follows a preprogrammed profile. This final phase depends on the correct preparation and setup, for both the pose, posture, and producing the initial state of the racket. These conditions at the beginning of the forward swing are produced during the transition from the back loop to the forward swing, and for proficient players involves the entire body kinetic chain.

Behavior Execution and Coordination

In the final execution phase, the control variables that the player can manipulate are the forward swing stroke profile. This phase is essentially a synchronization of the ball and the racket stroke in its last, approximately 100 msec. The control task is to adapt the stroke characteristics based on perturbations of the incoming ball. These types of control problems are most likely performed using so called perceptual guidance mechanisms. The human visual system uses specific mechanisms to extract the necessary information, such as the rate of expansion of the ball on the retina as it approaches the player after impacting the ground.

Typically, for a groundstroke, the racket reaches back before the ball ground impact, and as the ball bounces up the player initiates the back loop and transition into the forward swing. The exact strike conditions are achieved by synchronizing the ball motion and stroke relative to the strike point. The rate of closure of the motion gap between the racket and the predicted strike point, and the sensory gap between the upward motion of the bouncing ball and the anticipated strike point.

Note that the strike conditions also should consider lateral-directional control. Direction of the ball before impact and the timing and direction of the racket motion in the horizontal plane determines the direction of the ball.

III.II Large-Scale Movement Behavior Structure and Organization

The previous sections of the disclosure defined behavior elements, functional dimensions, and constraints. Before describing the architecture enabling the coordination and control of behavior, the larger elements of behavior are defined, operating at the task-level structure. The following sections describes how these elements, together with the task structure, determine the structure of the task performance. The general idea is that the larger-scale behaviors build on the structure emerging from the movement element and task interactions, to create what can be considered a behavioral abstraction.

Integration of Movement Skills Elements and Behavior Organization

The interactions of the basic skill elements—such as stroke classes and the shots for tennis—with the larger task environment has to participate in the organizational structure for the task-level perception and decision making. How well the elements of the subject's behavior enable such a structure ultimately determines their performance and skills. In other words, organization results from both top-down and bottom-up effects.

The following describes the integration of the behavior elements across the levels of organization to formalize the task structure and organization. The understanding of the structure and organization of behavior forms the basis for its abstraction. Instead of using a classic form of discretization the following describes the abstraction based on the behavior patterns in agent-environment system that were introduced in FIG. 7.

The system comprises the world or task environment, and the elements of the task environment and the agent(s) that participate in the activity or task (see FIG. 4 for the tennis example). If this were an engineering problem, the behavior would typically be described by specifying the states of the ball, the performers, etc. Such a complete and comprehensive description or representation is not a realistic model for humans.

Instead, subjects must rely on some representation that is compatible with human factors. In the following, instead of specifying the detailed state information such as the detailed ball trajectory, etc., the proposed approach focuses on elements of behavior such as stroke classes with their outcomes and the patterns of shot interaction.

The theories of skill development have benefited from a perspective coming from ecological dynamics. The general thesis of this approach is that the structure within which the large-scale behavior takes place is not predetermined but arises from the various constraints arising from the agent-environment system.

As a result, the structure and organization of behavior is determined by the combination of task structure and goals, and the effects of the various biological constraints, such as the performer biomechanics and the control and perceptual mechanisms.

Therefore, taking an ecological dynamics perspective, the behavior elements derived from agent-environment interactions provide the structure within which the behavior is organized and coordinated. The following reiterates some of the ideas with an emphasis on large-scale coordination.

The significance for skill modeling and assessment is that patterns in behavior act as units of behavior that can be assessed and analyzed, and that the higher-level states enabling abstraction are the result of the integration of the skill elements or behavioral units.

Shot Patterns and Discretization of the Court

Stroke classes describe the different movement patterns based on the strike conditions and effect of biomechanical constraints. Similar considerations can be extended to the shot. The operating conditions and the performance properties of primary skill elements determine constraints on the task performance. Shots combine with stroke patterns and organize around clusters of shot patterns that target different regions of the court (see FIG. 8).

FIG. 6 also illustrates the integration of the basic skill element (tennis stroke) across different levels of interactions: a) the incoming shot; b) the stroke and ball impact (with its immediate outcome), c) which in turn defines the shot with its outcome.

A player can control the length of a shot using a combination of speed, vertical angle of the ball (leaving the racket), and spin. Given a fixed speed and spin, the range between the minimum vertical angle (just clears the net), and maximum (just lands in the court) is called the acceptance angle. A player can in theory produce ground shots that target different depths by varying the vertical angle. This, however, assumes that the player can precisely control the conditions.

For example, in theory shots of three depth (e.g., down the middle of the court), could be accomplished by dividing the vertical acceptance angle into three distinct regions. Each would only be a few degrees and would require proficiency in controlling the angle across the admissible acceptance range. Such precision would be expected from a machine such as a servo system (and maybe in the context of a closed skill). However, for humans to reliably achieve different shot depths, it is easier to achieve the three depths using three different shot patterns, each combining the pace, spin, and vertical angle. The same reasoning applies for lateral and direction control of the shots.

Task Level Patterns

This basically explains why shots are best executed as distinct patterns that leverage biological and sensory constraints at play for a range of conditions and outcomes across the task environment. The performer learns how to modulate the parameters of the patterns, given the prevailing environment and task constraints.

In addition, it is necessary to account for the incoming shot characteristics in addition to the court location. An opponent can target the same location on the court using shots with different speeds, heights, and spin. The player relies on environment cues; e.g., the combination of physical environment and the incoming shot characteristics. It is expected that the players orient themselves using a combination of cues and landmark (chunking theory). As a result, the player positioning, and perception of the environment will display specific court patterns.

As a result of the combination of these various factors makes that the players discretize the task environment according to movement behavior and perceptual patterns, giving rise to specific target areas as illustrated in FIG. 8. The result of the interplay between the environment, and the player and opponent skill characteristics, lead to specific distributions in outcomes, in particular the ground impact distribution of the resulting shots. These characteristics, in turn, determine the task performance (see FIG. 8 as discretization of the task space).

Example: Tennis Shot Patterns

FIG. 8 is a schematic diagram 800 illustrating a tennis environment and elements, with interactions between the shots and court, as well as the player and opponent court movements. FIG. 8 highlights the shot ground impact distributions for the two players. These distributions illustrate in an idealized way how the shot patterns specific to the subject's skills discretize the task/activity environment (compare FIG. 8 of U.S. Publication No. 2019/0009133 A1).

FIG. 8 illustrates player and opponent shot ground impact distributions for a series of player/participant and opponent/participant ball delivery and return trajectories (exchange k, k+1 . . . ). The opponent/participant strike (or delivery) pose times are $t^O_s(k)$, $t^O_s(k+1)$, etc., with net crossing (boundary crossing) times $t^O_n(k)$, $t^O_n(k+1)$, etc., and ground impact (delivery point) times $t^O_b(k)$, $t^O_b(k+1)$, etc. The corresponding player/participant return (strike) pose times are $t^P_s(k)$, $t^P_s(k+1)$, etc., with net crossing (boundary crossing) times $t^P_n(k)$, $t^P_n(k+1)$, etc., and ground impact (return point) times $t^O_b(k)$, $t^O_b(k+1)$, etc.

Shot charts in tennis are used to show player shot patterns from different areas of the court (typically in a discretized court environment). To fully account for the interactions the shot charts need to account for the characteristics of the incoming shots; e.g., the player will return shots based on the court strike location but also the incoming shot's spin, speed, and height. FIG. 8 shows an idealized shot map to highlight how the respective styles and skills of players discretize the task space.

This type of shot map has been characterized from data. For example, match computer vision data can be used to determine shot dictionaries of the players; e.g., using Hawk-Eye devices or other augmented reality equipment available from vendors such as Hawk-Eye Innovations of Basingstoke, UK (compare, e.g., Wei 2016). The dictionaries describe the shot patterns that are characteristics of a player's technique and strategy. In the following, the behavior at the court-shot level interactions can be formalized using an environment model. The state of the environment is determined by the player and opponent poses, and the incoming shot. The input or action on the environment is defined as the player's return shot. The state of the environment and the player's return shot determine the next environment state; e.g., the player opponent and player pose and next incoming shot.

This formulation is based on the ecological system perspective that describes how the agent is embedded in the environment and learns the perception-action processes across the task structure and hierarchy. Alternatively, FIG. 8 can be used to describe more general delivery and return (exchange) trajectories and timing profiles for two subjects or participants in an interactive task.

Behavioral State-Space

The overall organization of this system can be described by behavior patterns associated with the different agent and object interactions. These patterns together with task structure determine a form of task and behavioral discretization. The quality of this discretization becomes one of the key attributes of a performer's skills in open motor tasks.

These classes result from effects of constraints on the domain of behavior that have been illustrated for the stroke and shot patterns in FIG. 8. As a result, a tennis player will use different stroke patterns to cover the range of strike conditions required to return the shots at different locations on the court and the specific shot conditions.

Following the discussion of chunking and motor program, the general idea is that the interactions of the player with the ball, and at the level of the shot, do not take place in a continuous domain but are structured around distinct patterns. These patterns produce to a form of "behavioral" state-space which is different than an engineering representation because it focuses on behavior patterns and their structural features that arise from the natural interactions within the task or activity ecosystem (between the agent(s) and key task and environment elements).

The structure resulting from the agent-environment dynamics is referred to as behavioral task environment discretization. The elements and their characteristics will provide representation used by the player for planning and decision making. The behavioral discretization of the state-space provides insights into how the brain reduces the representational complexity needed for planning and decision making.

The finite patterns, such as the shot pattern in FIG. 8, and others that manifest at the different levels of behavior interaction, and in particular the structural features associated with these patterns, also provide sets of cues that allow a player to predict the unfolding game, such as the incoming shot's ground impact location (prospective control—see perceptual control). These cues provide the information needed for driving court placement and shot selection (see FIG. 7). Therefore, structure is not only relevant for the behavior execution and planning, but also to enable efficient perceptual mechanisms at different levels of organization.

Finally, the quality and characteristics of the partitioning of behaviors, such as stroke types into stroke classes in tennis, with their respective range of conditions and shot outcomes, is a manifestation of the skills in open motor tasks. Extracting these skill element patterns provides the basis to help perform assessment, diagnostics and ultimately augmentation of the behavior across the entire sensing, control and decision-making hierarchy.

Summary: Behavior Abstraction

Figure 9:
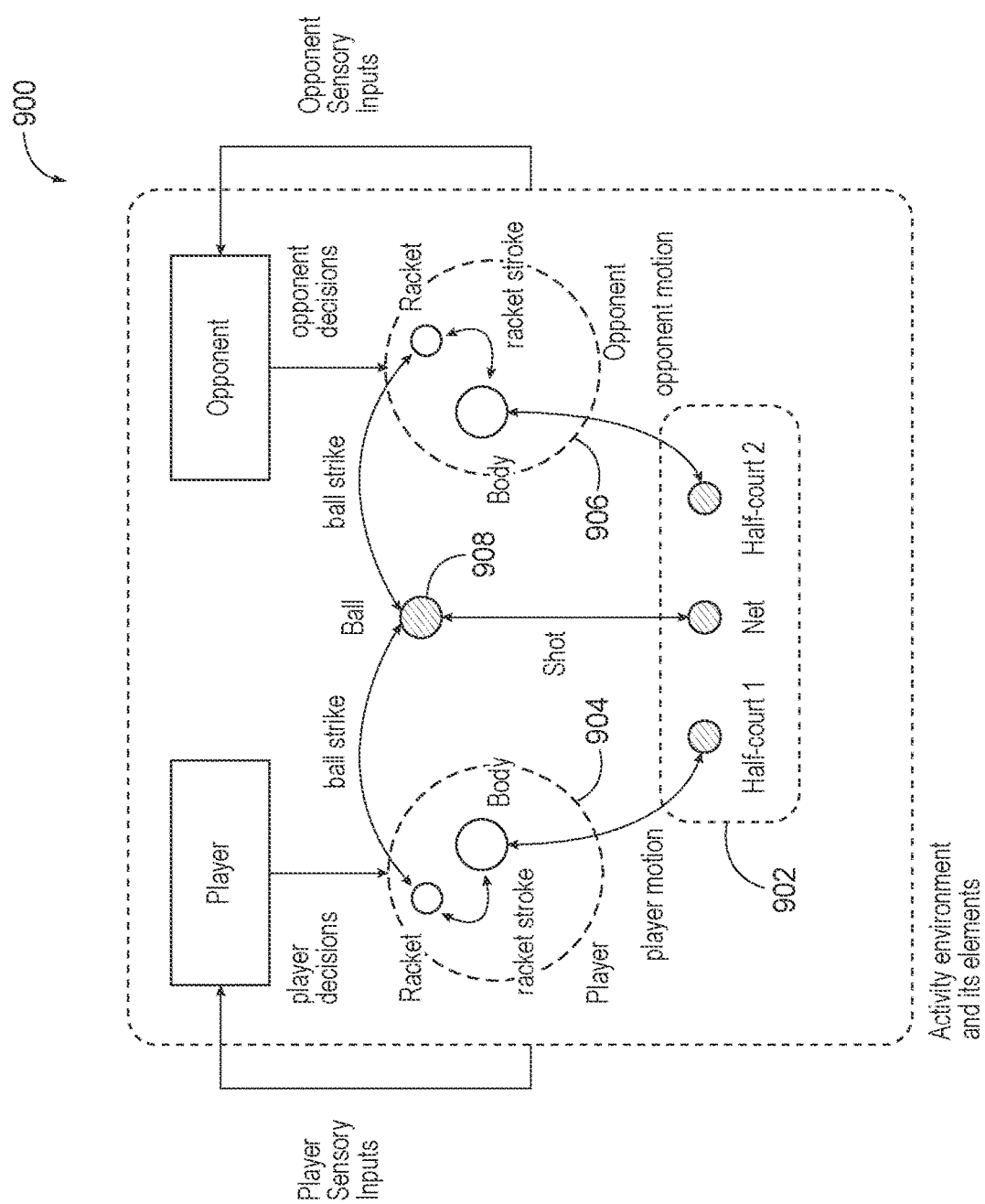
FIG. 9 is a graphic illustration of interactions in tennis between key elements, including the physical environment (court, net), the player (first participant) and opponent (second participant), including their body and body segments, racket(s) and ball.

FIG. 9 is a graphical illustration 900 of the interactions in tennis between key elements, including the physical environment 902 (court, net), the player 904 and opponent 906 (including their body and body segments, rackets) and the ball 908. FIG. 9 graphically illustrates the mind learning feedback loop for the mind of each of the player and opponent (or other participants). The player and opponent minds each acquire information regarding the interaction from the court or other interactive environment, and associated elements. In this tennis example, suitable information relates to the player and opponent strikes (incoming and return shots) on a tennis ball, as the ball crosses a net or other environmental boundary between the player participants.

The court environment is divided into two half-court regions by the net, with each player/participant assigned to a respective half court. Subject motions take place within these respective half-court regions, including both a first participant (player) with a body and an end effector (hand, racket, or other tools or equipment) operating in the first half court, on the left-hand side of the figure, and a second participant (opponent) with a body and end effector operating in the second half court, on the left-hand side of the figure. Each subject acquires information regarding the position of the ball (or other object), as well as well as participant positions related to player and opponent ball strikes (or other object delivery and return paths). This information is generated with respect to the net, half-court areas and other environmental elements, and processed according to a natural (human) learning algorithm in the mind of each participant, in order to select the next strike or other action (delivery or return) in the sequential exchange.

As introduced in FIG. 1, the interactions can be represented by a graph. Each behavior element can be arranged topographically according to the interactions. FIG. 9 illustrates an interaction graph for a tennis game.

The topology of this system is as follows. Starting from the top, these include: The player motion relative to the court, which includes the gross motions needed to take position. The ball interaction relative to the court, which is described by the ball trajectory relative to the court and is referred to as the shot. Going down further there is the tennis stroke, which is the interaction between the player, the racket and the ball. Nested in there is the strike, which is the interaction of the racket and the ball.

The agent behavior is organized around patterns of interaction. As can be noted in FIG. 9, and the behavior tree in FIG. 11, the interactions form a nested hierarchical system. Some interactions are taking place at larger time and spatial scales and depend on the execution of smaller units of behavior. This structure is typical of complex tasks with short- and long-term behaviors and outcomes.

In tennis, the shot outcomes do not typically distribute across the entire court space. The shots are emergent behaviors that usually concentrate around specific landmarks combining the effects of control strategies and the perception of the physical environment. For example, the players also use features and landmarks to orient themselves and plan and execute their shots.

Basically, shots are the result of visuo-motor interactions and task constraints. Example of landmarks are the corners of the court, centers of the court rectangles, or areas near the alleys. Novice players will target general areas within the court boundaries. More advanced players can target wider set of features.

Levels of Organization

The tennis example illustrates how the interactions help define the larger structure and organization of the behavior, including the levels of organization and respective domains of behavior elements. The larger behavior structure is a combination of the task structure (defined by the task constraints and rules) and the structure of the interactions.

Ultimately the skills of a player require the deployment of these skill elements for example to achieve a specific game plan. This requires the coordination of behavior across multiple levels, from the movement on the court, used to control the conditions, anticipation of the shot and preparation of the stroke, selection of targets, and planning of the point.

The precise structure in behavior is determined by dependencies such as serial order of behavior highlighted in FIG. 11.

For the tennis example, the levels of interaction and organization can include, but are not limited to, the following:

The sequence of exchanges making up a rally or a point in the case of a game.

The player and environment, court movement, positioning, over the period of exchanges.

The ball path and relationship with the court, and the perceptual and planning functions for each exchange, including the anticipation of the incoming shot and the planning of a strike point and shot target.

The local interaction, relationship between incoming shot (ball bounce) and stroke preparation.

The racket-ball strike, encompassing the fine-motor adjustments necessary to execute the stroke and achieve the desired outcomes.

Effect of Skill on Larger Structure and Organization

The basic skill element, combined with the task environment interactions, determine the organization of behavior across the larger task environment. The structure and organization of behavior, therefore, also reflect the level of proficiency and task or activity performance.

For example, poor ability to predict the incoming shot and take position to create optimal strike conditions will lead to poor control over the return shot, which will manifest as coarse control of the shot outcome over the task environment, as illustrated in the different court distributions. The distribution is also determined by the accuracy of the different stroke classes. For example, a novice player with poor control over their shot will only be able to achieve coarse shot outcomes across the task environment (see the distributions of shots on the two court sides, illustrating different levels of resolution in task discretization).

Skill level will manifest in distribution of characteristics of these elements, such as the distribution of shot patterns and the stroke patterns. Some of these characteristics depend on the dynamics of the underlying interactions and sensory-motor skills resulting in the specific conditions under which the movement is executed. But also, on the players movement on the court, and ultimately perception and decision-making abilities. However, since the movement patterns operate as units of organization, these higher-level mechanisms depend on the quality of the underlying movement patterns.

In conclusion, the structural characteristics can vary enormously depending on player skills. Accounting for the larger perceptual and planning structures that enable task level coordination can help determine how to characterize the quality of these interactions, and the resulting behavior.

III.III System-Wide Organization and Hierarchical Model

Now that the behavior elements and interactions and the large-scale behavior processes including the control of court movement have been defined, the following provides a system's view that integrates these elements under an interaction structure that support the coordination of behavior and processes needed for the larger task performance.

In summary:
(1) The behavior pattern; e.g., skill elements, are acquired to achieve specific outcomes in the environment and are defined by their respective operating domain.
(2) The topology and hierarchy of interactions and task structure determine the larger system organization.
(3) Specific performance properties of the skill elements (e.g., a range of outcomes and conditions) determine the characteristics of the interactions and overall task performance.
(4) This system provides basis for behavior coordination and integration, including the decision making and perception.

Activity Interaction and Hierarchical Structure

The first step before delving into the detailed behavior element modeling and the larger perceptual and decision-making processes is to represent the activity or task structure.

Interaction Levels (Reiteration)

Complex movement activities can be formalized based on the underlying interactions, as described above, and as illustrated by the interaction graph in FIG. 9. The task topology (influenced by the dynamics of interactions and the sensing and control information flow) generally defines a hierarchical structure (see Table 6). Characterizing this structure is critical for the skill modeling and assessment, and ultimately also its augmentation.

To integrate the various and multimodal dimensions and measurements (physical motions, player gaze, cues, etc.), the modeling process decomposes the activity in terms of behavioral units.

For example, in tennis games, considering them from top down and at the macroscopic task level, points are built from shot exchanges, and each exchange is made of more granular interactions and behaviors, including the player court movements, and the stroke execution. The following primary interaction levels are described (see FIG. 9):

The shots in relationship to the court (exchange and point construction)

The ground motion of the player in relationship to the shot (positioning)

The players body and stroke motion in relationship to the shot (stroke preparation)

The racket and body motion relative to the ball (stroke execution)

Previous sections of the disclosure have focused on characterizing these interactions to define behavior units. The following will focus on the sensory, control and coordination that explains their integration within a interaction structure.

The determination of the overall interaction structure is a central aspect of the modeling process. This structure is the basis for the system-wide description, which defines the interaction levels (see FIG. 9) and the overall sensing, control towards the larger decision-making structure. Note also, that some aspects of control or more centralized; e.g., taking place at, and based on information at, the task level, while some are localized at the behavior itself, e.g. the stroke execution.

Activity Segments and Behavior Elements

The overall performance is generally made of segments that are delineated by specific behavioral events or interactions. Some segments of performance are fully determined by physics such as the ball trajectory for the tennis example, or the ball ground impact. Other segments are part of the behavioral elements and therefore are triggered by perceptual states and others by deliberate actions of the agent(s).

It is therefore essential to define key events associated with the activity. For tennis, these events are defined by the interactions of the ball with the environment elements (crossing the net, hitting the net, bouncing on the court in particular regions). These events map the activity's continuous system state history to discrete states machines (see FIG. 12 and FIG. 23). Other events can be defined by the movement phases of the stroke and the other key movement behaviors.

Behavior Sequence and Hierarchy

The complete shot exchange pattern combines the incoming shot, the stroke preparation and execution, and the return shot (see, e.g., FIGS. 29A-29D). The incoming shot (along with the players poses) drive the behavior sequence, including the court movement, next shot selection, the stroke preparation and execution, culminating the return shot outcome. A shot exchange is defined from the perspective of a particular player or task participant (here this distinction is made by calling the one participant the player and the other participant the opponent). As described in the formal modeling, the exchange describes the response of the environment to the player's shot, where the environment encompasses the opponent's response and shot, including the different movement processes that participate in the activity.

This shot exchange represents the largest unit of movement organization which takes place at the task or activity level; e.g., for each point in a tennis game. The formal definition of a game state is introduced in the modeling section of the disclosure.

FIG. 11 depicts the hierarchical tree representation of the different behavioral levels in tennis games. The tree details the elements of behavior and the different levels of organization and abstraction. The diagram expands the stroke execution. Note that the other movement elements can be decomposed similarly to the stroke execution. For example, the court movement can be decomposed into phases with different actions of the body segment. A good example in tennis is the unit turn preceding the stroke execution. It combines the back swing (stroke) and the postural rotation (body).

FIG. 11 is a block diagram representation of a hierarchical model with breakdown of behavior elements from point and exchange levels down to the positioning, the stroke preparation and execution, and ultimately the stroke phases. As shown in FIG. 11, a point (or other task goal or subgoal) can be achieved via a series of shots or exchanges (1 . . . k . . . k+1, k+2 . . . K) between a player and opponent, or other exchanges between interactive task participants. Each shot or exchange (k, k+1 . . . ) can include several stages, for example move, prepare (stroke setup) and execute (stroke), and recovery. Each execution, in turn, can include several movement phases, for example backswing, backloop, forward swing, impact, and follow-through.

Table 6 and FIG. 11 describe the hierarchical organization of behavior elements for the tennis example. In tennis, for example, the larger behaviors driving the shot exchange include different types of movement behaviors including, court movements and "shot-making" behaviors. These, build on sub-movements including the stroke preparation, stroke setups, and stroke executions. These behavioral elements all have to be acquired by the particular player and integrated within a larger coordination, scheduling, and planning process that enables the player to build points and ultimately win games. This explains the lengthy learning process.

Activity Temporal Organization

Strokes depend on a chain of behaviors and proficiency in strokes depends on the various steps building up toward the ball strike. This is a common aspect of open motor tasks. FIG. 11 also shows a hierarchy based on the temporal ordering and the process dependencies delineating behavior units and subunits. At the top level, the point, which is made of a sequence of exchanges. Nested in the exchange, are the court movements, the stroke preparation, and the stroke execution.

The shot exchange is the largest behavior element. An exchange is made of an incoming shot and an outgoing shot. The shot is the ultimate outcome of the stroke, and in turn, drives the player court movement. Therefore, it describes the largest behavioral unit. These larger movement units are delineated based on the task interactions described by the topology in FIG. 9 and task structure.

The stroke execution is itself decomposed into phases. Note that the entire stroke phase sequence in FIG. 11 is shown under the execution level. In reality, some of the stroke phases such as the backswing and back loop may be implemented in parallel to the court movement and preparation. At the lowest level the structure is determined by the neurobiological system constraints (e.g., distinction between action preparation, initiation, and execution).

In tennis, a player can be proficient in a stroke class when dealing with incoming shots that do not require significant adjustments in the court position, and when the shots are directed toward specific stationary targets on the court. However, when playing live points, such as in a game, and furthermore, when targets have to be formed through the effect of game dynamics, the quality and diversity of the strokes and their outcome will decrease dramatically.

Activity Events

FIG. 12 depicts an event chart 1200 delineating key tennis activity events and interactions, including the coordination between key processes. The circles indicate instances of information pick up (e.g., primarily from player movement cues and shots or other actions). These events are defined by spatial relations between agent or objects and the environment elements, such as the ball-court interactions. The other class of events are those associated with the sensory and behavioral processes, including, action planning, attention, perception, and sensorimotor.

Tennis players have to coordinate the activity events and these various processes. The interaction structure defines the flow of information and coordination of sensory-motor behavior and actions.

Most open motor tasks share similar stratification of spatiotemporal process interactions. To become proficient in a task or activity, subjects have to learn the interaction structure, in addition to the repertoire of behavior units. This system of skills further speaks to the lengthy learning process. The interaction structure enables the integration and coordination of behavior elements to achieve smooth and effective performance, and therefore represents a key aspect in the formation of these behavioral sub-units and their integration within the task or activity schemas.

FIG. 12 is a temporal event chart of player and opponent key actions and key activity events during a shot exchange. FIG. 12 also shows instances of cues used to coordinate the behavior elements.

The timeline for a particular exchange of shots or other actions (k, k+1, . . . ) proceeds sequentially along the top of FIG. 12, from player (first participant) strike or delivery $t^P_s(k)$, net or boundary crossing $t^P_n(k)$, and bounce or contact $t^P_b(k)$, to the opponent (second participant) strike or return $t^O_s(k+1)$, net or boundary crossing $t^O_n(k+1)$, and bounce or contact $t^O{}_b(k+1)$. The chart is divided into shot, player (first participant) and opponent (second participant) sections, with planning, movement, preparation/recovery and execution stages for each participant. Stoke execution, in turn, can be further subdivided into a number of stroke phases or movement phases, depending of the particular interactive task in which the participants are engaged, and the corresponding forms of the associated delivery and return.

Phases of Activity (or Play)

The timeline associated with FIG. 12 also identifies the phases of play, which are based on key events and the sequence of movement behavior during a shot exchange between a player and opponent. The description is presented from the perspective of the player (and is symmetrical with that of the opponent's perspective). Relevant phases can include, but are not limited to, the following:

- The player's ball strike produced by the stroke (and the other behavior elements culminating in the stroke described below). This event initiates the shot and triggers the opponent response.
- Following the ball strike, the player recovers from the stroke and moves into the new court position. This typically takes place in two phases:
  - An initial positioning immediately following the recovery while the opponent prepares for the return shot,
  - The second court movement anticipating the return based on cues from the returning shot (and opponent movement), during which the player also finalizes the next shot target.
- Once in general strike position, the player makes final adjustments in pose and posture, as part of the stroke preparation. Neurological studies also show that movement preparation and initiation can be distinct phases and processes.
- Finally, the stroke execution which builds on the sequence of movement phases and learned movement motor program to direct the ball to the desired target.

Note, in particular in open motor tasks, that the stroke has to coordinate with the incoming ball to produce the conditions for the desired outcome, including the shot target.

Process Coordination

As illustrated in FIG. 12, the processes in each phase are interactive. The behavior elements depend on, and, in part, build on one another. The coordination between these behaviors and their underlying processes are enabled by specific cues. These are associated with events that are defined based on interactions with the environment, ball, and opponent. The figure depicts these cues as dashed lines connecting the relevant behaviors and events. The events are labeled by their time of occurrence and as a function of the exchange index (k, k+1 . . . ). The gray background in the cells indicate the receiving player.

Note that events can be extended to include details of the movement execution, both for the court movement (e.g. split step, unit turn, left hand, lean forward, etc.), and kinetic chain for stroke initiation (hip, stroke phase elements, arm pronation during impact and follow through, etc.). Basically, the state variables used to model coordination between the body and environment and activity event can encompass as many details as deemed relevant to training or rehabilitation. Each of these can be analyzed for technique, assessed, included in diagnostics, and eventually can be cued in real-time during training and performance using augmentations (e.g. visual, audio).

III.IV Tennis Perception and Decision-Making Processes

The following details the high-level processes illustrated in FIG. 3. The architecture is based on task representation derived from characteristics of behavior interactions and associated control structures, in particular, how the system of behavior patterns associated with interactions participates in the larger control architecture supporting decision making and perception.

TABLE 7

Temporal sequence and key stages, events and quantities outlining key perceptual and decision processes and actions

| | | Times (events) | | | | | |
|---|---|---|---|---|---|---|---|
| | | $t_s^O$ | $t_n^O$ | $t_i^O$ | $t_s^P$ | $t_n^P$ | $t_i^P$ |
| | | Shot | | | | | |
| Primary Task Phases, Events and Actions | Shot Events | Opponent shot leaves racket | Opponent shot crosses net | Opponent shot court impact | Player shot leaves racket | Player shot crosses net | Player shot court impact |
| | | | | Opponent | | | |
| | Opponent Action Processes | Ball strike | | | Anticipates shot | Court positioning | Final positioning and stroke preparation |
| | Opponent Perceptual Processes | Acquire shot target | | | Preparation for next shot | Shot prediction Planned shot outcome Planned court position | Updated shot prediction Updated shot plans |
| | | | | Player | | | |
| | Player Actions Processes | Anticipates shot | Court positioning | Final positioning and stroke preparation | Ball strike | | |

TABLE 7-continued

Temporal sequence and key stages, events and quantities outlining key perceptual and decision processes and actions

| | | Times (events) | | | | |
|---|---|---|---|---|---|---|
| | $t_s^O$ | $t_n^O$ | $t_i^O$ | $t_s^P$ | $t_n^P$ | $t_i^P$ |
| Player Perceptual Processes | Shot prediction Planned shot outcome Planned court position | Updated shot prediction Updated shot plans | Impact conditions Shot outcomes | Acquire shot target | | |

Decision, Control and Sensing Architecture

Key elements in tennis include the two players (Player 1 and Player 2), their equipment (Racket 1 and Racket 2). The environment (Court), with three of its key elements (Half Court 1 and Half Court 2, and the Net). The players are described by their overall body pose on the court, and the pose of the relevant body segments involved in the stroke preparation and execution.

Table 7 focuses on the player; the same general events and processes are expected for the opponent. Table 8 gives an overview of the perceptual and action processes across the levels of organization and control.

TABLE 8

Summary of the perception and actions over the different stages and levels of behavior toward a shot execution (see FIG. 3)

| Perception | Action/Behavior | Resulting Conditions |
|---|---|---|
| Global Task-Level Planning | | |
| Global configuration and conditions | Shot decision Positioning decision | Global configuration and conditions |
| Positioning Stage | | |
| Situational awareness Expected shot ground impact Pose at opponent strike time | Movement to anticipated strike point | Local player-shot conditions |
| Setup and Preparation Stage | | |
| Perceive actual ball ground impact location Shot target region location | Preparation and setup Move into strike pose and prepare/setup strike | Stroke execution conditions |
| Stroke Execution Stage | | |
| Perceive ball bounce conditions Determine initiation corrections | Stroke execution: Stroke impact location Stroke impact conditions Stroke outcome | Racket impact conditions Shot ball state conditions (spin, speed) Shot court outcomes |

Table 7 details the temporal sequence of events, processes and actions. The times are specified by shot events. The top section of Table 7 describes key events for a shot exchanges between a player and an opponent. Key events are defined based on the shot interactions, and players and court/shot interactions, shown in FIG. 12. There are three domains of shot interaction: ball/shot with player, court, and opponent. The description is presented with respect to the player's perspective. The sequence proceeds from the opponent ball strike, the incoming shot across the court and its elements, to the player return strike, and the outgoing shot.

The bottom two sections of Table 7 describe the player reactions (and anticipation) to the events, including the gaze focus of attention, player body and racket interactions. The shot events delineate the phases of play and are used as the primary driver of the player actions. Note that the shot events also encompass the ball strikes, which represents the primary player events. Process Flow Recall the perception and action process flow based on the hierarchic model in FIG. 3, and the task sequence in FIG. 12.

1. At the first stage, the larger task-level planning and situational awareness (Situational Awareness and Sense Making), the player determines the configuration of the game including the opponent state (game state, formalized below), and then plans the return shot. This can be performed by predicting the response of the game to particular choices of shots. The predicted shot is used to determine the court positioning.
2. The player takes position and continues to monitor the situation, he or she gains more specific information about the incoming shot exact characteristics (Motion Context Perception), and then uses this information to prepare and setup the body for the ball strike.
3. Finally, once the player is setup, the perception is focused on the local shot execution environment (Stroke Type Perception), gathering information for the coordination of the stroke execution with the incoming ball.

4. As the shot travels across the court, the player maintains situational awareness and prepares for the next return from the opponent (back to step/stage 1).

The perception and action go from a broad scope, at the task level, to the more specific local environment of the movement preparation and then execution. Note that FIG. 3 also highlights possible augmentations for perceptual cueing that are elaborated below.

The skill level manifests in the quality of the information at each stage. In the best case, the player acquires sufficient SA at the beginning of an exchange to plan the returning shot and anticipate the opponent's court movement and shot response. Failure to gain SA, the player operates reactively; if lucky the player can maintain one or two exchanges.

Discussion

Notice from the sequence in FIG. 3 that the primary outcomes (stroke and shot outcomes 310) depend on predictions and subsequent execution of movement and stroke behaviors. Yet, the central aspect is the control over the conditions in which the stroke is executed. Therefore, the player has to anticipate the incoming shot outcomes and plan his or her own positioning.

For the tennis example, the decision, control, and sensing architecture is determined by the environment control relations: first the player positioning to control the environment, which allows for control of the stroke/shot affordances, and then, based on the prevailing affordances, which are a function of the players state and ball conditions, the player proceeds with the movement to establish the planned configuration for the desired shot selection, and finally the shot execution.

As described herein, the positioning is determined based on the desired outcomes, which requires anticipation of the shot options as early as possible, even as early as the opponent's shot preparation. The best players maintain a game plan with the sequence of shots and player configurations.

Environment and System State

Task-level decision making builds on situational awareness; e.g., ability to perceive the task environment and its events, both in the spatial and temporal sense, and their prediction in the future. In technical terms this translates into observing the state of the task environment and predicting its evolution for different actions. The set of possible actions are based on the affordances that are available for a given task environment state. This type of prediction is typically performed by a so-called forward model. The combination of outcomes and decisions that result in the most favorable task outcome is used to select the action. This type of decision making with multiple steps is referred to as a dynamic program. An issue with these decision-making problems is their computational complexity. In particular for problems with large numbers of states and where decisions need to be taken in real time.

Decisions are based on state information. The complete state of a tennis game is given by the combination of different elements (player, opponent, shot) discussed above. Not all state information about the system is required for decisions at each stage shown in FIG. 3. The more immediate decisions of the players are based on the state of the operating environment at each stage of the activity. The decisions are constrained by the affordances; e.g., what actions are available given the state of the environment and the state of the agent.

In theory, to be able to predict and make the best decisions about his or her actions the player knows the full state of the game at any given time during the exchange. However, this is not realistic, because of limited perception and information processing. Instead, the idea is that the brain partitions the state-space into smaller decision problems that are based on the ecological structure as illustrated FIGS. 8 and 12. In general, task environments have a hierarchical structure, the larger units of behavior being determined by smaller units (see tennis point and exchange model in FIG. 11). Therefore, once the larger state is determined, such as the shot target and sequence of movements to attain this outcome, the agent can focus on the smaller units and their respective environments. Therefore, the ability to plan over a task cycle is essential for high levels of performance.

For example, once the plan for an exchange is determined, the subordinate steps follow the game structure within that cycle, where perception and decision problems at the level of each movement element are more tractable because they focus on the specific interactions, and operating environment. For example, positioning, preparation, and stroke execution have a smaller scope of interaction and are conditioned by the point and shot level state and decisions. However, the activity state may not always be fully predictable over a cycle such as an exchange, therefore the execution and timing of movement elements should be modulated based on evolving activity state. This is the task of the executive functions.

Good point strategy and execution requires sufficient situational awareness of the point level (perception and prediction of game/activity state) at the beginning of the exchange, which ideally is updated as the activity unfolds. This task structure, and the interactions must be learned in addition to the specific perception and control of the movement behaviors (court motion, stroke preparation, and execution).

Summary of Tennis Player's Decision-Making

At a task level; e.g., point level in tennis, the player plans the course of actions over the next exchange cycles. To do this, the player has to acquire information about the current system state (situational awareness), and take decisions, including determine a shot target and the ground motion. The input of the planning is the state or court configuration (player, ball and shot). The player uses a forward model to predict the set of game or environment states that are likely from the current task environment state.

TABLE 9

Tennis primary perceptual and action processes as a function of the stages and levels of behavior

| Stage of Behavior | Perception | Actions |
| --- | --- | --- |
| Planning Stage | Read/perceive the court and opponent player motion, position, and shot to anticipate the incoming shot. | Plan the return shot. |

TABLE 9-continued

Tennis primary perceptual and action processes as a function of the stages and levels of behavior

| Stage of Behavior | Perception | Actions |
|---|---|---|
| Positioning Stage | Determine the affordances for shots based on the global configuration (situational awareness). Read/perceive the global environment of the incoming shot based on global positioning. | Ground motion to the ideal location for returning the shot and producing the desired shot (target, pace). |
| Setup and Preparatory Stage | Read/perceive the local environment of the incoming shot based on global positioning. Starts with the final adjustments in posture based on shot state. Possibly make minor update in positioning and shot target due to unexpected contingencies. | Adjust pose and preparation and setup to produce the optimal conditions for the execution of the shot. Start stroke phases coordination with incoming shot. |
| Execution Stage | Player gathers the latest information necessary to modulate the stroke execution up to about 100 msec before impact. | Primary movement execution, coordination of the stroke phases and their functional properties. |
| Recovery Stage | Player observes the shot outcomes and opponent reaction, including anticipating the next incoming shot. | Player takes recovery pose accounting for anticipated return. |

Table 9 summarizes the perceptual and action processes as a function of the stages and levels of behavior. Given the set of states, the most desirable game state is used to determine the actual motor behavior (court movement). In summary, the main action processes can include, but are not limited to:
1. Control of the overall task/game configuration
2. Preparation of the primary action
3. Execution of the primary action Task Level State (Game State) Perception and Planning The state at the task level at different stages encompasses one or more of the following:
   The current incoming shot, player and opponent pose and motion.
   This information is used to determine the affordances for strike position and shot target (FIG. 7).
   On an outgoing shot the player builds and updates the outgoing shot target area and the opponent movement. This information is used to predict the next incoming shot.

Planning can include, but is not limited to, the following three major steps:
   i) Player position, together with opponent shot and position, define the game state.
   ii) The game state defines the feasible player shot outcomes (affordances). Outcomes can be ranked in terms of utility.
   iii) The set of player's shot outcome on game state are compared to select best shot.

The game plan defines a trajectory for the game state that can potentially span several exchanges. The game state depends on the behavior hierarchy (FIG. 11), including the sequences of intermediate states that can lead to the desired state positioning and strike/shots.

Positioning Decision

This information from the plan for the next game state is then used to drive the positioning. The determination of actions to reach a desired state is typically determined from a so-called inverse model.

Based on the reference state, or desired outcome determine the control actions, that essentially control the configuration or state of the game to a favorable state.

Preparation and SA Updates

Within a shot exchange, the game state can be updated based on smaller steps, accounting for changes that take place during the positioning and shot preparation and execution. In particular, by the time the player has moved to the desired pose, the game state may have deviated from the expected state at the onset of the planned exchange. The causes include the effects of uncontrollable events, such as the opponent motion.

Therefore, the preparation step has to reassess the game environment, albeit in a narrower scope focusing on the immediate stroke target and execution. The update in game state can be used to update the decision about shot target and pose.

Stroke Execution

Finally, at this stage, the conditions and range of options are drastically reduced, and the behavior unfolds largely based on procedural memory; e.g., it is automatic. Up to about 100 ms before impact, the player can only make minor adjustments to the stroke, including modulating the final conditions before the forward swing.

IV. Formal Tennis Game Modeling

The following describes the formal modeling of the tennis game, in particular the task level and the coordination of the underlying movement behaviors. The objective is to specify key quantities and mathematical relationships needed to describe the processes at each level and stage of behavior. Each level of organization is described in term of its environment and interactions. At the top level, the task environment model combines all the elements of the system. As described in the previous section, for open motor tasks, the environment is dynamic, therefore, the model has to capture how the state of the environment affects how the actions produce their outcomes.

IV.I Task Level Modeling

This section first provides some relevant aspects of task and activity level modeling, including considerations of the state-space abstractions, activity models, human decision making, and environment dynamics. Then the machine learning paradigm is described, in particular the distal learning problem, which provides a general framework for modeling the high-level processes in open motor tasks and skill learning.

Task and Activity-Level Modeling

Modeling human activity and task performance has typically been limited to high-level abstractions where states are discrete high-level behaviors (see, e.g., activity modeling using Hidden Markov Model) without accounting for the natural structure of behavior and the environment dynamics. This is adequate for simple problems with discrete structure; in open motor tasks, behavior properties emerge from the environment dynamics and depend on the skill levels of the performers.

Decision-Making Modeling

What modeling techniques can be used to describe the high-level behavior and decision making? Machine learning deals with the design of algorithms that enable artificial agents to learn skills. Therefore, the framework used in machine learning can provide important insights into the learning process. Machine learning literature provides a computational description of the learning problem which can also be used to formalize the human skill learning and its augmentation. In particular, it can help formally define what aspects of the learning problem needs to be modeled and augmented.

Internal models are fundamental in motor control and learning. Two primary types of internal models: the forward model (or environment model), which predicts response of the environment to an action; e.g., predicts the outcomes in the environment; and the inverse model (action model), which maps the desired outcomes to the necessary agent's action.

The specific challenge is that the open motor task requires multiple levels of organization. Hierarchical models have been proposed and validated in neurosciences; however, they have mostly focused on movement planning in simple tasks. The multiple levels of organization imply that the task-level configuration or game state has to be specified before the details of the movement can be meaningfully specified (nested behavior). A significant part of the modeling is the determination of this behavior structure.

The decision-making process operates in parallel with the perceptual processes, and these processes are ongoing and depend on the state of the activity across the level of organization. FIGS. 13A-13F illustrate the dynamics of these processes over the period of an exchange. The figure highlights the scope of the perceptual process, the decision process, and the resulting conditions on the operating environment (see also, e.g., FIGS. 3A-3B).

Decision-Making Algorithms

Markov Decision Process (MDP) is commonly used for modeling agent decision processes. In MDP's the decision problem is formulated as a discrete-time stochastic process. At each time step, the process is in some state x, and the agent chooses an action from the set of actions available in that state. The state at the next time step is determined by a stochastic transition function and the agent obtains a reward for the new state. In Partially observable Markov decision processes (POMDP), the agent usually cannot directly observe the state. Instead, the agent makes decisions based on a probability distribution over the set of possible states, determined from available observations.

For tennis, such a model would describe the relationship between environment state, the decisions (shot selection, court motion), and their outcomes at the level of the environment state (see FIGS. 13A-13F). This model can also include the opponent's actions, and the specific characteristics of their interactions and associated outcomes and success rates.

In theory, the decisions are based on the relative values of potential goals or actions, considering the cost to achieve them. This general decision is formulated using dynamic programming, where the optimal action optimizes the tradeoff between a cost-to-go from the future state to a goal, or utility of a future state, and the cost-to-come; e.g., the cost of achieving the next state. Other applications include a spatial value function in guidance within complex environments. Similar models have also been proposed in the neurosciences.

One challenge in applying these techniques is to formulate a model of the environment that is realistic for human decision making.

Human Decision Making

Naturalistic decision making has been shown to operate following some form of pattern matching and prediction process. An assumption about human decision making is that the player can map configurations to predicted scenarios. This enables fast decision making. This mapping can be conceived in terms of the affordances. Namely different patterns in configuration provide different options for actions.

However, for such mapping to be tractable for real-time decision making, the set of possible configurations and outcomes still has to be small and structured enough to be recognized. In particular they have to form distinct, ideally finite, patterns in configurations. This implies that the behavior at the game or activity level is structured enough. These decision-making considerations support the assumption that skill elements should produce structure and organization at the activity level. This would enable representing the activity or game in terms of interaction patterns, with sparse sets of cues available to recognize the patterns.

State-Space Abstraction

A key aspect of the problem is the representation of the state space at task level along with the sensory/perceptual and decision variables. At the task level, the details about the behavior interactions can be abstracted, however, these abstractions have to account for the movement elements and how they determine the larger behavior performance and organization. In particular, since these elements and their coordination depend on the skill level.

The task-level model has to encompass both the abstracted dynamics, defined by the actions performed by the agent, as well as the sensory information. Abstracted sensory inputs focus on the features from the observable subspace that govern outcomes of the interactions and enable their prediction.

For the tennis example, illustrated here, the task level model focuses on how players build points. Points are primarily determined by the sequence of shots (strike and target) and the player and opponent ground motion (see FIG. 8). These macroscopic patterns can be used to determine the task level performance and behavior (see "game state," as described below). The decision variables include the shot targets and the gross positioning on the court; the motor commands and sensory and cues that govern the lower-level behavior such as the positioning or the stroke are abstracted.

Perceptual Processes and Situational Awareness

An important aspect of the decision-making process is the perceptual process; e.g., the process of acquiring relevant observations and cues, which corresponds to the input side of the problem. At the highest level, perception is responsible for the estimation of the agent-environment state to produce a situational awareness (SA) needed to support the agent's decisions. The SA includes the projection of the task state in the future, which provides the basis for the decision making. The task state also determines the affordances for the agent's actions. The decision-making process can then select optimal actions based on the utility of the future states.

A key aspect influencing the perceptual functions is how well the player can recognize patterns in each stage. This depends on sufficient structure in the behavior, which relies on well-defined elements of behaviors. Therefore, the higher-level processes require sufficient proficiency at the skill element level.

Role of Environment

A key characteristic of open motor tasks is that the agent's actions take place in a dynamic environment. Furthermore, in complex movement activities, the system state is partitioned according to its hierarchical structure, which is defined by the structure and organization of behavior and the task structure. Finally, a game state or activity global state follows a trajectory; the activity's goals are not achieved through a single decision/action but a sequence of decisions. In tennis, the state trajectory represents the point sequence in a game.

In open motor tasks, the response, or outcome of an agent actions depend on the state of the environment. Therefore, a key part of modeling and assessing an agent's skills is capturing this dependency.

In complex tasks like tennis, the behavior is governed by multiple levels of organization. Therefore, an important task is to define the specific form of environment representation and its integration with the movement elements. Each level of organization has an appropriate form of environment representation that can be used for modeling and assessing the agent's behavior. For example, in tennis, the actual stroke movement can be described using a traditional dynamic and control framework. However, the task environment level is more complex due to the larger number of degrees of freedom and various human processes, including perception and decision making, which are difficult to model as simple components.

Environment Dynamics

A key insight for modeling open motor tasks is that the learner has to account for the state of the environment, therefore, learning has to acquire an environment model (forward model) in addition to the movement models. In addition, as described in the previous sections, the agent also actively controls the environment to put the system or environment in a state for which the action can best achieve its outcomes. In tennis this corresponds to the player positioning for the stroke execution.

The learning framework that is appropriate for open motor tasks is called distal learning, because it focuses on problems where the agent actions are mediated by an environment that is itself dynamic, and therefore, the outcomes of the actions are distal variables.

The following describes the mathematical formulation based on a distal learning problem. Machine learning provides a framework to evaluate skills. More specifically, since skills are acquired through learning, if it is possible to formulate learning for the skilled activities or task, it is then possible to use the models for the skill assessment and augmentation of the learning process.

The challenge is that open motor tasks are complex and cannot easily been translated into a single machine learning model. The reasons are related to what make human skill learning challenging, including the high-dimensional problem space, its hierarchical structure with sequential actions.

Different aspects of an open motor task are best formulated with different machine learning formulation. The following focuses on the task level planning and environment dynamics, where the players learn how the shot and positioning patterns over the sequence of exchanges determine their outcomes for a point and eventually game.

The task-level learning problem can be formulated as an unsupervised or supervised learning problem. Movement or motor learning, such as in learning strokes for particular shot types, is best formulated as a supervised or reinforcement learning problem for assessment and augmentation (compare, e.g., U.S. Pat. No. 10,854,104 B2 and U.S. Publication No. 2121/0110734 A1, and U.S. Publication No. 2019/0009133 A1). These differences are also reflected in the brain, which has been shown to use different learning mechanisms.

The following describes the general formulation of the environment model and the integration of the hierarchical control components. In particular, the definition of the internal models that are needed to operate in the task or activity environment. The knowledge that can be extracted from the models can then be used to guide the skill assessment and augmentation. The following first describe the environment dynamics. Dynamics are typically defined for processes or plants. The modeling of open motor tasks is a somewhat unusual problem because of the significance of the environment dynamics and the embedding of the agent in the environment.

The environment dynamics describe the sequence of system or environment states during an activity period, for example, an exchange in a tennis point. The dynamic equation for the environment can be described as follows:

$$x_k = f(x_{k-1}, u_{k-1}),  \quad (\text{Eq. 2})$$

where $x_k$ is the environment state and $q_k$ is the action produced by the agent, and f is the state transition function, which describes the effect of the input on the state; e.g., environment.

Corresponding to each state there is an outcome:

$$y_k = h(x_k). \quad (\text{Eq. 3})$$

For the embedded agent, or player, the outcome is typically a sensation; e.g., the result of the perceptual process.

The system dynamics in tennis has several inputs or actions. The player's and opponent's shots, which are the primary actions on the game environment. The other actions are subordinate behaviors such as the ground motion and posture influence the system's state and agent's response through their effect on the task environment (control of the environment).

The time variable can be defined by events at different time scales. At the game level, given the emphasis on the points, the time variable is the shot exchange. Other relevant times, which are more granular are the game and behavioral events shown in FIG. 12.

In tennis, for example, the desired state can be the configuration of the game elements (player, opponent, and shot). It is not possible to achieve an arbitrary state in a single step (one shot). The player has to plan a sequence of actions and adapt the plan to the opponent's actions. At the game level, given the system state at the opponent shot (k−1), the player's return shot at (k−1) determines the opponent's response, which in turn determines the new system state at time (k). Therefore, it is possible to define Eq. 2 for the game level by abstracting the underlying movement behaviors.

Learning Problem Definition

The player must learn to produce deliberate changes. Given the dynamics of the environment, the player's actions must account for the system's state.

$$u_k = \pi(x_k, y_{k+1}^*),\qquad\text{(Eq. 4)}$$

where $y_k^*$ is the intention of the player, such as a desired outcome. From this equation, the action must account for the environment state.

A player or agent first must learn the effects of different actions upon the environment, which corresponds to learning a forward model. The forward model is an internal model that predicts the outcome (the agent's sensations) given the environment's state x(k−1) and action u(k−1). This model provides the basis for eventually determining the actions.

One way to solve the decision problem is by learning the inverse model that determines the action u(k−1) as a function of the current state x(k−1) and the desired outcome y*(k).

The model of the macroscopic environment of the game makes is possible to compute a plan the next exchange cycle. The plan provides for the subordinate behavior in the underlying hierarchy. Remaining details are elaborated next.

IV.II Task-Level Planning and Decision Making

In a tennis match, the task goal is winning points. The high-level decision making correspond to the game plan; e.g., the building of a point, starting from the serve, and subsequently, responding to the opponent's own decisions and behaviors, as well as, the uncertainties inherent to the performance such as the variability in shot outcomes.

For the task level, the challenge is the complexity of the environment, which in theory is where the complete system integrates to produce the task or activity performance. The solution described below uses abstraction of the behavior to formulate a task environment and game model that can be used for the assessment of the skill at the task level, including, game strategy and decision making.

Modeling Requirements

The general goal of the modeling task is to capture the distribution of features associated with each of a user's behavior elements. This model is required to assess a subject's skill, perform diagnostics, and serve as a reference for skill augmentation. The resulting model is also used for real-time behavior element classification during activity performance.

The process through which this model operates are similar to human brain of a participant (or an experienced coach); e.g., it combines a task model with different movement element classes that have been previously identified and uses observations to explain performance. The modelled behavior elements are described by a set of features, and their statistical characteristics. The statistics define the behavior elements within their operating domain.

Therefore, as explained here, the state variables selected for modeling have to describe behavioral characteristics that correspond to the actual units of behavior; e.g., they should be consistent with the underlying biological processes, including the perception-action mechanisms that describe the dynamics of the task or activity interactions. In summary, some key differences with typical activity models used in engineering are:

Considering behavior elements from an ecological perspective; e.g., how behavior elements emerge from and participate in the coupled agent-environment system.

State variables and behavioral elements follow from the human factors; e.g., encompassing the perception-action or sensory-motor processes across hierarchical levels.

States are based on the activity patterns that are determined by the underlying classes of behavior. These patterns define the activity discretization.

Connecting movement behavior elements across the larger hierarchy, from continuous movement, to patterns of interactions, and activity performance patterns.

By decomposing these movement units according to their underlying processes, the resulting model elements can be used to describe the behavior from a functional standpoint; e.g., describing what dimensions define the behavior, and detailing the inputs, outputs, and the driving processes.

Moreover, capturing the functional details is important since these model elements have to support the augmentation. Finally, these movement units can serve as units of organization of behavior, and therefore also capture how the movement units are coordinated by executive functions across the task or activity ecosystem to achieve the task or activity performance.

This approach is different from typical statistical learning techniques that have been more recently developed to reproduce human control skills, such as in deep learning. These latter techniques typically capture the end-to-end performance; they do not capture the internal mechanisms, such as the perceptual processes that drive behavior. For example, in tennis, the cues used for predicting a shot, the cues that direct the player ground motion, or those that help initiate and synchronize the stroke motion with the oncoming ball. All these processes need to be coordinated in order for the racket to strike the balls with the conditions that will lead to the desired shot outcomes.

Tennis Point Formulation

A game in tennis is defined as a series of points. The points are made of shots that form exchanges (see, e.g., FIG. 14A). In the context of a game, an exchange terminates when the player or opponent puts the ball away (winner), or when he or she makes an unforced error. In casual play, the shots can continue for example on an equilibrium state (e.g. rallying cross court).

The individual points are the basic units of scoring in a tennis game. At the planning and decision-making level, the goal in a game is to determine the sequence of exchanges leading to winning the point (FIG. 14C). The player will win the point if he or she can drive the opponent into a position for which there is no feasible shot or put him or her in a condition for which the shot options are limited and favorable to the player. This sequence determines a state trajectory.

Exchange Definition

In the following, an exchange is defined relative to the player or opponent. For the player, an exchange encompasses the already-outgoing shot and opponent pose (which define the game state), and the opponent's response to the shot and the player's next shot response (which define the next game state).

In a formal game, an exchange is typically initiated by a serve. Alternatively, for an informal game of tennis, the player engages the ball by striking the ball across the net, e.g., using a groundstroke.

Environment State Definition

The system state evolves over time through the effect of the player and opponent behaviors (see FIG. 12). The general idea is that players can influence the game state through their response to the situation and the opponent's behavior, however, players have to account for the environment state; e.g., game state to produce the desired outcomes for a game.

The task environment state is defined by the entire collection of states describing the player and opponent pose, motion, posture (including stroke), as well as the ball's state. The points rely on a hierarchy of movement behaviors (FIG. 14B). The sequence of points, in turn, defines the underlying movement behaviors. Therefore, the shot exchange history, which defines a state history, has to account for the feasible transition.

Game State Definition

The game state is used to designate an abstraction of the environment state that focuses on the player motion and shot patterns. The game state describes the players and shot interactions using a finite set of game patterns.

$$g_k \in G = \{g_1, g_2, l, g_n\} \quad (Eq. 5)$$

The idea is that the player uses this abstraction to plan at the point or task level. The game state definition, as the grouping of configuration into patterns that can be easily recalled, is based on ideas from chunking theory in human information processing. Like in chess, a proficient performer can perceive the game state as a whole pattern and memorize configurations that are important for strategic decision making. To provide perspective, expert chess players (and other participants in complex, interactive tasks) may memorize tens of thousands of positions and movements. This strategy addresses issues of complexity that would arise with the large number of system states and the infinite game possibilities that arise with a model based on classic state-space description.

Figure 13A:
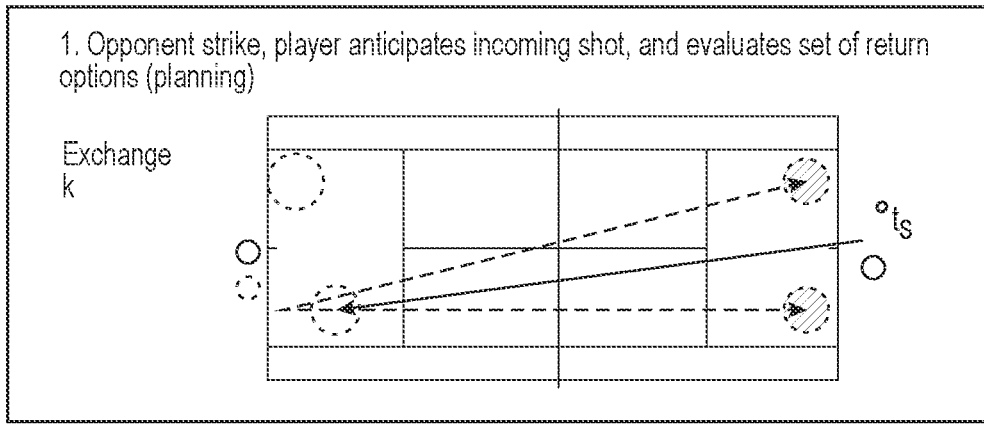
FIGS. 13A-13F are illustrations of a sequence of events over the period of an exchange, for a tennis or racket sport example.
Figure 13B:
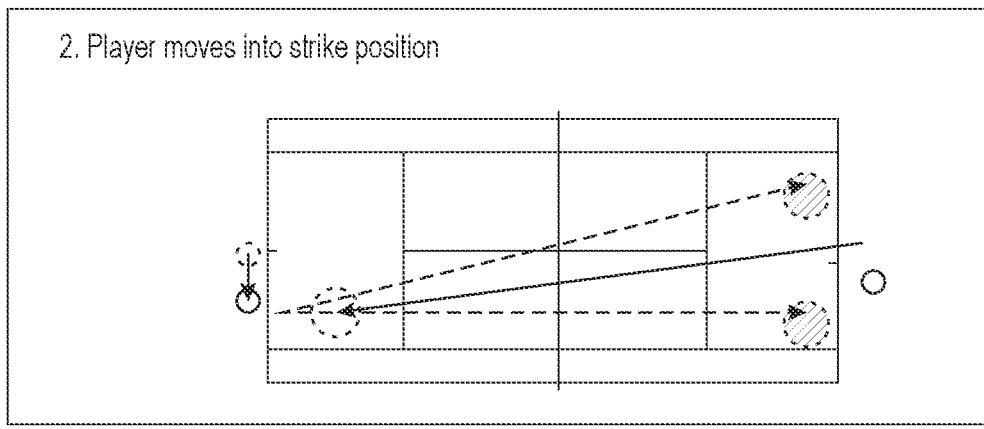
Figure 13C:
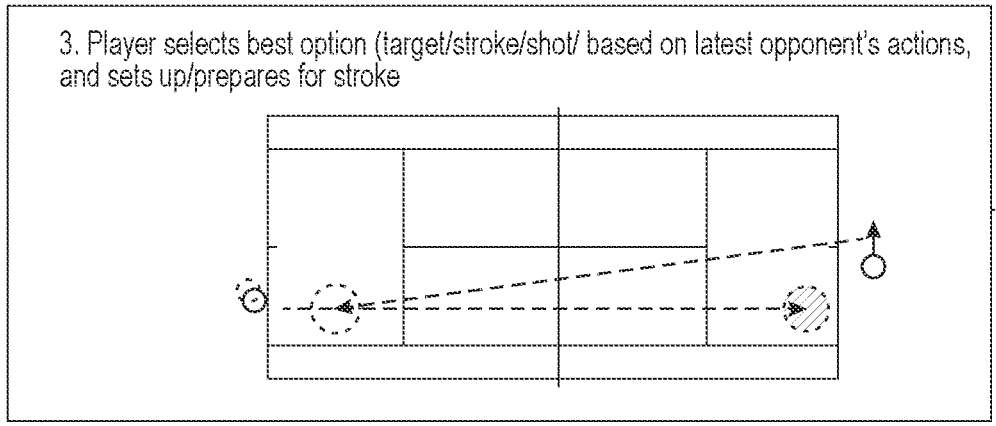
Figure 13D:
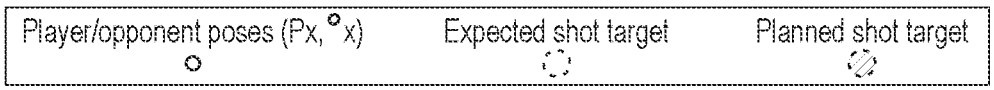
Figure 13D:
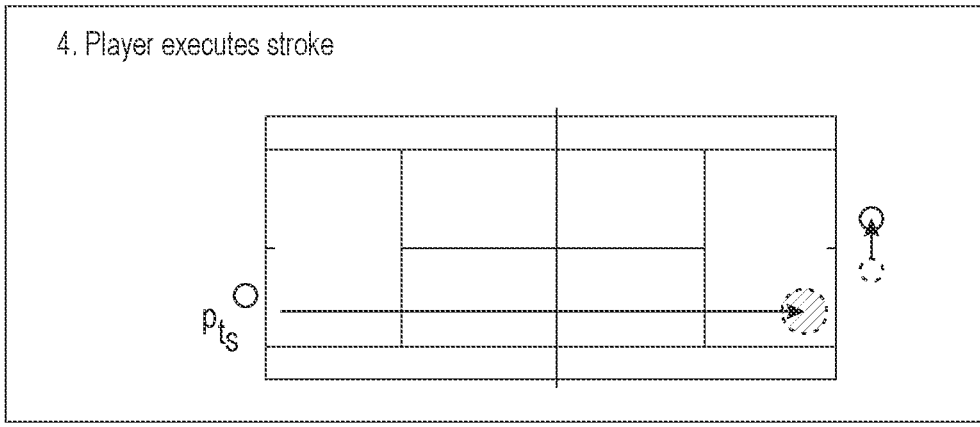
Figure 13E:
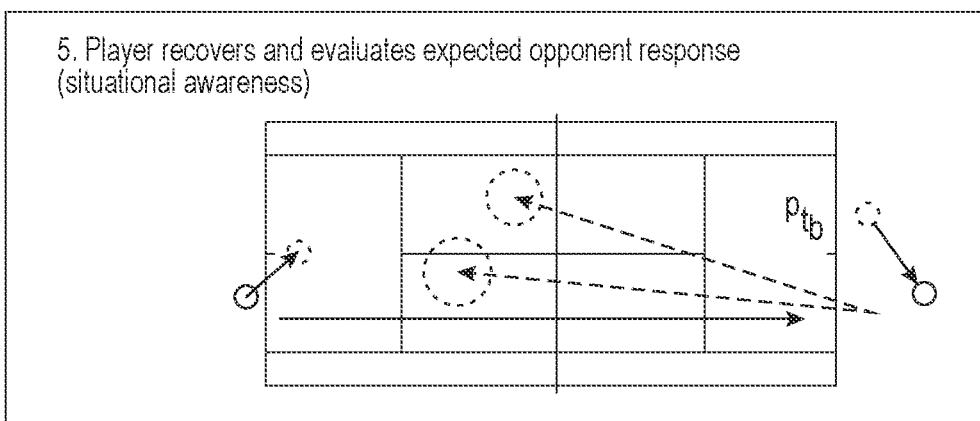
Figure 13F:
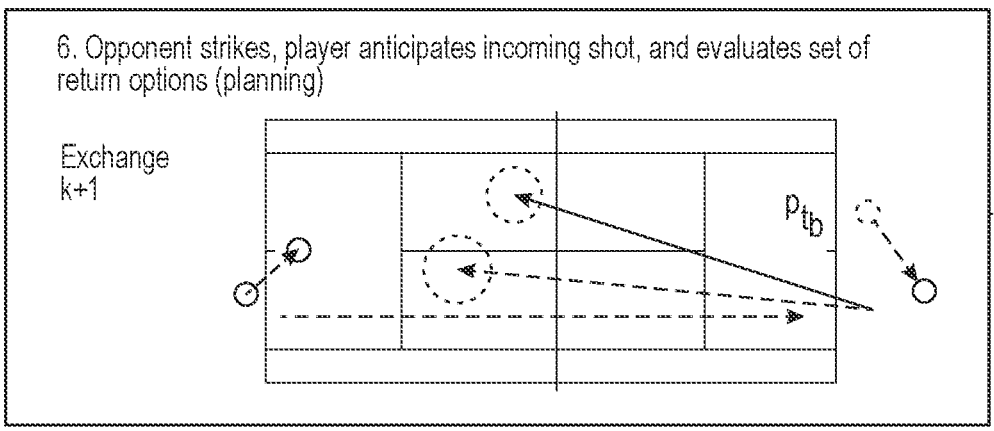

FIGS. 13A-13F show the sequence of events in an exchange. In FIGS. 13A-13F, the detailed behaviors are abstracted to emphasize the events at the game level. The formalized game state, which correspond to the state of the game or system at the incoming shot, is shown in boxes (or steps) 1 and 6 (FIGS. 13A and 13F), for the current, and next exchange, respectively. In this representation, the action is the player's shot, and the environment encompasses the court. The outcome; e.g., the response of the environment to the action, corresponds to the opponent's response to the player's shot in box 6 (FIG. 13F).

In addition to the game state, the players may also learn the actions for each game state; e.g., shot target selection and strike pose in response to the current configuration and opponent shot. The game state, therefore, may also captures the decision repertoire at the game level. Note that these elements can be useful for assessment and augmentation. Augmentations can be used to learn the declarative knowledge. For many players, the movement behavior knowledge is non-declarative and therefore players act on it unconsciously.

The game states cannot transition to an arbitrarily state from one exchange to the next. The specific configuration of player and opponent result in a subset of possible actions (affordances) and subsequent states, with some more likely than others. The transitions define the game dynamics. The following provides a formulation of the tennis game dynamics based on the environment model and techniques from the machine learning framework described above (see Eq. 2-4).

FIGS. 13A-13F illustrate a sequence of events over the period of an exchange, for the tennis example. The illustration focuses on the game state, which abstracts the various behaviors in terms of the player, opponent, and shot configurations.

The legend of FIGS. 13A-13F includes references for player/opponent poses, expected shot targets, and planned shot targets. In box 1300 (FIG. 13A), an opponent strike occurs, for the current exchange (k). The player (first participant) anticipates the incoming shot or delivery based on the opponent strike and evaluates a set of return options (stage 1, planning; at $t^O_s$). In box 1302 (FIG. 13B), the player moves into strike position (stage 2, positioning). In box 1304 (FIG. 13C), the player selects a best option (target, stroke, and/or shot), based on the latest actions of the opponent (second participant), and sets up and prepares for the return stroke (stage 3, preparation).

In box 1306 (FIG. 13D), the player executes the stroke or return (stage 4, execution; at $t^P_s$). In box 1308 (FIG. 13E), the player recovers and evaluates the expected response (stage 5, situational awareness; at $t^P_b$). In box 1310 (FIG. 13F), the opponent (second participant) ball strike (or delivery) is initiated for the next exchange (k+1). The player (first participant) anticipates the incoming delivery, and evaluates return options (stage 1, planning; at $t^O_s$).

Statistical Game State Model

The definition of game state is supported by recent work in game analysis. For example, player behavior can be analyzed based on statistical spatiotemporal analysis (compare Wei 2016).

In other applications, video sprites can be synthesized from game footage. This allows for modeling the decision process of the player during each exchange (compare, e.g., Zhang 2020). The approach here uses a statistical description of the point including discretization of the estimated poses (player and opponent), the incoming shot start and bounce positions, and the player velocity to reach the strike point.

While these examples do not formalize the larger player behavior and ecosystem, they demonstrate the feasibility of modeling the patterns in tennis behavior; in particular, the prediction of the next shot based on features describing the current shot and player-opponent poses.

Game Dynamics

A game state is represented as a finite number of patterns, which describe the game configuration (including the player, opponent pose, and incoming shot). The input or action is the response of the player described by the shot target (and implicitly the strike pose, stroke).

The game environment dynamics can be described by a stochastic model similar to those used in MDPs that describes the game state transition between the current incoming shot and the next incoming shot in response to the player's return shot (FIGS. 13A-13F and 14C).

Recall that in the tennis example, the actions at the game level are the player positioning and shot target. These are used to react to the current game state and drive it to the desired value. Recall also, that the actual movements are executed by lower-level supportive behaviors in the hierarchy (e.g., as shown in FIGS. 3A-3B).

Statistical Game Model

In FIGS. 13A-13F, the game state at the game level corresponds to the configuration of the player and opponent at the time of the incoming shot (shown in FIGS. 13A and 13F as stages or steps 1 and 6). Basically, the game state describes the conditions in which the player is performing his or her action; e.g., at the shot at the level of the game. The transition map T describes the range of ways the opponent can respond to the player's action (new poses and incoming shot).

Using statistical analysis of actual game data, it is possible to describe the game state patterns (Eq. 5), and their evolution, using a probability transition (see also, e.g., FIG. 14C).

$$p(g_k)=T(g_{k-1},q_{k-1},g_k), \quad (Eq.\ 6)$$

where T is the probability transition matrix for the finite set of games states and game inputs $q_{k-1}$. The game input corresponds to the shot and movement. The transition probability therefore is expressed as a function of the player's shot decision.

The modeling problem at the task level, therefore, involves describing the game states from play patterns extracted from the analysis of performance data. Ideally, the game state includes the specific opponent dynamics. Typically, only the most proficient players can incorporate the opponent's specific strategy. Therefore, it is practical to use generic opponent models that capture the stereotypical patterns of response for different styles and proficiency levels.

Affordances

Each game state affords a finite number of shot and positioning decisions. Therefore, it is also possible to model the player's set of actions for each game state. This set represents the affordances of the player. Each environment state affords a set of actions (shots):

$$q_k \in \mathcal{Q}(g_k), \quad (Eq.\ 7)$$

where $\mathcal{Q}$ is the map from game state to possible actions (affordances). The actions are specified by the strike pose, stroke, and shot target.

The same configuration of the incoming shot and opponent pose; e.g., game state, typically has a finite number of affordances for returning a shot. The transition probability T in Eq. 6 describes the change in the game state (opponent pose and shot) in response to the player's action.

FIG. 14C depicts the evolution of the player's game state over the period of a point. The transition is depicted as a tree, which spans the possible evolution of the game from its initial state. The transition matrix T is learned from performance data. It captures the player's ability to predict the evolution of a point based on the perceived game state and his/her choice of action.

Based on the hierarchical model (FIGS. 3A-3B; FIG. 10, FIG. 11), the positioning and shot are implemented through their underlying sequence of movement behaviors (FIG. 14B), which include the court movements and shot making that will drive the game state to the desired value.

Inverse Model

Another important technique in machine learning, control, and decision making, is the inverse model. The inverse model gives the action needed to take the system from the current state to the desired state (here the game state $g_{ref}$ or g*). At the task level, this type of model would allow to determine the sequence of game states toward the goal game state.

Utility

Finally, based on decision theory, the assumption is that the agent, or player here, learns the utility of the different actions. Different game states; e.g., configurations of player, opponents and incoming shot, provide different levels of utility to the goal of winning a point. In this example, this translates in an assignment of utility to the game states $U(g_k)$. The game state affords a set of actions $\mathcal{Q}$ that result in changes in the game state, therefore the utility of a game state is based on the effect of the set of actions on the game state:

$$E[U(q_k)]\Sigma_{g_{k+1} \in G} U(g_{k+1}) p(g_{k+1}|g_k, q_k), \quad (Eq.\ 8)$$

where $p(g_{k+1}|g_k, q_k) = T(g_k, q=q_k, g=g_{k+1})$ is the transition distribution conditioned on the current state and action. Based on this criterion, the player needs to choose a shot $q_k$, within the set of affordances specified by $\mathcal{Q}(g_k)$, that maximizes the expected utility.

One challenge of this formulation is that considering the utility over one-step, such as in discrete decision problems, is not compatible with dynamic processes that unfold over several steps.

For dynamic decision problems, the goal is to maximize the utility over a trajectory such as the sequence of decisions; e.g., as shown in FIG. 14C. This is typically formulated as a dynamic program. Dynamic programs, however, are computationally expensive. In human decision making it is reasonable to assume that a subject learns the sequence of actions for a game state. In tennis, the sequence is typically finite, and most game plans typically unfold over a few exchanges.

Perceptual Model and Situational Awareness

Figure 14A:
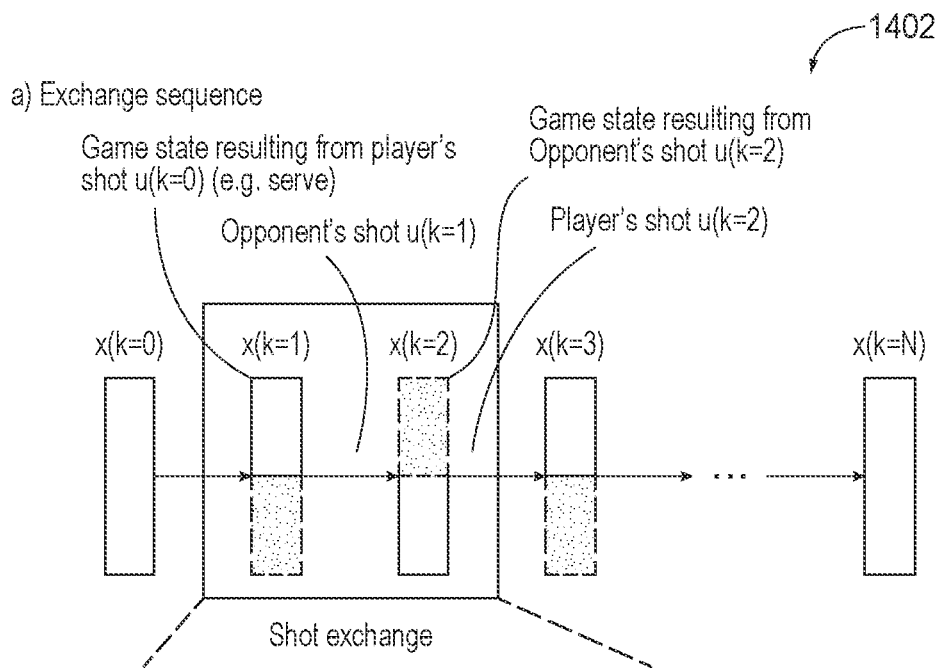
FIGS. 14A-14C illustrate game or environment state dynamics, including a sequence of exchanges and game states building a point, underlying movement behaviors, and a transition graph in terms of finite game state patterns.
Figure 14B:
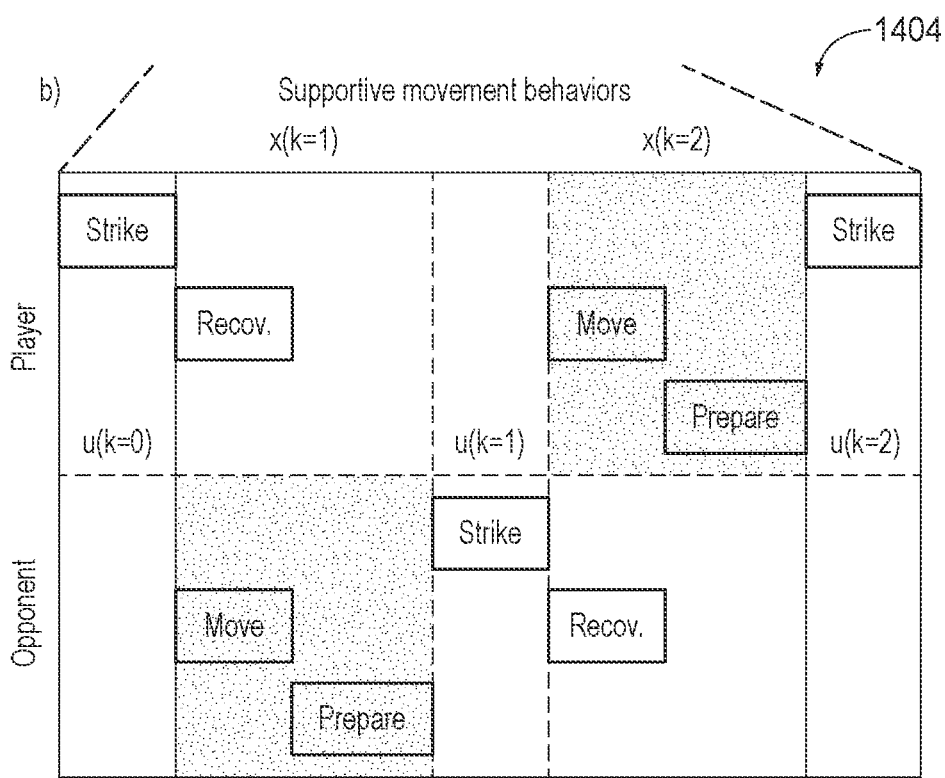
Figure 14C:
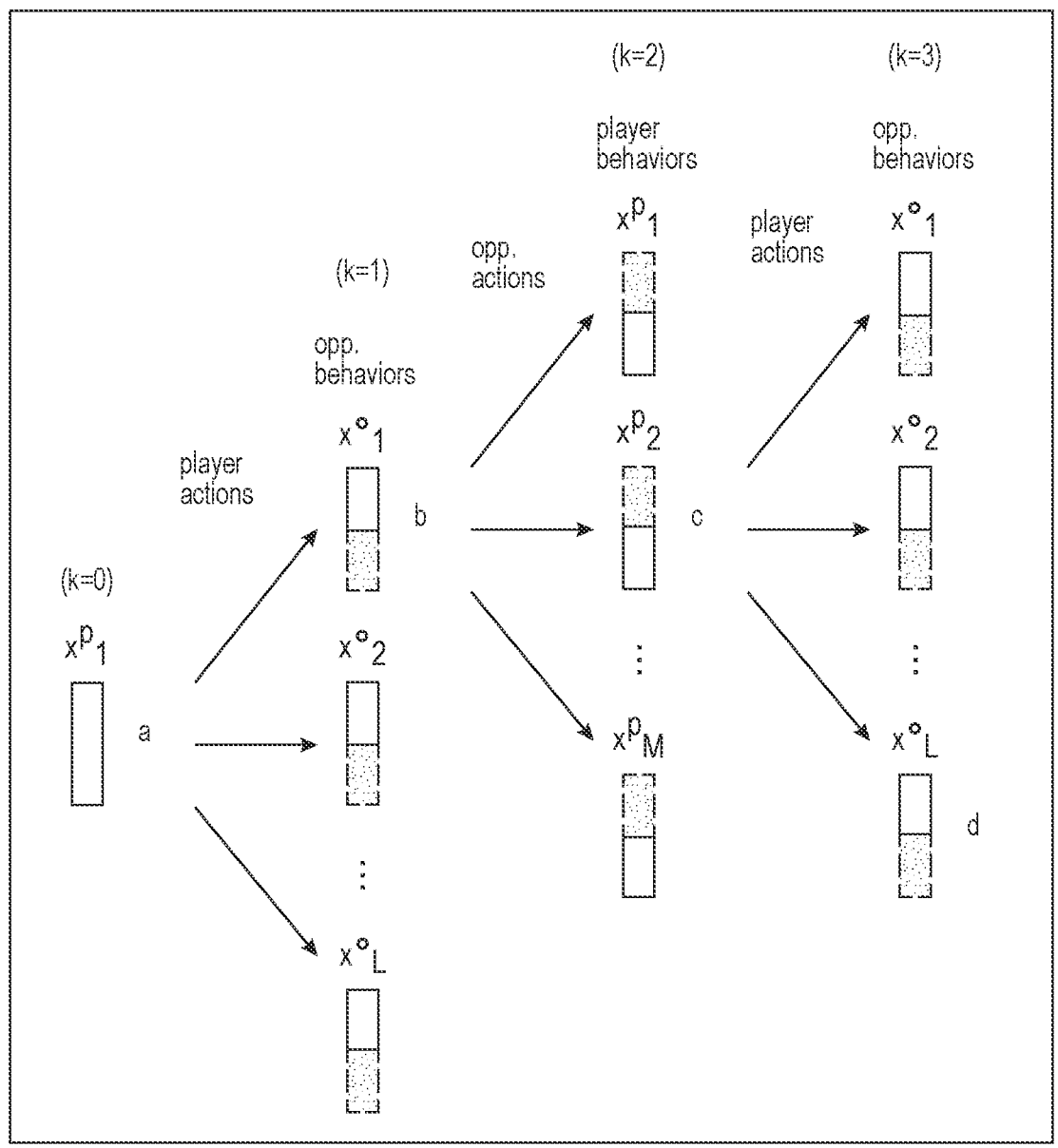

FIGS. 14A-14C illustrate the game or environment state dynamics, including (a) the sequence of exchanges and game states building a point 1402; (b) the underlying movement behaviors 1404; and (c) the transition graph in terms of finite game state patterns 1406.

The game state model is also relevant for situational awareness (SA). Situational awareness describes the ability to perceive the state of a situation and predict its evolution.

The game state captures the observable patterns of the system state, and, therefore, the following briefly describes the perception of the environment. The game state is determined from observations of the activity environment using some form of pattern detection process:

$$s_v \rightarrow \text{patterns} \rightarrow g_i, \quad (Eq.\ 9)$$

where $s_v$ stands for the visual stimuli such as provided by an optic array produced by the observation of the visual field by the eyes of the participant. The stimuli contain information about the player and opponent pose, as well as the shot. This information is first identified as patterns, which are subsequently recognized and categorized (Eq. 5).

Proficient players are able to achieve superior skills in part by memorizing chess board patterns. This has been referred to as the chunking hypothesis of memory. Similar principles are expected for the task level perception and planning in other application domains.

Chunking theory has been extended by the so-called template theory, which proposes that chunk used frequently are stored in a form of template that combines constant information (the core), with variable information. Both chunks and templates are considered a form of non-declarative memory (therefore unconscious). Based on this model, the game state can be described by a form of primary game patterns with variations that are less common but can be meaningful to more advanced players.

The patterns and transition matrix in the model (Eq. 5, Eq. 6 and Eq. 9) can be extracted from performance data, and therefore, can be used to capture and model the level of knowledge as well as key processes encompassing perception and prediction at the task level. Therefore, this represents useful information for the skill assessment and augmentation at the task level.

Tennis Decision Scenario Illustration

The following describes the planning and decision over the exchange cycle, integrating elements from the task-level model and incorporating lower-level behaviors (see time sequence in FIG. 10, FIG. 11 and FIG. 12). FIGS. 13A-13F gives an overview of the sequence of decision and actions over the exchange cycle; e.g., from opponent's shot to player's return. Key events are detailed as follows.

At the game planning level, the general goal for the player is to steer the game; e.g., environment along a favorable exchange sequence toward a goal (FIG. 14C). The goal at the task level can for example be winning the point or maintaining a specific game state such as rallying cross-court. However, since the environment is a dynamic system, a sequence of multiple actions (shots at the task level) are needed to achieve a particular goal state. Moreover, the dynamics over the period of an exchange depend on a sequence of underlying movement behaviors (FIG. 14B). Once the next game state is planned, the underlying processes deal with the execution of the sequence of movement behaviors within the exchange cycle, including the positioning and shot execution.

Planning (Steps 1-2)

At the game level, as described above, one assumption is that players use a mental representation of the game patterns. These representations can be described in terms of shot and pose patterns, which have been acquired from previous experiences and training (Eq. 5). Such representations are used as part of a forward model (c.f., Eq. 8) that allow to predict the expected opponent return and next court state or configuration, based on the current court state and actions.

The state library g E G and transition matrix T are important for assessment and augmentation because they provide the knowledge subjects need to plan the course of actions. Here in tennis, the court positioning and next shot target.

At the initial planning step (FIG. 13A, box 1), the player uses the forward model to predict the expected responses to the opponent's incoming shot afforded by the game state g (Eq. 7). With this internal model, the player can estimate the game state over the subsequent exchanges, for different shot decisions made by the player (FIG. 14C). The complete expected game state response factoring all the possible player shots at time k are given by:

$$\mathcal{G}(g(k))=\{T(g(k-1),q(k-1))|q(k-1)\in \mathcal{Q}(g(k-1))\}. \quad \text{(Eq. 10)}$$

This set can potentially be very large. Therefore, it makes sense that the player only considers the most likely states and most high-value states and actions.

The greedy solution is to only consider the best shot option q* for the current game state:

$$q_k^* = \text{argmax}_{q_k \in Q(g_k)} U(q_k) = \text{argmax}_{q_k \in Q(g_k)} \Sigma_{g_{k+1} \in G} U(g_{k+1}) P(g_{k+1}|g_k, q_k). \quad \text{(Eq. 11)}$$

Eqn. 4.7 gives the optimal action if the utility function is correct. If the utility function is an approximation based on an n-step look ahead, this equation gives a greedy solution.

However, the issue is that focusing on the decision one step ahead will generally not give the optimal sequence to reaching a goals state such as winning a point. The optimal decision sequence is to determine action sequence by maximizing the utility-to-go (or minimizing the cost to go as is commonplace in engineering formulations.

In engineering, optimal sequence of states and actions (game states and shot decisions) is computed solving a dynamic program. This approach, however, is not tractable for human decision making. The general idea, as presented under the game state abstraction, is that players in addition to game patterns also learn game plans; e.g., sequences of game states or sub-sequences, for example in chess.

Positioning (Steps 2-3)

Once the plan (shot and pose) for the next exchange has been determined, the player has to make decisions and execute movements for the underlying movement control level within the exchange cycle to achieve the plan, starting with the ground movement (FIG. 7 and FIG. 25). This requires additional decisions to deal with the uncertainties of the game process.

Before taking position, the player seeks cues from the opponent's behavior, and/or the early shot trajectory to estimate the ground impact of the opponent's shot (FIG. 13B, box 2). Cues can, for example, include player stroke preparation, or later, the actual shot leaving the racket (see FIG. 25). The information is used to update the game state within the current exchange period. This is necessary because the task-level decision is made based on approximate information.

The player uses knowledge from past experience to predict the bounce location, giving time to get into position and, at the same time, finalize the shot decision (target and stroke). The update in incoming shot can be described in terms of Bayesian probability. The brain has been shown to combine prior knowledge with observations consistent with the predictions from Bayesian probability. The player's shot observation corresponds to the likelihood of the shot bounce location, this information can be combined with knowledge from the past (prior) to compute the probability of the bounce (posterior).

$$p(x|o)=p(x)p(o|x)/p(o), \quad \text{(Eq. 12)}$$

where x is the bounce location and o the observation. The continuous estimate of the bounce location can be explained, for example, using a Kalman Filter process.

The estimate of the bounce location of the incoming shot is used to direct the player ground movement (FIG. 13C, box 3). The ground movement is executed through a repertoire of footwork patterns, described by the left-right foot sequence, which allows for accommodating a range of configurations between the player current pose and the anticipate strike pose (see, e.g., FIG. 7 and FIG. 25). Also critical is the ingress conditions that are needed to achieve the proper setup, including which foot and the resulting stance, which is implemented in the preparation stage.

Preparation (Step 4)

Once the player is approaching the strike pose, the sensory-motor coordination with the incoming shot is needed to get the body posture and stroke motion ready for the stroke execution. The preparation and setup are used to produce the exact conditions for the racket strike. The stroke and ball impact outcomes are determined by these conditions.

The outcomes specified in the task planning step, and specified by the game state, is an approximation. During the preparation step, the most up-to-date information about the game state and the specific strike environment are used to finalize the shot outcome and setup. For example, during the preparation the player can update the shot outcomes based on opponent behavior (FIG. 24). However, the options for these last-second changes are typically more limited.

Given the desired outcome, and the environment settings that are determined by the pose and incoming shot, the player makes pose adjustments and sets up the stroke (back swing to back loop phases and forward swing initial conditions).

An inverse model can be used to determine the action for the desired outcome. In the present case the exact posture, stroke technique, that will give the stroke conditions leading to the desired outcome.

The strike outcome is a function of the strike condition and the stroke technique. The outcomes can be divided into primary outcomes $\theta_1$ (spin $\omega$ and pace V of the ball leaving the racket) and shot outcome $\theta_2$ (e.g., shot direction p, length L, and height H).

$$\theta_1 = \Theta_1(\gamma, c), \text{ and} \qquad \text{(Eq. 13a)}$$

$$\theta_2 = \Theta_2(\gamma, c, x_p); \qquad \text{(Eq. 13b)}$$

where $\gamma$ is the strike condition (relative motion between the ball and racket) and s is the stroke class (describing its technique; e.g., movement functional structure). The strike condition can be described by the following function:

$$\gamma = \mathcal{F}_{b,c}{}^\gamma(l_s), \qquad \text{(Eq. 14)}$$

where $l_s$ is the distance between the bounce location and the strike point measured along the incoming shot path, and b and s, are respectively the bounce type and stroke class.

Note in the above relationships that several details are approximated, for example, the outcomes for a given bounce b type and stroke class s are a function of the strike conditions. Here, it is assumed that the stroke class variable s captures the comprehensive player posture and stroke execution configuration, and the bounce type captures the relative environment characteristics.

Execution (Step 5)

Execution is primarily a control problem. It deals with the precise synchronization of the stroke with the incoming shot to produce the racket strike conditions needed to achieve the desired outcome. At this time, the conditions for the execution are set (Eq. 14). The stroke execution deals primarily with the racket movement profile during the forward swing stroke phase. This movement needs to be precisely coordinated relative to the incoming ball.

The control profile and its timing, including, for example, the magnitude of the racket acceleration, can be modelled using Tau guidance. Tau theory describes the perceptual mechanism used to coordinate between the sensory gap (here the incoming ball relative to the strike point) and the motion gap (the gap between the racket pose and the strike point). Note that the forward-swing execution phase takes place within the time frame (100 msec) for which no cortical feedback loops are possible; the control modulation in the forward swing stroke profile is implemented by subcortical loops which have more limited control capabilities.

IV.III Environment Control Decision-Making Processes

Next, the tennis example is used to formalize the decision process for the positioning, preparation, and execution, which are referred to as the environment control processes. The formulation focuses on the specification of key variables that are needed to control the spatial behavior.

This understanding will in turn help determine performance assessments and diagnostics for open control skills, and eventually, also help determine how these processes can be augmented.

Skill elements are defined by a finite domain of operation. For tennis strokes, the operating domain is defined by the range of outcomes and strike conditions (see Eq. 13a-13b). Therefore, to satisfy these constraints on conditions that are imposed by the desired shot outcomes (Eq. 13a-13b and Eq. 14) a player must precisely steer his or her position relative to the incoming shot. Moreover, since the positioning unfolds in parallel with the incoming shot, the player must predict the strike point and shot's bounce location (see, e.g., FIG. 7).

Given these constraints, players and other participants in a task or activity cannot select their desired outcome arbitrarily, but at minimum they should select outcomes that satisfy the conditions and game states. To have more control over the outcomes, players should create the conditions for the desired outcomes, albeit still within the constraints of the game state. The following describes a mathematical model of the coordination between the planning process and ground positioning movement, the preparation, and the stroke movement execution (see FIG. 15).

Control of Conditions

FIG. 15 is a schematic illustration 1500 of the hierarchical process flow for the formal analysis of the tennis example.

FIG. 15 illustrates the planning, decision, and control system model for the tennis example. The task planning is based on a forward model that propagates the current game state to the best next game state. This model includes the associated macroscopic action (in tennis, the strike poses and shot references) needed to achieve this next state. This knowledge is used during the exchange to control the players positioning, preparation and stroke execution. Notice the nested process; e.g., how the positioning determines the conditions for the preparation, and the preparation, and in turn, determines the conditions for the execution.

Note also that the output of the inverse model are the references for the system that will implement these movements. The movements are implemented by a feedback policy that takes as input the reference movements determined by the inverse models and feedback from the environment. The policy is a technical description of the sensory-motor schema or general motor program used for the implementation of movement behavior in the subject.

The plan may be potentially updated during the exchange. This update process depends on the skill level. A proficient player, with superior situational awareness (SA), can perceive and predict the game state at the critical times, such as the opponent strike and continue to maintain SA throughout the period of the exchange. In contrast, a novice player will only be able to obtain partial SA with limited anticipation, resulting in mostly reactive performance.

Furthermore, since the player pose and strike conditions determine the feasible outcomes (Eq. 32a-13b and Eq. 14), the positioning choice should account for the desired outcome. Moreover, the desired outcome is also influenced by the opponent position during the exchange (FIG. 24). Therefore, the player should move to position as a function of the desired shot outcome, opponent shot outcome (incoming shot), and the opponent position.

Figure 16:
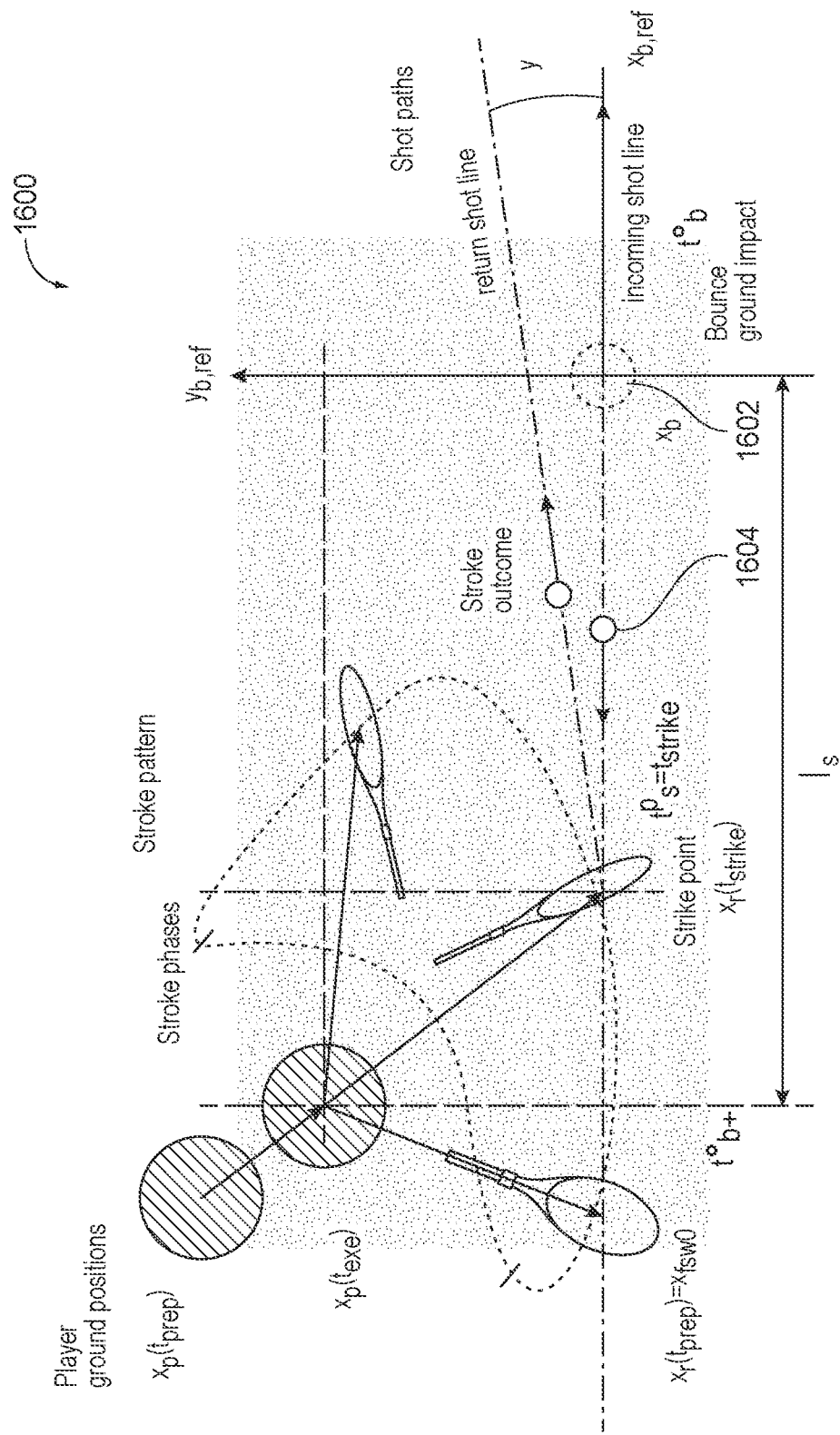

FIG. 16 is a schematic illustration 1600 of the execution phase, including the conditions at the preparation time, execution time, and during the follow through. The reference system for execution is the bounce location $x_b$ (coordinate axes $(x_{b,ref}, y_{b,ref})$).

The decision and control across the hierarchy is determined by inverse models, which are the three inverse models for the positioning 1514, the preparation 1516, and the execution 1510, respectively (FIG. 15). The output of these models are the control actions and the reference states needed to achieve the outcomes specified by the plan. In the following, an asterisk ("*") denotes the optimal reference value for the conditions driving the behavior, and the control action used to attain this value is denoted by the variable u.

This process forms the basis for augmentation of the player's decision and perceptual processes. From an assessment standpoint, these models can be recovered from performance data (together with the distributions that determine the conditions of operation). This information can be compared to normative models to generate inputs for training and cueing.

Ball Strike Equation

The primary control task for the tennis player is to intercept an incoming ball in a manner that produces precise striking conditions, which, in turn, will enable the player to produce the desired shot outcomes, expressed by the returning ball state and trajectory. Therefore, the first part of the model focuses on the ball-strike interaction.

The first step in the derivation of the environment control is to model the ball strike, considering the relative motion between the player, racket, and the ball, including the player court positioning in relationship with the incoming shot. The global racket pose is given by:

$$x_r = x_p + x_r^P, \quad (Eq.\ 15)$$

where $x_r$ is the absolute racket pose on the court, $x_p$ is the absolute player pose on the court, and $x_r^P$ is the racket pose during the swing relative to the player's pose (see FIG. 16).

The ball-racket strike implies that at the strike time $t_{strike}$, the racket and the ball are at the same place in space:

$$x_{strike} = x_{ball,strike} = x_r;\ t = t_{strike}. \quad (Eq.\ 16)$$

The anticipated strike point therefore drives the player court positioning. In addition, at the strike, the ball, and the racket should be at specific states to ensure that the strike results in the desired impact conditions and ultimately shot outcome. These requirements drive the more precise position and dynamics of the body and stroke dynamics just before the strike.

Strike Conditions and Desired Outcome

Given the desired strike and shot outcome (spin and velocity ω, V, and shot height and length H, L), the inverse model of Eq. 13a-13b specifies the ball state at the strike (ball velocity angle of attack and magnitude $\gamma_s^*$, $V_s^*$) that is required to produce the desired strike outcome, and the corresponding player pose (expressed relative to the bounce location).

The resulting player pose is expressed as the setback is from the shot bounce (see, e.g., 1602 in FIGS. 16 and 2602 in FIG. 26), which is used by the player to determine the strike point and ultimately the positioning relative to the incoming shot.

This inverse model relationship can be specified by a series of lookup tables or maps:

$$(\omega^*, V^*) \rightarrow (\gamma_s^*, V_s^*) \rightarrow l_s^*. \quad (Eq.\ 17)$$

The strike point expressed relative to the incoming shot's bounce point is given as:

$$x_{strike}^* = x_b + x_{p,strike}^{b,*} + x_{r,strike}^{P,*} = x_{r,strike}^{b,*}, \quad (Eq.\ 18a)$$

where $x_b$ is the incoming shot's bounce-point location (FIG. 16). The player offset from the bounce point includes lateral and longitudinal components:

$$l_{s,x}, l_{x,y} = x_{p,strike}^b. \quad (Eq.\ 18b)$$

Player Positioning

The player's pose is determined relative to the strike point, considering the bounce that can be used as position reference by the player:

$$x_{r,strike} = x_{p,strike} + x_{r,strike}^P = x_{strike}^* = x_b + x_{p,strike}^{b,*} + x_{r,strike}^{P,*} \quad (Eq.\ 19)$$

The player is usually in position at the instant of the stroke forward swing initiation (the exception is so-called running strokes where the player is moving during the stroke initiation and ball strike). The racket swing relative to the player can be decomposed into two components:

$$x_r^{P,*} = x_{r,prep}^{P,*} + x_r^{fsw,*}, \quad (Eq.\ 20)$$

where $x_{prep}^P$ is the racket pose relative to the player at the preparation time $t_{prep}$, and $x_r^{fsw}$ is the forward swing motion relative to the prep racket pose, which corresponds to the execution phase. At the strike instant:

$$x_{r,strike} = x_{p,strike} + x_{r,prep}^P + x_{r,strike}^{fsw} = x_b + x_{p,strike}^b + x_{r,strike}^P. \quad (Eq.\ 21)$$

Solving for the player's pose:

$$x_p^* = x_b + x_{r,strike}^{b,*} - (x_{r,prep}^P + x_{r,strike}^{fsw}). \quad (Eq.\ 22)$$

Therefore, the reference player's pose used to drive the player's ground movement relative to the incoming shot, can be expressed by the following three components:

$x_b$: The bounce location, which is considered a cue. Before it is observable, the player can anticipate this location from the shot and opponent behavior.

$l_{s,x}^*$, $l_{s,y}^*$: The player setback from the bounce point, which, along with the racket pose ($x_{r,strike}^P$) determines the strike conditions and are determined from the desired outcome (ω*, V*) and bounce kinematics ($\theta_b^{**}$, $V_b^*$).

($x_{r,prep}^P + x_{r,strike}^{fsw}$): The initial swing preparation and the forward swing phase.

During positioning, the player also perceives opponent movement and can potentially update their desired shot target location in response (e.g., according to a tau model as shown in FIG. 24).

Preparation and Setup

The swing displacement $x_r^{fsw,*}$ is generally small relative to the player court displacement ($\Delta x_p = x_p - x_p^*$), which explains why the gross court movement can be initiated based on the estimate of the strike point, but finer adjustments are needed closer to the strike time, when more precise information is available. The preparation stage typically includes adjustments in the positioning (adjustment steps) to adapt to uncertainties and make potential last second changes in desired shot outcomes.

After the players determined the court position, and the bounce location and incoming ball state are more precisely known, the operating environment for the stroke preparation and setup is also more clearly established. This environment information can then be used to determine body and arm movements for stroke preparation, and for setting forward swing initial conditions.

The operating environment at the stroke preparation time includes:

The player's pose relative to the bounce: $x_{p,prep} - x_b$

The incoming ball state: $x_{ball,prep}$

The player needs to gain information about the operating environment to setup the stroke and potentially revise the desired shot outcome. These operating environment parameters allow the player to specify the swing preparation and positioning. These updates can be used to compensate for uncertainties in the bounce.

The final stroke and setback quantities are determined similarly to the setback in the first stage of ground movement but at higher resolution and considering the stroke and posture. The desired outcome and incoming shot conditions are used as inputs to an inverse model to determine stroke initial conditions $x_{r,prep}^{P,*}$ and final $x_p^*(t_{prep})$. Thus:

$$(\omega^*, V^*)_{t_{prep}} = \mathcal{F}_{b,s}^{\gamma} \gamma_s^*, V_s^*)_{t_{prep}}, \text{ and} \quad \text{(Eq. 23a)}$$

$$(\gamma_s^*, V_s^*)_{t_{prep}} = \mathcal{F}_{b,s}^{l}(l_s^*)_{t_{prep}}, \quad \text{(Eq. 23b)}$$

Note that the pose is defined relative to the bounce point, which assumes that the player has an internal model of the bounce that enables them to make decisions about the pose and stroke behavior.

Racket Stroke Setup

The swing parameters are expected to be specified at the end of the preparation stage, once the adjustment motion, which is defined by the bounce and setback $(x_b + l_s^*)$, has been performed.

At that point, more precise information about the incoming shot, in particular the bounce point and bounce characteristics $\theta_b^*$, $V_b^*$, and the anticipated ball strike conditions are available. The player can then prepare the stroke $(x_{r,prep}^*)$.

The stroke motion is defined based on the racket head relative to the anticipated strike point. The relative racket position at forward swing initiation is defined as:

$$x_{r,exec}^p = x_{r,exec} - x_{p,exec}. \quad \text{(Eq. 24)}$$

Similarly, to the final pose, the swing's initial condition is determined by an inverse model. First, the desired outcome determines the desired strike conditions:

$$(\omega^*, V^*, L, H) \xrightarrow[\mathcal{F}_{b,s}^{y}]{} (\gamma_s^*, V_s^*)_{t_{prep}}. \quad \text{(Eq. 25a)}$$

Subsequently, the strike conditions determine the initial conditions:

$$(\gamma_s^*, V_s^*)_{t_{prep}} \xrightarrow[\mathcal{F}_{b,c}^{s}]{} x_{r,exec}^{p,*}). \quad \text{(Eq. 25b)}$$

Note that both are most likely determined for a specific context. First, the knowledge of the bounce type, and second, the stroke class.

Racket Stroke Execution

The initial conditions $s_0(t_{exe})$ provides the necessary setup for the desired outcome and state of the operating environment, such that the forward swing can proceed nearly automatically (within the selected stroke class).

The forward swing initiation and modulation is directed at intercepting the incoming ball, which requires precise spatial and temporal coordination. Therefore, it is expected to be performed through mechanisms such as perceptual guidance (time to contact, tau theory).

The so-called tau coupling perceptual control mechanism is based on coupling sensory tau with a motion tau. In the case of the racket forward swing, the sensory tau is provided by visual perception of the incoming ball, and the movement tau corresponds to the forward swing motion (see, e.g., 2604 in FIG. 26).

This type of perceptual mechanism is expected to play an important role in many activities or tasks where movement execution must coordinate with task and environment elements.

In addition to the perceptual mechanism, the subject also learns the control profile that coordinates the different degrees of freedom of the forward swing (body and arm segments). Given the fast movement, the motor control law relies heavily on a feedforward control policy based on an inverse model. The inverse model takes the relative ball state (cue) and stroke outcomes (primary and shot) to determine the racket's forward swing profile:

$$(\omega^*, V^*)(L, H) \rightarrow x_r^{fsw,*}. \quad \text{(Eq. 26)}$$

Given the swing profile for the racket, an inverse model specifies the movement profile for the body and arm segments:

$$x_r^{fsw,*} \rightarrow \text{Arm and body segment profiles.} \quad \text{(Eq. 27)}$$

Figure 27:
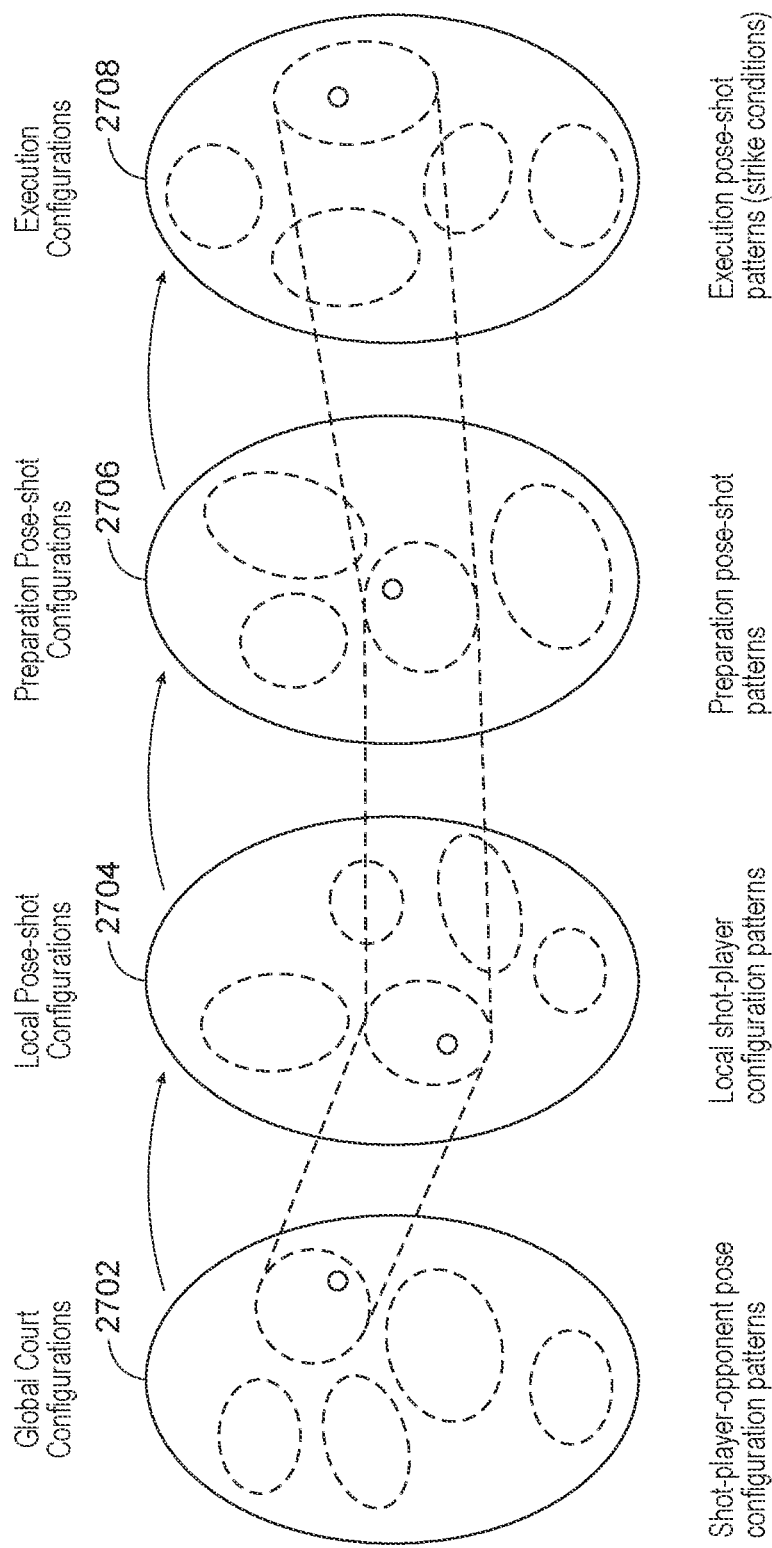
FIG. 27 is an illustration of mapping in distribution patterns for configurations and conditions at different levels and stages of behavior organization.

This example illustrates the quantities that can be modeled in the statistical model of FIG. 27 described in the diagnostics section.

V. Open-Motor Skills Modeling

This section details the modeling process for the tennis example detailing the behavior's functional aspects at each level of hierarchy in the formal model in FIG. 15. The physical system is described, as well as the process flow, including the extraction of information from performance data and the characterization of behavior elements supporting activity performance at different levels of task or activity interactions, then details behavior element's modeling for the tennis example.

The skill model is the basis of assessments and diagnostics. It makes it possible to determine precise attributes and characteristics of the perceptual, control, and decision-making, at each level of the hierarchy (see FIG. 15). The model also plays a key role in the synthesis and implementation of augmentation and feedback to the performer both to help improve skill learning and performance.

V.I Modeling Process Overview

The modeling approach can be extended to consider the hierarchical organization supporting the task or activity environment interactions (compare, e.g., U.S. Pat. No. 10,854,104 B2 and U.S. Publication No. 2121/0110734 A1, and U.S. Publication No. 2019/0009133 A1). Therefore, an important aspect of modeling is the model of the environment that define the movement element's operating conditions resulting from the larger task interactions (FIG. 1).

Two main tasks in the comprehensive modeling and assessment of skills are: (1) determining the specific behavior elements with their associated environment elements, and 2) subsequently integrating these into the activity interaction model and its characteristics (as was illustrated in the formal tennis modeling and summarized in FIG. 15).

Description of the Physical System

FIG. 17 is a schematic illustration 1700 of an interaction between a stroke motion and task and environment elements, including ball trajectory relative to the court, the impact of the ball, and bouncing before interception with the racket trajectory. The figure also illustrates the gaze of the player along different points of the ball trajectory and court locations and shows a ball machine as an apparatus that can be programmed to enable different forms of interactions targeting different areas of training.

The activity is instrumented to capture relevant measurements of the subject(s), object, and environment interactions. FIG. 17 also shows a tennis player 10 and an opponent on a court with motion tracking cameras 70, racket embedded motion sensor, and gaze tracking and AR glasses 80. More specifically, FIG. 2 illustrates an augmented activity in which a sequence of movement elements is a stroke moving an end effector (e.g., racket or hand) 20 toward impact with task or activity object 30 such as a ball. The operating environment 50 include a court with environmental features or elements including court markings or other boundaries 51 and a net 52, along with the surrounding terrain of the environment 50. A wearable motion sensor device 62 can be provided, along with one or more additional motion sensors (e.g., video sensors 70 and acoustic or radio frequency (RF) motion sensors 90), and adapted to track the motion of subject 10 in the operating environment 50, and to generate sensor output characterizing the motion of the subject body 10 and individual body segments 15 (such as legs, feet, arms, hands, head, torso, etc.) with respect to the features of the environment 50, as well as the end effector 20 and other objects 30. An augmented reality system or other cueing device 80 can be configured to generate audio, visual, and tactile cues for the subject 10, and provided with a sensor system adapted to track the visual gaze (or gaze vector) 81 of the subject 10. The gaze vector 81 can define the focus of visual attention of the subject 10 with respect to the end effectors 20, objects 30, and environmental features 50, 51, and when tracking visual cues such as a net crossing 31, ground impact 32, object trajectory (ball path) 36, other interaction between the object 30 and the features of the environment 50.

Motion of the end effector 20 defines a path 26 with respect to the environment 50, as defined by a series of motion behavior elements defining one or more turns or other phases, and transitions 27 between turns or phases. An apparatus 40 can also be provides to manipulate objects 30 in the environment 50, for example a ball machine.

Activity Measurements

Modeling the movement behavior interactions and underlying sensory-motor processes in open motor tasks or activities requires measurements of the comprehensive agent behavior, including the movements and actions associated with the interactions with the task and environment elements, and possibly the perceptual behaviors such as visual attention of the performers.

FIG. 17 illustrates a tennis activity with a motion capture system combining video, motion data from equipment embedded sensor, and gaze. The system is designed and adapted to obtain high-fidelity information of both the environment and the movement elements. To obtain a sufficient information for comprehensive behavior and activity modeling, it may be necessary to integrate different sources of information. For tennis, a suitable solution is to combine video analysis together with analysis of movement data from embedded motion sensors to capture the activity interactions (see, e.g., the tennis activity shown in FIG. 4 and FIG. 9).

The goal is to capture measurements of the activity elements necessary to identify key interactions and associated events. In tennis, most of the events involve the ball (shot and environment interaction, ball-racket interaction). In addition, the goal is to capture accurate measurements for the movement behavior units at organizational level.

FIGS. 19A-19E show the body segment pose configuration in relationship with the incoming ball and court extracted from video images at different stages (positioning 1902, preparation at ball ground impact 1904, forward swing initiation 1906, strike 1908, and follow through 1910). FIGS. 19A-19E also show pose estimations 1912, 1914, 1916, 1918, and 1920 superposed onto the body images.

The combination of video capture and wearable motion sensors provides an effective setup to capture performance at the different levels of interactions for various activities. Video enables comprehensive capture of the activity and its environment, but typically operates at a lower spatial and temporal resolution (as shown in FIGS. 19A-19E). Conversely, motion sensors, such as those based on inertial motion units (IMU), typically have high dynamic range and spatial resolution, but the information captured is usually limited to the sensor physical location (e.g., on a racket, body segment, or ball).

Note that other measurement systems can be considered, including optical (marker or marker-less), radiofrequency systems (based on Doppler shift of an RF signal), or even GPS. For example, one or more transmitter marker tags can be affixed to one or more objects or body segments, and use to determine position information. Radiofrequency based techniques are also attractive because they can overcome issues with occlusion in video-based systems, as well as the need for more than one camera.

Modeling Approach—Overview

The general approach of the modeling process is to extract the behavioral patterns accounting for their hierarchical organization (FIG. 15), and, at the same time, delineating the various behavioral elements supporting the task interactions. The movements that support the interactions are characterized by distributions in their various attributes. Movement patterns can be analyzed (see FIG. 8) to delineate them into different categories and classes forming the subject's overall movement element repertoire.

The modeling task can be conducted in a bottom-up or top-down fashion, or a combination of the two. When modeling complex tasks or activities, the performance data are often first analyzed based on the activity structure (top-down). The goal is to determine the task structure hierarchy and interactions and the natural structural characteristics of human behavior and its organization (see FIG. 9 and FIG. 11 for the tennis example). The first modeling step, therefore, is to determine a model structure capturing the sensory-motor (or perceptual-action) processes for the relevant movement elements. The combination of a bottom-up approach is indicated when behavior elements are emergent and depend on individual factors including skills. Knowledge about the behavior units and their organization can then be used to determine the behavioral states and their abstractions for activity representation and behavior organization. This level of analysis is useful for task-level models (e.g., game state in tennis).

Figure 18:
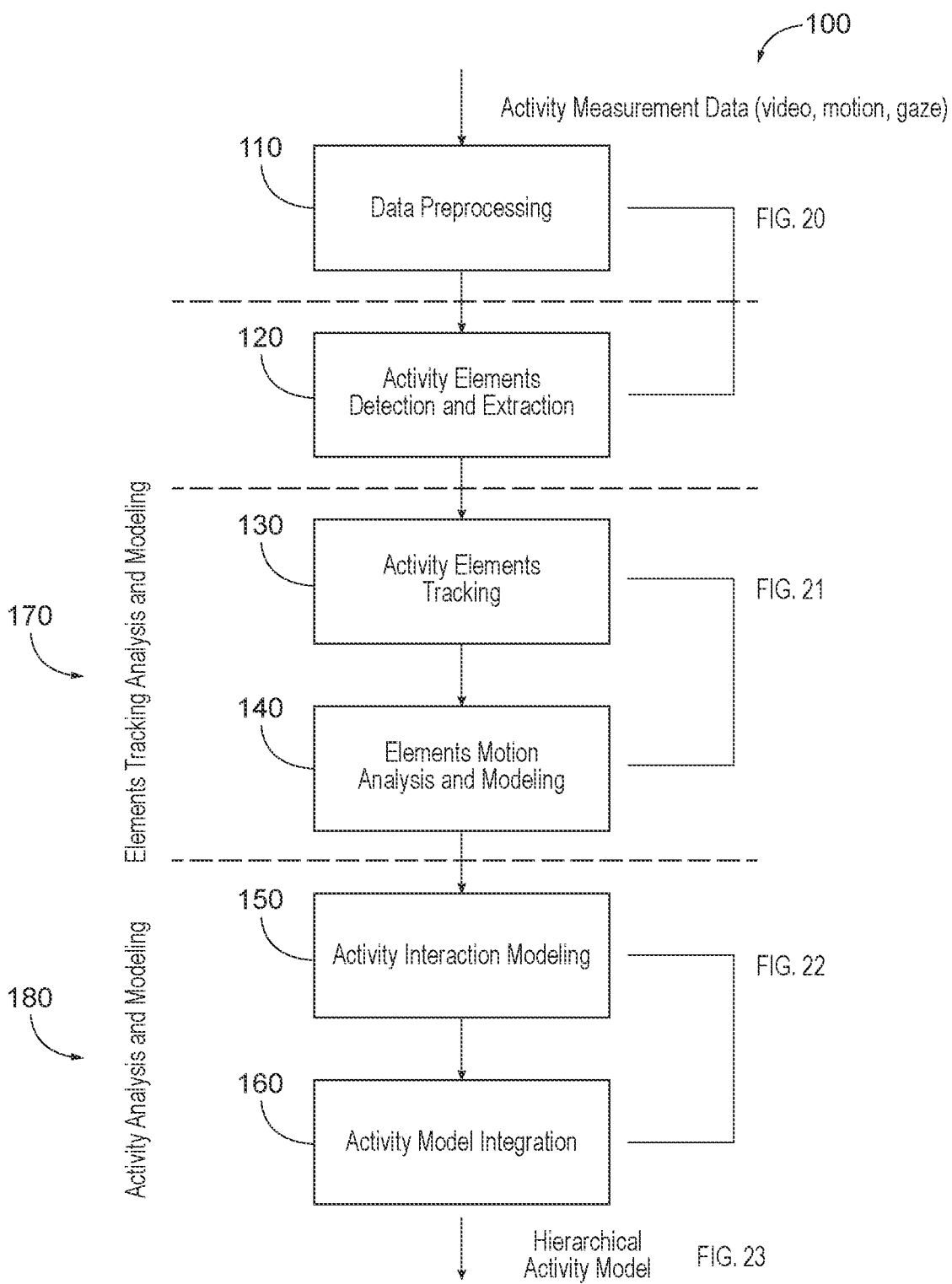
FIG. 18 is a block diagram overview of modeling and analysis process flow.

The following provides a description based on the overall modeling process flow, highlighting key steps in the transformation of the data and information. FIG. 18 shows an overview of a possible process 100 for the modeling and analysis of an open motor task or activity. Note that progress in machine learning approaches, in particular deep learning using artificial neural networks, can replace classic computer vision techniques and can also be applied for activity detection and modeling. The process flow description provides a functional perspective of the approach. The steps and components that are outlined represent a system description to help understand the levels of representation and key quantities needed to model, assess, and augment skill in open motor tasks. This system may or may not reflect how the information is processed in a deep learning or other approach.

The process 100 in FIG. 18 has four major components: data preprocessing (step 110), activity elements detection and extraction (step 120), elements tracking and modeling (step 170), and activity tracking and modeling (step 180). The overall goal of these steps is to determine the hierarchical activity model.

The activity performance measurements are first preprocessed (step 110) to extract low-level features that are needed to capture the activity environment elements and their movement from the measurement data. The features may be integrated to enable description of the objects and elements (step 120). Once the elements are defined, they can be used to track their behavior throughout the activity (step 130). Information about the elements' behavior can then be then used to determine the elements motion models accounting for their local interactions (step 140). The movement and task activity elements may include key activity objects and environment elements and their relationship. The movement elements and their movement characteristics can be used to analyze and model task level activity patterns (step 150). This information can then be combined to form the activity interaction model (step 160).

Figure 20:
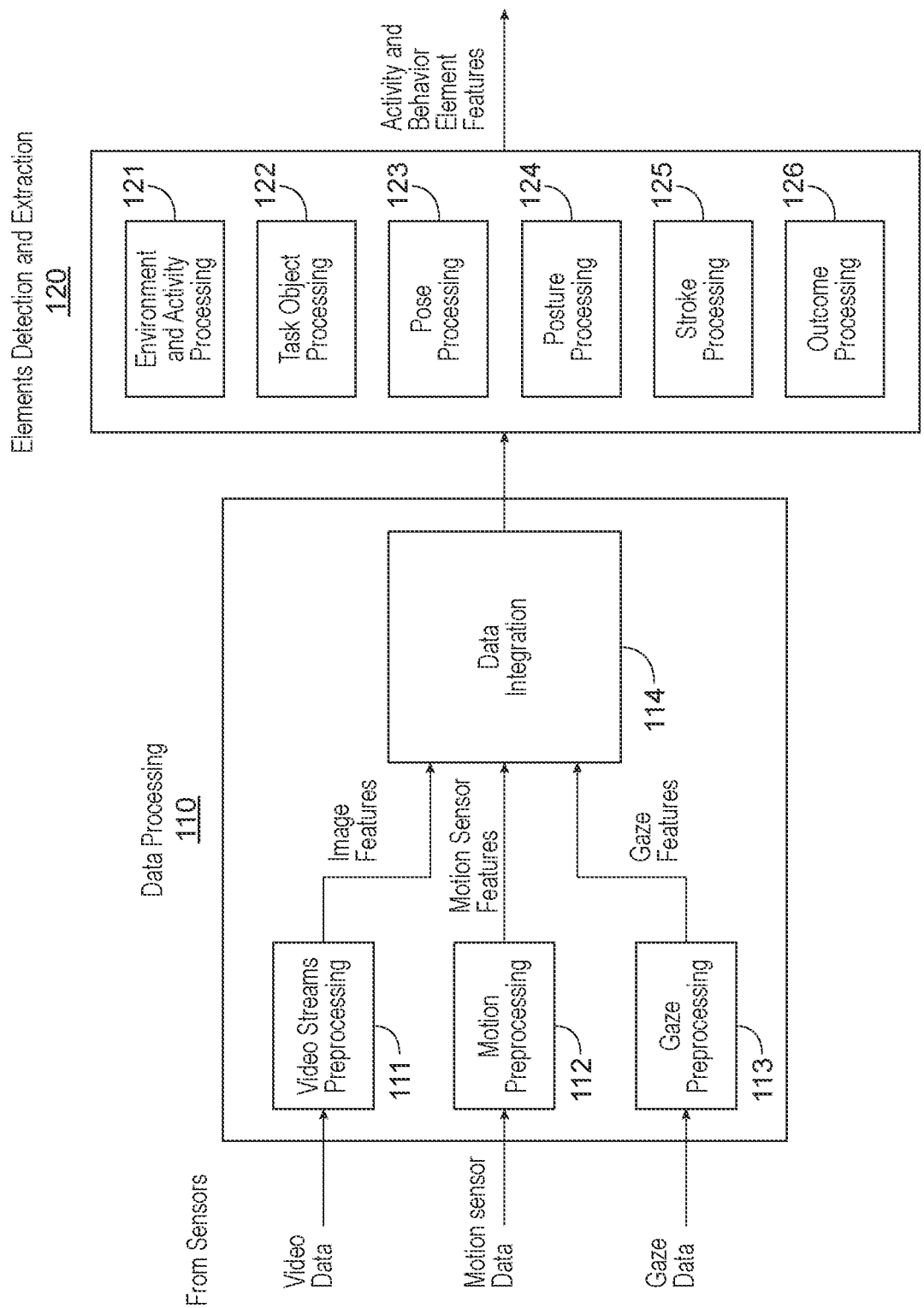
FIG. 20 is a block diagram illustrating a method for tennis data preprocessing and element detection and tracking combining vision, motion sensor, and gaze measurements.

FIG. 20 provides an overview of a preprocessing and elements feature extraction process flow for activity measurement data such as video, motion sensor, and gaze data 110. Data preprocessing deals with all the lower-level processing steps. For example, in the tennis application, it encompasses various video analysis steps including, the calibration of the court, the camera pose estimation, color filtering. In addition, preprocessing can include the registration of key environment features, such as the court boundaries, net, etc., as well as features associated with the subjects, their equipment, and end effector. The process may also require integration of the measurements or features 210, such as different camera views or motion data and video features.

FIG. 20 also shows a process flow for data preprocessing and elements detection and extraction 120. Recall that the definition of behavior elements emphasizes the idea that behaviors in open motor tasks emerge from the environment interactions and, therefore, the movement elements should be extracted with their associated environment features.

Figure 21:
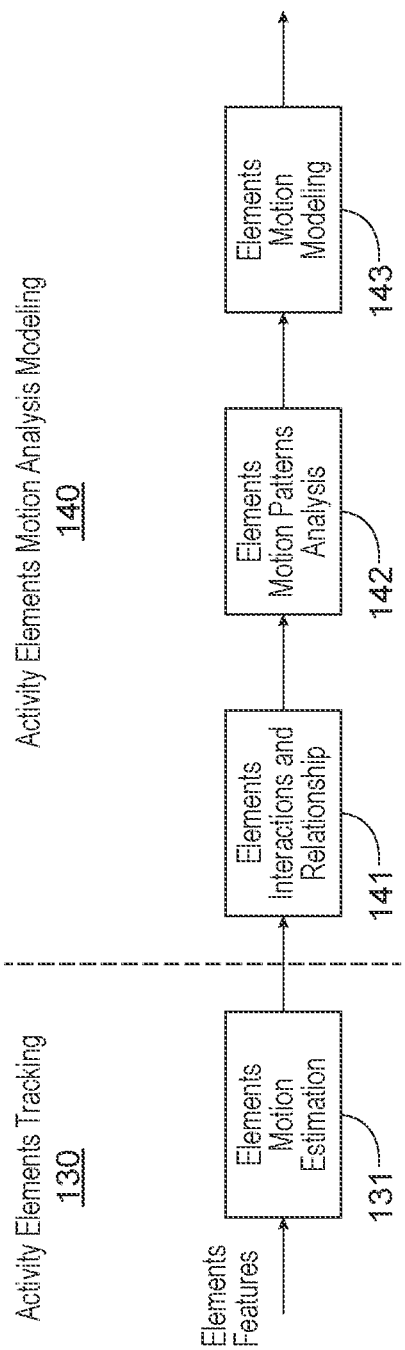
FIG. 21 is a block diagram illustrating elements tracking motion analysis and modeling.

FIG. 21 shows a process flow for element tracking, analysis, and modeling. Suitable elements tracking and modelling include, but are not limited to, activity elements motion estimation 131, identification of activity elements interactions and relationships 141, elements motion patterns analysis 142, and elements motion modelling 143.

Figure 22:
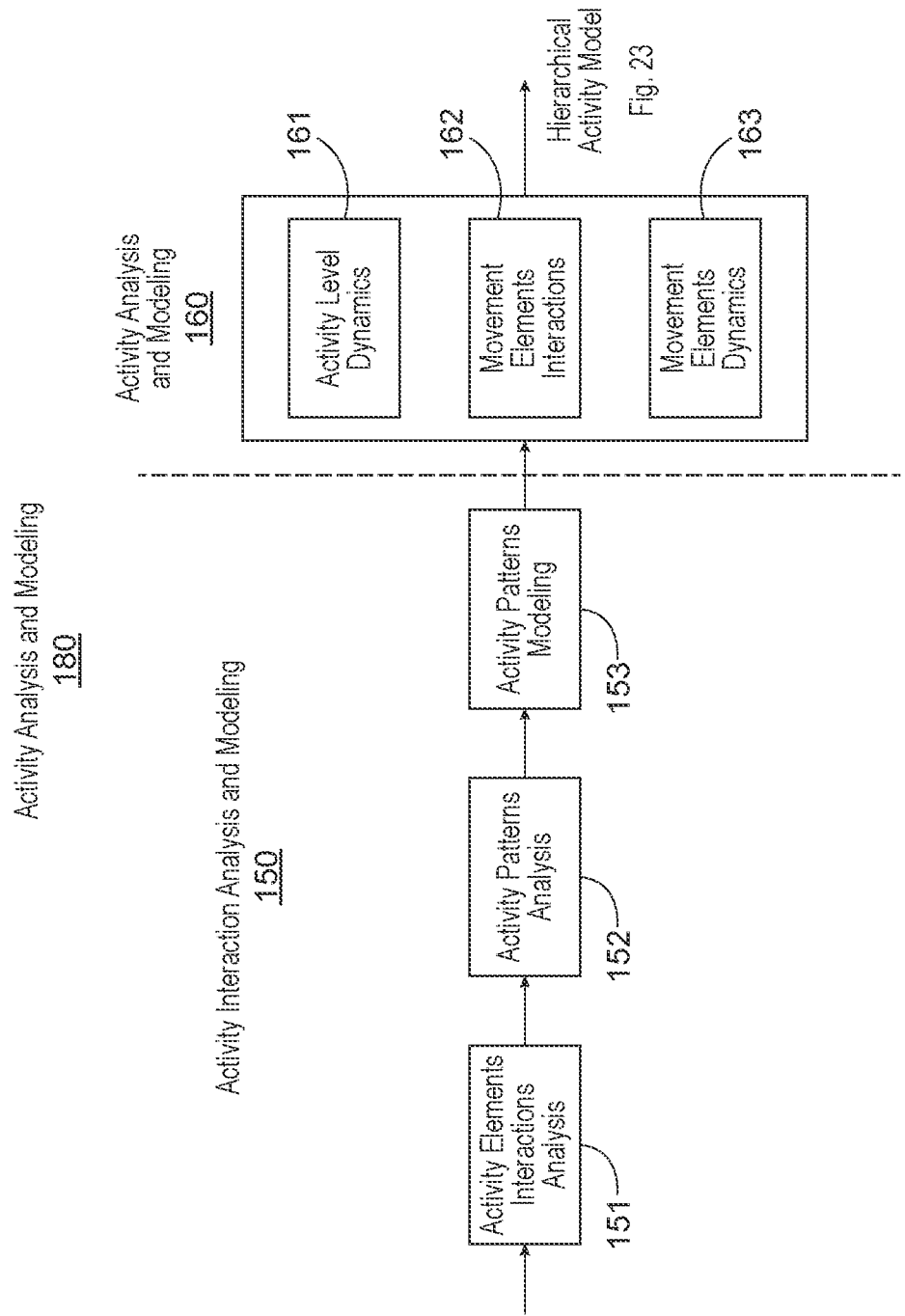
FIG. 22 is a block diagram illustrating activity interaction, analysis and modeling used for the activity interaction model.
Figure 23:
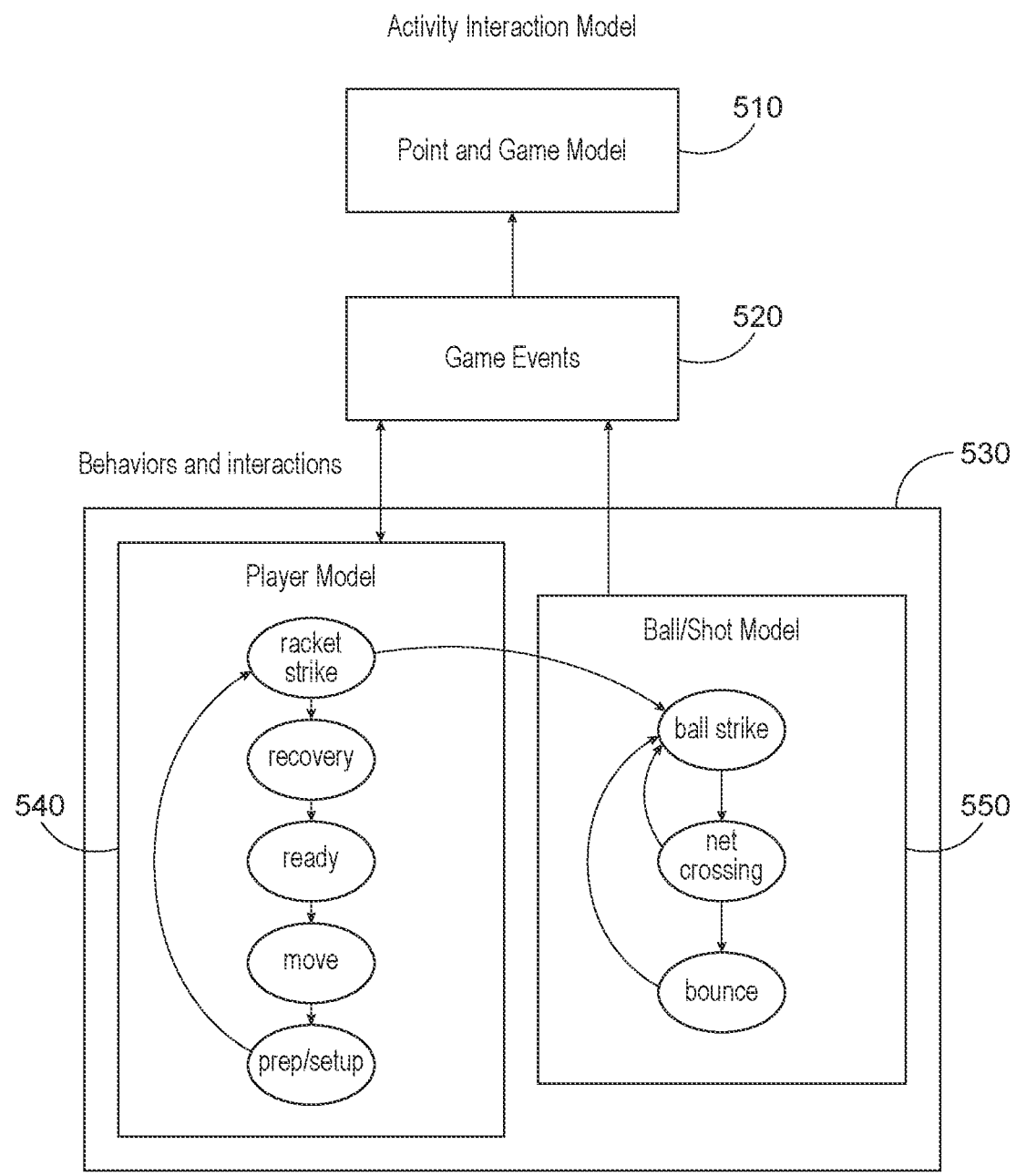
FIG. 23 is an illustration of an activity interaction model, encompassing physical behavior interactions (shown here as a state machine), game events, and a game model that determines evolution of points and game score.

FIG. 22 shows a process flow for the activity analysis and modeling 180. Suitable activity tracking and modelling corresponds to the integration of the element's movement models at the activity level (FIG. 18, 160), which can be used for the determination of the hierarchical interactive activity model (FIG. 23). This includes, but is not limited to, activity dynamics modeling 161, which considers the task level segments and events (FIG. 10); the movement elements interactions 162; and the movement elements dynamics 163.

Activity Elements Detection and Extraction

FIG. 20, 110 shows the process 100 flow of the data preprocessing and element detection and extraction. Video scene processing 111 includes extracting body, environment and object elements involved in the movement interactions from the video frames. This process can be performed using standard computer vision methods, which rely on several preprocessing steps 110, including, edge detection, blob detection, filtering, and sequencing. Typically, pixel blobs for each object or subject are segmented and tracked across frames. The blobs can then be used to reconstruct the activity, such as the ball trajectory or the trajectory of the players and their body segments. Player or performer pose, including of the body segments, end effector, are typically determined from dedicated pose detection algorithms. Motion sensor processing 112 includes extracting movement phases and elements. And gaze processing 113 includes processing patterns in gaze, including different movements (saccades, fixations, smooth pursuit), The features extracted from preprocessing of different sensor may be integrated 114 to leverage the complementarity of the information from the different sensor streams.

Element detection and extraction (step 120) can include, but is not limited to, the following initial processes:
(1) Identifying the activity elements including the primary movement units employed by the subject, across the range of interactions, as well as the supporting behavioral elements needed to achieve the task or activity goals.
(2) Extracting primary movement units and their supporting movement units from the performance data, including key elements of their operating environment.

Figure 19A:
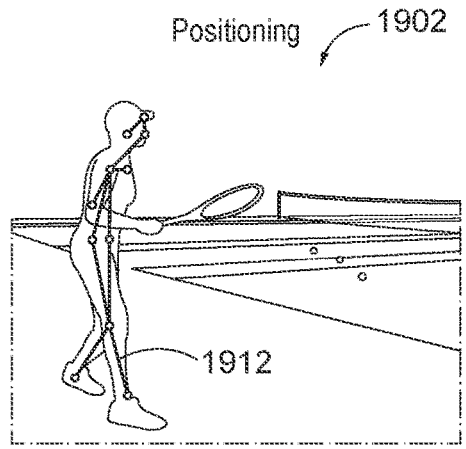
Figure 19B:
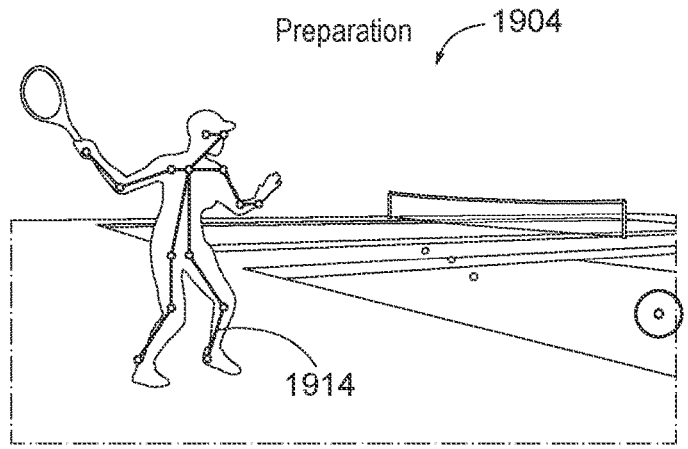
Figure 19C:
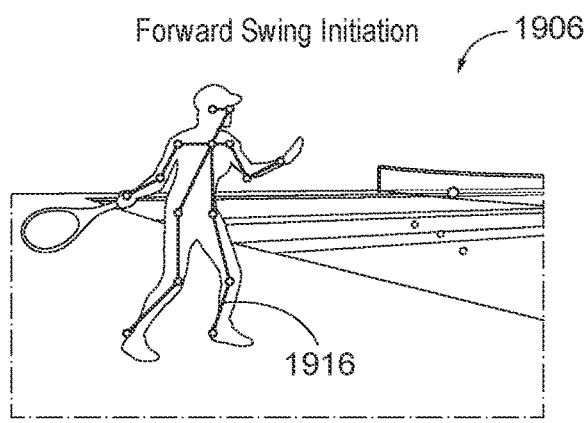
Figure 19D:
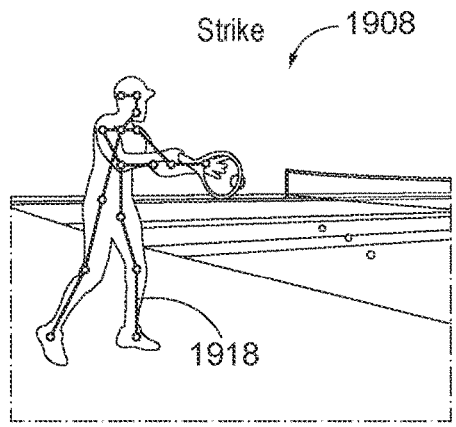
Figure 19E:
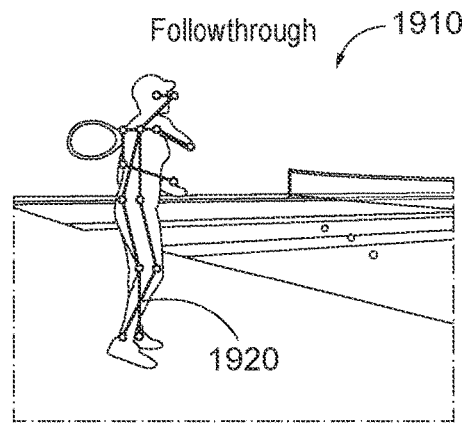

FIGS. 19A-19E illustrate examples of frames and pose estimation from computer vision system, for key frames from ready positioning in FIG. 19A (frame 1), to preparation in FIG. 19B (frame 2), stroke forward swing initiation in FIG. 19C (frame 3), strike in FIG. 19D (frame 4), and the end of the follow through in FIG. 19E (frame 5). Note the ball close to the ground contact in the second frame (FIG. 19B), which is used for the local reference frame (see FIG. 26).

FIG. 20, 120 shows the element hierarchy for the tennis example, starting with the environment and activity element processing 121, including the court, net; the task object processing 122, including the tennis ball; then, the subject's processing including the pose 123 and posture 124, including the racket, the stroke movement element 125, and the ball outcome and shot processing 126. Features of these elements make it possible to support the element tracking (FIG. 18, 130) and movement modeling (FIG. 18, 140; FIG. 21) described next.

Elements Analysis and Movement Element Modeling

Activity elements analysis and modeling (FIG. 18, 170) may include two steps, first the activity element tracking and modeling (FIG. 18, 130), followed by the activity elements motion analysis and modeling (FIG. 18, 140).

In activity elements tracking 310, feature elements are input to elements motion estimation. In activity elements motion analysis and modeling, process flow proceeds from elements interactions and relationship 141, to elements motion patterns analysis 142, and elements motion models 143.

Activity Elements Tracking

FIG. 21 shows the activity element tracking, motion analysis and modeling processes. Once activity elements have been identified (e.g., the subject's body, body segments, equipment, and key activity objects and environment elements), these elements can be tracked throughout the activity data to gather information about their interactions such as the relative motions between the player and the shot. This information is then used to determine models of the various movement skill elements and their associated operating environment and outcomes.

The general approach to extracting measurements for the movement behavior elements is to:
Segment video and motion sensor data streams based on activity level interactions, including events such as the environment interactions (ball strike, ball bounce, net crossing; etc. see, e.g., FIG. 4 and FIG. 7).
Categorize each activity segment according to the behavioral units delineated at each level of the hierarchy, as illustrated in FIG. 11.
Extract from the resulting segments the movement patterns that lead to primary task outcomes (e.g., strokes), along with the features determining their corresponding environment interactions (performer pose, bounce point, gaze vector, (see FIG. 26).

Extract the supportive movement patterns, such as ground movement, stroke and pose setup.

For example, in tennis, the movement skill elements include the player's ground movement, preparation, and stroke, and the interaction with the ball, throughout the exchange cycle. Similarly, with the other movement elements across the task hierarchy (see FIG. 12 for the tennis example.

Activity Elements Motion Analysis and Modeling

The information about the motion characteristics of the various activity elements, including patterns in the perception-action interaction, is then used to determine the motion models for the activity's movement skill elements 143.

Recall that humans learn motor programs and that because of the limitations of each program (and other task constraints), the brain partitions the potentially broad range of conditions and outcomes into distinct classes of behavior. Within each class, subjects learn to stabilize the various behaviors and learn to control and exploit the prevailing conditions to optimize movement performances and their outcomes.

Behavioral units manifest as patterns. Statistical characteristics of these patterns, together with mathematical properties, make it possible to isolate the relevant segments from the overall data; e.g., using equivalence and symmetries.

The patterns formed by the elements behaviors as they unfold during the activity are then analyzed, and their motion and interactions are analyzed to determine comprehensive motion models. This can include one or more of the following additional processes:

(1) The individual segments are subsequently combined to form the repertoire of behavioral units. This process is conducted for the different levels of interactions used to perform a task.

(2) For each class of movement units,
  a) Segmenting the movement units into movement phases associated with functional and biomechanical constraints (see, e.g., the poses from the videos analysis based on stroke phases in FIGS. 19A-19E).
  b) Modeling the functional characteristics of the behavior units, including:
    (i) The set of cues that drive the behavior element.
    (ii) The range of operating conditions (and other factors that can affect behavior) and range of outcomes (e.g., corresponding to the operating conditions of the general motor program underlying the skill element).
  c) Determining a set of features characterizing each class of behavior units that will enable their identification from available measurement data in real time.

An important step in the activity interaction modelling is the determination of the relationships and interaction between the movement elements and the activity and environment elements 320. FIG. 9 shows the key elements and objects and their relationships and interactions for tennis. The interactions define the activity events. The modeling goal is to determine the activity's dynamics across the comprehensive behavior hierarchy (FIG. 11).

The behavioral units (movement behavior elements) in a particular behavior category, for example as shown in Table 10, can present different characteristics, forming sets, or repertoire, of behavior elements. For example, in tennis there are multiple stroke types forming a repertoire. The same applies to supportive movement including the ground movement patterns (footwork), and similarly, for the stroke preparation/setup, and execution behaviors.

Activity Analysis and Modeling

Activity analysis and modeling (FIG. 18, 180) is concerned about the activity structure resulting from the physical interactions and the task structure, constraints, and rules.

The resulting movement elements models together with their environment interactions can be integrated to form an activity interaction model (FIG. 23). The activity patterns can be analyzed to determine the subject's behavior model across the levels of the hierarchy (FIG. 15). Additional processes can include, but are not limited to:

(1) Determining the hierarchical task or activity model, including interactions and sequences of movement, and key activity events in relationship with activity structure.

(2) Determining the executive control architecture used to coordinate behavior, in particular the interaction of movement elements with activity structure and elements.

(3) Integrating the resulting behavior units within an activity or task environment performance model that abstracts lower-level behaviors (see, e.g., "game state," as described in the tennis example).

The activity model captures the activity planning behavior, which was described in detail in the previous section, including the determination of a forward model. Recall, this level focuses on the task or activity model and performance; e.g., how the subjects combine the behavior elements to accomplish the task or activity goals. The goal of the activity interaction analysis and modeling (step 150) is to determine the patterns encompassing the entire behavior hierarchy.

In tennis the task goal is typically expressed at the point level. Players learn to combine behavior elements to produce favorable conditions for their shot performance so that they can either execute a winning shot or force the opponent to make an error. Points are won by constructing shot sequences that give advantages over the opponent and enable to control the game (e.g., according to a game state as shown in FIG. 15). In skiing, for example, behavior elements are combined to successfully perform runs in different terrain types. Therefore, generally, the larger task performance builds from the sequence of behavior elements and task events (for skiing see, e.g., FIG. 34, and for tennis, see, e.g., FIG. 12).

For a proficient tennis player, the various movement behaviors are determined from task-level state. In tennis, as described in the formal modeling section, the game state describes the task level environment and key elements at key times in the activity. Knowledge of the game states specifies the underlying behaviors in the hierarchy (positioning, preparation, and execution).

Activity Interaction Analysis and Modeling

FIG. 22, 150 illustrates the activity analysis and modeling. Activity behavior and events from elements interactions analysis 151 can be used in activity patterns analysis 152, followed by activity pattern modeling 153.

Activity Model Integration

This information is then integrated to form an activity model (FIG. 18, 160). The model encompasses: at the level of movement elements 162, the interactions with the relevant environment and objects; and at the task level 161, the interactions of the movement elements toward the task goal (see levels of interaction in Table 10).

Recall that the movement elements represent building blocks for the activity performance. The activity state is defined by the events and behavior sequence. In tennis, for example, see the hierarchy of behavior in FIG. 11 and the exchange cycle in FIG. 12.

The activity elements interact according to hierarchical structure associated with the task structure and agent interactions (FIG. 9). Therefore, the motion analysis at the activity level should account for the interaction topology (see FIG. 9).

FIG. 23 illustrates the activity interaction model. The model is delineated between the physical behaviors and interactions 530 (combining the player 540, and the ball and shot 550), which determine the game events 520, and in turn the game model, 510 which, in tennis, is determined by scoring rules.

FIG. 23 also illustrates the activity interaction model, encompassing the physical interactions between the player 540 and the ball and shot 550 (both are shown here as a state machine), game events, and the game model, which determine the evolution of points and game score. As shown in FIG. 23, the player or subject/participant model 540 includes racket strike, recovery, ready, move (or movement), and preparation/setup, and other participant model parameters. The ball/shot or task model 550 includes ball strike, net crossing and bounce, and other task model parameters. Physical behaviors and interaction define the key game events and other task-related events 520. These events then feed into a point and game model 510 which determines evolution of the points and game score, or other outcomes.

The interaction model can be used to analyze the task or activity-level performance. This process may include using a statistical, time-series model (such as Hidden Markov Process, or recurrent neural networks), to predict game or activity interactions based on the elements extracted from the performers.

Finally, such an activity model can then be used for the activity state estimation for the real-time processing supporting the augmentation (see also, e.g., FIG. 30).

In one example, an environmental sensing and tracking system for activity or task-level strategy modeling and augmentation may include a distributed vision sensor system with one or more cameras and a vision processor configured to identify one or more agents and associated task and environmental elements and objects within an environment, and to generate output adapted to track positioning of the agents and associated task and environmental elements and objects in the environment. A processor may be configured to extract task or activity patterns from the output of the sensors, where the task or activity patterns include movement behavior patterns of the agents and associated task and environmental elements and objects in the environment, as well as actions of the agents characterized by the movement behavior patterns and respective outcomes of the actions. The processor may further use the task or activity patterns to form a dynamic task model of the sequence of movement behavior patterns, where the movement behavior patterns and associated task and environmental elements and object configurations describe activity states and distill the dynamic task model into a task-level strategy map, where the task-level strategy map describes an evolution of the agent positioning and the sequence of actions of the agents with the respective outcomes for a given activity state over a future activity period or cycle.

V.II Detailed Modeling at Each Interaction Level in Tennis

The model structures of the behavioral elements delineated in Table 10 are described below. The description delineates between the game planning level and the motion execution level. The motion execution level is itself divided into different skill elements that support the task and environment interactions.

Summary Elements and Structure of Behavior

Table 10 describes general characteristics for task and movement levels, following from the sequence and decomposition of behavioral elements in FIG. 12 (plan, move, prepare/recover, execute) and hierarchical organization in FIG. 11 and FIG. 15.

TABLE 10

Movement behavior elements at different levels for the definition of the model components

| Levels | Movement Behavior Unit/Processes |
|---|---|
| TASK PLANNING LEVEL | |
| Domain/Scope: Shot-court-player-opponent (5-10 sec to minutes) General purpose: Global court perception, situational awareness, and planning | Movement behaviors: Span the exchange sequence forming a point. Can encompasses several exchanges, there movements are usually abstracted to approximate shots and court placements. Key processes: Global situational awareness, planning, and decision making driving the sequence of shots towards a game point. Part of the planning covers strategy based on opponent strengths/weaknesses, including the repertoire shot patterns. |
| ENVIRONMENT CONTROL LEVEL | |
| Shot exchange and ground motion Domain/Scope: Shot-court-player-opponent (2-4 sec) General purpose: Control of conditions for target shot through larger court motion | Movement behavior: The gross movement on the court during an exchange. It includes the player ground motion, and the return ground impact (global conditions/configuration). Key processes: Anticipation of court positioning (defined by the anticipated ball ground impact,), and formation of shot target based on opponent strike pose. |
| SETUP AND PREPARATION LEVEL | |
| Domain/Scope: Shot-racket-player (1-2 sec) General purpose: Local | Movement behavior: The preparatory steps for the stroke, including the finer adjustments in ground motion, and setup of strike pose, including the stroke preparations and early |

TABLE 10-continued

Movement behavior elements at different levels
for the definition of the model components

| Levels | Movement Behavior Unit/Processes |
|---|---|
| motion based on incoming shot and target shot (shot interaction schema) | initiation that are necessary for optimal synchronization with the incoming shot.<br>These steps determine the local conditions for the execution of the stroke and includes the final phase of the incoming shot anticipation and shot selection.<br>Key processes: The determination of the local environment adjustments and pose preparation needed to achieve optimal conditions for the stroke execution and ultimately the target shot. |
| | EXECUTION LEVEL |
| Domain/Scope: body-racket-ball (100-500 msec)<br>General purpose: Primary interaction for action execution | Movement behavior: Stroke pattern (delineated into specific phases) used for the production of the specific racket-ball impact conditions that lead to the target shot.<br>Key processes: The stroke execution; e.g., sensory-motor processes supporting the modulation and adaptation of the stroke pattern needed to generate the specific stroke outcome (within constraints of local conditions and subject's biomechanics). |

The primary delineation is between the task (game) level, and the movement behavior level. Game-level planning is primarily strategic and deals with building points in the game; e.g., determining the sequence of shots that will lead to a winning shot or an unforced error by the opponent). The movement behavior level deals with the various movement elements supporting the activity interactions. The goal is to determine the underlying sensory-motor processes.

Interaction Levels

The details of the modeling steps for each level of interaction are described below. Modeling follows the spatial and temporal structure associated with the interactions, at one or more of the following levels (see Table 10):

Exchange sequence level: patterns in the evolution of the game state, including shots and shot targets as a function of the strike position on the court and incoming shot characteristics (exchange process: EP).

Player-shot level: patterns in positioning; e.g., court movement toward the ball and expected strike position (positioning process: PP).

Stroke-shot: patterns in stroke setup and preparation (stroke interaction process: SIP)

Stroke-ball: patterns in stroke characteristics and primary outcomes (stroke execution process: SEP)

Behavioral Units Overview

Each movement behavior units manifest as a pattern in performance data and has to be described as a behavioral process (shown in parenthesis) with their specific operating environment and conditions (see, e.g., FIGS. 13A-13F and FIG. 28A-28B). These processes can be considered schemas, or more formally policies. The comprehensive modeling therefore entails extracting these different patterns.

The interaction processes supporting these behavior patterns provide the units of description and analysis. As described the previous sections of the disclosure, the interactions can be used to define the primary movement units, used to generate the primary task outcomes, and supporting units of movement.

The behavioral units combine functional dimensions supporting the environment relationships and interactions, including perceptual cues and physical actions, and they operate as whole units of behavior. The behavioral units encompass input-output processes that include the cues that enable anticipation and synchronization of behavior elements and the respective outcomes, and the conditions of their performance (see, e.g., FIG. 12; FIGS. 13A-13F; FIG. 15).

One of the skill modeling goals is to identify the cues and outcomes. Therefore, in addition to the movement performance data, measurements can include the set of visual inputs (e.g., using gaze tracking), and output (outcomes). These additional measurements can help capture the functional mechanisms underlying the performance of these processes.

Coordination and Executive Level

Another important aspect of performance in complex tasks is that the behavior is stratified in the sense that several units are generally sequenced across several spatial and temporal scales (FIG. 10 and FIG. 11).

Humans first learn the behaviors that are critical for the task, which typically are key interactions, and subsequently learn to exploit these elements to effectively achieve task goals. Behavioral units, besides providing specific task outcomes, enable the control and sensing "coordinative structure" needed to achieve task-level goals (see FIG. 15). This requires learning the additional perceptual, control, and planning processes needed to coordinate and manage the activity interactions at task level.

Every movement activity has its own sets of interactions with the environment and task elements, as well as, with the other participants and objects. Activities also have different behavior characteristics and requirements. However, the general hierarchical system architecture, with behavior units supporting key interactions, and acting as building blocks, remain similar across activities. The generalization of the approach and model is discussed further in the generalization section.

Overview of the Model Components

Going down each successive level of behavior (game, shot exchange, preparation/setup, and stroke execution), the scope of the state-space becomes smaller and more specific (see, e.g., FIG. 15). At the same time, the time scales also shorten. When actions are unfolding more rapidly, their spatial scope typically also gets more specific. Therefore, the movement behaviors across the hierarchy distinguish themselves by their respective scope and domain. The general idea is that each behavioral unit has its operating environment, which can be described by a reference frame and set of inputs, outputs, and cues.

TABLE 11

Model components for the behavior elements at task/game level
Task Level Planning: Tennis Point General Information

| | Components |
|---|---|
| Domain/scope: shot-court-player-opponent | Inputs: e.g., tennis court optic array |
| | Outputs: Shot target and general court movement plan over next exchange. |
| Timeframe: Sequence of exchanges in point. | State: Player and opponent poses, movements, and shot target sequence. |
| Reference Frame: Global (court frame) | Processes: Overall court perception and situational awareness. |
| | Prediction of the opponent's strike and expected range of incoming shots path and target area. |
| | Cues: Court configuration and specific motion gap and rate (see gray area in FIG. 24). |
| | Outcome criteria: Ability to construct exchange, e.g., leading to a winning point. |
| | Modeled Elements |
| | Behavior Elements: |
| | Shot patterns |
| | Player and opponent gross court movement patterns |
| | Behavior Outcomes Measures: |
| | Quality of exchange sequence in point |
| | Target decisions |
| | Gross movement decisions |
| | State/Conditions: |
| | Shot (start and end) |
| | Player and opponent poses |

The subsequent sections of the disclosure describe the comprehensive model of the movement units from performance data, at each level, described for the tennis example. For each behavior unit level, the following aspects are elaborated:

Details of the form and scope of interactions supported by the movement unit, including the corresponding level of human motor control.

Processes: The specific processes supporting the behavior unit.

Inputs: The information needed to support the movement behavior, including the cues, and level of perceptual and information processing.

Cues: The set of features that are used to drive the behavioral element.

Outputs/Outcomes: The results of the movement behavior on the task/activity environment.

Outcome success criteria: The relevant aspect of the behavior that is critical for the task or activity success at this level.

Table 11 provides model components for the behavior elements at a task/game level. The functional details and operating range for the behavior units are described below, following an overview of the units across the interaction levels.

Reference frame System

The general idea of a reference frame system is to provide description of behavior data that are consistent with the underlying human sensory and perceptual processes. From a behavioral standpoint, different types of reference frames are relevant. A global reference frame provides the larger description for the task elements, objects, and/or agents, and is relevant to the overall activity organization and planning. Local reference frames, such as in FIG. 26, provide more specific details of the operating environment of behavior elements, and the associated functional characteristics and execution The local reference frame, defined based on the behavior's particular environment or object interaction, is critical because it makes it possible to describe the relative motion consistent with the behavioral characteristic of each type of movement element, e.g., the player setup relative to the incoming shot. Each behavioral element is expected to have its specific operating environment and task elements; its cue environment which is used to determine the behavior; and its specific outcomes.

In addition, the description that follows also elaborates the more specific modeling details for the tennis example, including, but not limited to:

Measurement and extraction describe how these behavior units can be measured and then extracted from performance measurement data.

Representation describes the modeling structure of behavior elements.

Scope describes the scope of the operating environment for each unit of behavior.

Reference frame describes the coordinate system used for the behavioral unit. Different levels have different reference systems that are consistent with the behavioral processes.

FIG. 7 and FIGS. 24-26 illustrate the dimensions and scope of each of behavior at these levels of organization. Notice also that each level is developed as an integral unit of behavior that operates as a skill element that the performer must acquire and perfect.

Inverse Models

The inverse models determine the references for the actions that have to be implemented to achieve the given outcomes at the respective level of interaction (see FIG. 15). The inverse model encompasses the conditions which can be determined by the preceding movement, the input; e.g., the reference outcomes that should be achieved, and the output; e.g., the movement specifications. These levels can include, but are not limited to:

For positioning, the inverse model specifies the court movement given the present pose and the anticipated strike pose. The outcome is the actual ground movement, which leads to the actual strike pose.

For preparation, the inverse model specifies the pose and posture adjustments, including stroke preparation, given the present pose, and the anticipated shot outcome. The outcome is the actual pose and posture adjustments, including adjustments in racket pose.

For execution, the inverse model specifies the forward swing initial condition and profile given the present strike conditions and anticipated shot outcome. The outcome is the stroke profile, strike outcome, and shot outcome.

The actual action at each of these levels has to be implemented by some control process such as a general motor program encoding the movement class in the brain for the selected outcome and conditions. Such a program can be modelled by a feedback policy. The policy specifies the information exchange between the environment, the agent and the resulting outcomes.

In addition to the inverse model, modeling includes determining the forward model. The forward models predict the outcomes (including sensations) expected for the specific actions.

Therefore, comprehensive modeling encompasses the inverse and forward models for the different levels of organization, and in addition may include the policies that are responsible for the implementation. Note that these models of the skill elements are critical since they also describe how these different elements can be augmented. The models also specify what variables can be manipulated through feedback cues.

In one example, modeling analysis and assessment or diagnostics of interactions of movement behavior elements in an environment and outcomes may include capturing a sequence of body and body segment movements of participants in performance of a task or activity in an environment, where one or more motion or vision-based sensors generates output characterizing interactions between the body and body segment movements of the participants with features of the environment and task or activity objects within the environment. Movement features and attributes characterizing movement behavior elements of the interactions and performance may be extracted from the sensor outputs. Movement behavior elements may include movement techniques of the participants, operating conditions of performance, and outcomes of the sequence of body and body segment movements. A model may be built by aggregating and classifying the movement behavior elements based on a hierarchical relationship and a combination of the movement features and attributes. For each element in the model, behavior classes may be analyzed for aspects selected from setup conditions, stance, movement performance, and efficiency of the outcomes. An inverse model of the movement behavior elements may be captured, and a model of executive functions determined, where the executive functions provide coordination of the movement elements with the task or activity objects and elements of the environment. Patterns may be determined that identify a coordination policy and the inverse model and the coordination policy may be used to perform skill assessment and diagnostics for the participants by determining patterns that identify deficient combinations of the coordination of movement elements with setup conditions, the movement techniques of the participants, and the outcomes of the sequence of body and body segment movements.

Task Level Planning: Tennis Points

The task level for tennis games correspond to building points. Points are determined by the interaction between the shots and player and opponent movement patterns during sequence of exchanges. Points typically require a sequence of shots and the outcome is determined by the shot behavior and game rules. Successful point construction requires anticipating future shots and determining targets that accounts for the opponent's strengths/weaknesses.

The brains of each participant form statistical representations, such as for the different shot and player and opponent movement patterns (see shot distributions in FIG. 8). As discussed in the formal modeling section, this information can be captured in the form of a game state (Eq. 5). For proficient players, this information is used to predict shot sequence information and make decisions about the future movement and shot targets. The dynamics are described by game state transitions (Eq. 6). The task level processes primarily deal with building the knowledge needed to plan and organize behavior. The patterns in the shot and player pose configuration provide information about the player and opponent's strategic planning.

The scope of interaction at the point level encompasses the global court environment motion and goals over larger task or activity phase. The model at the point level, also accounts for the task rules, and structure.

At the point level, relevant information includes the configuration of the players, the relationship between player and opponent movement patterns, and the shot target. The model encompasses the patterns in shots and court pose configurations.

Behavior Units

At the point level, the level of description focuses on the shot/player configurations. Moreover, at the task level, the details of the movement performance is abstracted to capture the evolution of the game state (Eq. 5). The behavior elements provide the units of organization for the task level model. The units of behavior induce the discretization of the task space (see, e.g., FIG. 8). The interactions at the point level is primarily the shot-court interaction and is described by the shot types and targets, in parallel with the player and opponent's ground movements.

The behavioral units at the task level describe the sequence of shot and player/opponent configurations. These are used to determine the court positioning and shot sequence over series of exchanges in a point (point construction; see, e.g., FIG. 8 and FIG. 24) or a rally in the case of casual play.

Processes

In behavioral sciences the task level planning is closely related to situational awareness (SA). The purpose is to comprehend the current state of the system (game state), and to be able to predict the larger behavior, and make high-level decisions needed to successfully accomplish a task; e.g., build points and create favorable game outcomes.

The behavior at this level encompasses the perception, decision, and planning supporting the construction of a point. More specifically, these different movement units provide the input-output features that are used to encode the task level perception and movement organization. At the task level, the perception and decision can be described in terms of game/point patterns. The decisions are the sequence of points and the associated game states describing the player-opponent-shot configurations on the court.

Model Form

The model at the point level has to capture the information needed for strategic decision making. For example, as described in the formal modeling section, different player and shot configurations have different strategical values, e.g., expressed by a utility function (U(g(k))). The game state determines the next shot opportunities. This information is captured by a type of forward model that also encodes the best actions for each game state in Eq. 5 (see formal model discussion herein).

This information drives both the shot targeting decision but also the underlying ground motion (see next level). Modeling at the task or activity level first has to capture the patterns of poses, court movement, and shots. The patterns such as in FIG. 8 can be used to identify the natural, behavioral states of the system (Eq. 5). The pattern characteristics combined with the utility function capture the strength and weaknesses of the player and opponent.

An alternative approach is to use a discretized court into cells, which are then used to study the player and opponent poses during points, and more specifically the movement and shot target from the different cells of the respective poses, as defined in the court environment.

In a second stage, the states that are derived from the patterns of play are used to determine the dynamics of the system; e.g., the state transitions. The dynamics are typically described using state transition probabilities determined from state-transition characteristics obtained from the performance data (Eq. 6). Such statistical models are typical of high-level modeling and decision making. The activity or game dynamics in Eq. 6 can also be described using a Hidden Markov Model or recurrent neural network model.

Additional modelled components can be combined with the decision-making model, such as accounting for the visual attention (gaze vector of the performers). Accounting for the underlying perceptual and decision-making mechanisms in the models make it possible to improve the assessment and diagnostics, as well the augmentation of the subject's perception, learning, and performance.

Model Inputs and Outputs

As illustrated in FIG. 15, the model at the task level describes the response of the game state to a particular shot decision (Eq. 6). The model inputs q(k−1) are the player shot selection for the game state g(k−1) perceived by the player (e.g., the respective poses and motions of both the opponent and the player).

The outputs are the prediction of the next game state g(k) corresponding to the player shot decision input q(k−1). The output specifies the next player and opponent poses, to enable the player's the next shot q(k−1).

Measurement and Extraction

The player and opponent poses can best be extracted from videos, using pose detection and estimation tools (compare, e.g., OpenPose, currently available via CMU (Carnegie Mellon University) Perceptual Computing Lab link at GitHub, Inc., or other available deep learning software).

In the tennis example, the phases of play can be determined from key events which are defined by key task interactions including the racket strikes, net crossings, ground impacts (see FIG. 12). Events related to the poses and motions of the player and opponent ground motion, respectively, can be used to identify events related to the larger game activity.

Features of the racket motion measurements can be added to account for stroke phases. Combining the events provides the complete court-players-shot level interactions governing the dynamics and outcomes of a point.

Decision Update During Exchange

FIG. 24 is a graphical description 2400 of a player sequence of court movements and shot targets according to the top panel of FIG. 2A, based on the anticipated ball ground impact and the sensory gap formed by the opponent ground motion.

While planning emphasizes the decision across the larger time period from incoming shot to the player's return to the next incoming shot (one cycle of game state update). The decisions about the player's movement and shot target can also be updated during that time period based on the up-to-date information about the situation.

In particular, the details of target formation are based on the shot and player-opponent dynamics. FIG. 24 illustrates an example of representation showing the player and opponent poses and movements, as well as the shot, and the formation of a target based on the ongoing dynamics in the game state.

In this example, the pattern of play is described by tau theory. In this example, the player has to anticipate the incoming shot, perceive the opportunities for target (based on the opponent configuration and movement), and form a target for the return shot.

As shown in FIG. 24, the opponent pose results in a sensory gap (open area for the shot target), and the court movement results in a sensory gap rate. The parameter tau ($\tau$)=gap/(gap rate) provides a measure of opportunity for the shot target and movement coordination. Table 12 provides model components for the behavior elements at shot exchange level.

Environment Control Level

The environment control level corresponds to the macroscopic control of movement behavior relative to the incoming shot and the opponent. This level represents a key aspect of open motor tasks. As shown in FIG. 7, at this level, more details about the environment state are available for the precise pose and shot production, including details about the incoming shot. These details are useful for the exact ground movement that determine the conditions for the stroke execution.

The updates the strike conditions from the latest information about the incoming shot and opponent pose and motion (see, e.g., FIG. 7 and FIG. 24). The ground movement between the previous stroke recovery and the anticipated strike can span a variety of possible strategies. For example, FIG. 7 shows four possible player strike poses (A-D) for an incoming shot. Note that each may lead to different stroke conditions with different shot outcomes. Typically, the player will determine the ground movement for the planned shot outcome; however, at this stage the player may also update the stroke and shot target (see FIG. 24).

Operating Constraints

These decisions are governed by the constraints of the task environment. These set pose-dependent constraints on the shot selection and execution. These constraints govern the admissible range of strike; e.g., the conditions that determine if a shot is successful; e.g., if it does not hit the net and lands within the limits of the court. The combination of court movement, the environment constraints, and the behavioral constraints (including stroke patterns) leads to the patterning of the behavior across the activity state space, which manifest by the shot patterns shown in FIG. 8.

TABLE 12

Model components for the behavior elements at shot exchange level
Environment Control Level General Information

| | Components |
|---|---|
| Domain/scope: shot-court-player-opponent Timeframe: Current exchange (opponent strike $t^o_s(k)$ to player strike $t^p_s(k)$ and up to next opponent strike $t^o_s(k + 1)$). Reference Frame: Global frame focusing on the incoming and outgoing shots (see FIG. 7). | Inputs: Early incoming shot cues (opponent preparation and strike pose/stroke). Outputs: Anticipated incoming shot court ground impact (opponent shot target); range of possible strike zones and shot target; possible ground movements from player recovery point to anticipated ball strike point and stroke. State: Gap between current pose and predicted strike pose, including estimation of target area. Processes: Predict incoming shot ground impact and type; determine the range of possible strike target; select best strike pose and target. Cues: Incoming shot and opponent motion (preparation and stroke execution). Outcome criteria: Ability to predict incoming shot and move to anticipated strike pose to create favorable conditions for shot/target. |

Modeled Elements

Behavior Element:
Player court gross movement patterns toward expected strike pose
Player court movement patterns following strike (recovery)

TABLE 12-continued

Model components for the behavior elements at shot exchange level
Environment Control Level General Information Behavior Outcomes:
Positioning efficiency
Recovery efficiency
Conditions/State:

Movement Units

The movement behavior at the exchange level is the global court movements from previous stroke recovery (or serve, etc. depending on the context of the point) and incoming shot, to the next anticipated strike point and opponent response (see FIG. 7). The movement units at this level correspond to the player positioning and large-scale motion on the court, and the associated shot. These movements determine the local configuration to create favorable conditions for successful shot making and stroke execution.

At this level, the movement also focuses on posture such as the unit turn typically initiated following the opponent ball strike, as soon as the side of the incoming shot is known. The court ground motion is described by different footwork patterns. Footwork patterns are usually specific to the court such as along the baseline, moving around the ball to hit a forehand stroke, moving to the net, or at the net. The court ground motion can be decomposed into phases, which result from the boundary conditions between the egress from the ready state and the ingress into the strike pose. These phases can be described using different footwork patterns acquired by the player. More proficient players have a larger repertoire of footwork patterns, allowing them to negotiate a variety of court movement scenarios as depicted in FIG. 7.

Reference Frame

The environment encompasses the elements shown in FIG. 7, including the incoming shot towards the strike point, and the player and opponent's pose. These elements can be described using a global reference frame (see FIG. 4). In addition, the footwork patterns can be described using the court coordinate system or a player centered reference frame, such as hip orientations (see, e.g., FIGS. 19A-19E), that allows for tracking the relative movements as well as the shoulder and arm motions, which are critical to the stroke preparation (e.g., shoulder rotations, back swing).

Processes

Decision making for example can be described by perceptual variables describing the shot-player interactions, such as motion gaps (see gray box 2404 in FIG. 24) and perceptual tau theory (described below).

In addition, the player uses knowledge from the task level perception and decision making. Recall, this knowledge describes the value or utility of player-opponent-shot configurations for building points (Eq. 8).

Model

The inverse model determines the player's court movement toward the strike point and the target area for the return shot. At the positioning level, the actual movement is described by the displacement in player poses and the associated displacement kinematics. Therefore, modeling has to describe both the inverse model that determines the reference value for the behavior, and the model of the movement process itself. This distinction is critical for the assessment and augmentation.

For positioning, the inverse model specifies the court movement displacement $\Delta x_{p,ref}$ given the current pose $x_{p,posit}$ and the anticipated strike pose $x_{p,strike}$* (see, e.g., FIG. 15). The outcome is the actual ground movement, which leads to the actual strike pose. In addition, the model should also account for the footwork patterns and some relevant postural details (such as the unit turn). Like other movement units, each ground movement pattern is characterized by an operating envelope describing the kinematic properties.

The modeling task is to characterize the functional mechanism that explains the behavior across the operating envelope. The environment state at this level, describes the player-opponent configuration within the incoming shot to player response period.

The player typically updates the strike pose and possibly the shot target based on updated information about the incoming shot. Therefore, a key aspect of skills at the positioning level is the perception and anticipation of the shot.

Furthermore, the overall displacements and shot target dynamics can be described by coordination of movement gaps, including the displacement of the player during the exchange from recovery to next strike pose; the opponent displacement from previous strike to recovery, and the resulting gaps on the court for shot targeting. Table 13: provides model components for the behavior elements at stroke setup and preparation level.

Measurement and Extraction

The player and opponent configuration and movement, including the shot, during the period defined by the incoming shot and movement to the strike point ($t_s^o$, $t_b^o$), can be extracted using computer vision processing.

Like stroke classes, the extracted ground movement segments can be analyzed for patterns including the different ground movement patterns used for the different displacements and start-end configurations (see FIG. 7).

TABLE 13

Model components for the behavior elements
at stroke setup and preparation level
Preparation and Setup General Information

| | Components |
|---|---|
| (Interaction schema) | Inputs: Incoming shot cues and anticipated target. |
| Domain: | Outputs: Ground motion into position and |
| Shot-racket-player | stroke preparation. |
| Timeframe: | State: Gap between current pose and strike |
| Incoming shot $t_n^o$ to | pose, and the stroke preparation. |
| bounce $t_b^o$. | Processes: Control of conditions within |
| Reference Frame: | selected stroke/shot target, including |
| Anticipated shot | adjustment steps and postural preparation |
| reference frame | for stroke execution. |
| (provides the | Cues: Incoming shot trajectory up to bounce. |
| goal state). | Outcome criteria: Ability to setup to create |
| | optimal final conditions and stroke preparation, |
| | including balance. |
| | Modeled Elements |
| | |
| | Behavior Elements: |
| | Ground position adjustments relative to |
| | bounce and strike |
| | Postural adjustments, including feet configuration |
| | (stance), hips and shoulder rotation |
| | Preparatory stroke phases, including |
| | backswing configuration. |
| | Behavior Outcomes: |
| | Stroke execution pose |
| | Expected point of contact and strike zone |

TABLE 13-continued

Model components for the behavior elements
at stroke setup and preparation level
Preparation and Setup General Information > Conditions:
> Ground impact location and ball bounce
> Ground impact location before and following ground impact
> Ball velocity before and following ground impact Stroke Preparation and Setup Once the larger positioning motion has been specified and executed, the next stage is the stroke preparation and setup. The former determines the larger strike and shot-making conditions, while the latter determines the precise conditions and coordination with the incoming shot and body and stroke preparation for the successful stroke execution.

FIG. 25 shows the sequence of motions 2500 from the player pose at the opponent strike 2502 ($t_s^o$), to the pose at the ball bounce 2504 ($t_b^o$). Typically, for a groundstroke, the player is ready for the stroke execution by the time the incoming ball bounces on the court. FIG. 25 also shows the transition between the court positioning based on the anticipated strike from the larger environment (environment control level) and the adjustments in position and posture and coordinate the upcoming stroke with the incoming shot to produce the specific conditions before the execution.

In this final positioning phase, the goal is to synchronize and coordinate with the incoming shot, and setup the body for the stroke execution. Therefore, this level deals with the creation of the dynamic conditions and environment for the primary movement execution (the final stroke phases and racket-ball strike).

FIG. 25 is a schematic illustration of the preparation and setup of a stroke, highlighting the reference frame based on the shot bounce location and key events relevant for this stage and level of movement behavior.

While the preparation is close to the execution, it is still a distinct phase. In fact, neuro-motor studies have shown that movement preparation is a distinct process from the movement initiation and execution. Basically, this phase plays such a critical importance that it can be treated as a behavior in and of itself.

Movement Units

The final preparatory stage before the actual stroke execution is determined by the player-shot interaction. In this stage, the court motion and stroke preparation overlap. The court motion in the preparatory phase (as shown for a groundstroke in FIG. 25) typically represents adjustment steps. At the same time the player proceeds with the stroke preparation (back-loop) just before forward swing initiation and execution. The preparation stage takes place approximately during the ball bounce ($t^o_b$).

The movement behavior can be described as shot interaction schema. The movement operates as unit involving positioning and postural adjustments needed for the precise setup and conditions for the stroke execution, including establishing proper balance. The movement behavior combines the body motion (simultaneous adjustment steps and unit rotation, to align body and shot direction), while synchronizing with the incoming ball to create the precise conditions for the stroke execution.

Model

In the formal model, the preparatory behavior is described by an inverse model, which receives the desired outcomes and the conditions to determine the ground adjustments and postural adjustments before the stroke execution.

As illustrated in FIG. 15, for the preparation stage, the inverse model specifies the pose $\Delta x_{p,prep}$, and posture adjustments $\Delta \psi_{prep}$, including stroke preparation $\Delta x_{r,prep}$, given the current pose $x_{p,prep}$, and the anticipated shot outcome $y_{prep}*$. The outcome is the actual strike pose and posture, including the adjustments in racket pose, such as the backswing ready state.

The preparatory movement can be analyzed and modeled similarly to a primary movement element such as a stroke. The basis for this task is the movement architecture and the associated functional dimensions and characteristics. The preparation and setup include movements that can be segmented into phases. The temporal evolution of this behavior can for example be described by a similar type of state machine as the one used to describe the stroke motion (compare, e.g., U.S. Pat. No. 10,854,104 B2 and U.S. Publication No. 2121/0110734 A1, and U.S. Publication No. 2019/0009133 A1).

For proficient players, the stroke and postural preparation and setup are generally coupled. For example, in advanced players, the upper body, hips and legs form a kinetic chain that winds up during the preparation as a single movement unit, and then unwinds during the stroke initiation and execution. Therefore, the finite-state models for the stroke and the body movement can be coupled. Table 14 provides model components for the behavior elements at stroke execution level.

Inputs/Outputs

The inputs to the inverse model are the preparation conditions and the shot outcome reference. The preparation conditions are determined from visual cues extracted from the incoming shot as it approaches the ground (around the net crossing $t^o_n$), and provide updated information about the expected strike point. The cues are also used to coordinate preparatory motion (FIG. 25).

The outputs of the inverse model include: the details of positioning and posture, extending into the stroke initiation state (FIG. 15). Postural details include the foot configuration (angle relative to the baseline), and the rotation of the hips and shoulders.

TABLE 14

Model components for the behavior elements at stroke execution level
Stroke Execution General Information

| | Components |
|---|---|
| Domain: body-racket-ball (Physical sensory motor) | Inputs: Final conditions (stroke initiation Outputs: Forward swing initiation and parameters for impact. |
| Timeframe: about 150 msec before strike, after the bounce $t_b^o$, to the strike $t_s^P$. | Reference Frame: Local frame; e.g., with reference at the bounce point (see FIG. 26). State: The player ground position, racket stroke state and phases, as well as relevant body segment motion. Processes: Sensory-motor program Cues: Ball moving toward player relative to the racket. Outcome criteria: Ability to achieve the desired stroke outcome and shot target. |

TABLE 14-continued

Model components for the behavior elements at stroke execution level
Stroke Execution General Information Modeled Elements Behavior Elements:
Stroke spatial characteristics
Body segment angles and displacements
Timing (forward swing initiation and kinetic chain)
Behavior Outcomes:
Stroke primary outcomes (pace, spin)
Stroke characteristics, including transfer from kinetic chain
Outgoing shots
Conditions (incoming shot)
Player pose relative to bounce point (for a ground stroke)
Body and stroke/racket configuration
Ball velocity before and after racket strike In addition, the movement is executed using a policy which takes as input the output of the inverse model (desired pose and postural adjustment) and in addition the necessary cues about the unfolding of the movement (environment feedback). The policy produces the actual pose and postural movement.

Note that, as described under the planning level model, the update of the game state can be used to update the shot target during that phase. In parallel, if there is an update in the shot target, the output is the final shot target, including the stroke and shot outcomes.

Measurement and Extraction

The player's pose, and the incoming shot, relative to the ground impact define the local operating state. The reference point can be defined as the incoming shot's bounce (ground impact; see, e.g., FIG. 25 and FIG. 26).

The preparatory stage can be extracted using a computer vision system, tracking the ball as it approaches the ground and through the bounce, and including the player's ground motion, postural adjustments, and stroke preparation (see, e.g., FIG. 16; FIG. 25 and FIG. 26).

An important aspect of the preparation stage is the range of stances, and postural configurations leading to the execution (see Table 1). The stance and posture can be identified from the player pose relative to the bounce (FIG. 16; FIG. 25 and FIG. 26). More details are obtained at the execution, where the specific information about the contact point and eventually the follow through become available.

Table 15 provides the nomenclature describing the types of positioning and posture relative to the ball strike, as used in the tennis community. The classification of the configurations in player positioning and posture extends the stroke classification and therefore provides critical information for assessment and training. For example, the classification describes how the player adapts to the conditions in the preparation for the stroke and therefore influences its execution and outcome. The classification represents the semantic information needed for the formation of mental models, communication, and interpretation.

TABLE 15

Example criteria for the player posture and strike configuration

| Stance | Open stance: feet lined up parallel | Semi-open stance: feet lined up at | Closed stance: feet lined up |
|---|---|---|---|
| | with the baseline | about 45 degrees | perpendicular with the baseline |
| Point of Impact | Defensive: contact point behind hip line | Neutral or rally: contact point parallel or slightly in front of hip line | Offensive: contact point in front of hip line. |
| Strike Zone | High: shoulder or higher | Medium: between knees and shoulders | Low: below knees |
| Bounce | On the rise: ball stricken as it rises, before the apex | Apex: ball stricken near the apex of the bounce | Drop: ball stricken as it drops |

Stroke Execution (Ball-Player Interaction)

The execution stage and level of behavior describes what happens during the primary movement unit pattern; e.g., the stroke in tennis. This level captures the final interaction between the ball before the strike and the stroke execution through the impact and ending with the follow-through (see the computer video frames in FIGS. 19A-19E).

The scope of the execution phase encompasses the body and racket movement directed towards the strike. At this stage, the movement setup is established, the player has a more restricted range of control over the conditions, and most of the movement takes place in open loop. To achieve the stroke outcomes, including reaching the shot target, the environment variables should be controlled within well-defined margins that define the stroke's operating conditions.

Accounting for the details of interactions at the execution level also enables augmentation to characterize the factors that determine movement pattern and stroke sub classes, as well as, the functional details, including external cues and movement phases, and mechanisms used to adapt to uncertainties in conditions (FIG. 26).

Movement Units

FIG. 26 is a graphical depiction 2600 of the bounce reference frame used to model stroke execution. The movement unit at this final execution phase encompasses the detailed coordination between the racket swing and overall body, e.g., hip weight transfer and rotation, as well as the shoulders and arm motions, with the incoming shot before and during the ball strike.

Note, as shown in FIG. 26, this level of behavior captures important details capturing how the player is embedded in the environment; e.g., the body pose relative to the incoming shot. Therefore, these characteristics can be accounted for when assessing, diagnosing, and eventually augmenting the performance.

Reference System

The reference system during the final stroke execution phase, is based on the specific stroke execution condition. For example, it can be defined with the origin at the bounce point (as shown in FIG. 26), and therefore, the player pose relative to the bounce point provides the details of the stroke conditions, including the point of contact and strike zone, as well as the bounce phase selected for the strike.

In addition, the actual performance, such as stroke can be described in the player's headframe, which is consistent with the encoding of most sensory-motor processes. This reference system is particularly relevant to the perceptual functions used for the stroke initiation and synchronization.

Model

Similar to the other levels and stages, the modeling encompasses the inverse model used to determine the swing profile, the policy used for the implementation of the behavior, and the resulting movement characteristics. The outcome is the stroke profile, strike outcome, and shot outcome.

The inverse model in the execution phase determines the forward swing profile based on the information about strike conditions produced in the preparation phase and desired shot outcome established during planning and potentially updated during preparation (see, e.g., FIG. 15).

The actual movement behavior can be described by its stroke phases and the relationship with the body segment displacements (compare, e.g., U.S. Pat. No. 10,854,104 B2 and U.S. Publication No. 2121/0110734 A1, and U.S. Publication No. 2019/0009133 A1). In addition, the stroke execution level also accounts for the cues about the incoming ball that are used for ball-racket synchronization.

In tennis, modeling the interaction enables the model to extend from simple stroke classes (based on stroke and impact characteristics) to include subclasses for the conditions in which the movement is executed (compare, e.g., U.S. Publication No. 2019/0009133 A1). As a result, the stroke classes include details of the larger body-shot interactions illustrated in FIG. 26, such as:

Point of contact relative to player (forward, neutral, back)
Strike zone (high, neutral, low)
Incoming ball motion characteristics, including speed, bounce phase (rise, apex, drop) Inputs/Outputs The inverse model in FIG. 15 determines the stroke forward swing forward swing profile to produce the desired stroke and shot outcomes, under the current strike conditions (initial conditions and anticipated strike point). The inputs to the inverse model are the desired shot outcomes and the strike conditions (established during the preparation stage). The output of the inverse model is the stroke forward swing profile.

The inputs to the policy in the execution phase include the cues that are used to modulate and adapt the stroke profile relative to the incoming shot (1604 in FIG. 16). The outputs of the actions on the environment, here the racket forward swing and ball strike, are the movement pattern's profile, and the strike outcomes.

Measurement and Extraction

As described here, measurement and extraction of movement units are extended to body movements and environment interactions. These extended dimensions can be captured by additional movement sensors, affixed on the body segments, and/or computer vision processing (see FIGS. 19A-19E).

The measurements can also include gaze tracking to obtain information about the perceptual processing and visual attention.

V.III Movement Elements Detailed Modeling

All movement elements, the primary and the supportive ones share similar general characteristics. The following describes the common aspects of movement unit modeling, including the functional details, the operating range, and the modelling of the dynamics.

Behavior Units Functional Model

The movements behavior units are characterized by the range of conditions and outcomes, as well as the functional details such as the cues that are used to coordinate and initiate the behavior (see FIGS. 5A and 5B). Recall that the primary purposes of the movement behavior elements are to support specific aspects of the interactions with environment and task elements and has to achieve this in the face of uncertainties and disturbance (see adaptive behavior in FIG. 6).

Therefore, one task for modeling these subsystems is to capture their functional properties, elaborating upon the general approach for a movement model (compare, e.g., U.S. Pat. No. 10,854,104 B2 and U.S. Publication No. 2121/0110734 A1). For example, this approach can be elaborated by the present disclosure to include any one or more of the following:

Operating envelope, which is defined by:
  Range of outcomes.
  Range of operating conditions, including the nominal conditions.
  Start and termination conditions, that determine how the movement elements transition.
Set of cues that drive the behavior, at the decision level, the information to initiate and time the movement sub elements, and its adaptation.
In most movement units the motion is composed of a sequence of discrete phases such as described for the functional structure of a tennis stroke, or other movement unit (compare, e.g., U.S. Pat. No. 10,668,353 B2 and U.S. Publication No. 2020/0289907 A1, U.S. Pat. No. 10,854,104 B2 and U.S. Publication No. 2121/0110734 A1, and U.S. Publication No. 2019/0009133 A1).
As well as the operating environment characteristics and features that describe the specific interactions.
Functional mechanisms that support the adaptation to changing conditions.
Decision making features, including the internal models (forward and inverse model)

Model of Operating Envelope

An important aspect of the modelling is to characterize the operating condition of a movement unit, including the nominal conditions and the range of variations. These characteristics describe the agent's relationship with the environment and task elements.

Environment Dynamics

Since the movements take place in a dynamic environment, and the state of the environment; e.g., operating conditions, is a factor in the outcome (Eq. 2), the modeling and analysis of movement units has to account for the state or conditions of the environment. To produce the optimal level of outcomes under a range of conditions, players need to modulate their movement behaviors using cues from the environment. The cues are needed for coordination with the task or environment elements and objects. For example, these cues provide information for anticipating the incoming shot's or determine the bounce location and conditions, needed for the stroke's initial conditions and timing, as well as signal specific stroke movement profiles.

Control problems with redundancies, such as human movement, afford a broad manifold of solutions, where the specific solution is determined by the movement configuration, conditions, and outcomes. For example, in the execution of a particular stroke type, the player has to modulate the stroke spatiotemporal characteristics, to simultaneously manage conditions and achieve the desired outcomes. These characteristics are also relevant for the assessment of skill acquisition.

This flexibility is also used to adapt for changing conditions, for example, adapt the stroke to perturbations in conditions (e.g., due to effect of irregular surface on bounce) maintain the level of outcomes. The performer biomechanics and skill act as constraints that specify the exact form of movement characteristics.

Movement Dynamics

The exact movement dynamics can also be described using some state machine where states represent movement phases (compare, e.g., U.S. Pat. No. 10,854,104 B2 and U.S. Publication No. 2121/0110734 A1, and U.S. Publication No. 2019/0009133 A1). Each phase can be described by its specific dynamics. For example, the forward swing phase dynamics can be characterized by the initial state and the profile characteristics which describe the dynamic response. Movement phases typically combine multiple dimensions that are coordinated through so-called muscle synergies. In the stroke's forward swing, for example, the dimensions of interest can include the racket's coupled 6DOF motion and the simultaneous arm segment displacements such as the forearm rotation and pronation.

The neuromotor inputs used to drive the muscle synergies are generated by a general motor program. This program operates like a feedback policy with combining signals from the reference movement data and signals from the environment such as sensory gap in tau guidance. For example, for the forward swing, the sensory gap represents the incoming ball motion gap and the gap's rate of closure. Therefore, in the general case, the inverse model specifies the policy or program, in addition to the relevant parameters for its operation such as the movement phase initial conditions.

Operating Envelope Definition

Movement patterns from each skill element class are characterized by their specific operating envelope, which describes the range of movement technique, for example changes in phase profiles and the associated changes in outcomes and/or conditions (see FIG. 6; compare, e.g., U.S. Pat. No. 10,854,104 B2 and U.S. Publication No. 2121/0110734 A1).

The operating envelope can be characterized by regions or subregions within an operating envelope (compare, e.g., U.S. Pat. No. 10,854,104 B2 and U.S. Publication No. 2121/0110734 A1). For example, consider the following three specific regions or subregions:

- Nominal operating conditions define the typical conditions that explain the majority (e.g., 60%) of outcomes to achieve sufficient margin of error, and a high success rate.
- Optimal conditions for the execution of a particular pattern to achieve the best outcomes (e.g., top 10%) but results in reduced margin of error (reduced adaptability).
- Marginal conditions, which typically are feasible but result in a significant degradation of performance (bottom 20%). Here the goal is to return the ball but with low success rate.

These operating envelope characteristics provide critical information for the assessments and diagnostics. In particular, the performance data can be used to describe the relationship between the conditions under which the movement is performed, the technique used, and the movement outcomes.

Operating Envelope Statistical Representation

These operating envelope characteristics can be described by statistical distributions, e.g., multivariate distributions, which can be modeled by Gaussian mixture models.

FIG. 6 shows a stroke pattern with its primary outcomes depicted by distributions. The optimal conditions, some nominal conditions that are defined as an envelope around the optimum stroke profile, and then the feasible, but limit conditions. The figure also highlights the relationship between the distribution in the bounce conditions, the stroke technique, the first level outcome (the ball's spin a velocity leaving the racket) and the second level of outcomes (the ball trajectory relative to the court and its bounce).

The idea is to model the relationship between the distributions across the conditions, technique, and the different levels of outcome. For the stroke example, the goal is to specify the stroke and primary outcome distributions in relationship to the incoming shot conditions (including the player's setup, posture), and ultimately, the shot characteristics, which define the placement of the shot on the court.

Skill Element Integration

An important aspect of the extended skill modelling is capturing the mechanisms for the anticipation, planning, and perceptual processes at task level. The hierarchic model in FIG. 15 (and the general one in FIGS. 3A-3B) describes the complete set of interactions needed to perform an open motor task; therefore, it captures the information needed to characterize a performer's skills. An important dimension is the coordination which corresponds to the executive level function in the brain. Skills in open motor tasks depend on coordination of movement units with the task and environment elements.

Table 16 provides a summary of the key model's main parameters by level and stage of organization. The behavior units can have movement components that unfold concurrently (FIG. 12) or overlap (so-called coarticulation). For example, in tennis the first stroke phases take place in parallel to the ground movement and setup/preparation. More generally, the player ground movement and stroke preparation combine into a large behavior unit that can be decomposed into sub-units. Each of the subunits is itself composed of more granular movement phases (FIG. 11).

TABLE 16

Summary of the key model's main parameters by level and stage of organization

| | |
|---|---|
| Global Positioning | |
| Global conditions | Global pose for player and opponent<br>Ongoing shot exchange |
| Local Positioning | |
| Local conditions | Local pose (lateral, longitudinal positioning relative to bounce point, directional information, etc.)<br>Strike point (racket strike point relative to bounce point)<br>Bounce phase (racket strike point relative to bounce phase) |
| Stroke Execution | |
| Stroke state/ conditions | Forward swing profile<br>Strike conditions (relative to incoming ball) |
| Stroke Outcomes | |
| Impact conditions | Spin<br>Pace<br>Racket strike point |
| Shot Outcomes | |
| Shot | Shot length<br>Shot height<br>Shot direction |

Sequential Schedules/Programs

The control architecture detailed in the formal modeling section helps understand how the skill characteristics manifest at the different levels of organization. Once the skill elements have been extracted and characterized the next step is to model the mechanisms that explain the performance when they operate together within a sequence toward larger, more distal goals.

The planning level integrates the behavior elements into a schedule to accomplish the task goals. In tennis this program deals with the sequence: ground movement, preparation and stroke execution. In addition, the executive functions handle the coordination between the elements, determination when to start and stop, switch between the behavior elements (FIG. 12).

These sequences or programs at the task level are common to many human tasks or activities. The brain therefore possesses executive functions needed to perform general schedules but needs to adapt these to create more specialized programs such as for building tennis points.

In particular, the brain has to learn to work with the new skill elements, their specific sensory-motor interactions, e.g., extracting the cues, driving the visual attention to the appropriate locations at each stage of the sequence of behavior elements.

At the task planning level, the goal is to capture key relationships and causal chain; e.g., as illustrated in FIGS. 13A-13F and FIG. 15. This information provides the basis for the assessment and diagnostics, as elaborated below.

Learning and Summary

Based on the elements and architecture that were described in the formal model (FIG. 15), the following briefly outlines some hypotheses for learning open motor skills. In particular, it is possible to delineate the elements and constraints that condition human skill acquisition in open motor tasks or activities. These insights provide additional perspectives on what aspects of performance provide meaningful information for comprehensive skill assessments and their subsequent augmentations.

Skill Elements as Template for Learning

The central hypothesis is that the brain has a form of functional templates for learning skill elements. The templates are specialized for sensory-motor behavior and support the basic functionalities required to interact with the environment. When learning to perform a new activity such as tennis, the brain adapts existing movement behaviors and then specializes through differentiation (compare, e.g., U.S. Pat. No. 10,854,104 B2 and U.S. Publication No. 2121/0110734 A1, and U.S. Publication No. 2019/0009133 A1). Once a skill element has been learned it can be integrated with other skill elements to achieve larger goals.

Sensory-Motor Processes and Abstraction in Skill Learning

To enable integration within a plan, and execution, the skill elements have to be abstracted as units of organization and execution. The skill elements support the agent-environment interactions. As units of organization the skill elements provide the basis for the input-output encoding that is needed for planning and programing performance at the task level.

On the input side, the skill elements provide the encoding of the sensory dimensions to produce effective perception of the environment. The skill elements define the relevant cues and environment features that are needed for the specific interactions. The same applies on the output side. The skill element outputs are outcomes that describe the specific environment changes needed to support a task, resulting from the movement.

These two sides work in conjunction, as unit of behaviors. They constrain the input-output relations and result in a form of discretization of the activity's problem space. This explains how they can be used as abstractions for talk level planning. It also explains how specific facility (or impairments) at the skill element level will result in limitations at the task planning level.

VI. Skill Assessment and Diagnostics

Open motor skills build on a comprehensive hierarchy of behaviors and processes. The following describes skill assessment across different levels of the activity and movement process hierarchy. The hierarchical model provides a framework for assessment and augmentation. It determines the levels of behavior and dimensions, as well as system-wide organization.

Table 17 summarizes the behavior elements and outcome components across the levels. The components of the hierarchical skill model provide a description of the system of processes, encompassing the perceptual and decision processes needed to control the larger agent-environment system, and to control the environment; and, finally, the sensory-motor functions supporting the execution of patterns of motion producing the various activity interactions (see, e.g., FIGS. 3A-3B and FIG. 28A-28B).

TABLE 17

Example of the assessment and diagnostic dimensions for each level of behavior of the tennis example

| Level | Assessment | Metrics |
| --- | --- | --- |
| | Planning | |
| Task Planning (Global environment) | Shot target/stroke selection Shot sequence based on exchange dynamics Court discretization Point construction | Optimality of the shot target/stroke selection Variety of targets |
| | Central Executive | |
| Movement Sequence Deployment and Coordination | Coordination of movement elements with the events Adaptation of the sequence during exchange cycle | Timing and synchronization of movement stages relative to key activity events |
| | Movement Elements Execution | |
| Positioning movement (Local movement environment) | Optimality of the positioning (control of global conditions) Gross positioning (based on incoming shot and shot target: does it allow target and shot deployment?) | Range of footwork patterns Efficiency of footwork patterns Precision of footwork patterns |

TABLE 17-continued

Example of the assessment and diagnostic dimensions
for each level of behavior of the tennis example

| Level | Assessment | Metrics |
|---|---|---|
| Stoke Preparation (Execution environment) | Optimality of the stroke preparation<br>Coordination of stroke preparation and incoming shot<br>Timing<br>Modulation/adaptation to variations and uncertainties<br>Operating conditions (e.g., is the setup up within the stroke operating range?) | Range of stances and postures<br>Ingress conditions<br>Balance/stability<br>Weight transition |
| Stroke Execution (Strike environment) | Optimality of the stroke execution<br>Stroke and shot outcomes | Range of stroke types<br>Stroke technique<br>Shot precision |

Tennis NTRP Rating

The following illustrates the elements of the hierarchical model using the National Tennis Rating Program (NTRP). Table 18 depicts the rating system used by the National Tennis Rating Program (NTRP), with general descriptions for players of skill levels from 2.5 to 6.0. The following illustrates how the proposed model and methods can support a data-driven assessment for the characteristics that are used for the NTRP. To illustrate the model from the perspective of the NTRP system, the following briefly highlights the model differences between an advanced (Level 4.5 and up) and beginner tennis player (Levels 2.5-3).

TABLE 18

Sample of general descriptions from National Tennis Rating
Program (NTRP) for players of skill levels from 2.5 to 6.0

| Level | General Characteristics |
|---|---|
| 2.5 | This player is learning to judge where the oncoming ball is going and how much swing is needed to return it consistently. Movement to the ball and recovery are often not efficient. Can sustain a backcourt rally of slow pace with other players of similar ability and is beginning to develop strokes. This player is becoming more familiar with the basic positions for singles and doubles, and is ready to play social matches, leagues and low-level tournaments. |
| 3.0 | This player is fairly consistent when hitting medium-paced shots but is not comfortable with all strokes and lacks accuracy when trying for directional control, depth, pace or altering distance of shots. Most common doubles formation is one up, one back. |
| 4.0 | This player has dependable strokes with directional control and the ability to alter depth of shots on both forehand and backhand sides during moderately paced play. This player also has the ability to use lobs, overheads, approach shots, and volleys with success. This player occasionally forces errors when serving. Points may be lost due to impatience. Teamwork in doubles is evident. |
| 4.5 | This player can vary the use of pace and spins, has effective court coverage, can control depth of shots, and is able to develop game plans according to strengths and weaknesses. This player can hit the first serve with power and accuracy and can place the second serve. This player tends to overhit on difficult shots. Aggressive net play is common in doubles. |
| 5.5 | This player has good shot anticipation and frequently has an outstanding shot or attribute around which his or her game can be structured. This player can regularly hit winners or force errors off of short balls and puts away volleys. He or she can successfully execute lobs, drop shots, half |

TABLE 18-continued

Sample of general descriptions from National Tennis Rating
Program (NTRP) for players of skill levels from 2.5 to 6.0

| Level | General Characteristics |
|---|---|
|  | volleys, overheads, and has good depth and spin on most second serves. |
| 6.0 | This player has developed pace and/or consistency as a major weapon. This player can vary strategies and styles of play in competitive situations and hit dependable shots in stress situations. |

A beginner tennis player has reduced ability to anticipate an incoming shot, which corresponds to a limited ability to recognize the game state. Beginners also have a small movement repertoire with reduced accuracy in the shot placements; e.g., reduced ability to produce deliberate shot types and locations. Since these provide the building blocks to the higher-level representation, these limitations result in a coarse discretization of the environment state and resulting limitations in planning. These limitations also explain the lack of perception and recognition of the game state.

An advanced player, in contrast to the beginner, has a good ability to anticipate the opponent's shot and to a greater extent to identify the game state. These capabilities are enabled by a rich repertoire of behavior (shots and ground movement), with sufficient control of the shot direction and depth to enable controlling the game state and, therefore, make it possible to plan and structure the game. From a system's standpoint, these skills are enabled by a fully integrated high- and low-level behavior (as illustrated by the system in FIG. 15). With even more proficiency (Level 6.0), an even richer repertoire, and more developed perception of the game state and planning skills allow to be creative in the strategy.

VI.I Overview of Hierarchical Skill Assessment and Diagnostics

This section briefly describes how the hierarchical interactive model (see FIGS. 3A-3B) can be applied to skill assessment and diagnostics, and ultimately the synthesis of augmentation. First, a brief discussion of the extended repertoire followed by a description of the assessment considerations for the functional dimensions supporting the coordination and control of the behavior elements.

Diagnostics can focus on primary movement units (compare, e.g., U.S. Pat. No. 10,854,104 B2 and U.S. Publication No. 2121/0110734 A1, and U.S. Publication No. 2019/

0009133 A1). To achieve comprehensive diagnostics, and eventually augmentation, it is also possible to go deeper in the modeling, encompassing the interaction across the multiple levels of organization, which requires specifying key quantities at each level of the hierarchy and how the levels are coupled as described in the formal model (FIG. 15).

Hierarchical Skill Assessment: Assessment Levels

FIG. 28 illustrates the augmentation dimensions on the hierarchical model from FIG. 3. The hierarchical model makes it possible to achieve a comprehensive assessment and diagnosis of a subject's skills. This knowledge can subsequently be used to generate instructions and feedbacks to help drive the training process. The hierarchical skill model also provides the basis to design or adapt augmentation at the different levels of the control hierarchy.

The following section describes the components of assessment and diagnostics based on attributes that can be extracted at each level of the hierarchy. Subsequently, the type of real-time feedback that can be used at each level of the hierarchy, to augment the different dimensions of learning and performance. Table 17 gives an overview for the assessment and diagnostic dimensions, and the augmentation features for each level of behavior of the tennis example.

The present disclosure extends movement assessments and diagnostics to the entire skill hierarchy and sequence of behavior. The hierarchical model accounts for four primary levels (planning and the three movement levels). The present disclosure also considers the outcomes and conditions created at each level for the respective movement behavior, and the system-level integration under the planning and coordination processes (see FIGS. 3A-3B and FIG. 15).

The following outlines the various dimensions of assessments at the different levels of organization of the hierarchical model in FIG. 3. Table 17 gives an overview of the agent processes across the levels.

The general outline for the assessment is derived from FIG. 15. At the task level, in tennis, the optimality of the player's shot selection and pose given the game state (player and opponent poses, incoming shot). At the positioning level, the optimality of the ground movement given the anticipated strike pose and current pose (e.g., recovery pose). At the preparation level, the optimality of the preparation and setup given the pose achieved during positioning and the desired shot target. Finally, at the execution level, the optimality of the stroke execution given the achieved strike pose and the desired shot target.

Open motor skills activities share similar composition of movement skill elements. They typically have a primary set of actions or movement elements and sets of supporting movements. The model extends the movement behavior to include the entire set of supporting movements (e.g., move, prepare, execute in tennis). At the level of each movement behavior element, the diagnostics build on the functional properties/capabilities, but these diagnostics can also extend into the relationship between conditions and outcomes across the entire set of movement types in the hierarchy (compare, e.g., U.S. Pat. No. 10,854,104 B2 and U.S. Publication No. 2121/0110734 A1, and U.S. Publication No. 2019/0009133 A1).

Extended Repertoire

The representation of behavior in terms of repertoire of elemental behaviors (skill elements) acquired to support the range of agent-environment interactions, enables the model to characterize the various dimensions underlying performance (control, perceptual, decision making) at different levels of interaction. This understanding provides the basis for comprehensive skill assessment and diagnostics. The skills at the lower levels (e.g. execution and positioning) are a factor in the ability of the performers to exploit these elements and structure in the higher-level movement processes, such as for directing attention, predicting key events, and decision making.

These skill element interactions play a key role in assessments because they also implicitly capture the various biological constraints including sensory, perceptual, biomechanics. All of these determine the subspace of admissible motions which is relevant both from the standpoint of formulating representations that are functionally meaningful, as well as mitigating complexity.

Repertoire of Primary Actions

Every shot type in a game is ultimately produced by the racket's ball strike, and therefore, the stroke is the primary action used to produce tennis outcomes. However, good strokes are not sufficient for strong tennis skills since most strokes have to first be setup relative to the incoming shot. The stroke, through the effect of the ball strike, changes the state of the ball, which in turn determines its trajectory or shot driving the game.

For example, in tennis, the stroke repertoire of a player provides the actions that can be used to handle the broad range of conditions and outcomes for the game; the repertoire includes a lexicon of actions that can be used to perform the task. In addition, this disclosure extends the repertoire to supportive movements. These supportive movements can be an essential part of the subject or participant's repertoire of skills.

From a composite perspective, the quality of the repertoire can also be determined by its size; e.g., how many distinct motion classes in the repertoire, and the associated resolution of the task space discretization; e.g., how accurately the repertoire can capture the task requirements, such as by accommodating a range of conditions and outcomes (compare, e.g., U.S. Pat. No. 10,854,104 B2 and U.S. Publication No. 2121/0110734 A1, and U.S. Publication No. 2019/0009133 A1).

At the task performance level, poor repertoire results in a reduced overall operating environment, and manifests by having to compromise the performance and outcomes. The lack of range in operating conditions prevents from being able to handle critical situations. For example, in tennis, a broad range in conditions enables the player to return a larger variety of incoming shots, and a broad range in outcomes enables the player to produce returns that cover the court and are challenging for the opponent. Both are critical to control and win a game.

Repertoire of Postures

The stance and posture reflect the many ways the player can set themselves up to strike the ball. The chosen configuration depends on the conditions and the desired outcomes. In a proficient player, the stroke, stance, and posture are consistent for the given conditions and desired outcome. Skill acquisition is about planning the exchange, the movement and using the right stance and posture for the situation. Like the stroke classes, an important aspect is the acquisition of the repertoire of stances and postures (Table 15).

A poor repertoire of postures limits the ways a player can accommodate to the range of conditions and therefore limits the proper deployment of stroke to achieve the necessary outcomes.

Repertoire of Supporting Movements and Planning and Coordination

However, to perform good strokes, and hence effective shots, it is necessary to intercept the incoming shot and first create optimal operating conditions for the ball strike. This requires a whole sequence of supportive movements and processes. These include, reading the court environment, anticipating the opponent's actions, moving on the court, and preparing the stroke (see FIG. 15).

Therefore, tennis, like most other open motor tasks, requires an entire repertoire of different movement types, where each movement behavior typically has a repertoire of classes; e.g., forming what can be viewed a skill set. As shown in FIGS. 13A-13F, the outcomes of the court movement and preparation behaviors define the conditions for the execution of the primary movement behavior.

And in addition to the movement skills, the processes needed for deploying the behavior elements, including the planning and coordination. Therefore, to fully master an activity or game like tennis, requires a skill set and the situational awareness and planning processes, and the latter have to integrate the skill elements. In tennis it amounts to intercept the opponent's shots arriving in different locations on the court to and redirecting them to different target locations on the opponent's half side of the court.

Assessment Functional Components

The movement behavior elements can be modeled following the extracted motion pattern classes (compare, e.g., U.S. Pat. No. 10,854,104 B2 and U.S. Publication No. 2121/0110734 A1, and U.S. Publication No. 2019/0009133 A1). However, they can also be extended to capture the supporting movement behavior units and the associated operating environment. As described in detail here, each movement unit class is modelled as a sensory-motor interaction, with its associated sensory, perceptual and control mechanisms, allowing to capture their specific performance characteristics.

The performance data encompasses the following key quantities: outcomes, conditions and movement technique (pattern characteristics). These components describe the extended repertoire in typical open motor tasks. Measurements can also include psychophysical data such as the gaze (visual attention).

Recall that each instance of behavior, e.g. tennis exchange, is further described by the sequence of behavior elements (see FIG. 12 and FIGS. 13A-13F). FIGS. 13A-13F and FIG. 15 show the conditions and outcomes produced by each level of behavior in the sequence leading to a shot. In addition, the model includes the inverse models describing the decision process for each step in the sequence. Recall that the movement behavior is specified by the planning based on the overall task state (e.g., game state in tennis). However, the execution depends on the hierarchical schema.

With this extended model, the assessment and diagnostics can encompass the full range of dimensions that govern behavior in open motor tasks such as tennis.

Planning

An important dimension of open motor skills is how elements of behavior are combined and sequenced to achieve larger goals. The planning process determines how movement elements are deployed in the environment. The planning process therefore also makes the provisions for the player's environment control, which in turn determines the conditions under which the movement elements are executed. The environment at each level of organization of a task defines the operating conditions of the respective movement elements (FIGS. 13A-13F). Therefore, a poor outcome can result from different causes that arise at stages from the initial decision up to the shot execution.

The goal of the diagnostic process is to isolate and identify the causes for the performance achieved. At the planning level, the central question is whether the subject selects the best action, given the current activity state.

Once the goal is determined at the task level, a critical aspect of performance is the sequence of behaviors and the environment state that are produced at each stage as illustrated in FIG. 15. For example, the positioning and setup stage should create the environment conditions conducive for the stroke class used for the desired outcomes (see, e.g., FIG. 8).

In the sequencing, a critical aspect is the transition between behavior elements, and the sequence timing and coordination, which are produced by the executive functions. The assessment can also include these details and how the elements are differentiated and integrated. Proficient players have better differentiated and tighter integration between the units of behavior, which enables tighter task level planning and performance. For example, in tennis, first, the differentiation of the movement components (positioning, stroke preparation, and stroke execution), allowing coherent responses as a function to the phases of play, and, at the same time, the integration of these phases into a seamlessly flowing whole (see also the effect of skills on assessment, as described herein).

Perceptual Processes

The shot selection corresponds to the output side of the planning process (see FIGS. 5A-5B and FIG. 6). On the input side, skills amount to the ability to read the environment across the levels of task hierarchy, such as the conditions that determine the behavior at each level in FIG. 15. For example, at the planning level, making the correct shot election requires the subject to correctly recognize the activity state (situational awareness) and propagate the state (based on some forward model) to select the best action.

Therefore, an important aspect of performance elaborated in this disclosure is the environment features and cue environment, e.g., learning which environment features (including task elements such as opponent and ball) provide information for anticipate, and coordination with the task dynamics at each level.

The operating environment of each behavior elements are produced through the task-level and environment interaction resulting from the plan and the execution of these movement components. The assessment includes the coordination with the task or environment elements, including the cues and visual attention. The emphasis is on the operating environment created at each level and how these translate into movement outcomes (see FIG. 15).

Behavior Discretization and Task Performance

Discretization is based on patterns in the activity or game. Once the structure and form of behavioral discretization can be established but here based on the agent-environment interactions skills at the task level can be assessed from the contribution of the discretization to the task organization and ultimately performance. In tennis, the shot dictionary or repertoire provides information about the player's ability to discretize the activity and control the exchange (see e.g., FIG. 8).

Using behavior elements as states in the task performance makes it is possible to take a computational perspective on skill assessment. Basically, at the task performance level, skill manifests as the quality of the task state discretization. Two terms related to quality play important roles in control engineering: optimality and controllability.

Optimality is determined from the decision models (internal models). At the task planning level in tennis the optimality of the shot selection is gives the most advantageous evolution of the game state. Recall, to win the point a player will typically require a shot sequence. At the movement levels, the optimality is determined from the operating conditions and desired outcomes.

Skill assessment is different at each organizational level. At the planning level, in general, a higher resolution description of a problem space enables more complete and optimal solutions. In tennis, the relation between level of discretization and optimality manifests at the task level. For example, a proficient player has a broader repertoire of strokes and shot patterns, which translates into a broader set of strategies to build and win the points.

The effect of task-level discretization can be regarded In terms of controllability. A system is controllable if given any initial conditions and final condition, there exist a control sequence that drives the system from the initial to the final condition in a finite time. Controllability in tennis describes the range of deliberate target outcomes a subject can achieve from each condition, and more generally, how the subject can steer the sequence of exchanges toward a desired game state. This includes returning shots under a broad range of conditions and targeting a broader set of court locations while engaged in the dynamics of an exchange. This form of versatility ultimately determines how well a subject can build points.

Effects of Proficiency on Skill Assessment

The level of assessment and cueing depends on player proficiency, which encompasses the learning stage of the player's movement elements. For strokes in formation or consolidation, the performance is often insufficient to support meaningful training of higher-level outcomes such as shot placement and point construction. For strokes in the consolidation or optimization stage, complete assessment and augmentation across organizational levels can be achieved.

Furthermore, in open motor tasks, actions typically have multiple outcome levels. In tennis, the ball's trajectory (shot) is entirely determined by the racket impact, and location and the player's pose on the court at the instant of the impact. The following levels of outcomes can be defined: (1) the ball velocity and spin immediately following the racket strike (referred to as primary outcome); (2) the ball net crossing location, velocity and spin; and (3) the ball ground impact location, velocity and spin (see FIG. 4).

These outcomes can be measured directly, e.g., from computer vision, or can be estimated from impact measurements (via IMU, and player court positioning). Although the fact that all of these outcomes are all defined by the racket strike and can therefore be readily estimated from the stroke and player pose data means that a player may not be capable of controlling all levels of outcomes. Only proficient players can "close the loop" at each of the above outcome levels.

Beginning players (and other task participants) tend to not actively control their environment; they mostly react to the immediate conditions of a situation. Therefore, the participants cannot always adapt well to changing conditions, such as variations in the ball spin or pace, and, as a result, use their motor behavior to compensate for conditions instead of being able to control the conditions that will afford the best actions, e.g. being able to approach the ball to engage a more offensive stroke, and more accurately control the placement of the shot (see FIG. 7).

At the motor control level, the lack of experience often manifests as a lower level of outcomes, and also a smaller operating range in each movement class. Beginners also exhibit more variability in outcomes (stroke and shot) because of the larger motor noise, and because conditions are not sufficiently compensated for (and the least taken advantage of). Overall, beginners also have a reduced repertoire. Beginners have not acquired the more advanced techniques needed for more extreme outcomes and conditions, and they have not explored the full range of activity requirements.

Skill and Representational Complexity

Insights about the challenges of acquiring advanced skills in open motor task can be gained from modeling complexity considerations.

The model complexity needed to capture the details of a player's task performance can be used as a measure of skills at the task level. For example, a novice player who does not have a specific game dynamics and strategy does not have the same modeling complexity in terms of the number of states; e.g., behavioral elements, and game states, and have limited task-level planning and coordination.

Note that a relatively simplistic, game model where the player has to control a shot within coarse level of resolution (three depth levels), already requires relatively advanced proficiency. The reason is that it is not just about directing the shots to three different targets (as would be the case in closed motor tasks). In open motor tasks, achieving this level of performance relies on one or more of:

Precise anticipation of the incoming shot (e.g. depths)

Accurate and timely positioning on the court

Reliable stroke execution to direct the shot in the selected target area

More detailed models, corresponding to intermediate to advanced players, include the conditions at the incoming shot (spin and speed), and the outgoing shot spin and shot speed. Furthermore, the model also gets extended to the two court dimensions (longitudinal and lateral positions x and y), which also adds the player orientation and shot lateral-directional motion. Finally, other components of the body motion, including the posture, as well as the stroke dynamics. These dimensions add to the state space size, and the scope of planning and decisions of the court movements, the timing of the stroke phases with the incoming ball (to ensure optimal control over the impact conditions).

These additional dimensions dramatically increase the representational and decision-making complexity. For the simplified example, the combinatorial and the state dependence of available actions make it non-trivial. The player must learn a larger repertoire of shot patterns and learn to discriminate among a larger number of scenarios.

Fast human decision making has been shown to operate based on pattern matching. The combinatorial complexity explains why it is unrealistic to consider human perception and decision making based on traditional representations of the problem space such as arbitrary discretization. There are also behavioral reasons for the discretization (see finite operating range of motor programs), as well as operational ones such as the finite operating range of patterns.

The same general characteristics are shared by many other open motor tasks. Therefore, the general modeling, including the task environment and outcome discretization, along with the decision and control structure, can be derived for such tasks following this example.

Diagnostic Process Overview

The goal of the diagnostic process is to identify the larger combination of factors responsible for a given level of outcome. For example, in tennis, determine the contributing factors in less-than-optimal behaviors across the hierarchy, for example poor selection of shots for a given game state, or suboptimal outcomes in a certain class of strokes. These factors can span any specific aspect of planning, positioning, or setup and execution.

A key aspect in the assessment of open motor skills is the hierarchical model and sequence of behaviors. These include the perceptual and planning functions at the task level, and the decision making and perceptual processes at the different levels.

Diagnostics ideally should consider the entire chain of events and behaviors leading to the outcomes and ultimately task performance (see, e.g., FIG. 12, FIGS. 13A-13F, FIG. 15). The most direct approach to diagnostics is to determine patterns in the subject's performance data across the levels of hierarchy and sequence of behaviors.

Table 19 summarizes some of the criteria that are useful for the diagnostics at each level of organization. These details are elaborated by focusing on each level of organization in the hierarchy.

TABLE 19

Examples of skill assessment criteria and metrics across the different behavior elements

| Aspect | Criteria | Metric |
|---|---|---|
| Shot and Court Movement | | |
| Precision | Ability to target an area on the court within a margin of error. | Number of distinct patterns/court resolution |
| Controllability | Ability to target large set of areas on the court. | Number of shot target regions from different strike poses |
| Perception | Game state perception within point and exchange | Number of distinct game states that can be recognized |
| Planning/ Strategy | Ability to select correct targets based on game state | Effectiveness of shot target for game state |
| Anticipation and Positioning | | |
| Trajectory anticipation | Ability to predict the incoming shot ground impact across court. | Accuracy of expected shot ground impact point as a function of court locations. |
| Player Positioning | Ability to move into position in time and with sufficient precision across court. | Spatial and temporal precision to reach shot impact position as a function of court locations. |
| Stroke Preparation | | |
| Repertoire of stances and postures | Ability to achieve the correct setup pose for different shots and strokes. | Range and quality of the stance/posture repertoire |
| Stroke synchronization | Ability to time stroke preparation to incoming ball | Stroke smoothness and precision |
| Stability | Stability of the player in each stance | Movement variations during the execution |
| Stroke and Shot Execution | | |
| Repertoire of strokes | Ability to target different regions from the different strike poses. | Range and quality of the stroke repertoire |
| Adaptability to conditions | Ability to fine tune stroke to adapt to impact conditions | Modulation of stroke technique for conditions |
| Modulation of stroke outcome | Ability to make adjustments to the outcome during stroke execution | Shot precision for different conditions |

More specifically, diagnostics involve the identification of performance patterns, including specific fault patterns in a subject's behavior and performance. In particular, patterns between conditions, technique, and outcomes, for example as described with an influence diagram (compare, e.g., U.S. Publication No. 2019/0009133 A1). The model in the present disclosure encompasses the entire hierarchical system; e.g., it extends U.S. Pat. No. 10,854,104 B2 and U.S. Publication No. 2121/0110734 A1, and U. S. Publication No. 2019/0009133 A1 to encompass task level planning, positioning, and preparation, which can determine the operating conditions for the primary movement execution. Therefore, the patterns can span the comprehensive skill model components.

Data-Driven Diagnostics: Statistical Representation

FIG. 27 is a schematic illustration of the distribution patterns for the configurations and conditions at the different levels and stages of behavior across the hierarchical model (see FIG. 15). The dashed lines across the configuration patterns between the levels/stages, highlights a specific strategy, and the small circles describe the specific configuration at each level for one instance. From the left-hand side, it includes the global court configuration (game state), the local positioning, preparation, and execution. Each of these stage sets the conditions for the performance of the next behavior. Because of the dependencies and constraints in the activity and behavior, given a certain game state, only a subset of positioning patterns is possible. Similarly, for a selected positioning, a subset of preparation and then stroke execution and shot outcome.

In the tennis example, proceeding forward from left to right in FIG. 27: (1) A given global court configuration 2702 affords a set of plans for positioning and sequence of movement element behaviors; (2) the specific shot-player interaction dictates the positioning movement (Local pose-shot configuration 2704); (3) the positioning creates the conditions for the preparation (Preparation Pose-shot Configuration 2706); (4) the preparation creates the strike conditions (Execution Configuration 2708).

The statistical modeling of behavior across the stages and levels in FIG. 27 makes it possible to determine patterns in performance from weaker to better than typical performance. For example, the decisions and conditions that lead to poor overall outcomes, can be analyzed to identify the specific deficiencies. For example, every shot can be assessed for their outcomes and subsequently, the events and interactions for the best and worst shots can be analyzed to determine specific characteristics in conditions associated with the underlying sequence of behavior across the hierarchy (FIG. 27).

Diagnostics aim at explaining why a subject achieves their current level of performance. The ensemble of data from a period of activity (set, session, or longer historical log), can be used to compute distributions for the various movement elements. For example, in tennis, for a given stroke class it is possible to aggregate all the respective conditions and outcomes for the sequence of behavior leading to the shot. FIG. 27 illustrates the mapping between distributions of the conditions and outcome of the behavior element forming the sequence of behavior. Starting with the pose-shot configuration, the pose preparation, and the stroke execution. The lines across the configuration patterns between levels highlights a specific strategy, for example, for a given configuration of opponent and player pose and incoming shot, a possible local shot, preparation, and execution).

The representation in FIG. 27 highlights the patterns in system configuration for each level of organization; e.g., the distribution in global configurations $p(x_{p,os})$ (game state in Eq. 5), the distributions in pose after positioning movement $p(x_{p,posit})$, the distributions at preparation $p(x_{p,prep})$, and then the distribution at execution $p(x_{p,exec})$. The state can encompass any number of relevant dimensions (positioning, pose including end effector, etc.).

These statistical models provide the basis for statistical inference that can be used in the diagnostic process. As illustrated in FIG. 27, for each global configuration pattern, it is possible to describe the most likely local shot-player configurations at the positioning phase, the preparation phase, and the execution phase. Based on this representation, it is then possible to run various inferences based on outcomes and attributes at the different level of organization. For example, determine the player global court configurations for the best and worst shots. Or the local preparation conditions for the best and worst stroke. The statistical data associated with FIG. 27 can be used to perform inferences, such as to determine the propagation of decisions and conditions and their effect on the outcomes. More specifically, for example, Bayesian inference can be applied to investigate different hypotheses.

The knowledge gained from the assessment and diagnostics can then be used for augmentation and training. Conversely, the knowledge of conditions and behaviors that lead to be the best outcomes can help determine the type of reinforcements for augmented performance or training. In the proposed approach, the reference behaviors for desired patterns across the hierarchy can be determined from the subjects and/or population data, as described herein.

VI.III Task-Level Skill Assessment and Diagnostics

Skills can be primarily focused on movement execution and production of outcomes. In the present disclosure, the models and augmentation are extended to larger interactions and task performance. This disclosure also elaborates on prior models, starting with the task level (compare, e.g., U.S. Pat. No. 10,854,104 B2 and U.S. Publication No. 2121/0110734 A1, and U.S. Publication No. 2019/0009133 A1).

The discretization of behavior resulting from the system-wide interactions (see, e.g., FIG. 6 and FIG. 8), defines the behavioral state-space that allows a comprehensive and parsimonious representation of the behavior at the point and game levels and the mechanisms used for the coordination within the hierarchy (FIG. 15). The behavioral approach, building on units of behavior, helps define the actions, and the inputs associated with the perception of the environment. Together this system enables a formal analysis and assessment of an individual's skills across all levels including the planning and perceptual processes (FIG. 15).

Overview: Task-Space Discretization and Skills

Shot making combines the interactions at the environment level and those at the player/racket-ball level (see, e.g., FIGS. 5A-5B and FIG. 9). Since there are infinite configurations of agent-environment interactions and states, the brain tackles this problem by clustering conditions into sets or regions. In tennis these result in a repertoire of strokes and shots. The repertoire of stroke classes subdivides the shot conditions (ball impact height, spin, speed). When these shots are deployed on the court, they also lead to subdivisions of the court into subregions (FIG. 8).

Each shot type and their associated distributions in attributes depend on the stroke technique used, but also the ability to accommodate the variation in conditions. Players and other task participants do not learn strokes and shots (and other skills) for each specific combination of player position and target location. Instead, the participants discretize the task space (considering for invariants such as the symmetries in translation and rotation) to achieve an efficient task representation and performance. This discretization of the task space in terms of the behavior patterns results in task-level patterns (see FIG. 8). Each class of stroke/shot covers a range of conditions. As shown here, the stroke and shot repertoire is related to the discretization of the interactions in the agent-environment system. Finally, these shot patterns are used to build points; e.g., sequences of exchanges to control the game outcome.

Task Discretization and Task Performance

As can be appreciated from FIG. 8, the level of task performance is directly related with the granularity of the discretization achieved by movement behavior. For example, in FIG. 8, the player with more distinct shot patterns and precision achieves a better coverage of the court and therefore can achieve broader tactical effects. Higher resolution enables more precise positioning of the return, and broader range of outcomes which enable more variety in the game that can be exploited tactically. Typically, task performance increases with the increase in resolution; e.g., number of shot and stroke patterns or classes, subdividing the entire configuration space. However, the computational complexity typically sets limits to the level of optimality. The quality of the discretization is also critical; e.g., how well the interaction patterns discretize the task space; e.g., how compatible with the task structure, and simultaneously, how well it exploits the subject's movement capabilities, within the biological constraints.

The task discretization is relevant both for the analysis and assessment of the task or activity performance and is also relevant for the analysis and assessment of the subject's skill across motor, perceptual, and decision-making levels.

System-Level Assessment: Discretization and Resolution

With the hierarchical model and the resulting task-space discretization, it is also possible to introduce system-level assessments. From a formal standpoint, skills depend on how accurately subjects can "measure" and control their state; e.g., the position and orientation on the court, and the target position.

The task space discretization is determined by how precisely players can control the operating environment such as the position and conditions at the racket impact, which in turn depends on their ability to predict the opponent's shot. The level of resolution in the discretization is determined by several additional factors. The most direct, is the variability in the subject's movement performance from the ground motion to the shot making. In this tennis example, producing reliable shots requires precise control of the ball interception to create the specific impact conditions that will produce the precise strike outcomes.

In computational motion planning, the resolution of the discretization of the task environment space determines the optimality of the solutions. The player's ability to create a finer discretization is determined by the quality of the shots (interaction patterns), but this discretization depends on the ability to control the environment compensate and take advantage of conditions. This is a central characteristics of open motor skills.

The quality of the shot outcomes also depends on the of perception of the court and target areas needed to control the shots in a deliberate goal-directed fashion, as well as perception of the opponent and prediction of incoming shots and the court positioning to achieve the conditions that are favorable for the ball strike.

Controllability

Techniques from control systems and computational motion planning can be adopted here to assess a subject's skill at the task and repertoire level. Building on the behavioral state-space representation resulting from the repertoire of skill elements, provides for building on controllability, as borrowed from control theory. A system is said to be controllable if given any initial and final state, there exist a control sequence that drives the system from the initial to the final state in a finite time.

In tennis controllability translates in being able to return shots from a range of strike poses to a range of targets while deliberately controlling placement, e.g. in contrast to returning shots reactively. This relates to the following capabilities: (i) controlling the conditions to enable shot precision; (ii) managing to direct the ball to a specific location with sufficient precision; and (iii) being able to perform (i) and (ii) over the largest area of court space possible and the largest range of incoming shots.

Given an incoming shot, the player is constrained to intercept the ball along the ball's path. The player can only partially control the specific location of the ball strike (through anticipation, court positioning). Most of the control is in the return shot target and through point strategy; e.g., using a sequence of shots to put the opponent into favorable game states (Eq. 8).

Producing precise shots directed at specific location starts with the ability of the player to control their environment; e.g., position themselves relative to the incoming ball, which requires anticipating the incoming ball trajectory, and the ability to move to the anticipated interception position. Doing so enables the player to maximize his or her opportunities to create a state at the interception location that affords the set of desirable strokes in the repertoire, and hence, affords the level of controllability to achieve the desired shot target and state.

Perceptual and Planning Processes at Task Level

At the highest level, naturalistic decision making relies on some form of pattern matching. Behavioral elements basically provide the representation for higher-level planning and perception. The highest-level representation is described by the game state (Eq. 5). The underlying hierarchy is described by its internal models. This model can be used to describe a variety of performance patterns exhibited by a player or subject in another domain.

The shot-environment patterns forming the game state combine the effect of perception and action. These can be analyzed through the interaction model. On the input side, the resolution of the discretization determines the resolution of the state and conditions.

Perceptual Processes

Task-level perception is responsible for the recognition and classification of the overall situation (game state Eq. 5) from limited observations of the objects, and actions of the opponent or other agent in more general activities. Recall that situational awareness (SA) encompasses processing the larger task environment and predicting the future environment (see game dynamic model in Eq. 6). This knowledge is then used to support decision about positioning on the court, and the selection of shot targets that will produce desirable effects on the environment (FIG. 15).

For the tennis example, behavior element properties determine the ability of the performer to distinguish between different shot types from the opponent, predict the impact location on the court, including bounce characteristics, needed to determine how to best intercept the ball (on the rise, top, or fall, see FIG. 7) to achieve the outcome.

Assessing the perceptual processes at the task level, therefore, includes determining the player's ability to recognize different game states and to predict future states. This information needed to by the player, is contained in the game state representation and game dynamics, which can be identified from performance data (Eq. 5 and Eq. 6). These quantities, therefore, are useful for the assessment and diagnostics. However, isolating high-level perceptual components of performance may require a player to be tested more specifically, for example, similarly to chess players, as discussed above.

Planning Performance

Planning at the task level deals with the overall coordination of behavior elements (see FIGS. 13A-13F) within the underlying hierarchy (see, e.g., FIG. 10, FIG. 11 and FIG. 12, and the formal model in FIG. 15). As seen in the previous section, the behavior elements can be used to build a type of forward model for the higher-level performance (Eq. 6). The output of this model in turn determines the state sequence (move, prepare, execute) taking place during the exchanges.

Planning manifests primarily at the task performance level. Task performance can be assessed using optimality, e.g., how much time or energy is used to complete a task. Task performance, however, is not always as straight-forward to measure, but optimality provides a meaningful principle to illustrate how the model's key quantities can help describe task performance. In tennis, simple optimality metrics can be assessed directly by measuring the number of exchanges to build a winning point, including the energy required to move on the court and strike the ball.

Given the game state, determine the optimal shot target and strike pose. The hierarchical model based on internal models makes it possible to predict the task evolution and the course of actions. The transition probability in the environment model (Eq. 6) can be used to assess the evolution of the game. A competitive player will learn the game patterns that result from his or her choices; e.g., predict the opponent's response created by the shots for given state (usually described by a forward model).

Internal Models

The planning process is described as a form of forward model with long-term memory of the high-value game state sequences and associated actions (shots and positioning). The quality of the model is determined by the quality of the prediction within a point (transition probability in Eq. 6).

Proficient players and task participants can perceive the game state in greater detail, have a richer set of plans dictating the evolution of the game state, and among those options, can select the best course of action for that given current state. This means they possess a more complete and accurate representation of game states (Eq. 5). The sequence of actions also is expected to better match the unfolding of the situation during the exchange, keeping options as the exchange unfolds in case of contingencies. Finally, their prediction also is expected to be more accurate. Basically, proficient players have a better situational awareness (SA).

Beginner players in contrast have a more limited situational awareness. Beginners cannot always read the game state and possess reduced or even nonexistent task or game-level representation. Their selected sequence of actions is also not necessarily consistent with the best anticipated actions. These limitations are both a result of limited stroke, shot and ground movement repertoire (limited repertoire of movement units), and limitations in the mental representations (internal models) needed to operate within an exchange and sequence exchanges to build points. As a result, beginners are usually operating more reactively, and experiencing a greater amount of surprise. These limitations prevent players from combining elements of movement units to construct points.

The game dynamics depends on the sequence of actions within the exchange starting from a current game state (player and opponent poses at incoming shot) leading to the subsequent game state. Recall, the sequence of action in tennis includes the court positioning, and preparation and selected shot outcome at the strike. Therefore, the reliability of the high-level prediction and planning depends on the quality of the game state representation and the underlying behaviors. These lower-level behaviors are described next.

VI.IV Assessment at Movement Deployment Level

The positioning and preparation used in the deployment of actions is a critical aspect of open motor tasks. This level is responsible for the task element coordination and movement implementation before the primary movement (stroke in tennis). It includes the larger movement based on the planning and the preparatory movement taking place before the primary movement execution. Assessment focuses on (1) sequencing and coordination of movement elements within an exchange and (2) the movement characteristics in relationship with the task elements. At the deployment level, these behaviors focus on the creation of adequate operating conditions.

The stroke and its outcome depend on a chain or sequence of events that determine the exact strike conditions. The sequence of behaviors preceding the primary movement, such as preparation and final adjustments, affect the stroke execution and the conditions of execution. Therefore, capturing these details is critical to achieving a complete and detailed diagnostic.

Proficient performers have a more structured organization with coordination of the stages. Less proficient performers tend to have a weaker delineation of the movement behaviors which affects the structure and coordination of the stages.

Movement Characteristics

In open motor tasks, the performer's skills are determined to a great extent by the ability to control the conditions in which actions are executed. For example, in tennis the conditions at the ball interception and stroke execution determine the quality of the stroke outcome (FIG. 15).

The conditions rely on positioning of the performer before the strike. These conditions cannot be created instantly but depend on the prediction of the incoming shot, the decision of the target outcome, the ability to move and take the correct position; and, finally, initiate the stroke at the right time to create the conditions that are consistent with the expected, desired outcome.

The setup and preparation are the focused on the precise control of conditions. At that level/stage, the perceptual mechanisms are focused on the task and environment elements that are critical for the primary action execution (stroke in tennis).

By modeling the positioning and preparation behavior as a skill element, the information contained in these elements can be used to categorize the respective movement behavior for subsequent analysis, similar to modeling a primary movement element, including forming a repertoire of positioning and preparatory movements (compare, e.g., U.S. Pat. No. 10,854,104 B2 and U.S. Publication No. 2121/0110734 A1, and U.S. Publication No. 2019/0009133 A1).

Positioning Movement

A critical role of the positioning is to control the conditions, and more generally, the affordances. Recall, the affordances define the sensory-motor environment for the actions and their outcomes. This is one of the central characteristics of open motor skills, where the agent controls its sensory-motor environment in addition to the actual movement execution.

Patterns in positioning can be extracted including footwork patterns, for example described by the sequence of left-right steps (direction, length, speed), and coordination the upper body motion (e.g., unit turn).

Preparatory Movement

Similar to the different stroke classes, there are different types of preparatory movements. Some of these differences are due to the different stroke types which require different setup conditions but there may also exist different types of preparations for the same stroke type such as to accommodate different incoming shots.

Patterns in preparatory movements here also are movement element, in this case the patterns will include smaller footwork patterns with a bigger component of upper body and arm motions.

VI.V Assessment at Execution Level

The same stroke class performed under different conditions, will result in different movement execution characteristics, and therefore different level of outcomes. At the movement execution level, the main assessment components are the effect of operating conditions on performance characteristics, and the characteristics of the functional mechanisms, including the perceptual processes.

Performance Characteristics

The performance characteristics of the movement elements such as the stroke in tennis can be assessed by the relationship between operating conditions and outcomes. The model of the operating envelope of each class of movement units can be used to analyze and assess the interplay between the system configuration, including the perturbations in conditions, and their role in determining technique and outcomes. In particular, it allows for quantifying the adaptation of movement patterns to these perturbations, which is an aspect of skill.

Functional Characteristics and Conditions

Execution of a primary movement can be described to including some functional properties (compare, e.g., U.S.

Pat. No. 10,854,104 B2 and U.S. Publication No. 2121/0110734 A1, and U.S. Publication No. 2019/0009133 A1). In this disclosure, the functional modeling can also extend to the environment interactions, in particular conditions and perceptual processes, which support the environment interaction and coordination.

Each stroke class has its specific operating domain of conditions and resulting range of outcomes, which can be assessed from the data. These classes combine to form the repertoire of behaviors. Proficient players (and other proficient task participants) have larger number of stroke and movement classes, where each class displays a more specific range of conditions, with more efficient techniques and higher levels of outcomes. Therefore, collectively, their repertoire will cover larger conditions and outcomes, and as a result proficient participants will have wider opportunities to build shots, win points, and perform other task objectives. However, proficient players may also set higher demands on positioning and preparatory movements.

Tradeoff in Performance and Robustness

An important property of the skill element is the relationship between performance and robustness. Robustness is the tolerance for uncertainties in the conditions. Disturbances in conditions can be caused by the environment (wind, surface quality, etc.) as well as variability in movement characteristics such as motor noise.

Typically, when a system operates away from its nominal conditions there is a degradation in performance. In movement this degradation can manifest in the decrease in the level of outcomes, or a decrease in efficiency and increase in the variability in the shot outcome. As one operates closer to the operating limits, the human sensory-motor processes operate in suboptimal conditions, resulting in less robustness to variation in operating conditions as well as increase in motor noise (see stochastic effect, e.g., degradation of performance such as found in Fitts law or the rule for speed/accuracy tradeoff).

The skill element's operating envelope, help explain the tradeoff conditions how the maneuvering margins for the operation are determined. For example, techniques that are optimized to achieve the highest level of outcomes typically have a narrower operating margin than conservative techniques with lower outcome levels. The latter typically provide more robustness to uncertainties. These considerations are important in decision making and the selection of the level of outcome given the general conditions and task state.

Perceptual Processes at Execution Level

The environment conditions for the execution are determined by the preparation level. During the execution, the perceptual mechanisms are focused on the functional mechanisms. For example, in the stroke execution, there are two primary inputs, the timing of the forward swing initiation and the modulation used to fine tune the movement execution in relationship with the incoming ball. The assessment of perceptual mechanism can be performed using perceptual guidance theory (tau theory) described in the previous section of the disclosure.

Assessment and Diagnostics Synthesis

The output of the assessment and diagnostics is the visualization of the elements. The visualization can be based on simulation, graphical renderings, or directly superposed on the corresponding elements (see e.g., the pose information in FIGS. 19A-19E). This type of visualizations makes it possible to highlight the critical features of behavior across the hierarchical model.

Activity pattern analysis can combine the video processing features and motion pattern from motion sensors.

The video data represents a natural medium for communication of assessments and diagnostics. For example, it is possible to use video frames to superimpose information from assessment and diagnostics; see e.g., body poses at different behavior stages in FIGS. 19A-19E.

VII. Skill Augmentation

The general goal of the augmentation is to provide feedback to the subject during and after performance to enhance skill learning and task performance. The present disclosure extends the feedback and augmentation system to encompass interactions at the task environment level (see FIG. 28A-28B) (compare, e.g., U.S. Pat. No. 10,854,104 B2 and U.S. Publication No. 2121/0110734 A1). The hierarchical model provides a framework for design of such augmentation systems. Given the scope of the model, augmentations can take a broad range of forms. As illustrated in FIG. 28, augmentations can target functions at multiple levels of interaction and organization across the system hierarchy and, therefore, can in theory include the entire range of interaction processes, such as task planning, executive (directing attention and coordinating the execution of movement elements), and movement motor control (see detailed model in FIG. 15).

The augmentation system should ultimately also interface with the natural cueing processes and satisfy the biological constraints. Therefore, both specific functional and system-level considerations should be made. For example, task level planning relies on the higher cortical processes such as those taking place within the prefrontal cortex. Positioning and coordination rely on a combination of executive, perceptual and pre-motor motor functions, while motor execution relies primarily on the sensory-motor centers and lower-level visual processes.

The tennis use case will provide more details of augmentations across the different levels, but before that, the following briefly describes considerations for design and implementation.

VII.I Augmentation Overview

The augmentation system builds on the model of performing and learning open motor tasks as described in previous sections of the disclosure. As such, open motor skill learning entails the acquisition of planning and perceptual skills, feedback coordination across multiple levels of organization, and movement skills (see FIGS. 3A-3B, FIG. 15; FIGS. 28A-28B).

Augmentations may focus on the movement technique and outcomes of a subject's primary movement skill elements (compare, e.g., U.S. Pat. No. 10,854,104 B2 and U.S. Publication No. 2121/0110734 A1, and U.S. Publication No. 2019/0009133 A1). Feedback mechanisms at this level of the movement performance, however, may only help the subject maintain movement technique and outcome in the face of disturbances and uncertainties within a limited range of operation. These movement elements, as illustrated in FIGS. 5A and 5B, operate as subsystems, and therefore provide some nominal levels of stability and performance for the whole system to remain stable and achieve its goals.

The present disclosure extends the movement to the larger environment interaction and encompass the system-wide processes supporting task performance, including perceptual, decision making (action selection), the coordination of the stages of behavior, and the execution of movement behavior elements.

In open motor tasks, the movement elements should be deployed in the environment in such a manner that they can operate close to their nominal operating conditions, and thus best achieve their desired outcomes. A critical skill for open motor tasks is therefore the control of operating conditions; e.g., the operating environment for the primary movements used for the task or activity. FIGS. 3A-3B and FIG. 15 describe the conditions that are produced at each level of organization and Table 17 outlines the behaviors and outcomes across the hierarchy.

In addition, subjects must coordinate sequences of skill elements to achieve the task goal. Given the most distal task or activity goals (e.g., winning a tennis point), the players plan a sequence of activity states. The skill elements, therefore, should be deployed by controlling the larger task or activity environment state following a precise sequence. Successful prediction and execution minimize surprise and therefore creates flow in the performance. Achieving flow requires reliable planning and perceptual processes and movement execution. In tennis, the player must anticipate the incoming shot using a set of cues and position the body for the strike while accounting for the task plan. The plan is then used by a coordination policy to predict the upcoming environment behavior at different levels of organization (see FIG. 15). The performance of these processes will vary vastly based on skill level; therefore, the augmentation has to account for the users' skills.

Next, different perspectives on the augmentation are provided. FIG. 28 illustrates the hierarchical model highlighting the functions that lend themselves to augmentation across the levels of organization.

As shown in FIGS. 3A-3B and FIG. 28A-28B, perception is a critical aspect of the environment interaction in open motor task. The development or acquisition of the perceptual mechanisms across multiple levels of organization is critical in complex tasks. FIG. 28 shows the augmentation can target the perception of environment cues used at the different levels of organization. These encompass the global situational awareness and orientation, including the recognition of features of the environment that are predictive of important task events needed to coordinate movement behaviors, as well as features that are used for the synchronization of movements with events associated with object or environment interactions (see FIG. 12).

In one example, illustrated in FIG. 32, augmentation of movement behavior elements and interactions in an environment may include using reference models describing desired behavior for the forward model, the coordination policy, and the inverse models to synthesize a feedback cueing law to assist the participants in one or more of the following aspects.

Assist a subject selected from participants to plan for the next sequence of movement elements toward a goal or subgoal.

Assist a subject selected from the participants in coordinate the sequence of movement behavior elements including achieving operating conditions and outcomes for respective movement elements in a sequence of movements toward a subgoal or goal.

Assist a subject selected from the participants in initiation of the element in a sequence of movement behavior elements and synchronization with one of the task or activity objects or features of the environment to achieve or improve a selected one of the respective outcomes.

Assist a subject selected from the participants in preparation of the element in a sequence of movement behavior elements and synchronization with one of the task or activity objects or features of the environment to achieve or improve a selected one of the respective outcomes.

Assist a subject selected from the participants in execution of the sequence of the element in a sequence of movement behavior elements and synchronization with one of the task or activity objects or features of the environment to achieve or improve a selected one of the respective outcomes.

Movement Organization Levels and Augmentation

Learning complex skills such as open motor tasks involve the acquisition of different types of units of organization (FIG. 11A). Units start from basic motor actions, which typically coincide with movement phases, these combine to form movement elements, these are then organized into sequences or plans to achieve specific task goals. Augmentations can therefore operate at these different levels of organization. Suitable augmentations can take various forms, depending on their level in the system hierarchy, and depending on their use for performance enhancement or learning.

The augmentation system follows the model's hierarchical architecture described in FIG. 3, in which movement skill elements are acquired to support the task and environment interactions, and ultimately the task or activity goals. FIG. 28 shows examples of augmentations at each level of the system's hierarchy (highlighted in gray boxes). Notice that augmentations fall under the perception or control category, i.e., augmentation can enhance the subject's ability of extracting necessary information, and/or, it can enhance the decision or control process. Notice also, how these capabilities can be delineated across the hierarchical levels and stages of behavior.

Furthermore, at the point of movement element execution, the augmentation system should account for the primary movement deployment, preparation, and execution, as well as the distinction between primary and supportive movements. Recall the three movement stages (so-called phases of play in tennis):

Movement element coordination level augmentation targets global configuration and positioning needed to optimize the conditions under which the primary actions are performed, thereby affecting their outcomes (setup of initial conditions). Augmentation at this level include cues for anticipation of the current phase of the activity to help control the conditions for the next action (e.g., positioning cue based on the anticipated opponent shot ground impact to help preparation of the players shot toward target).

Movement preparation level augmentation targets the local positioning and preparation of primary movements by the synchronization the movement execution with the task elements (movement timing and modulation). Augmentations at the preparation level include cues for the preparatory movement creating the local conditions for execution (e.g., stroke preparation and synchronization of the stroke with the oncoming ball).

Movement execution level augmentation targets execution of movement elements by providing feedback about technique and outcomes (knowledge of technique and outcomes (compare, e.g., U.S. Pat. No. 10,854,104 B2 and U.S. Publication No. 2121/0110734 A1, and U.S. Publication No. 2019/0009133 A1). Augmentation at the execution level include cues to help prime and fine tuning of the movement execution associated with the primary movement behavior (e.g., the modulation and timing of the forward swing stroke toward the ball strike).

An example system for implementing and delivering augmentation to a subject engaged in an open motor task may include a processor with memory configured for receiving data from a sensor system. The system may be configured for acquiring data for the subject engaged in the open motor task, in an environment. The processor and memory may be configured to execute processes. An activity recognition process may include a sequence of movement types toward a goal, and detection of stage in the sequence. A model building process using task or activity patterns obtained during the activity recognition process may form a dynamic task model of the movement behavior patterns, where the movement behavior patterns are described as behavioral states of one or more agents and associated task and environmental elements and objects in the environment. A determining process may use a task strategy map and inverse models to determine a reference behavior across a behavior hierarchy including a reference for the overall plan as a sequence of actions and their corresponding subgoals, and reference outcomes and movement execution for the underlying movements. The system may include a means of communicating the references in the form of cues presented as an enhancement of the natural task and environment cues.

In the example system, perceptual cues may be implemented using augmented reality glasses, enhancing perception of one or more elements or features of the task or activity environment.

In the example system, perception may be enhanced using timing cues in the form of audible cues or haptic cues coinciding with key activity events and/or interactions.

Functional Levels and Augmentation

Finally, the augmentation system should account for the levels of organization's functional properties. The hierarchical model distinguishes between task-level perception and movement planning, local environment perception and decision making, and movement implementation (see FIGS. 3A-3B; FIGS. 28A-28B). In addition to planning, task-level functions also include the executive control used for sequencing and coordination of the different movement elements over the stages in a sequence of movements. As a result, the functional delineation considers the following distinctions: planning and decision process level, the executive level, and the actual movement process levels (positioning, preparation, and execution).

The planning and decision processes deal with task configuration and strategy; therefore, these processes engage with global perception and situational awareness. The augmentations at the planning process level can include a broad scope of forms such as directing visual attention for situational awareness, planning and anticipation. For example, in tennis, augmentation can include the cues for subgoals (e.g., shot target cue in point construction).

The executive level augmentation targets the coordination of the skill elements deployment, to implement the plan and achieve the desired task performance levels. This corresponds to the implementation of the plan over the main performance cycle. At this level, the emphasis is the movement sequence configuration and coordination with the activity environment and events to create the condition for the local task goal. Augmentation can include cues for the performer's positions and body pose, as well as timing in the sequence. For example, in tennis, cues can also help coordination of the movement sequence of positioning, stroke preparation, and stroke execution, by anticipating the ball trajectory and bounce location.

At the level of the movement element execution, the augmentation primarily cues for the preparation of the movement element and the outcome of each movement element. For example, for the primary movement element in tennis, the stroke, augmentation can assist with the setup the stroke and timing and the execution of the forward swing to achieve the desired stroke outcomes.

Information Processing Hierarchy and Augmentation

In addition to the hierarchy associated with the task and behavior organization, and the hierarchy associated with the functional organization, it is possible to define levels of augmentation related to the different levels of human information processing (compare, e.g., Rasmussen 1983). These can include the cognitive or symbol level, the cue level, and the signal level. Augmentations can target the representations (abstractions) at the cognitive level, the movement guidance functions at the cue level, and the sensory-motor functions at the signal level. These cues may also operate in a way that is compatible with the functional properties at these levels (compare, e.g., U.S. Pat. No. 10,854,104 B2 and U.S. Publication No. 2121/0110734 A1, and U.S. Publication No. 2019/0009133 A1).

For example, at the cognitive level, augmentation helps the subject form mental representations, and effective encoding of information to abstract the details. This type of augmentation can take the form of visualizations of patterns at different levels of the movement organization (FIG. 15). For reference see also the literature on long-term memory representation of motor skills. Cueing and augmentation at the cognitive level also include tools and methods for mental training.

At the cue augmentation level, feedback encodes information to help direct subject's movement execution, such information about timing, direction, or magnitude of movement. This augmentation level includes cues for different aspects of movement behavior preparation and execution, including movement synchronization, modulation, and execution. The cue level is best communicated in visual or verbal forms.

Finally, at the signal level, augmentation is suited for movement process augmentation level, feedback operates at the lower-level sensory processing and motor implementation and includes signals for modulation of these processes. Cueing can also augment various aspect of the movement process, including, but not limited to (compare, e.g., U.S. Pat. No. 10,854,104 B2 and U.S. Publication No. 2121/0110734 A1):

Movement optimization
Movement feature validation
Outcome validation

Cueing related to movement technique are related to the so-called knowledge of performance (KP). Cueing of movement outcomes are related to the so-called knowledge of result (KR).

Subsequent sections of the disclosure will use Rasmussen's symbol, cue, and signal categories to provide a more detailed description of the augmentations for the tennis example. Before that, the general computational approach is briefly described, building on the formal hierarchical model.

Cueing Computational Approach

Augmentations can be formalized based on the architecture outlined in FIG. 15. The internal models in this architecture that can be identified from the subject's data provide the computational basis for the determination of cueing laws. Following the formal model architecture in FIG. 15, there are three primary types of models:

> Forward models support the planning (planning process level, long-term memory of sequences of game states). This corresponds to the higher-level fast-access pattern recognition system.
>
> Coordination policy describes the sequence of movements in the current task or activity cycle (e.g., tennis exchange shown in FIG. 2 or segment of maneuvers in skiing in FIG. 34).
>
> Inverse models at each stage in the behavior sequence (movement process level), that determine the movement technique based on the outcomes and condition.

Note that in addition to the inverse models at each behavior stage, it is possible to include a forward model that provides the sensory consequences of the actions. This information has been shown to play a critical role in assessing movement performance and learning (see KP and KR above).

These three types of models essentially capture the knowledge needed to drive behavior. Therefore, if it were available, it could be used to augment performance and learning. The challenge is that the models must be adequate for an individual's skill level. For example, performance at the task level depends on the availability of effective movement elements to support the range of interactions, therefore, augmentation should be adapted to the skill level.

According to the forward model there are three primary quantities, the state of the environment and the plan which is a sequence of movement elements and the goal for the current planning cycle. Therefore, cueing at this level can operate on the input, which are primarily perceptual quantities that help the subject form an awareness of the game or activity state. Cueing can operate on the output, basically, assist the subject become aware of the goal or subgoal for the current activity cycle.

According to the coordination policy, there are the state of the activity in the current cycle, and the specification of the sequence of movement elements. Therefore, cueing at this level can operate on the input, which are primarily perceptual quantities that help the subject form an awareness of the activity cycle, however, here in contrast to the level of the forward model, the state describes the timing and synchronization of key events. Cueing at the output level corresponds to the specification of the movement sequence.

According to the inverse models there are three primary quantities: the two inputs: desired goal, the condition, and the output: the movement specifications. Therefore, cueing at this level can operate at the inputs; e.g., the conditions and the outcome, which are primarily perceptual quantities, and the output: the motor response specifications, which are essentially movement form. The augmentation of the desired outcome represents a form of attentional cue, e.g., as in tennis, the purpose of cueing is to designate the movement target. The augmentation of the conditions represents a form of perceptual cue. The augmentation at the output represents a form of motor cueing.

Cueing Law Synthesis

One way to synthesize the cueing law is to create these from the user's own data. Given the variability in performance, the best performance demonstrated by the user at each level can be used to synthesize a cueing law that drives the user to perform according to his or her best performance. Over time, this approach may iteratively improve the performance as the user gain more facility. In summary, the models can be used to extrapolate reference behaviors across the hierarchy that can produce higher levels of performance.

In addition, population data can also be integrated in the cueing law synthesis process (compare, e.g., U.S. Pat. No. 10,854,104 B2 and U.S. Publication No. 2121/0110734 A1, and U.S. Publication No. 2019/0009133 A1). For example, performance data from other subjects, selected from a group that is representative of the user's skill level, can be used to synthesize normative model for the performance expected across the hierarchy for that skill level. Additional groups of higher levels can be added to a library to provide incremental improvements across the hierarchy.

Finally, computational techniques can be used determine theoretical performance characteristics for different skill levels. For example, machine learning methods could be used to synthesize internal models based on domain knowledge such as expert coaches.

The following example elaborates the hierarchical functional augmentation for the tennis example. To illustrate how to generalize these techniques to other suitable activities, skiing is considered as an example.

VII.II Tennis Hierarchical Augmentation Example

The final step is to turn the results of the modeling, assessment, and diagnostics into training interventions, and/or feedback, that can help subjects enhance their performance and skill training.

The following first gives an overview of the functional augmentation for the tennis example, including the levels of augmentations that are enabled by the hierarchical skill model. Then, each level is detailed, using the human information processing hierarchy.

Tennis Functional Augmentation Hierarchy

The hierarchical model in FIG. 3 shows the key functions supporting open motor behavior. FIG. 15 describes these processes emphasizing the control architecture, which provides the foundation for the organization and definition of augmentations for the tennis example. The model describes the key quantities and processes. As already described one central aspect of open motor tasks such as tennis is the coordination of the movement elements in the current activity cycle including the positioning used for controlling the operating conditions for the stroke performance (the primary movements) and the attainment of shot outcomes. FIG. 28 shows the augmentation primarily delineated between the perceptual functions and decision-making functions across the hierarchy.

TABLE 20

Augmentation features overview

| Level/Stage | Augmentation Features |
|---|---|
| Planning | |
| Movement sequence planning | Point strategy including target and shot type<br>Nominal movement sequence |

TABLE 20-continued

Augmentation features overview

| Level/Stage | Augmentation Features |
|---|---|
| | Executive Control |
| Movement sequence coordination | Anticipation cueing (ground impact and strike pose) Timing of the movement sequence |
| Plan adaptation | Update shot target and type |
| | Movement Execution |
| Movement Deployment | Ground positioning direction and distance |
| Court movement patterns | Footwork pattern |
| Learning footwork patterns | Steps into preparation |
| Stoke Preparation | Stance setup |
| Postural/stance patterns | Strike point |
| Learning stance/posture movement patterns | Timing and synchronization of stroke preparation |
| Stroke Execution | Forward swing timing (based on final phase of incoming shot) |
| Stroke patterns | |
| Learning stroke patterns | Modulation/corrections |
| | Body segments form at phase transitions and during phases |
| Stroke Recovery | Recovery steps |
| | Ready pose direction and location |

The model distinguishes between the cognitive level and the movement control level. The so-called cognitive control level encompasses planning and the executive control. Planning operates at the global movement scale and deals with selecting a strike pose and target based on the current game state and plan for exchange. The executive control level deals with the implementation and coordination of the sequence of movements and processes such as adapting the plan and controlling attention to obtain information about the current activity cycle (FIG. 12).

Following FIG. 28, at the top level, augmentation can target the global situational awareness and planning (forward model as described in FIG. 15). At the executive level 2806, augmentation can target the situational awareness within the unfolding exchange and the adaptation of the plan based on updated information (coordination policy). At the movement element levels (including positioning 2808, preparation 2810, execution 2812, and recovery), augmentation can target the specific perceptual functions that are part of the interaction schema, as well as the inverse models that specify the movement behavior, and the motor programs.

The following describes the augmentations based on an exchange cycle illustrated in FIGS. 29A-29D. It details the cues and aspects of behavior in relationship with key task and environment elements at the different phases of play. Table 20 presents an augmentation features overview.

Tennis Task Planning Level

The prior art sometimes focused on the augmentation of movement at the level of their execution (e.g., movement technique), but without the detailed and comprehensive analysis of how these movements participate in the larger task or activity outcomes.

As already described, the classes motion skill element associated with the interaction patterns form the units of organization for the larger planning and decision making. In tennis the highest-level interactions are the shot exchanges and their sequence toward building points.

The augmentation targeting the larger task outcomes, focus on how these shots discretize the task performance and, in turn, how these patterns enable task level representations FIG. 8 and FIG. 14.

Planning is considered a part of cognitive control and its long-term memory that is involved in recalling the patterns in sequence of points and actions as shown in FIG. 13 (captured by the forward model). The task-level planning augmentations, therefore, focus on the formation of larger movement patterns needed to support the task goals. At the task planning and performance level, the augmentation is primarily at the knowledge and cue levels.

Knowledge Level

Instructions and cueing at the knowledge level can also focus on the development of a lexicon of interaction patterns that enable efficient and optimal discretization of the agent-environment state-space; e.g., the movement and shot patterns (FIG. 8) provide the language for the game performance. Here the task-level augmentation is extended to help the player learn how these patterns participate within the game dynamics shown in FIG. 14 (compare, e.g., U.S. Pat. No. 10,854,104 B2 and U.S. Publication No. 2121/0110734 A1, and U.S. Publication No. 2019/0009133 A1).

Similar as with the inverse model at the movement control level, it is possible to delineate between the input and output side of the skill element processes. In tennis, on the output side, these classes manifest as shot types with specific environment features such as the distribution of the shots on the court, e.g., in the corner of the court near the baseline, etc. (see FIG. 8). On the input side, the patterns contribute to the game perception and situational awareness and orientation on the court across the range of positions and conditions. These units determine how well a player can control the game (read the incoming shot, orient on the court and designate the shot target) so as to control the exchange outcomes and dictate play.

Following these insights and the formal hierarchical model (FIG. 15), augmentation at the cognitive knowledge level can contribute to the formation of shot and movement patterns that describe the game states and game dynamics (Eq. 5 and Eq. 6).

Augmentation, at this level takes the form of information that facilitates mental training, such as rehearsing these patterns and understand the strategy. The augmentation basically assists the formation of long-term memory that supports the rapid perceptual and decision mechanisms captured by the forward model.

Cue Level

Figure 29A:
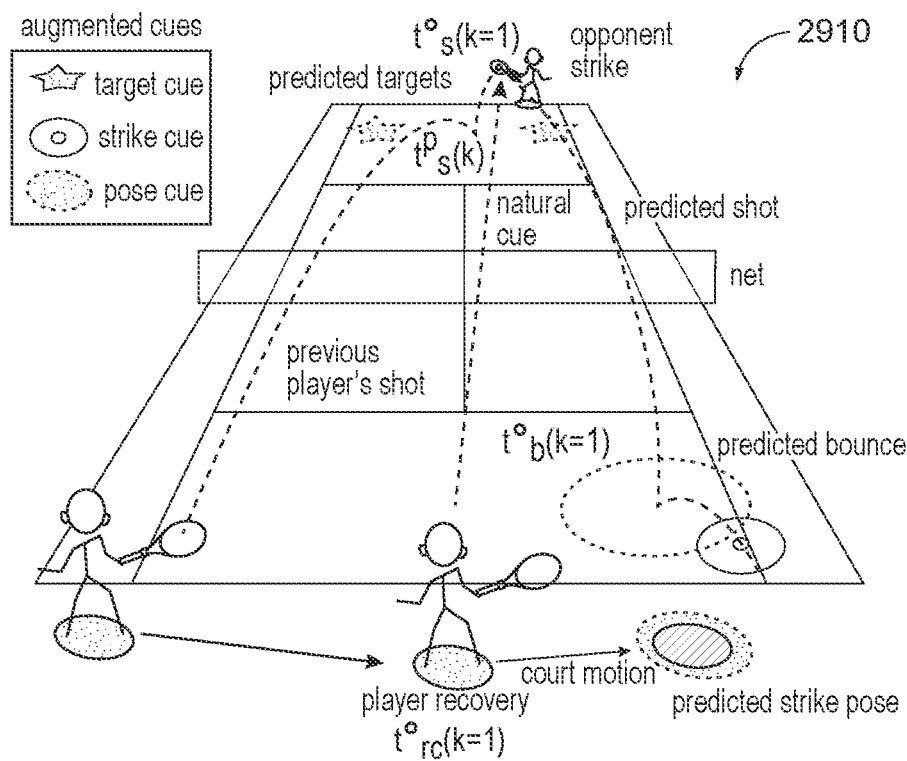
FIGS. 29A-29D illustrate an exchange sequence highlighting primary events at key phases of play, and possible cues for augmentation in relationship with environment elements.

FIGS. 29A-29D are schematic illustrations of an exchange sequence, highlighting the primary events at key phases of play and possible cues for augmentation in relationship with the environment elements and events. FIG. 29A illustrates the exchange sequence approximately at the planning stage 2910, FIG. 29B at the positioning stage 2912, FIG. 29C at the preparation stage 2914, and FIG. 29D at the execution stage 2916.

Training targets the formation of task-level patterns. However, this level of performance relies on availability of some nominal level of facility in ground movement and stroke and shot making, therefore, training should be adapted to the skill level. The challenge is to then learn the sensory-motor patterns that implement these strategies. The augmentation at the planning level can be in the form of cueing such as visual augmentation during the performance. For example, in addition to the mental training at the knowledge level, the cueing enables rehearsal of game states, associated movements, and shot patterns.

At the task planning level, augmentation of planning at the cue level corresponds to providing information to help recognize the variety of game patterns (game states) and help memorize the best set of actions for each game state (see also, e.g., FIG. 14C), including the sequence of positioning and shot targets used for the construction of points. For example, cues can be used to highlight and designate shot targets building up the sequence of shots in the point construction for a given game state.

Executive Control Level

The executive control level is responsible for implementing and coordinating the planned sequence of behavior. The executive control provides a conceptual model for the functions of the augmentation system at the level of task interaction during a cycle such as the exchange in tennis.

Augmentation at the executive control level may be grounded on existing models of executive cognitive functions. Executive control encompasses several functions, including the implementation of the plan and coordination of the action/behavior sequence, the direction of attention, and the evaluation and monitoring of actions (FIG. 3). Executive control is also closely related to short-term memory and access to long-term memory. More specifically the executive system is responsible for the seamless implementation of the hierarchical control architecture, with its distinctive levels of control (FIG. 15).

Sequence Coordination

As shown in FIG. 3, the planning function determines the sequence of subgoals toward the task goal (e.g., sequence of movement stages within an exchange). The executive control is responsible for the coordination of movement units and associated attention and perception events within a sequence (see FIG. 12). Each sequence of movement behaviors execution should be tailored to the desired outcomes specified by the plan and the prevailing conditions. Since the task state evolves concurrently with the implementation of the sequence, the executive control is also responsible for adjusting the plan (e.g., timing or movements or even updating the subgoal). Therefore, the executive control should simultaneously oversee the implementation of the movement behavior at each level of behavior, while making sure the sequence attains the larger task goal.

Given a player's movement behavior plan over the next tennis shot exchange cycle, the following types of augmentation can be used to assist the player's movement executive control:

During player positioning, assist the player with selecting a pose for the anticipated shot strike point and shot target.

During the shot preparation and setup, assist the player with selecting a pose and posture based on the incoming shot to fine tune the strike conditions.

During the swing movement execution, assist the player with achieving the timing and strike conditions needed to synchronize the stroke movement with the incoming ball to produce the desired outcomes.

Decision making at the level of each movement skill element is described by the inverse model; e.g., the specification of the actions needed to attain the desired outcomes. During the movement execution, the executive function is responsible for updating the plan in the face of contingencies. As already mentioned, if the plan cannot be adapted, the system may update the plan or switch to a form of rescue plan.

Working Memory

Working memory is important for executive control. Executive control requires a memory of the sequence of movement elements within the exchange, including details about key task and environment element interactions, and activity events, which define a key state for the behavior sequence.

Augmentation, therefore, can be implemented as part of a mental training process, such as rehearsing the structure of the plan at different levels of organization, including the sequence of exchanges, and the sequence of movement behavior within the current exchange.

Attention Control

Another important aspect of executive control is directing attention. Augmentation that assists with visual attention can be used to direct gaze to these critical elements. Attentional cues represent a primary augmentation modality for the spatial interaction. FIGS. 29A-29D show examples of visual attentional cueing for the different stages of performance, from planning, positioning, preparation/setup, and execution. These are elaborated in respective sections of the disclosure.

Figure 29B:
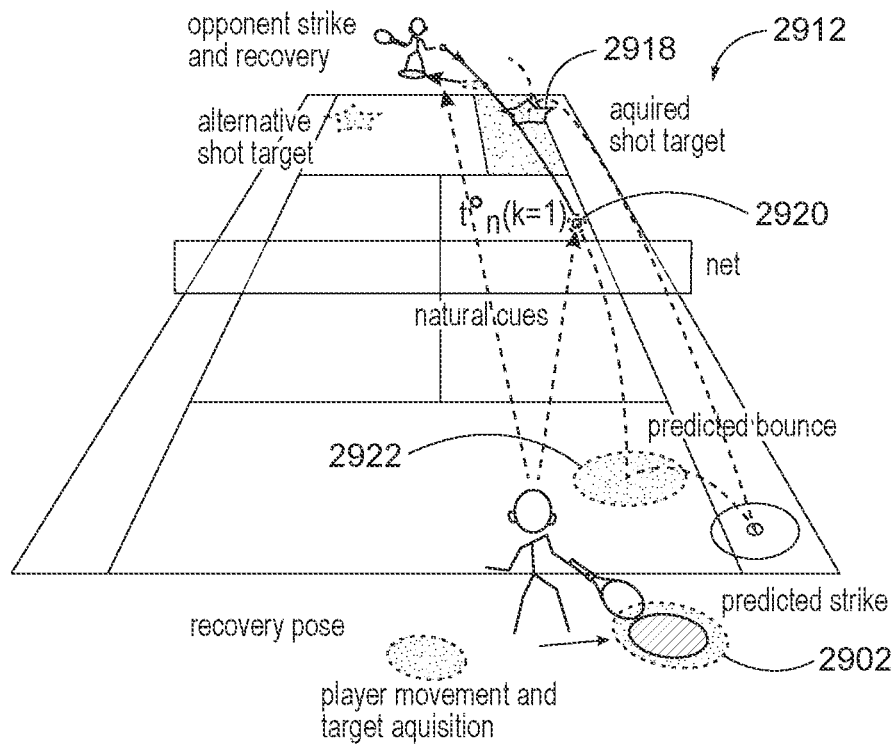

An important aspect of behavior execution is to achieve the movement elements initial and final conditions. FIG. 29B gives an example of the preparation phase with cues highlighting the target 2918, the incoming ball 2920, and the predicted bounce location 2922. These environment elements unit of interaction for the operating environment in that stage of behavior. The goal is to produce a behavior that is consistent with the underlying interaction schema.

Performance Monitoring

Another important aspect of executive control is performance monitoring. The brain uses information about the expected effects of actions to take and update decisions. This information also plays a critical role for learning, namely, the difference between the expected outcome and actual outcome provides a signal for updating the internal models, which either improve the technique (inverse model) or to adjust the expected outcome (forward model).

The forward model at the task-level planning predicts the consequence of actions and therefore provides necessary information for performance monitoring.

The following sections describe augmentation at the movement execution levels. Each movement is considered a form of schema that support its automatization. Therefore, at the movement execution level, the augmentation focuses on the sensory and motor dimensions but with an emphasis on the local environment interaction, as illustrated for the stroke in FIGS. 5A and 5B (compare U.S. Pat. No. 10,854,104 B2 and U.S. Publication No. 2121/0110734 A1, and U.S. Publication No. 2019/0009133 A1).

Deployment and Positioning Stage

In tennis, successful shot making depends on the player positioning, the stroke preparation, and execution, which have been planned ahead of time (FIG. 13). The positioning movement requires knowledge of the ball strike location and desired shot target. Therefore, at the same time as moving into position toward the strike point, the player should also finalize the shot target (see FIGS. 29A and 29B).

The positioning stage combines the knowledge of the local environment conditions for the anticipation of the strike, and the larger task environment needed for the target acquisition/selection. Therefore, at this stage in the activity, augmentation occurs primarily at the knowledge and cue levels.

Knowledge Level

At the knowledge augmentation level, the goal is to help the player form mental models of the positioning phase. Instructions at the deployment and positioning level focus on the understanding of the court movement patterns for the different shot-pose configurations (FIG. 7). One related aspect of augmentation at the positioning level is to assist in the formation of the repertoire of footwork patterns to support the range of positioning scenarios.

Cue Level

The positioning represents the largest and most foundational movement in tennis. The player's plan for the exchange provides the desired shot target and strike pose; however, this plan should be adjusted based on current information as the exchange progresses, which, as already described, is performed by the executive control system.

Based on the concept of inverse model, cueing can operate on the model's inputs or outputs. Regarding the inputs this includes, e.g., the perception of the conditions (perceptual cueing) or the specification of the shot target. Regarding the model's output, this includes, e.g., specifying the actual movement form (motor cueing).

Perceptual cueing augments a player's situational awareness by helping them extract and decode the relevant visual features. For example, helping them focus on the opponent and shot features, and helping them decode these features to produce the court movement commands.

This type of cueing can be realized using audible signals associated with the events; e.g., net crossing cues, and encoding anticipatory cues (compare, e.g., to U.S. Pat. No. 10,668,353 B2 and U.S. Publication No. 2020/0289907 A1). More immersive approaches can be achieved by overlaying the visual cues on the natural scene, such as highlighting the ball, attributes of the ball motion such as the predicted trajectory, or the predicted bounce region on the court, using augmented reality (AR) glasses. Verbal cues that designate the elements or event can also be used.

The outcome cueing encodes information about the movement target. The court movement outcome represents foot configurations relative to the anticipated bounce location. At the positioning level/stage, the movement target is the court pose that needs to be attained for the successful ball strike. Similar to the perceptual cueing, this type of information can be communicated using visual augmentation (AR glasses), using verbal cues, or sound or haptic signals.

Motor cueing can take place in several forms. First, cues can be used in the form of commands for court movement. For example, one option is to direct the player through voice command "move back, move right, etc.". Direction information could alternatively be encoded using different tones or other audible signals. Alternatively, visual augmentation can be overlayed to the natural scene using AR glasses.

Preparation and Setup Stage

Augmentation for the preparation and setup stage focuses on the production of precise conditions for stroke execution that support the desired shot outcome. This also includes producing pose and posture for stable execution and recovery.

Knowledge Level

Figure 29C:
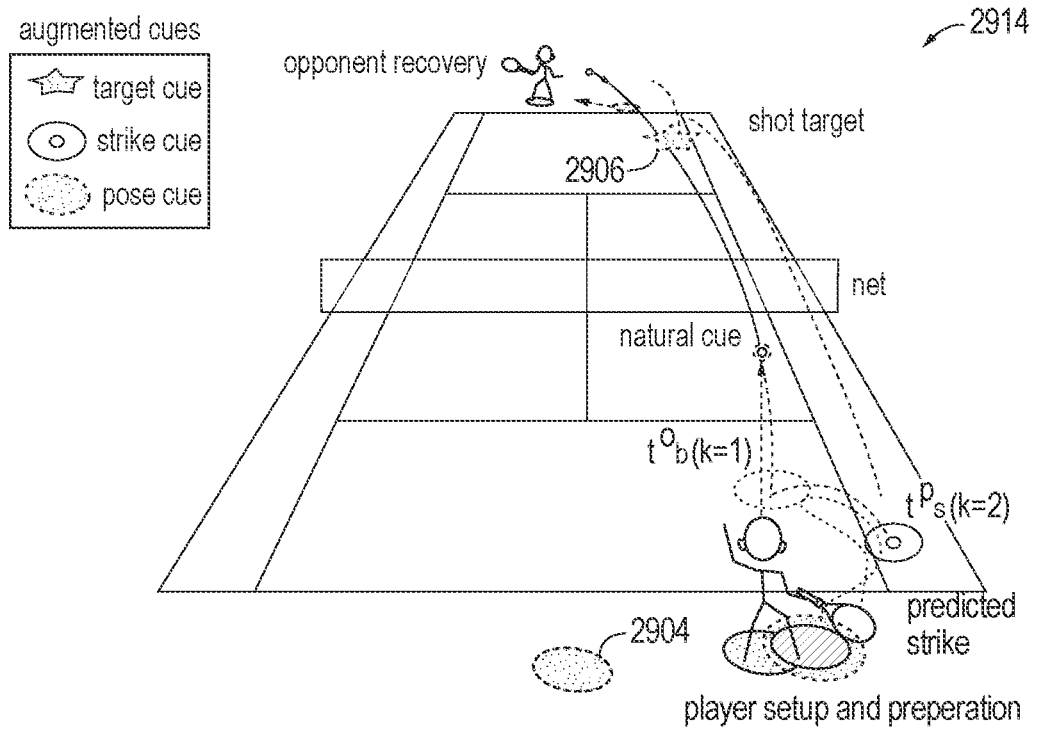

At the knowledge level, the goal of augmentation is to help the player form mental models for the preparation and setup phase schema. The player's mental model captures the understanding the phases and specific movement features, and their relationship with the task elements for the preparation (see, e.g., FIG. 25 and FIG. 26). For tennis groundstrokes, the preparation takes place in the period from around the shot bounce and the beginning of the forward swing (FIG. 29C).

Cue Level

Cueing at the preparation level is like that for positioning in the sense that it takes the conditions closer to its stroke execution phase, but at a more precise spatial and temporal scale. Another key distinction is that it corresponds to a preparatory phase for the primary movement unit. These phases play an essential role for complex movement execution.

According to the inputs and outputs of the inverse model, the player setup is determined from the desired shot outcome and the prevailing operating conditions. Therefore, cueing can provide information about the conditions (perceptual cueing) and the target (outcome cueing), and cueing can also provide information about the movement control (motor cueing).

Perceptual cueing at the preparation and setup stage focuses on the player's acquisition of the incoming ball state in its final phase (close to the bounce) (FIG. 26). One specific form of cue at this stage is to help predict the bounce location and characteristics needed to get setup for the execution. This can be as a visual overlay of the bounce on the court in the form of a bounce point or even bounce vector using AR glasses. Bounce information such as height or spin/velocity can also be communicated through audible or haptic signals or verbal cues.

Regarding outcome cueing, the augmentation designates the target pose including the body and arm/racket for the specific forward swing initiation pose, needed to produce the desired shot outcome. Pose information is harder to communicate because pose information are proprioceptive (as opposed to exteroceptive). Haptic signals for example using transducers in the clothing, equipment, or shoes are well suited for pose and posture cueing. It is possible to overlay a body pose diagram on the visual field. It is also possible to communicate validation cues, that provide a signal to reinforce desired pose features (compare, e.g., U.S. Pat. No. 10,854,104 B2 and U.S. Publication No. 2121/0110734 A1). Pose references can also be communicated using verbal cues.

Finally, regarding motor cueing, the augmentation can be designed and adapted to assist the execution of the preparatory phase. Example, timing and modulation of the magnitude.

Primary Behavior Execution Stage

The assessment and feedback at the level of primary motion execution can focus on the movement functional structure (compare, e.g., U.S. Pat. No. 10,854,104 B2 and U.S. Publication No. 2121/0110734 A1, and U.S. Publication No. 2019/0009133 A1). The present disclosure extends this functional modeling to include perceptual processes, such as the cues used in the execution phases of the primary movement units, e.g., tennis strokes (FIG. 16 and FIG. 26), which can be elaborated from the inverse model (FIG. 15).

The stroke impact outcome determines the shot trajectory and hence, ultimately the precision with which the performer can control the game state.

Knowledge Level

At the knowledge level, the goal is to help the formation of mental models for the execution phase. This corresponds to the understanding of the movement architecture such as the stroke phases and their functional role in the task environment and object interactions. For the stroke execution (FIG. 29D), this includes.

Instructions at this level focus on the functional performance of the different movement element classes such as the relationship between the movement architecture and the different types of shots. The goal of training at this level is primarily to learn the coordination with the environment and technique for efficient movement performance; e.g., to achieve high levels of outcome with the least power and strain on the body (compare, e.g., U.S. Pat. No. 10,854,104 B2 and U.S. Publication No. 2121/0110734 A1).

Cue Level

According to the inverse model, the movement execution is determined by the desired target and the preparation conditions (see skill element in FIGS. 5A and 5B). Therefore, on the input side, cueing can provide information about the conditions and the target. On the output side, cueing can provide information about the forward swing movement pattern, including the coordination of the body segments degrees of freedom.

Perceptual cueing augments the natural cues needed to determine the situational awareness of the operating conditions. In tennis, at the execution stage, these are the later features of the incoming shot once the player is already set up, including the bounce toward the strike point following the ground impact (see, e.g., FIG. 16 and FIG. 26).

Outcome cueing focuses on the strike point and the recovery. Based on the understanding of movement encoding, target movement such as the racket and arm, can be presented as a target pose at ball strike, and eventually at follow through.

Motor cueing targets the guidance of the movement profile. The condition cue encodes the information needed to trigger the forward swing and the movement profile.

VII.II Augmentation System Implementation

This section first describes the functional model of the augmentation based on the hierarchical model in FIGS. 3A-3B, FIG. 15 and FIG. 28A-28B. It encompasses the hierarchical organization and coordination of the movement behavior from the task level perception and planning to the current cycle sequence of movement elements, down to the execution of the different movement elements in the sequence. The section also describes the physical implementation of an augmented system, extending upon other human augmented systems (compare, e.g., U.S. Publication No. 2019/0009133 A1).

Augmentation System Functional Description

The augmentation of performance in open motor tasks requires several processes to generate the information about the environment and activity interaction and produce a sensory-motor experience that is compatible with the subject's natural experience. The augmentation therefore has to the state of the activity across the hierarchical organization of behavior.

The hierarchical model of the human open motor behavior shown in FIG. 15 illustrates the process flow of the main decision and control processes during an activity cycle based on internal models. First, how the estimates of the current game state and forward model are used for planning, how the coordination policy coordinates the movement sequence and adjusts the movement element outcome references, and how the inverse models are used to execute the movement behavior based on the reference values and conditions. The augmentation essentially replicates this model but uses reference models to synthesize the reference values for cueing across the levels of hierarchy during a planning cycle, e.g., for a tennis exchange.

The successful implementation of augmentation in open motor tasks requires several key capabilities. FIG. 30 is a schematic overview 3000 of the augmentation system process flow illustrated for the tennis preparation stage. One critical aspect is that the reference models used to determine augmentation require knowledge of the state of the activity and the exact stage and phase of the behavior elements. Another critical aspect is that the augmentation features such as the cues be registered with the scene and environment elements both in their spatial and temporal dimensions. FIG. 30 delineates key components of this system, including the extraction of the behavior elements (30A), the activity recognition and state estimation (30B), the generation of augmentation features (30C), their synthesis of cue and augmentation elements (30D), and their communication to the user.

The augmentation features 30C and elements 30D in FIG. 30 include their integration with the environment elements to produce the effective experience for the subject. For example, in the case of augmented reality (AR), the cues should be fused or integrated with the visual scene elements that are produced by the scene's video stream or simulated environment. The integration has to be accurate in spatial and temporal dimensions to create immersive experience with the AR glasses that are synchronized with the environment dynamics. For verbal augmentation the cues should be synchronized with the events. Spatial audio can be used to create a stronger spatial integration (e.g., encoding direction and distance).

The Activity Processing and Recognition (30B) is responsible for the estimation of the global activity state, as well as the stage of behavior in the sequence. The first step is the extraction of the relevant elements of the environment and activity. The activity and environment elements processing (30A) uses data from one or more sources (e.g., video cameras that can be combined with wearable sensors) to achieve a comprehensive and detailed estimation of the activity state.

This includes similar components as described in the modeling section (FIG. 20), except that for augmentation they should be adapted to run in real time. The main components are the data preprocessing, which typically takes care of the measurements' low-level feature extraction. This may also include fusion of the streams such as the combination of multiple camera views to reconstruct a 3D scene, as well as fusion of multiple sensor modalities to take advantage of complementary information content.

These low-level features are then typically processed for detection and extraction of the actual objects and elements. The latter include the detection and extraction of the one or more participant's, including their poses, the task environment elements, and objects. In the tennis example, these encompass the player and opponent poses (including the body segments and tennis racket), the court and its elements, as well as the ball.

The elements are then tracked and integrated as part of the activity model (FIG. 23). Patterns associated with these elements' spatial and temporal behavior are then used to determine the activity state, as well as the key events in the activity, and the movement skill elements, including the stage in the activity sequence. In the tennis example, this includes the game state: game, set, point, and the exchange; the stage in the movement behavior sequence: positioning, preparation/setup, stroke execution, recovery, ready; and the ball events: ball strike, net crossing, bounce.

The Augmentation Processor (30C) takes the activity state and the reference model to generate cueing features. The cueing features is a representation of the cues that considers their spatial and temporal features that can be translated into different modalities. In simple implementations, e.g., using a single modality, the cueing feature and the augmentation generator can be integrated. The augmentation processor shown in FIG. 32 relies on some form of reference model that can be used to compare the subject's behavior with some model of desired behavior.

The reference model is derived from the hierarchical model in FIG. 15 and is illustrated in FIG. 32. The figure illustrates how the estimate of the current game state, and the internal models (forward model for planning, coordination policy for the sequence of movement, and the inverse model for the movement behavior), are used to synthesize the cue features across the levels of hierarchy during a tennis exchange. Note also that augmentations can be generated as either feedback or cueing. In the feedback mode, the augmentation provides post-action assessment, or a form of commentary, for the specific stage of behavior. In the cueing mode, the augmentation provides cues to help direct various aspects of behavior during their different phases of execution.

The reference model can achieve different effects by selecting different source data for the modeling (compare, e.g., U.S. Pat. No. 10,854,104 B2 and U.S. Publication No. 2121/0110734 A1, and U.S. Publication No. 2019/0009133 A1). The subject's own internal models make it possible to mostly reinforce the past behavior. Typically, a subject's performance includes sufficient variability that it contains information about different levels of performance. It is possible to filter the subject's data to reinforce best level of performance. Alternatively, the reference model can be based on a population subgroup, this mostly has the effect of expanding the skill and behavior beyond the subject's level and range of behavior. Finally, synthesized data, combining larger population data and domain knowledge can be used to achieve wider skill training levels and emphasis.

The Augmentation Generator (30D), and detailed in FIG. 31, is responsible for the production of the cue stimuli from the cue features. This process depends on the modality used to communicate the cue to the subject. For example, the visual cue generator encodes the cue features into visual cue elements (see, e.g., elements depicted in the tennis scenes of FIGS. 29A-29D).

Note that the augmentation generator is responsible for processing the activity and movement state to generate the cue as an augmented behavior. A critical aspect of cueing the activity and environment interactions is the synchronization of the cues with the activity and movement state. Furthermore, to create an effect on the subject's performance or learning, the cue features should describe the cue as behavioral features (e.g., spatial, and temporal features of the movement behavior that are actionable, in the sense of an instruction, command, or alternatively in the sense of a correction for future executions). In addition, the artificial cues should integrate with the behavior schema to produce effective experience and results.

The approach used to determine the cue or augmentation element is based on the skill element's functional structure (behavior interaction schema, FIG. 5B and FIG. 26). As can be seen this schema encompasses the natural cues and the sensory-motor process used to produce the movement behavior. Therefore, the cue feature may also include environment and object features (such as activity events or interest for the behavior).

The augmentation communication system (E) is responsible for the implementation of the cueing. The cueing logic selects the cueing law for the currently active skill element. The cueing law is based on the movement element functional structure (interaction schema; see, e.g., FIGS. 5A and 5B; FIG. 26). One realization of the augmentation system is shown in FIGS. 29A-29D as an augmented reality apparatus using augmented reality glasses (see FIG. 33). This modality is particularly appropriate to perceptual processes, such as directing attention to the relevant elements in the operating environment of that given stage of behavior.

Another modality or realization that enables a rich augmentation environment is to use verbal cues such as commands, instructions or commentary as described in the tennis embodiment and for which representative commands are detailed in Tables 21A-21E.

Finally, other realization can use sound or haptic signals for communication. The sound modality can encompass simple sound cues, such as pulses of different tones, or frequency modulated, etc. The sound modality can also include spatial audio using stereo speakers or headphones.

Model Reference Data

The model components in FIG. 32 can be based on the subject's own past performance, as well as, other sources, including those derived from population data or theoretical. Different models achieve different effects. When used with the subject's model, the system in FIG. 32 can reinforce the best aspects of subject performance over the respective performance history of the subject. The models can be extrapolated to extend the subjects performance and skills within the scope of information captured by the model.

When used with population data, the system in FIG. 32 can be used to train performance and skill beyond the range of their own model. Population data can be used to determine subgroups that extend their performance and skill level based on a representative group (compare, e.g., U.S. Publication No. 2019/0009133 A1). Recall, the representative group gives a more complete description and will also include a broader range of performance suited for the subject's skill and other individual factors, such as technique, physical fitness, etc.

Figure 29D:
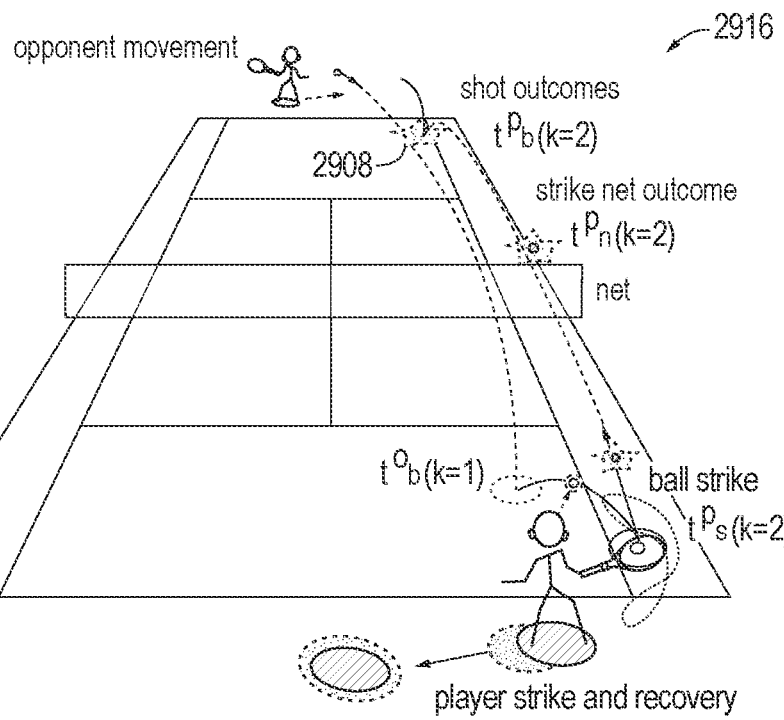

When used with theoretical models, such as a normative model, the system in FIG. 32 can be used to train for a specific performance and skill profile described by the theoretical model. At the task level, the theoretical model can be used to generate exchange patterns (shot sequences) for the point construction that can be used for training (e.g., using a programmable ball machine and active targets). At the movement behavior level, the theoretical model can be used to teach the movement patterns at the different levels of organization. For example, the footwork patterns in the court positioning level (FIGS. 29A and 29B), the preparation and setup patterns (FIG. 29C), and the stroke execution (FIG. 29D).

Augmented Reality

FIG. 33 is a schematic illustration of the elements augmented during the preparation stage using augmented reality glasses. Perceptual functions are critical for the various task interactions; therefore, key information for performance can be mediated through perceptual augmentation.

FIG. 33 illustrates reality augmented through "smart" glasses or a similar mobile display device such as a HoloLense headset, available from Microsoft Corp. of Redmond, Washington. The glasses make it possible to highlight task elements relevant for a given stage of performance, as well as provide cues for behavior element performance. The illustration shows elements for perceptual augmentation for the preparation stage. At that stage, elements may include:

Incoming ball with anticipated bounce point
Racket and body pose at stroke initiation
Strike pose
Strike point and shot target The other stages of behavior can be similarly augmented. In addition to the visual cues that are highlighted in the visual field, sound and/or verbal instructions can be used to enhance the effect of augmentation, in particular for ensuring the timing of the perceptions.

Note that these features can be extended to a mixed-reality system, which would enable a tennis player, for example, to hit a virtual ball, and train the various aspects of performance, from point sequence, to positioning, preparation and stroke execution.

Verbal Instructions

Verbal instructions or commentary can be used by themselves or with sound cues and visual augmentations. The verbal modality is highly effective in coaching providing a means of motivation and directing the user. As already mentioned, it is also easier to implement because it does not require the integration with the user's visual field. However, it still requires synchronization with the activity stages (see activity state determination in FIG. 31). The user's behavior in each stage and phase of motion are compared with the reference behavior to determine the error in behavior attribute. In some instances, cueing is based on the prediction of the next stage to help the user anticipate the correct behavior. The timing of the cues can be determined based on whether they are acting as corrections or instructions.

TABLE 21A

Verbal instructions/commands focusing on footwork, stroke, and body pose for the ready and shot anticipation stage

| Footwork | Stroke (Racket) | Pose (Body) |
|---|---|---|
| "Split Step" | "Take Racket Back" | "Shoulder Unit Turn" |
| "Crossover Steps" | "Lift Racket higher" | "Lead with the elbow" |

TABLE 21A-continued

Verbal instructions/commands focusing on footwork, stroke, and body pose for the ready and shot anticipation stage

| Footwork | Stroke (Racket) | Pose (Body) |
|---|---|---|
| | (for higher balls) "Lower racket take back" (for lower balls) "Compact backswing" | |

Tables 21A-21E provide examples of the verbal cues or commands for tennis. Note how the verbal cues are designed for specific stages in behavior, organized according to behavior components (footwork, stroke, and pose). The cueing can be selected to focus on a particular behavior component to reduce the number of cues within human information processing capacity.

TABLE 21B

Verbal instructions/commands focusing on footwork, stroke, and body pose for the positioning stage

| Footwork | Stroke (Racket) | Pose (Body) |
|---|---|---|
| "Adjustment steps" | "Racket back with sufficient spacing" | "Body hips turned" "Shoulder unit turn" "Continuously turn shoulder as ball approaching" |
| Directional Steps: "Diagonal Front" "Diagonal Back" "Lateral side to the ball" "Lateral side make space for ball" "Backward"/"Forward" | | |

TABLE 22C

Verbal instructions/commands focusing on footwork, stroke, and body pose for the preparation/setup stage

| Footwork | Stroke (Racket) | Pose (Body) |
|---|---|---|
| "1, 2, 3, set" | "Maintain space with racket" (to insure on-time ball impact) | "Lead with elbow" "Move racket and hand below elbow" |
| Stance Types: "Open stance" "Semi-open stance" "Neutral stance" "Closed stance" | | |
| Stance Distance: "Short hop-hop" (1, 2 and forward step) "Long sequence steps" | | "Drop back leg" "Rise on the front leg" (for ball with arc) "Drop both legs and kick back" (for hitting off the rise down on the ball) |

TABLE 21D

Verbal instructions/commands focusing on footwork, stroke, and body pose for the execution stage

| Footwork | Stroke (Racket) | Pose (Body) |
|---|---|---|
| Stances with center of gravity: "Center of gravity on back leg" (for upwards swing creating more spin) | "Swing through the ball" "Drop racket" (for upwards spin) "Snap swing quicker downwards" (for more | "Hip initiation" "Hip function through ball" "Come around ball" (for creating under ball arc) |

TABLE 21D-continued

Verbal instructions/commands focusing on footwork, stroke, and body pose for the execution stage

| Footwork | Stroke (Racket) | Pose (Body) |
|---|---|---|
| "Center of gravity on front leg" (for downwards swing creating more pace) | pace) | "Kick back" (for creating off the rise speed shot) |
| "Balanced feet positioning" "Drop back leg" "Stand on front leg" or "Kick back" (for more pace) | "Wrist lag" "Continuous shoulder uncoiling" | "Transfer weight through the ball" |
| | | "Drop the back leg and rise on the front leg" (for ball with arc) "Drop both legs and kick back" (for hitting on the rise down on the ball) |

TABLE 21E

Verbal instructions/commands focusing on footwork, stroke, and body pose for the recovery stage

| Footwork | Stroke (Racket) | Pose (Body) |
|---|---|---|
| Open Stance: "Recovery step" ("left" or "right") "Crossover step back" | "Hold finish" (for center of gravity recovery) | "Center of gravity" |
| Neutral Stance: "Recovery step" (right hip around) "Crossover step" | "Maintain racket space from body" (to keep core engaged) | |
| "Recovery positioning" | | "Get ready" (for next ball) |

Data Acquisition

An important part of the augmentation system is the acquisition of the various measurement data. In a large part, the measurements are like those used for the modeling and analysis. The scope of the augmentation determines the set of sensor and types of measurements.

Augmentation of perceptual processes also present some special requirements. For example, for the augmented and mixed reality, it is necessary to track the performer's pose, including the exact head pose, and potentially also the gaze, to enable a sufficiently good fusion of the scene's image of the visual field and the objects superposed on the visual field. This may also require registering the elements in the natural physical environment (see, e.g., the ball, the bounce location, etc. in FIGS. 29A-29D. The real-time video processing (see FIG. 20) to extract the elements needed for the augmentation at the different stages of performance.

In a mixed reality simulation, the ball and other game interactions may be simulated and used to drive the subject's behavior and response.

Augmentation Profile

Not all aspects of augmentation described here must be implemented. Rather the idea is to target the areas of weakness based on the specific subject's assessment and diagnostics, as well as user preferences. Given the variety of factors that play into the subject's performance, it is critical to be able to identify the specific causes holding back the performance and skill development of a given subject. An augmentation profile describes the modalities, levels, and parameters of feedback for a particular user and training objective.

Augmentation Modalities

The cueing can encompass a combination of visual cues, and other modalities such as audio or haptic, to highlight a broad range of task or activity events and movement features during performance.

The most direct way to communicate spatial information is through so-called immersive technologies such as augmented reality, which have already been discussed (e.g., HoloLens system). In such implementation cues are superimposing onto the natural visual scenery. Examples of the use of augmented environment include movement cues in the environment (direction of motion, subgoals), cues to enhance visual attention about relevant task elements or events that are, for example, used to anticipate future events.

Cues can be communicated verbally, for example, the augmentation system can directly generate verbal descriptions of the posture and stroke attributes to be implemented by the player during the performance (see Table 1). Verbal cueing is especially suited to providing commands, instructions, and commentary, as illustrated in the tennis embodiment.

Cues can also be encoded into audio signals. For example, timing cues, of simple magnitude information, and alerts (compare, e.g., U.S. Pat. No. 10,668,353 B2 and U.S. Publication No. 2020/0289907 A1). Stereo audio signals (e.g., using speakers or headphones) can also produce directional cues, e.g., direction of motion for court positioning.

Finally, there exist other means to augment the environment, using projection techniques, such as video projection, or laser-based techniques, to highlight and superposed visual elements in the task or activity environment.

Augmentation with Apparatus

A key aspect of open motor tasks are the movement and task interactions. In tennis, for example, these interactions are typically trained with the assistance of a coach using various forms of drills. An apparatus can be used to run drills and create conditions for training specific aspects of the movement behavior focusing on the different movement skill elements and their sequencing. For example, in tennis, a programmable or smart ball machine, coupled to the augmentation cueing system, can be used to generate exchange patterns and conditions based on the current player state to exercise specific aspects of the performance such as positioning, preparation, and stroke execution.

For example, the ball machine can generate specific shot sequences, to drive the positioning of the player. Markers can be added or highlighted using projection techniques or smart beacons to specify the shot targets. These targets can themselves be interactive (such as light up under command of the training algorithm, which implements the specific drill).

A drill can be defined as a sequence of shots from the machine, with the player at a specified starting position. The interactive targets can then be used to designate the sequence of targets at each new incoming shot. The sequence of shots from the ball machine can also respond to the players movement and shot selection to simulate an exchange for point strategy.

VIII. Generalization to Other Sports and Movement Activities

The brain and the various supporting sensory, perceptual, and motor functions have evolved to support the broad range of challenges faced by humans when interacting with the physical world. All movement tasks or activities have in common that they are performed by a similar brain. The human brain has evolved a control architecture adapted to learning a broad range of different spatial control tasks. While the specific details are determined by the structure and organization of the task and its environment, the general characteristics, including the hierarchic organization, and the sequences of movement skill elements supporting the various interactions, share a lot of functional similarities across spatial control tasks or activities.

As a result, the skill elements, and the hierarchical model describing how the skill elements are deployed in a task, can be used to describe human performance in a variety of activity domains. The following briefly outlines considerations regarding the generalization of the modeling, assessment, and augmentation of task performance and/or training.

VIII.I Generalization to Other Movement Domains

The levels of interactions and key sensory-motor, perceptual features, and decision making at the different levels of organization can be generalized to other open-motor tasks.

Other open motor tasks or activities share similar motion skill elements and hierarchical organizations. Most such activities have some primary movement units directed at some key interactions and outcomes for the task. These primary movement elements to be effective should operate under specific conditions, therefore, in general, open motor tasks have additional, subordinate movement units. These are mainly used to decompose the task into a sequence of stages that make it possible to create favorable conditions for the primary movement element.

Each skill element can be modeled as an interaction schema (input-output system as illustrated for the tennis stroke in FIGS. 5A and 5B or for a ski turn maneuver in FIG. 35) that defines the dynamics and scope of the interactions:
Subset of task and environment elements (operating environment)
Subset of agent or body segments (primary degrees of freedom)
Set of inputs, including cues
Set of outputs, including movement performance and its outcomes A typical movement skill element can be defined by the following input-output dimensions. On the input side, the cues that are necessary to initiate and obtain the necessary information for the behavior execution. On the output side, the outcomes of the behavior, which are the task-relevant results of the movement, e.g., the trajectory and target of the tennis shot.

The performance characteristics of each skill element behavior class can be defined by some nominal conditions and operating range. The conditions for a given movement instance are given by the deviation of the conditions relative to its nominal conditions. Typically, deviations from the nominal conditions lead to degradation in outcomes. This error signal can be used to drive the correction in the supportive movement, such as the player positioning and preparation movements needs to create satisfactory conditions for the intended stroke execution and outcome.

Related to the execution conditions, movement behavior elements typically have some initiation criteria or conditions. In addition, related to the outcome, these behaviors may have some termination criteria.

Different open motor tasks or activities distinguish themselves by the specific forms of interactions and skill elements, as well as the extent of the skill set needed to achieve the task goals, and finally the general geometry and topology of the larger task domain. As already discussed, the tasks, and activities usually share a similar hierarchical structure and therefore, the larger system of processes is very similar to the one described by FIG. 3. Therefore, the same general approach and forms of behavior elements and system architecture can be used for other activities or tasks.

To generalize the approach, it is necessary to consider the following specific characteristics influencing the system-wide interactions and organization. At the action or execution level, the specific skill elements (degrees of freedom, sensory and control variables). At the positioning and preparation levels (environment control level), the coordination with the perceptual mechanisms and set of cues. Finally, at the task level, the sequencing and topology associated with the deployment of skill elements toward attaining the larger task goals.

The hierarchical interaction model in FIG. 3 is derived from these characteristics capturing the essential skill elements and their properties and therefore generalizes to various movement activity domains. Analogous elements and features can be derived for other movement activity domains. The system and methods can also be deployed for human machine systems, video games, or virtual reality systems, including simulators (such as for surgery).

VII.II Skiing

To broaden the applicability of the hierarchical skill model presented in these specifications, this section briefly describes some considerations for a skiing application. Skiing represents a complementary example to tennis with some unique characteristics such as its extended terrain environment. A skier travels within the terrain environment using a sequence of various maneuvers that need to be planned and coordinated to reach a specific destination. The destination is usually considered the larger task goals Skiing General Description FIG. 34 illustrates the skier's movement and perceptual behavior in the larger terrain environment. The skier is shown performing a sequence of turns following a path 3412 relative to a local terrain element and transitioning into a different terrain element leading to a destination. The following considers two primary types of movement behaviors, the turn maneuvers and more general maneuver elements used to transition between turns. Turn maneuver come in different forms depending on the terrain and movement conditions, such as the slope, the speed, and the curvature. Rectilinear segments can also be considered as behavior elements in the repertoire, but their behavior is less technical, and they are typically not considered maneuvers since they represent relative equilibria.

Similar to tennis an important aspect of the behavior is the interaction with the environment. The skier behavior at a given time is shown in reference to a local terrain element (FIGS. 34 and 35). The larger terrain geometry can be described by discrete terrain elements such as plane elements and the associated behavior. Various forms of terrain models can be used, especially for more uneven terrain such as moguls. The discrete terrain planes used in this example is primarily for the purpose of illustration. In more uneven terrains the behavior can still be described as some relationship between terrain geometry and the turn behavior. In terrains with more random characteristics, such as rough terrain, the movement behavior has less continuous relationship with the terrain; the behavior relies on discrete features such as at the turn apex.

A key aspect of the task interaction model is how the movement skill elements are acquired to support the various task and environment interactions. A skier acquires a repertoire of various types of skill elements. In skiing these correspond to the maneuvers used to navigate the terrain environment. These maneuvers include different types of turns (skidding, carving) as well as other maneuvers such as traversing that are needed to negotiate the range of terrain features and conditions. Similar to tennis even in a same category such as carving, the skier may acquire different classes to deal with the range of conditions and outcomes.

The repertoire of classes of maneuvers are the elements of a language for spatial behavior. This means that the infinite dimensional range of conditions and outcomes can be negotiated with a finite set of behaviors. Recall, that each class of behavior elements operates within a finite range of conditions and outcomes (compare FIG. 6). These elements are used for the higher-level functions including planning, perception, and learning, and lead to a form of "task discretization" (shown in FIG. 8).

Like tennis, these maneuvers are sensory-motor patterns. The control of the operating environment—where and how to deploy the maneuvers in the terrain—and the control of the maneuver—the execution of the turn maneuver determine how they are deployed in the terrain. The former is performed by global perception and planning functions (task level situational awareness) and the latter by more local perception and decision mechanisms.

Like tennis, the skier must follow a sequence of behaviors to position and setup the body and skis to successfully engage the turn maneuver. Similar to the stroke phases, turns have distinct phases that are primarily a result of the biological constraints and the movement functional properties. FIG. 35 also shows the turn entry 3502, the turn apex 3504, and the turn exit 3506. The turn apex typically corresponds to the point of maximum turn performance (in term of leaning angle, reaction forces, turn rate).

Skiing Movement Functional Characteristics

Since the biological constraints affecting the human subject are constant across movement domains, the expectation is that the overall movement behavior hierarchical organization is similar across the levels of organization even for different domains of activity. For example, comparing tennis and skiing we can make the following analogies:

With the fastest phase of the turn motion being analogous to the forward swing, both are too fast to involve cortical feedback, e.g., they are executed open loop according to the motor programs and subcortical sensory-motor functions. Therefore, they require preparation phase to create the conditions for the execution.

Specifically, it is reasonable to consider the period between the exit and entry in the turn (FIG. 35) as a similar preparatory movement type as the pose setup and preparation, including the synchronization with the local environment (see visual attention to expected turn entry and apex terrain locations in FIG. 35). Recall, this stage prepares the conditions for the respective execution phases.

The phase from the turn entry and turn apex could be compared to the forward swing and stroke impact phases in tennis. This phase involves fast interactions and therefore is expected to be performed mostly open loop. As just discussed, it is the phase where most of the turn outcome is determined. The phase from the apex to the exit can be compared to the follow-through and recovery phase, which lead to a new ready state. In cases of stationary or quasi-stationary conditions, the skier may directly follow with a similar turn to form a periodic sequence of turn.

In addition, like the footwork used for positioning the player for a stroke in relationship to the incoming shot (FIG. 2), skiing also involves maneuvers that are aimed at positioning the subject in the terrain environment to create the right kind of affordances for the primary turn maneuvers. These are considered transition maneuvers as shown in FIG. 34. Such maneuvers can combine turn segments with variable timing to steer the skier in the right state to intercept the next turn.

The functional structure of the movement interactions determines the topology of the system supporting the coordination of the movement behavior (see, e.g., FIG. 12; for tennis, see FIG. 9 and FIG. 11). More specifically, it determines the primary behaviors and the supportive behaviors, as well as the control architecture that ultimately defines the coordination policy and the larger hierarchical architecture such as in FIG. 15 for tennis.

System Hierarchy

FIG. 3 illustrates the general system process flow associated with the hierarchical movement organization. The point is that it is possible to delineate a similar hierarchical architecture for skiing—and other open motor skills—as for tennis as shown in FIG. 15. Also recall FIG. 28, which shows the hierarchy and highlight the functions that lend themselves to augmentation. The major difference in FIG. 3 for skiing is the details of the movement elements and their typical sequencing structure in relationship to the environment elements (as illustrated in FIG. 34).

Recall that in these specifications we consider three major levels of organization. At the highest level, the task planning the sequence of turns and other maneuvers to navigate around the terrain elements and obstacles, taking the skier to a favorable intermediate state, i.e., subgoal, to reach the final goal (e.g., destination). At the intermediate level, the coordination of sequence of immediate movements to create favorable conditions for the execution of the maneuver, including timing and coordination with the immediate elements such as terrain features interacting to produce the turns. The turns, like the strokes interacting with the incoming balls, are an interaction with the oncoming environment elements. This level deals with creating the dynamic environment conditions, timing, a synchronization with the local environment. At the lowest level, the motor execution of the movement.

The intermediate level can be described as the executive control level, is responsible for the coordination of the sequence of movement elements to reach the local subgoal or state. As described earlier, it is helpful to distinguish between different environment conditions, including dynamic and stationary/quasi-stationary. When the environment is stationary/quasi-stationary, the state is periodic turns sequence. For example, one aspect of decision in these conditions is the skier's path in relationship to the fall line, this determines the slope in which the turn maneuvers are performed (FIG. 34). In each such terrain element, if the skier does not change his or her turn sequence or path relative to the fall line, the behavior remains in its quasi-stationary state. In stationary or quasi-stationary conditions, the skier can therefore repeat the behavior to create a periodic behavior. This is possible as long as the terrain remain the same and the skier maintains the same path relative to the fall line.

FIG. 35 shows the skier transition into a different turn maneuver following a new path relative to the fall line or transition into a new terrain element. As shown in FIG. 34, the skier transitions between terrain elements by specifying a subgoal. In this example, the subgoal specifies with the turn entry point into the next terrain element and segment. Eventually, the sequence of these larger segments leads to the overall task outcome, e.g., reaching a specific destination somewhere on the mountain. The subgoals in skiing can be considered analogous to the shot target in a tennis exchange in, where the shot target determines the evolution of the game state. The planning process are briefly discussed below, following the same ecological principles used for tennis.

Perceptual Functions

Regarding perceptual functions, similar to the tennis example, and following the hierarchical levels in FIG. 3, distinguish between perceptual functions used to read the terrain environment and create the so-called situational awareness for planning; the perceptual functions at the executive level that will allow to orient and coordinate behavior through the terrain in the current planning cycle; and the perceptual functions at the level of the skill element execution needed to modulate execution in real-time throughout the turn.

FIG. 34 shows the gaze vector in the larger terrain to determine obstacles and terrain conditions such as the transition point into a new terrain element. FIG. 35 shows the gaze vector relative to features that are associated with the terrain interactions, including the turn entry and turn apex locations. The local interaction throughout the movement element execution is likely also based on optic flow and other mechanisms of the peripheral vision.

Task Level Planning

At the task level, planning is conditioned by the acquired repertoire of skill elements, i.e., the skill elements determine how the skier represents the environment and task. Similar to the game state in tennis, the skiing activity state includes the skier's current movement relative to the terrain environment and its elements (FIG. 34). This larger task state has to contain information needed to determine the plan for the larger trajectory for example the subgoal and the sequence of maneuvers leading to the subgoal.

The planning process could be formulated as a form of receding horizon process, where the skier considers a finite horizon in the future, long enough to determine the current action but not too long to exceed the perceptual limits and/or working memory. A more plausible type of implementation is that a skier learns patterns of behavior for different environment configurations (activity state) analogous to the game state in tennis shown in FIG. 13. Recall, that this process, inspired from ecological decision making, entails that the skiers acquire a set of templates capturing the range of environment configurations and corresponding actions. They can then retrieve from memory the state corresponding to the current perceptual pattern, with its template of behaviors, which allows rapid decision making. Recall also that these templates are described by the forward model.

As shown in FIGS. 14A and 14B, the transition between the current and next game state determines the sequence of supportive movement behaviors. In stationary conditions, the activity state remains similar, and the supportive behavior can follow the same behavior pattern, leading to periodic behaviors.

Environment Discretization and Assessment

The range of environment interactions and associated movement behaviors, like for tennis, depends on the skier's experience and skill level. Following the same logic as in tennis, the interaction of the skill elements with the environment participate in the environment representation for the task level processes. Therefore, characterizing the patterns of behavior and associated terrain environments, can provide the basis for skill assessment.

More generally, the actions and behaviors that a subject can perform in an environment determine how subjects perceive and build mental representations of the activity and environment, including the game state and forward model. For example, the characteristics of the turn maneuvers and their environment (e.g., including curvature, speed, slope) determine the terrain types that can be negotiated by a skier of a particular skill level and the range of conditions.

Same as in tennis, with sufficient skiing data from a subject in varied conditions and terrains, it is possible to determine the components of the model in FIG. 15, which comprehensively captures the subjects' skills. These quantities can then be used for assessment, diagnostics, and augmentation following the same general approach detailed for tennis.

The main elements of the comprehensive assessment are the forward model, the coordination policy, and the inverse models (for the different movement elements in the repertoire). Recall, the forward model describes the relationship between terrain features and configuration and the set of decisions. In the case of skiing, this corresponds to the configurations of terrain elements within the skier visual field of view and range, including possible obstacles, and the resulting set of possible trajectories that the skier has been using in those configurations as illustrated in FIG. 34. Each configuration can have one or more options (not considering configuration for which a skier does not have solutions). The set of trajectories can be described in detail such as sequence of movement elements as well as in form of subgoals (see FIG. 34).

The coordination policy describes how the movement elements are sequenced, this includes the coordination of the movement elements behavior with respect to key events associated with the task environment interactions and features of the environment (see FIG. 34 and FIG. 12 for the coordination of the movement elements during a tennis exchange).

The inverse model describes the relationship between conditions, technique, and outcomes for the repertoire of movement skill elements used by a subject, including for their various types of turns and transitional maneuvers.

Note that the forward model, coordination policy, and inverse model can also include the perceptual behavior such as the patterns in visual attention in relationship to the environment elements (see FIGS. 34 and 35).

The assessment and diagnostics are based on the evaluation of these models, their comparison with reference models, such as derived from population data, as well as normative models that can be determined from domain knowledge (e.g., ski coaching experts).

Skiing Behavior Augmentation

Similar as in tennis, augmentation can be deployed across the entire hierarchy (see, e.g., FIG. 28A-28B), with different emphasis and augmentation modalities at each level. In skiing, the key functions that are candidates for augmentation are environment perception, and coordination and deployment of the turn elements, and naturally the various aspects associated with the behavior execution. Therefore, perceptual augmentation using techniques such as augmented reality (AR) are expected to be well suited for such applications where the environment interactions are a major part of the performance.

Like for tennis, a range of augmentation at different levels of the system hierarchy can be implemented. FIG. 32 shows the overall architecture for tennis. For skiing that hierarchy remains the same with the planning forward reference model, the coordination policy within the sequence of behavior during a planning cycle, and reference models at the different elements and levels. The main difference in skiing is the definition of the behavior elements. the environment elements, and how the planning cycles are defined with respect to the environment dynamics and structure.

At the task level, a reference forward model can assist the skier with planning the sequence of turns for the terrain environment within the planning cycle (including options specified by subgoals). These cue elements can be overlaid on the visual scene using augmented reality glasses.

At the executive control level, a reference coordination policy can assist the skier coordinating the sequence of movement elements. For example, in the case of transition into a new terrain element or change in path, augmentation can assist with positioning and preparation of the turn. Specifically, cues can be overlaid on the visual scene to help the skier coordinate the turn maneuver phases with the critical environment features.

Finally, at the motor execution level, a reference inverse model can target the coordination of body motion to achieve the desired turn outcomes. The behavior within the turn can be specified by the timing and location of the entry, apex, and exit of the turn, considering for the specific environment elements (terrain features) and body segment configuration.

Like for the tennis embodiment, the augmentation can also be provided verbally using natural language. A similar set of instructions as described in Tables 21A-21E for tennis can be adapted for skiing and other recreational, professional and vocational open motor tasks and activities. Finally, signal based audio and haptic modalities can be used as well. These are primarily suited for timing, validation, or warning signals.

The augmentation system implementation for skiing—and other open motor activities—relies on the similar set of processes as in tennis (FIG. 30). Recall, that the activity element processing (A) determines the relevant activity and behavior elements; the activity recognition and tracking determine the activity state and the stage in the sequence of movement elements, relative to environment; the augmentation processor (C) determines the augmentation features based on cueing laws; the augmentation generator determines the augmentation elements including visual and/or verbal cues, as well as possibly signal based cues for audible and haptic communication and finally, the augmentation communication system is responsible for the communication of the cue elements to the subject. These processes operate based on the same principles as for tennis. They primarily have to be adapted to the different environment and dynamic and biomechanical characteristics of the behavior elements.

Skiing Sensing and Measurements

A key aspect of skiing, as in most open motor tasks, is the direct interaction with the physical environment. Therefore, in addition to measurements from the skier's body and equipment, measurements about the environment are key for improved assessment and augmentation.

One or more motion sensors can be affixed to the equipment and or body segments. At the minimum, a sensor on one or both the skis and/or boots can provide information about the skier's movement behavior. There are also increasingly measurement solutions that are embedded into the garments.

So-called first-person cameras provide key information about the environment from the subject's vantage point. One or more cameras can be used. Stereo vision makes it possible to get depth information which can be beneficial to precisely model the terrain. Other specialized depth sensor can be used such as LIDAR or time-of-flight cameras. The cameras or vision sensor can also be used to obtain measurements of the skiers' movements.

The sensor data are typically combined to estimate the behavior of the skier-environment system. For skiing the pose estimation including the relationship to the local environment relies primarily on the motion sensing of the individual segments such as legs, torso, or arms. In tennis, the court environment can be equipped with cameras to capture the entire body movement using video or other visual means. In skiing, video can be used but is more limited since in most cases the cameras are affixed to the subject. Cameras with wide angle lenses on the chest or other areas of the body may be used to capture the body segments and skis.

Finally, like for tennis, a gaze tracking sensor can provide necessary information about the skier's attention, perceptual, and decision-making processes.

VIII.III Other Applications

The modeling, assessment, and augmentation described in this disclosure focus on the physical interactions between an agent or subject and the activity or task and environment elements. In the following we briefly consider two types of applications where the subject is not fully embedded in the activity environment: human-machine systems and video games and other simulation.

In human-machine systems, the physical interactions with the task environment are typically mediated by some mechanical system. For example, in surgical robots the surgeon movement are mediated by a robot, which provides a variety of end effectors for the range of interactions required for a surgical procedure. Another example of human-machine application is prosthetics where part or the full interaction is enabled by a prosthetic device, such as lower limb or upper limb prosthetics. In video games and simulations, task and activity environments are simulated. In these domains, the manifestation of movement behavior takes different forms; however, the movement elements are similar sensory-motor interactions, and the behavior organization follows a similar structure and organization as in direct physical interactions.

Human-Machine Systems

In robotic surgery the surgeon must learn a repertoire of interactions and sequence of movement elements, similar as in open surgery. The modeling, assessment, and augmentation can be used following the same approach described in these specifications. Movement elements are acquired for the different forms of interactions and end effectors, such as cutting, manipulating, drilling, etc., and the surgeon must learn to sequence different movement elements to achieve the procedure subgoals and goal.

In prosthetics application the modeling, assessment, and augmentation can be used to assist the subject in learning movement interactions such as walking, in the case of lower limb prosthetics, or manipulation, in the case of upper limb prosthetics.

An advantage of most human-machine systems is that the system is typically already instrumented. For example, in surgical robotics, the robot control system requires measurements of the robot's movements and interactions. Often, in these robotic systems also have video capture that provide additional information about the environment.

Simulations and Video Games

In video games and simulations, the model and augmentation system can be applied to a range of applications in the general space of video games and other simulated activities. These include:

Video game design: The games can be based on real-world activities such as tennis, where the model can be used to assess and analyze skills. The augmentation can be used to assist training and/or produce additional effects for the game.

Surgical, or other professional skills (e.g., mechanical assembly) the assessment and augmentation system can be used for performance enhancement and training. The assessment and augmentation can for example focus on the acquisition of movement skill element repertoire, as well as the planning and executive functions used for the larger task performance.

Other applications include the design of spatial environment such as in interior design and architecture. In these applications, the model and augmentation can be used to study how people interact with the spatial or task environment.

IX. Examples

These specifications describe a set of capabilities to enable augmentation of the performance and learning of open motor skills. They cover modeling of the perceptual, planning, and control functions, through a hierarchical interaction model, and describe how this model is applied for assessment and augmentation of the subject's behavior across the behavior hierarchy.

The specifications can cover a range of embodiments in different application domains, with assessment and augmentation features operating across the hierarchy; e.g., as shown in FIG. 15 and FIG. 30 (task planning, perception, movement execution and control relative to the environment dynamics). The following embodiments and examples describe the application domains of tennis and skiing as representative of other professional, recreational, and vocational open motor tasks and activities. The realization of examples and embodiments in these other domains can be achieved by adapting the same general approach, substituting suitable equivalents and making other changes as understood by a person of ordinary skill, having read and understood the present disclosure, along with the accompanying drawings.

The general idea is to extend the concept of repertoire to include a sequence of movement elements with one or more primary movement elements, where the movement elements are modeled to include information about their operating conditions, and the activity state. The embodiments are based on a computer-based measurement, assessment and augmentation system with one or more motion sensors; e.g., embedded in a racket, paddle, club, bat, or other effector, or in a wearable device such as a smart watch, or attached to a ski or ski boot, cleat, shoe or glove, or attached to an arm, leg, foot or hand.

The measurements from the one or more sensors provide basic information about the activity state of the subject. For example, a sensor on the racket or other effector or on a wrist or other body part, besides stroke processing, can also be used to perform basic activity recognition and tracking, including identifying the player or subject positioning movements and preparatory movements such as a unit turn. This information can be used to tag the extracted stroke or movement elements based on context; e.g., was the subject moving, and how large of a positioning movement was observed before striking a ball or performing some other activity. This information about the context, as discussed herein, is used to measure, assess, diagnose, and augment sequences of movement by the subject.

The augmentation of a sequence of movements based on one or more sensors can include basic cueing features such as validation of key preparation movements including the unit turn used to take the racket back or otherwise move an effector, or to signal/trigger a behavior element such as recovery steps following a ball strike or other interaction with an object in the environment.

Clearly the full potential of environment interaction cueing utilizes sensing the movement behavior of the subject, and the interactions of the subject with the environment. A system based on one or more motion sensors can be extended with video capture; e.g., using a smart phone or adding cameras on the court or other environment. Alternatively, video data can be used by itself, independent of mountable or wearable motion sensor data, either using cameras and data processing abilities integrated into smart phones and other portable computing devices, or using dedicated cameras connected with a computer-based augmentation system.

A system can be adapted to capture and model movement behavior of subject engaged in an open motor task or activity performed in an environment, wherein the system includes: one or more movement sensors configured to capture and generate output characterizing body and body segment movements of the participants, including one or more sensors configured to capture interactions with elements and features of the environment and task or activity objects within the environment, with respect to the body, body segment, and or end effector movements of the participants. The system can comprise a processor configured to: extract and segment movement behavior from the output, characterizing the sequence of movements behavior elements used to perform a task or activity in its respective environment, identify a hierarchical relationship of the movement behavior elements, register the movement behavior elements and their outcomes with respective associated environment elements defining their operating environment including said task or activity objects participating in the sequence of movement behavior elements, and characterize the movement behavior element and their outcomes relative to the task or activity objects and the elements and features of the environment, including operating conditions and outcomes of the sequence of movement behavior elements.

A method for modeling analysis, assessment, and diagnostics of interactions of movement behavior elements in an environment and outcomes can comprise capturing a sequence of body and body segment movements of participants in performance of a task or activity in an environment, wherein one or more motion or vision-based sensors generates output characterizing interactions between the body and body segment movements, and possible end effector, of the participants with features of the environment and task or activity objects within the environment.

The method can include extracting movement features and attributes characterizing movement behavior elements of the interactions and performance from the sensor outputs, the movement behavior elements including movement techniques of the participants, operating conditions of performance, and outcomes of the sequence of body and body segment movements.

The method can include building a model by aggregating and classifying the movement behavior elements based on a hierarchical relationship and a combination of the movement features and attributes, and, for each element in the model, analyzing behavior movement element classes for aspects selected from positioning, setup conditions, stance, execution, movement performance, and efficiency of the outcomes.

The method can include capturing an inverse model of the movement behavior elements and determining a model of executive functions the coordination policy, the inverse model specifying describing the movement technique used for to achieve a desired outcome and given the prevailing conditions, and the executive functions providing coordination policy of the describing behavior movement elements of the movement elements relative to the task or activity objects and elements of the environment.

The method can include determining patterns that identify a coordination policy, and using the inverse model and the coordination policy to perform skill assessment and diagnostics for the participants by determining patterns that identify deficient combinations of the coordination of movement elements with setup conditions, the movement techniques of the participants, and the outcomes of the sequence of body and body segment movements.

This disclosure is made with reference to representative examples and embodiments. Changes can be made and equivalents may be substituted to adapt these teachings to different problems and applications, as known to persons of skill in the art. The invention is not limited to the particular examples that are disclosed, and encompasses all embodiments falling within the language of the appended claims.

The invention claimed is:

1. A system comprising:
one or more movement sensors adapted to capture and model movement behavior of a subject engaged in an open motor task or activity performed in an environment, wherein the one or more movement sensors are configured to generate output characterizing body segment and end effector movements of the subject, and interactions of the subject with features of the environment and one or more task or activity objects within the environment;
an augmentation processor comprising computer processor and memory components configured to:
extract and segment movement behavior elements from the output, characterizing a sequence of the movement behavior elements performed by the subject in the task or activity, within the environment;
identify a hierarchical relationship among the movement behavior elements;
generate a register of the movement behavior elements and associated outcomes with respect to the features of the environment based on the hierarchical relationship, including the sequence of movement behavior elements and motions of said task or activity objects responsive to the end effector movements; and
characterize the movement behavior elements and associated outcomes relative to the task or activity objects and the features of the environment based on the register of movement behavior elements, including the outcomes associated with the movement behavior elements; and
a user interface configured to generate augmentation feedback responsive to the sequence of movement behavior elements and associated outcomes, as characterized by the augmentation processor;
wherein the augmentation feedback is selected to specify one or more of the movement behavior elements for the subject to perform the task or activity via one or more of the end effector movements; and
wherein the computer processor and memory components are further configured to determine a participant setup for the subject, the participant setup including a stance of one or more of the body segment movements with respect to the subject, and a point of contact or strike zone information for one or more of the end effector movements relative to one or more of the task or activity objects.

2. The system of claim 1, wherein the register of movement behavior elements comprises positioning movement elements, preparatory or setup movement elements, and recovery movement elements, and wherein the outcomes represent changes in the features of the environment associated with said movement behavior elements.

3. The system of claim 1, wherein one or more of the task or activity objects comprises a ball, one or more of the end effector movements relate to a racket, and the features of the environment comprise one or more court subdivisions or boundaries and a position of a net relative to the subject.

4. The system of claim 1, wherein the computer processor and memory components are further configured to determine one or more of the features of the environment from the register of movement behavior elements, the register characterizing a pose of the subject based on the respective body segment and end effector movements, with respect to the one or more features or one or more of the task or activity objects, or both.

5. The system of claim 1, wherein the movement behavior elements define a turn maneuver of the subject in performance of the task or activity and the features of the environment define a local terrain proximate the subject, and:
wherein one or more of the associated outcomes defines a change in the local terrain proximate the subject, responsive to the turn maneuver, or
wherein the end effector movements are responsive to a velocity or direction of the participant with respect to the local terrain, proximate the subject; and
wherein the augmentation feedback is selected to prompt the subject to achieve or improve upon one of the associated outcomes, based on the local terrain.

6. The system of claim 1, wherein the features of the environment comprise one or more terrain elements selected from moguls, gates or natural obstacles, and wherein the registry defines a local plane of the subject with respect to the one or more terrain elements.

7. The system of claim 1, wherein the one or more movement sensors comprise a video sensor configured to generate the output as adapted for measurements of a gaze vector of the subject with respect to one or more of the features of the environment, or with respect to one or more of the task or activity objects.

8. A method for operating a system according to claim 1, the method comprising:
- estimating an activity state of the subject;
- identifying the movement behavior elements and interactions of the subject with the features of the environment, and the respective associated outcomes;
- using a reference model describing desired behavior of the subject, synthesizing a cueing law defining one or more aspects of the augmentation feedback comprising a cue selected to:
  - prompt the subject to coordinate the movement behavior elements in the sequence within the environment, selected for execution of the sequence of movement behavior elements to achieve one or more of the associated outcomes in the task or activity;
  - prompt the subject in positioning the movement behavior elements for synchronization with one or more of the task or activity objects or features of the environment;
  - prompt the subject in preparation or setup of the movement behavior elements element for synchronization with one or more of the task or activity objects or features of the environment; and/or
  - prompt the subject in execution of the movement behavior elements for synchronization with one or more of the task or activity objects or features of the environment, and to achieve or improve upon a selected outcome of the respective associated outcomes.

9. The method of claim 8, wherein the augmentation feedback is selected for one or more of prompting the subject for positioning of the body segment movements within the environment, timing of the body segment movements in the sequence of movement behavior elements, or highlighting relevant cues from one or more of the features of the environment or the task or activity objects within the environment.

10. The method of claim 8, wherein the augmentation feedback includes one or more real-time cues comprising a visual, audio, or verbal signal selected to assist the subject in positioning of the body segment movements, for planning the sequence of movement behavior elements during performance of the task or activity, or both.

11. The method of claim 8, wherein the one or more movement sensors include one or more motion sensors mounted on one or more of the task or activity objects, or worn by the subject.

* * * * *